US010010213B2

(12) United States Patent
Alexander et al.

(10) Patent No.: US 10,010,213 B2
(45) Date of Patent: Jul. 3, 2018

(54) HEATED OR COOLED DISHWARE AND DRINKWARE AND FOOD CONTAINERS

(71) Applicant: Ember Technologies, Inc., Westlake Village, CA (US)

(72) Inventors: Clayton Alexander, Westlake Village, CA (US); Daren John Leith, Agoura Hills, CA (US); Mikko Juhani Timperi, San Marcos, CA (US); Christopher Thomas Wakeham, Solana Beach, CA (US)

(73) Assignee: Ember Technologies, Inc., Westlake Village, CA (US)

(*) Notice: Subject to any disclaimer, the term of this patent is extended or adjusted under 35 U.S.C. 154(b) by 0 days.

(21) Appl. No.: 15/153,657

(22) Filed: May 12, 2016

(65) Prior Publication Data
US 2017/0042373 A1 Feb. 16, 2017

Related U.S. Application Data

(63) Continuation-in-part of application No. 14/712,813, filed on May 14, 2015, which is a continuation-in-part
(Continued)

(51) Int. Cl.
*A47J 36/24* (2006.01)
*A47G 19/02* (2006.01)
(Continued)

(52) U.S. Cl.
CPC .......... *A47J 36/2472* (2013.01); *A47G 19/02* (2013.01); *A47G 19/027* (2013.01);
(Continued)

(58) Field of Classification Search
CPC ...... A47J 36/2472; A47J 36/32; A47J 39/025; A47J 41/005; A47J 31/4417;
(Continued)

(56) References Cited

U.S. PATENT DOCUMENTS 1,649,067 A * 11/1927 Karlson .............. A47J 36/2461
219/436
1,721,311 A 7/1929 Muenchen
(Continued)

FOREIGN PATENT DOCUMENTS

CH 631614 8/1982
CN 1338240 A 3/2002
(Continued)

OTHER PUBLICATIONS

Non-final Office Action dated Nov. 14, 2016 in U.S. Appl. No. 15/050,714.
(Continued)

*Primary Examiner* — Eric Stapleton
(74) *Attorney, Agent, or Firm* — Knobbe, Martens, Olson & Bear LLP

(57) ABSTRACT

An actively heated or cooled food container can have a lid movable between an open and a closed position and an insulated body to which the lid can be attached. The insulated body can have a sidewall that defines a perimeter of the container body and a base, the sidewall and base defining one or more chambers that can be sealed by the lid. The food container can have a temperature control system that can include one or more heating or cooling elements in thermal communication with one or both of the sidewall and the base and operable to heat or cool one or both of the sidewall and the base to thereby heat or cool the one or more chambers in the food container.

15 Claims, 110 Drawing Sheets

Related U.S. Application Data of application No. 14/312,366, filed on Jun. 23, 2014, now Pat. No. 9,035,222, which is a continuation-in-part of application No. 14/144,283, filed on Dec. 30, 2013, now Pat. No. 8,759,721, which is a continuation-in-part of application No. 13/830,934, filed on Mar. 14, 2013, now Pat. No. 8,618,448, which is a continuation-in-part of application No. 13/287,967, filed on Nov. 2, 2011, now abandoned.

(60) Provisional application No. 61/409,493, filed on Nov. 2, 2010.

(51) Int. Cl.
*A47G 19/22* (2006.01)
*A47J 36/32* (2006.01)
*A47J 39/02* (2006.01)
*A47J 41/00* (2006.01)
*A47J 31/44* (2006.01)
*A47J 27/21* (2006.01)
*F25B 21/04* (2006.01)

(52) U.S. Cl.
CPC ...... *A47G 19/2288* (2013.01); *A47J 27/2105* (2013.01); *A47J 27/21041* (2013.01); *A47J 27/21083* (2013.01); *A47J 31/4417* (2013.01); *A47J 31/4425* (2013.01); *A47J 31/4457* (2013.01); *A47J 36/2416* (2013.01); *A47J 36/2466* (2013.01); *A47J 36/2494* (2013.01); *A47J 36/32* (2013.01); *A47J 39/025* (2013.01); *A47J 41/0005* (2013.01); *A47J 41/005* (2013.01); *A47J 41/0044* (2013.01); *A47J 41/0094* (2013.01); *F25B 21/04* (2013.01); *A47J 2202/00* (2013.01); *F25B 2600/07* (2013.01); *F25D 2331/808* (2013.01); *F25D 2400/36* (2013.01); *F25D 2700/16* (2013.01)

(58) Field of Classification Search
CPC ............... A47J 31/4425; A47J 31/4457; A47J 36/2416; A47J 36/2466; A47J 36/2494; A47J 41/0044; A47J 41/0094; A47J 27/21041; A47G 19/02; A47G 19/2288; A47G 19/027
USPC ........................................................ 219/485
See application file for complete search history.

(56) References Cited

U.S. PATENT DOCUMENTS

| | | | |
|---|---|---|---|
| 2,046,125 A * | 6/1936 | Lacy | A47J 36/2461 219/436 |
| 3,064,113 A | 11/1962 | Pitrone | |
| 3,155,260 A * | 11/1964 | Widener | A47J 41/0044 206/459.1 |
| 3,345,934 A * | 10/1967 | Steiner | A47J 31/50 222/146.1 |
| 3,463,140 A | 8/1969 | Rollor, Jr. | |
| 3,603,106 A | 9/1971 | Ryan et al. | |
| 3,622,753 A * | 11/1971 | Lax | A47J 36/2483 219/268 |
| 3,678,248 A | 7/1972 | Tricault et al. | |
| 3,739,148 A * | 6/1973 | Ryckman, Jr. | A47J 39/02 219/441 |
| 3,766,975 A | 10/1973 | Todd | |
| 3,797,563 A * | 3/1974 | Hoffmann | A47J 39/02 165/137 |
| 3,892,945 A * | 7/1975 | Lerner | A47J 36/2433 200/85 R |
| 3,931,494 A * | 1/1976 | Fisher | A47J 36/2461 219/386 |
| 4,068,115 A * | 1/1978 | Mack | A47B 31/02 126/246 |
| 4,095,090 A * | 6/1978 | Pianezza | A47G 19/2288 219/435 |
| 4,134,004 A * | 1/1979 | Anderson | A21B 1/52 219/202 |
| 4,240,272 A * | 12/1980 | Tiede | A45C 11/20 215/12.1 |
| 4,442,343 A | 4/1984 | Genuit et al. | |
| 4,470,999 A * | 9/1984 | Carpiac | A23F 5/243 141/1 |
| 4,531,046 A * | 7/1985 | Stover | A47J 31/56 392/442 |
| 4,537,044 A * | 8/1985 | Putnam | A45C 11/20 220/902 |
| D296,509 S | 7/1988 | Fuke | |
| 4,801,782 A | 1/1989 | Ineson | |
| 4,827,107 A * | 5/1989 | Peery | A47J 27/004 219/386 |
| 4,978,833 A * | 12/1990 | Knepler | F24H 1/202 392/402 |
| 4,980,539 A * | 12/1990 | Walton | A47G 19/2288 219/386 |
| 4,982,722 A * | 1/1991 | Wyatt | A47J 36/2494 126/246 |
| 4,983,798 A | 1/1991 | Eckler | |
| 5,042,258 A * | 8/1991 | Sundhar | A47G 19/2288 62/3.2 |
| 5,090,209 A | 2/1992 | Martin | |
| 5,163,290 A | 11/1992 | Kinnear | |
| 5,199,275 A | 4/1993 | Martin | |
| 5,208,896 A | 5/1993 | Katayev | |
| 5,217,064 A * | 6/1993 | Kellow | A61J 1/165 165/254 |
| 5,243,684 A | 9/1993 | Edwards | |
| 5,274,215 A * | 12/1993 | Jackson | A47J 36/2483 219/202 |
| 5,283,420 A | 2/1994 | Montalto | |
| 5,313,787 A | 5/1994 | Martin | |
| 5,343,368 A | 8/1994 | Miller | |
| 5,448,809 A | 9/1995 | Kraus | |
| 5,497,883 A * | 3/1996 | Monetti | A47J 39/006 206/545 |
| 5,508,494 A | 4/1996 | Sarris et al. | |
| 5,549,035 A * | 8/1996 | Wing-Chung | A47J 31/545 219/505 |
| 5,550,452 A * | 8/1996 | Shirai | H01F 38/14 320/108 |
| 5,603,220 A * | 2/1997 | Seaman | A61J 1/165 62/3.62 |
| 5,603,858 A * | 2/1997 | Wyatt | A47J 39/006 126/246 |
| 5,643,485 A * | 7/1997 | Potter | A47J 27/002 126/375.1 |
| 5,678,925 A | 10/1997 | Garmaise et al. | |
| 5,731,568 A * | 3/1998 | Malecek | B60H 1/00278 180/68.5 |
| 5,737,923 A | 4/1998 | Gilley | |
| 5,786,643 A | 7/1998 | Wyatt et al. | |
| 5,842,353 A * | 12/1998 | Kuo-Liang | A47G 19/2288 219/419 |
| 5,884,006 A * | 3/1999 | Frohlich | A47J 36/2494 126/263.01 |
| 5,903,133 A | 5/1999 | Amero, Jr. et al. | |
| 5,948,301 A * | 9/1999 | Liebermann | A47J 36/2483 219/395 |
| 5,954,984 A | 9/1999 | Ablah | |
| 5,959,433 A * | 9/1999 | Rohde | H02J 7/025 320/108 |
| 6,005,233 A | 12/1999 | Wyatt | |
| 6,013,901 A * | 1/2000 | Lavoie | A47G 19/2227 219/432 |
| 6,020,575 A | 2/2000 | Nagle et al. | |
| 6,032,481 A | 3/2000 | Mosby | |
| 6,042,720 A | 3/2000 | Reber | |

(56) References Cited

U.S. PATENT DOCUMENTS

| | | | |
|---|---|---|---|
| 6,072,161 A * | 6/2000 | Stein | A47G 19/2288 219/386 |
| 6,075,229 A | 6/2000 | Vanselow | |
| 6,089,409 A * | 7/2000 | Hart | A47J 31/505 222/146.5 |
| 6,108,489 A * | 8/2000 | Frohlich | A47J 36/2494 126/263.01 |
| 6,110,159 A | 8/2000 | Tsujita | |
| 6,123,065 A | 9/2000 | Teglbjarg | |
| 6,140,614 A * | 10/2000 | Padamsee | A47J 36/2466 219/438 |
| 6,144,016 A * | 11/2000 | Garvin | A45C 11/20 206/550 |
| 6,158,227 A * | 12/2000 | Seeley | G01K 1/14 340/585 |
| 6,180,003 B1 | 1/2001 | Reber et al. | |
| 6,212,959 B1 | 4/2001 | Perkins | |
| 6,232,585 B1 | 5/2001 | Clothier | |
| RE37,213 E | 6/2001 | Staggs | |
| 6,274,856 B1 | 8/2001 | Clothier | |
| 6,279,470 B2 * | 8/2001 | Simeray | A47J 39/006 165/48.1 |
| 6,281,611 B1 * | 8/2001 | Chen | A47J 36/26 219/201 |
| 6,314,867 B1 * | 11/2001 | Russell | A47J 36/2466 219/432 |
| 6,316,753 B2 | 11/2001 | Clothier | |
| 6,320,169 B1 * | 11/2001 | Clothier | G06K 7/0008 219/620 |
| 6,350,972 B1 | 2/2002 | Wright | |
| 6,353,208 B1 | 3/2002 | Bostic | |
| 6,376,803 B1 * | 4/2002 | Klinger | A47J 39/006 219/386 |
| 6,384,387 B1 | 5/2002 | Owens | |
| 6,403,928 B1 * | 6/2002 | Ford | A47J 36/2461 219/386 |
| 6,414,278 B1 * | 7/2002 | Frohlich | A47J 39/02 219/387 |
| 6,415,624 B1 | 7/2002 | Connors et al. | |
| 6,427,863 B1 | 8/2002 | Nichols | |
| 6,433,313 B1 | 8/2002 | Owens | |
| 6,444,961 B2 | 9/2002 | Clothier | |
| 6,543,335 B1 * | 4/2003 | Lassota | A47J 31/007 99/283 |
| 6,555,789 B2 | 4/2003 | Owens | |
| 6,571,564 B2 | 6/2003 | Upadhye et al. | |
| 6,584,374 B2 * | 6/2003 | Lee | F24C 7/08 219/386 |
| 6,634,417 B1 | 10/2003 | Kolowich | |
| 6,657,170 B2 * | 12/2003 | Clothier | A47C 1/12 126/400 |
| 6,662,978 B2 | 12/2003 | Lin et al. | |
| 6,664,520 B2 | 12/2003 | Clothier | |
| 6,674,052 B1 * | 1/2004 | Luo | A47J 41/0077 219/432 |
| 6,702,138 B1 | 3/2004 | Bielecki et al. | |
| 6,703,590 B1 | 3/2004 | Holley, Jr. | |
| 6,818,867 B2 * | 11/2004 | Kressmann | A47J 27/21083 219/438 |
| 6,852,954 B1 * | 2/2005 | Liu | A47J 36/2472 219/387 |
| 6,864,462 B2 | 3/2005 | Sanoner et al. | |
| 6,870,135 B2 * | 3/2005 | Hamm | A47J 36/2433 219/202 |
| 6,953,913 B1 * | 10/2005 | Hara | A47J 27/18 219/432 |
| 6,968,888 B2 | 11/2005 | Kolowich | |
| 7,002,111 B2 | 2/2006 | Bauer | |
| 7,022,946 B2 | 4/2006 | Sanoner et al. | |
| 7,034,256 B1 * | 4/2006 | Phillips | A47J 36/04 126/261 |
| 7,059,387 B2 | 6/2006 | Kolowich | |
| 7,073,678 B1 | 7/2006 | Dibdin et al. | |
| 7,091,455 B2 * | 8/2006 | Fung | A47J 27/2105 219/429 |
| 7,109,445 B2 * | 9/2006 | Patterson | A47J 27/004 219/438 |
| 7,193,190 B2 * | 3/2007 | Kissel, Jr. | A47J 36/2483 219/386 |
| 7,208,707 B2 | 4/2007 | Clothier | |
| 7,212,955 B2 | 5/2007 | Kirshenbaum et al. | |
| 7,227,108 B2 | 6/2007 | Clothier | |
| 7,263,283 B2 | 8/2007 | Knepler | |
| 7,276,676 B1 * | 10/2007 | Thompson | A47J 36/2483 206/541 |
| 7,287,386 B2 | 10/2007 | Upadhye et al. | |
| 7,414,380 B2 * | 8/2008 | Tang | H01F 38/14 320/108 |
| 7,419,073 B2 * | 9/2008 | Crisp, III | B67D 1/0057 222/129.1 |
| 7,431,174 B2 | 10/2008 | Thissen | |
| 7,571,830 B2 * | 8/2009 | Lin | A47J 41/0016 206/217 |
| 7,592,084 B2 * | 9/2009 | Hoffjann | G07F 13/065 222/129.1 |
| 7,659,493 B2 * | 2/2010 | Reusche | A01K 1/0158 119/69.5 |
| 7,681,754 B1 | 3/2010 | Ross | |
| 7,683,572 B2 * | 3/2010 | Toya | H02J 7/0044 320/108 |
| 7,815,067 B2 | 10/2010 | Matsumoto et al. | |
| 7,825,353 B2 * | 11/2010 | Shingler | H05B 3/70 126/21 A |
| 7,836,722 B2 | 11/2010 | Magill et al. | |
| 7,934,537 B2 | 5/2011 | Kolowich | |
| 7,942,145 B2 | 5/2011 | Palena et al. | |
| 7,948,209 B2 * | 5/2011 | Jung | H02J 7/025 307/104 |
| 7,966,927 B2 * | 6/2011 | Yoakim | A47J 31/005 99/284 |
| 7,997,786 B2 * | 8/2011 | Liu | A47J 27/004 219/438 |
| 8,055,310 B2 * | 11/2011 | Beart | G06F 1/1632 340/693.1 |
| 8,061,149 B1 * | 11/2011 | Gowans | A61J 1/165 62/3.62 |
| 8,076,620 B2 | 12/2011 | Maupin et al. | |
| 8,146,485 B2 * | 4/2012 | Ozanne | A47J 31/407 99/280 |
| 8,205,468 B2 | 6/2012 | Hemminger et al. | |
| 8,272,532 B2 | 9/2012 | Michaelian et al. | |
| 8,274,016 B2 * | 9/2012 | Montana | A47J 36/2466 219/385 |
| 8,280,453 B2 | 10/2012 | Beart et al. | |
| 8,319,154 B2 * | 11/2012 | Shaikh | A47J 36/2411 165/104.17 |
| 8,336,729 B2 | 12/2012 | Kelly | |
| 8,400,104 B2 | 3/2013 | Adamczyk et al. | |
| 8,448,809 B2 | 5/2013 | Kelly | |
| 8,467,669 B2 | 6/2013 | Widanagamage Don et al. | |
| 8,479,941 B2 | 7/2013 | Matsumoto et al. | |
| 8,618,448 B2 | 12/2013 | Alexander | |
| 8,621,980 B2 * | 1/2014 | Bunn | A47J 31/007 222/146.5 |
| 8,759,721 B1 | 6/2014 | Alexander | |
| 8,907,796 B2 | 12/2014 | Sweeney et al. | |
| 9,035,222 B2 | 5/2015 | Alexander | |
| 9,151,545 B2 * | 10/2015 | Soukhojak | C09K 5/04 |
| 9,184,427 B2 * | 11/2015 | Chuang | H01M 2/105 |
| 9,351,600 B2 | 5/2016 | Rime | |
| 2001/0009609 A1 * | 7/2001 | Bradenbaugh | F24H 9/2021 392/463 |
| 2001/0023866 A1 * | 9/2001 | Wang | A47J 27/004 219/429 |
| 2002/0023912 A1 * | 2/2002 | McGee | A47J 36/2461 219/432 |
| 2002/0083840 A1 * | 7/2002 | Lassota | A47J 31/50 99/275 |
| 2002/0129712 A1 * | 9/2002 | Westbrook | A47J 31/3676 99/279 |

(56) References Cited

U.S. PATENT DOCUMENTS

| | | | |
|---|---|---|---|
| 2002/0162339 A1 | 11/2002 | Harrison | |
| 2002/0175158 A1* | 11/2002 | Sanoner | F23Q 7/001 |
| | | | 219/270 |
| 2003/0024250 A1 | 2/2003 | Haas | |
| 2003/0029862 A1* | 2/2003 | Clothier | A47C 1/12 |
| | | | 219/621 |
| 2003/0066638 A1 | 4/2003 | Qu | |
| 2003/0145621 A1 | 8/2003 | Kidwell | |
| 2004/0004072 A1 | 1/2004 | Clothier | |
| 2004/0159240 A1* | 8/2004 | Lyall, III | A47J 31/505 |
| | | | 99/275 |
| 2004/0167592 A1 | 8/2004 | Grove | |
| 2004/0194470 A1* | 10/2004 | Upadhye | A47J 36/2438 |
| | | | 62/3.3 |
| 2005/0045615 A1* | 3/2005 | Sanoner | A47G 19/2227 |
| | | | 219/387 |
| 2005/0121431 A1* | 6/2005 | Yuen | A47G 19/2288 |
| | | | 219/387 |
| 2005/0242804 A1 | 11/2005 | Hintz | |
| 2006/0023480 A1 | 2/2006 | Plummer | |
| 2006/0081599 A1 | 4/2006 | Anderson | |
| 2006/0207442 A1* | 9/2006 | Pettersson | F25B 21/02 |
| | | | 99/517 |
| 2006/0261233 A1 | 11/2006 | Williams et al. | |
| 2007/0024237 A1 | 2/2007 | Cole et al. | |
| 2007/0092773 A1 | 4/2007 | Guo | |
| 2007/0151457 A1* | 7/2007 | Rabin | A47J 27/21008 |
| | | | 99/275 |
| 2007/0182367 A1* | 8/2007 | Partovi | H01F 5/003 |
| | | | 320/108 |
| 2007/0223895 A1* | 9/2007 | Flemm | A47J 36/2433 |
| | | | 392/441 |
| 2007/0278207 A1 | 12/2007 | Van Hoy | |
| 2007/0279002 A1* | 12/2007 | Partovi | H02J 7/0027 |
| | | | 320/115 |
| 2008/0011077 A1* | 1/2008 | Ramus | A47J 31/44 |
| | | | 73/304 R |
| 2008/0019122 A1* | 1/2008 | Kramer | A47G 19/025 |
| | | | 362/154 |
| 2008/0022695 A1 | 1/2008 | Welle | |
| 2008/0022696 A1 | 1/2008 | Welle | |
| 2008/0041233 A1* | 2/2008 | Bunn | A47J 31/007 |
| | | | 99/281 |
| 2008/0041859 A1 | 2/2008 | Teglbjarg | |
| 2008/0121630 A1* | 5/2008 | Simard | A45C 11/20 |
| | | | 219/387 |
| 2008/0135564 A1 | 6/2008 | Romero | |
| 2008/0141681 A1 | 6/2008 | Arnold | |
| 2008/0149624 A1* | 6/2008 | Tamura | H02J 7/00 |
| | | | 219/685 |
| 2008/0179311 A1* | 7/2008 | Koro | A47J 36/2416 |
| | | | 219/430 |
| 2008/0190914 A1 | 8/2008 | Gibson | |
| 2008/0213449 A1* | 9/2008 | Wisner | A47J 39/006 |
| | | | 426/520 |
| 2008/0251063 A1* | 10/2008 | Palena | A47J 36/2416 |
| | | | 126/263.09 |
| 2008/0272134 A1 | 11/2008 | Rohe | |
| 2009/0102296 A1* | 4/2009 | Greene | H01Q 1/243 |
| | | | 307/149 |
| 2009/0166350 A1* | 7/2009 | Ho | A47J 27/21041 |
| | | | 219/441 |
| 2009/0184102 A1* | 7/2009 | Parker, Jr. | A47J 36/2472 |
| | | | 219/387 |
| 2009/0230117 A1 | 9/2009 | Fernando | |
| 2010/0000980 A1* | 1/2010 | Popescu | A47J 36/20 |
| | | | 219/201 |
| 2010/0028758 A1* | 2/2010 | Eaves | H01M 2/105 |
| | | | 429/50 |
| 2010/0108694 A1 | 5/2010 | Sedlbauer et al. | |
| 2010/0125417 A1 | 5/2010 | Hyde et al. | |
| 2010/0158489 A1* | 6/2010 | Siu | A47J 27/2105 |
| | | | 392/444 |
| 2010/0186499 A1 | 7/2010 | Ramus et al. | |
| 2010/0251755 A1* | 10/2010 | Lauchnor | F25D 25/02 |
| | | | 62/457.5 |
| 2011/0056215 A1* | 3/2011 | Ham | H01F 38/14 |
| | | | 62/3.7 |
| 2011/0062149 A1* | 3/2011 | Driel | A47J 36/2433 |
| | | | 219/618 |
| 2011/0072978 A1* | 3/2011 | Popescu | A47G 19/14 |
| | | | 99/288 |
| 2011/0108506 A1* | 5/2011 | Lindhorst-Ko | A47J 41/0044 |
| | | | 215/13.1 |
| 2011/0121660 A1* | 5/2011 | Azancot | H02J 5/005 |
| | | | 307/104 |
| 2011/0152979 A1* | 6/2011 | Driscoll | A61N 5/0616 |
| | | | 607/93 |
| 2011/0155621 A1 | 6/2011 | Lindquist et al. | |
| 2011/0174993 A1 | 7/2011 | Blain | |
| 2011/0180527 A1* | 7/2011 | Abbott | A47J 27/002 |
| | | | 219/450.1 |
| 2011/0198255 A1 | 8/2011 | Baumfalk et al. | |
| 2011/0259871 A1* | 10/2011 | Li | A47J 27/21158 |
| | | | 219/441 |
| 2011/0265562 A1* | 11/2011 | Li | A47J 27/212 |
| | | | 73/304 C |
| 2012/0061050 A1 | 3/2012 | Petrillo et al. | |
| 2012/0064470 A1* | 3/2012 | Delattre | A47J 36/2433 |
| | | | 432/29 |
| 2012/0082766 A1* | 4/2012 | Maupin | A47J 27/004 |
| | | | 426/244 |
| 2012/0090333 A1 | 4/2012 | DellaMorte et al. | |
| 2012/0103562 A1 | 5/2012 | Alexander | |
| 2012/0118874 A1 | 5/2012 | Williams et al. | |
| 2012/0132646 A1 | 5/2012 | England et al. | |
| 2012/0138597 A1 | 6/2012 | Quella et al. | |
| 2012/0193999 A1 | 8/2012 | Zeine | |
| 2012/0235505 A1 | 9/2012 | Schatz et al. | |
| 2012/0235636 A1 | 9/2012 | Partovi | |
| 2012/0248095 A1 | 10/2012 | Lee et al. | |
| 2012/0248096 A1 | 10/2012 | Lee et al. | |
| 2012/0255946 A1 | 10/2012 | Kim et al. | |
| 2012/0256585 A1 | 10/2012 | Partovi et al. | |
| 2012/0258229 A1 | 10/2012 | Mindrup | |
| 2012/0312031 A1* | 12/2012 | Olsen | F25B 21/02 |
| | | | 62/3.62 |
| 2012/0319500 A1 | 12/2012 | Beart et al. | |
| 2013/0059259 A1 | 3/2013 | Oldani | |
| 2013/0103463 A1 | 4/2013 | Briar et al. | |
| 2013/0167730 A1 | 7/2013 | Behm | |
| 2013/0200064 A1 | 8/2013 | Alexander | |
| 2013/0206015 A1 | 8/2013 | Jacoby et al. | |
| 2013/0221013 A1 | 8/2013 | Kolowich et al. | |
| 2013/0239607 A1 | 9/2013 | Kelly | |
| 2013/0255824 A1 | 10/2013 | Williams et al. | |
| 2013/0275075 A1 | 10/2013 | Johnson | |
| 2014/0230484 A1 | 8/2014 | Yavitz | |
| 2014/0238985 A1 | 8/2014 | Sweeney et al. | |
| 2015/0024349 A1* | 1/2015 | Bischoff | A47G 23/16 |
| | | | 434/127 |
| 2015/0122688 A1* | 5/2015 | Dias | A47G 19/025 |
| | | | 206/459.1 |
| 2015/0335184 A1* | 11/2015 | Balachandran | A47G 19/2288 |
| | | | 219/438 |
| 2016/0183730 A1* | 6/2016 | Bedi | A47G 19/2288 |
| | | | 219/439 |
| 2017/0150840 A1* | 6/2017 | Park | A47J 27/002 |

FOREIGN PATENT DOCUMENTS

| | | |
|---|---|---|
| CN | 2708795 Y | 7/2005 |
| CN | 1748112 A | 3/2006 |
| CN | 1776992 A | 5/2006 |
| CN | 2922666 Y | 7/2007 |
| CN | 101069606 A | 11/2007 |
| CN | 201042350 Y | 4/2008 |
| CN | 201076180 | 6/2008 |
| CN | 201308643 | 10/2008 |
| CN | 201237271 | 5/2009 |

(56) References Cited

FOREIGN PATENT DOCUMENTS

| | | | |
|---|---|---|---|
| CN | 201303850 Y | | 9/2009 |
| CN | 201445353 U | | 5/2010 |
| CN | 101820128 A | | 9/2010 |
| CN | 201612420 U | | 10/2010 |
| CN | 102 164 526 A | | 8/2011 |
| CN | 102802294 | | 5/2012 |
| CN | 202681700 | | 1/2013 |
| CN | 202919767 U | | 5/2013 |
| CN | 102266184 B | | 10/2013 |
| CN | 203468187 U | | 3/2014 |
| DE | 19744526 | | 4/1999 |
| DE | 20108363 | | 8/2001 |
| DE | 20314416 | | 1/2004 |
| EP | 0332355 | | 9/1989 |
| EP | 0722708 | | 7/1996 |
| EP | 0895772 | | 2/1999 |
| EP | 2 165 243 A1 | | 3/2010 |
| EP | 2001761 | | 1/2012 |
| EP | 2308771 | | 6/2012 |
| FR | 2737380 | | 1/1997 |
| FR | 2752377 | | 2/1998 |
| FR | 2763463 | | 11/1998 |
| FR | 2828082 | | 2/2003 |
| GB | 1 311 955 A | | 3/1973 |
| GB | 2 390 798 A | | 1/2004 |
| GB | 2414922 A | | 12/2005 |
| GB | 2441825 | | 3/2008 |
| JP | U-S54-147575 | | 4/1953 |
| JP | 11-268777 | | 10/1999 |
| JP | 2000-279302 A | | 10/2000 |
| JP | 2003-299255 A | | 10/2003 |
| JP | A-2004-261493 | | 9/2004 |
| JP | 2006-068152 | | 3/2006 |
| JP | 2006-102234 A | | 4/2006 |
| JP | 2006-166522 A | | 6/2006 |
| JP | 2006-345957 | | 12/2006 |
| JP | 2007-064557 A | | 3/2007 |
| JP | 2007-312932 | | 12/2007 |
| JP | 2008-173464 A | | 7/2008 |
| JP | U-3153007 | | 7/2009 |
| JP | 2010-527226 A | | 8/2010 |
| JP | 2011-171205 | | 9/2011 |
| JP | 5127819 | | 1/2013 |
| JP | 5481388 | | 4/2014 |
| WO | WO 2004/055654 A2 | | 7/2004 |
| WO | WO 2008/028329 | | 3/2008 |
| WO | WO 2008/065175 | | 6/2008 |
| WO | WO 2008/137996 A1 | | 11/2008 |
| WO | WO 2008/155538 A2 | | 12/2008 |
| WO | WO 2009/138930 A1 | | 11/2009 |
| WO | WO 2011/13155 A2 | | 10/2011 |
| WO | WO 2012/104665 | | 8/2012 |

OTHER PUBLICATIONS

Second Office Action dated Apr. 10, 2017 in CN Application No. 201510869257.5.
International Search Report and Written Opinion dated Jul. 12, 2017, in PCT Application No. PCT/US2017/031534.
Non-final office action dated Aug. 2, 2016 in Japanese Patent Application No. 2013-537797.
Supplementary European Search Report dated Oct. 18, 2016 in European Patent Application No. 14 77 4350.
Decision of Rejection dated Apr. 4, 2017 in JP Application No. 2013-537797.
First Office Action dated Nov. 23, 2016 in CN Application No. 201480014620.9.
U.S. Appl. No. 13/287,967, filed Nov. 2, 2011, Clayton Alexander, US 2012/0103562, Pub Date: May 3, 2012.
U.S. Appl. No. 14/712,813, filed May 14, 2015, Alexander, Clayton, US 2015/0245723 A1, Pub Date: Sep. 3, 2015.
International Search Report and Written Opinion dated Mar. 16, 2012 in PCT/US2011/059014.
International Preliminary Report on Patentability dated May 7, 2013 in PCT Application No. PCT/US2011/059014.
International Search Report and Written Opinion dated Dec. 9, 2014 in PCT/US2014/019130.
International Search Report and Written Opinion dated Jan. 12, 2016 in PCT Application No. PCT/US15/36304.
Office Action in related Chinese Application No. 201180063844.5, dated Dec. 29, 2014.
Patent Examination Report No. 1 in related Australian Application No. 2011323416, dated May 15, 2015.
Patent Examination Report No. 2 in related Australian Application No. 2011323416, dated Oct. 20, 2015.
Notice of Reason(s) for Rejection dated Aug. 11, 2015 in JP Application No. 2013-53797.
European Patent Office Search Report dated Mar. 17, 2016 regarding Application No. 11838764.6-1804, PCT/US2011059014, 7 pages.
European Search Report received in European Patent Application No. 15811173.2, dated Dec. 13, 2017.
Office Action dated Jan. 12, 2018, received in Chinese Application No. 201510869257.5.
European Office Action dated Sep. 28, 2017, received in European Patent Application No. 14 774 350.4, pp. 5.
PCT International Search Report and WrittenOpinion dated Sep. 14, 2017 regarding International Application No. PCT/US2017/034081, 15 pages.

* cited by examiner

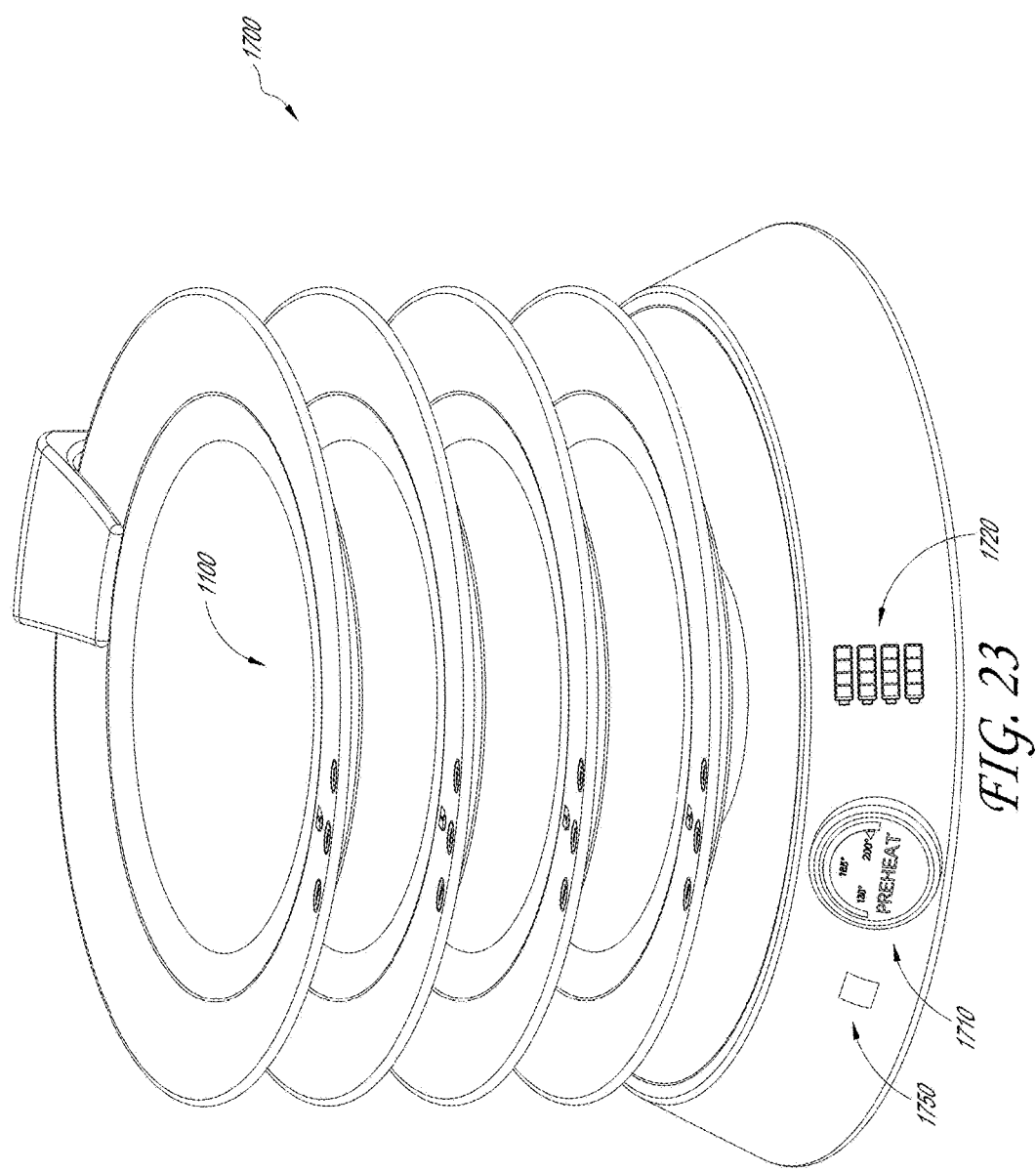

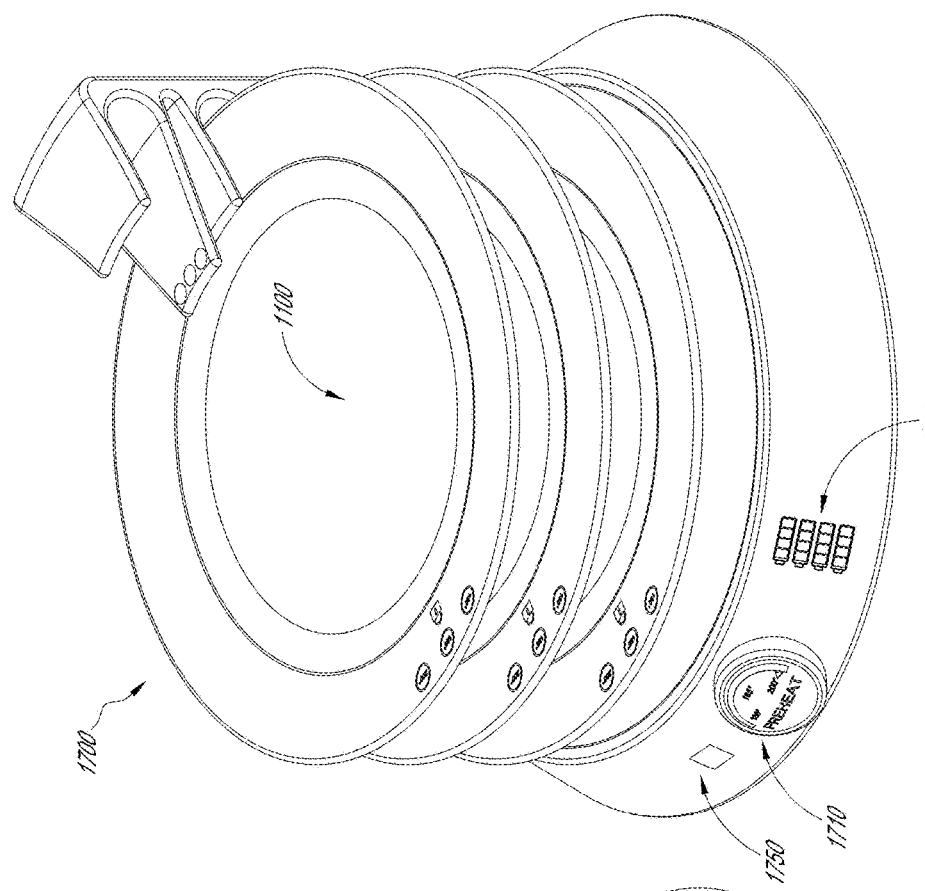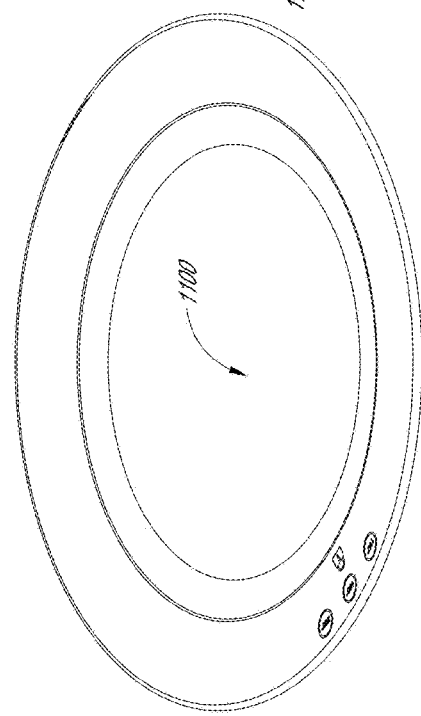
FIG. 24A

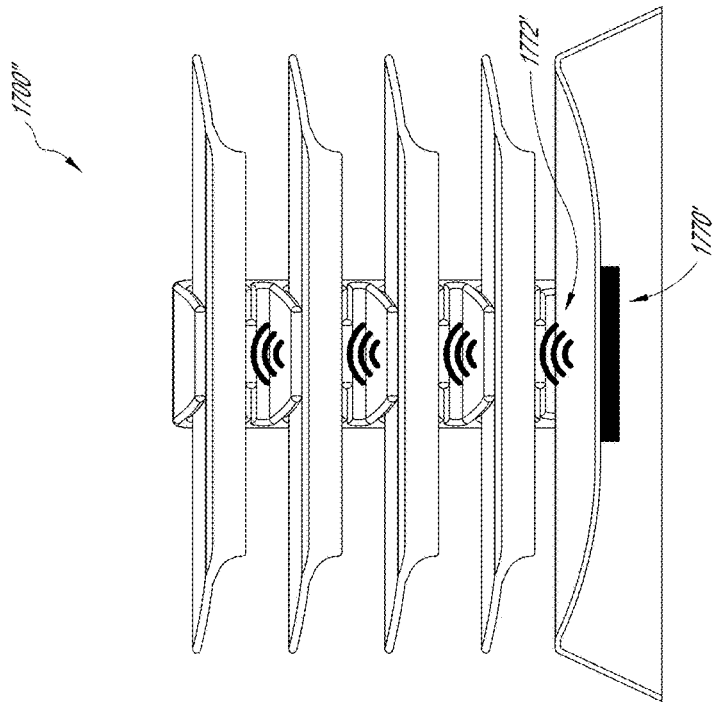
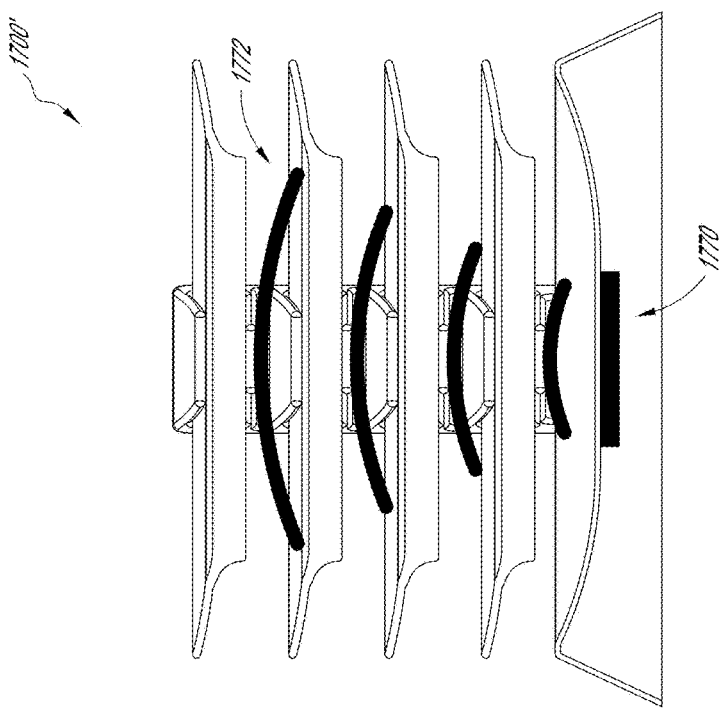

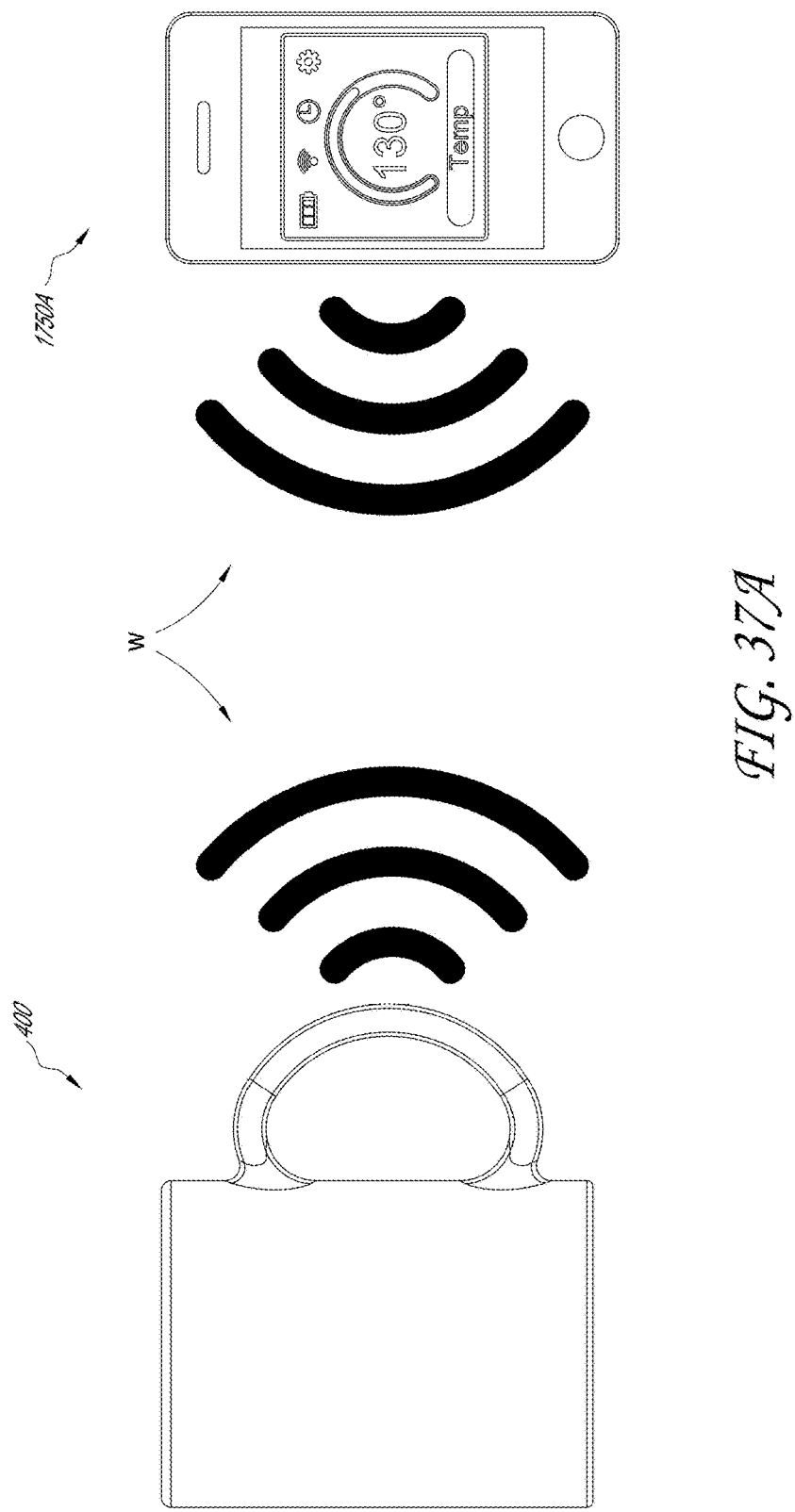

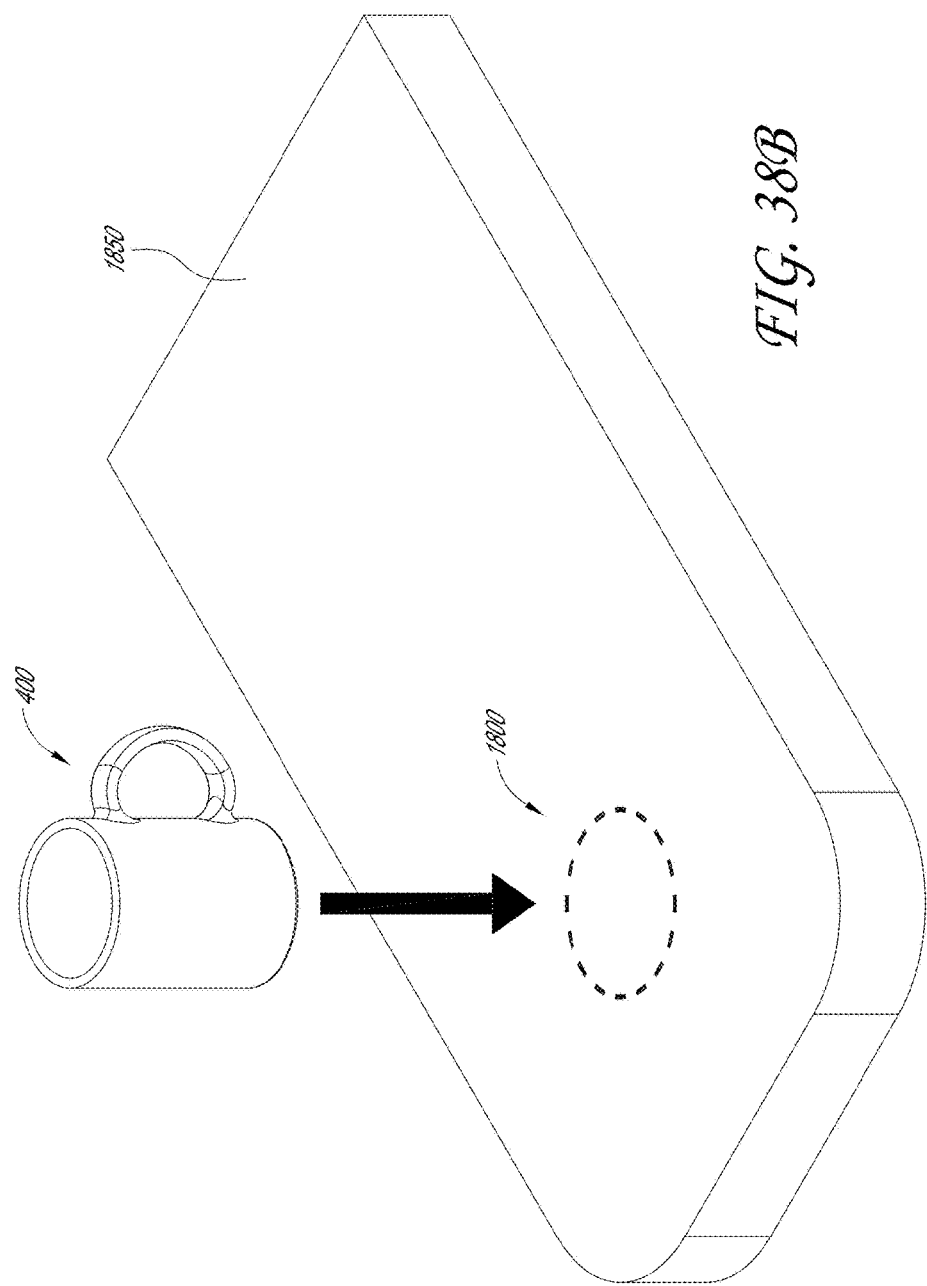

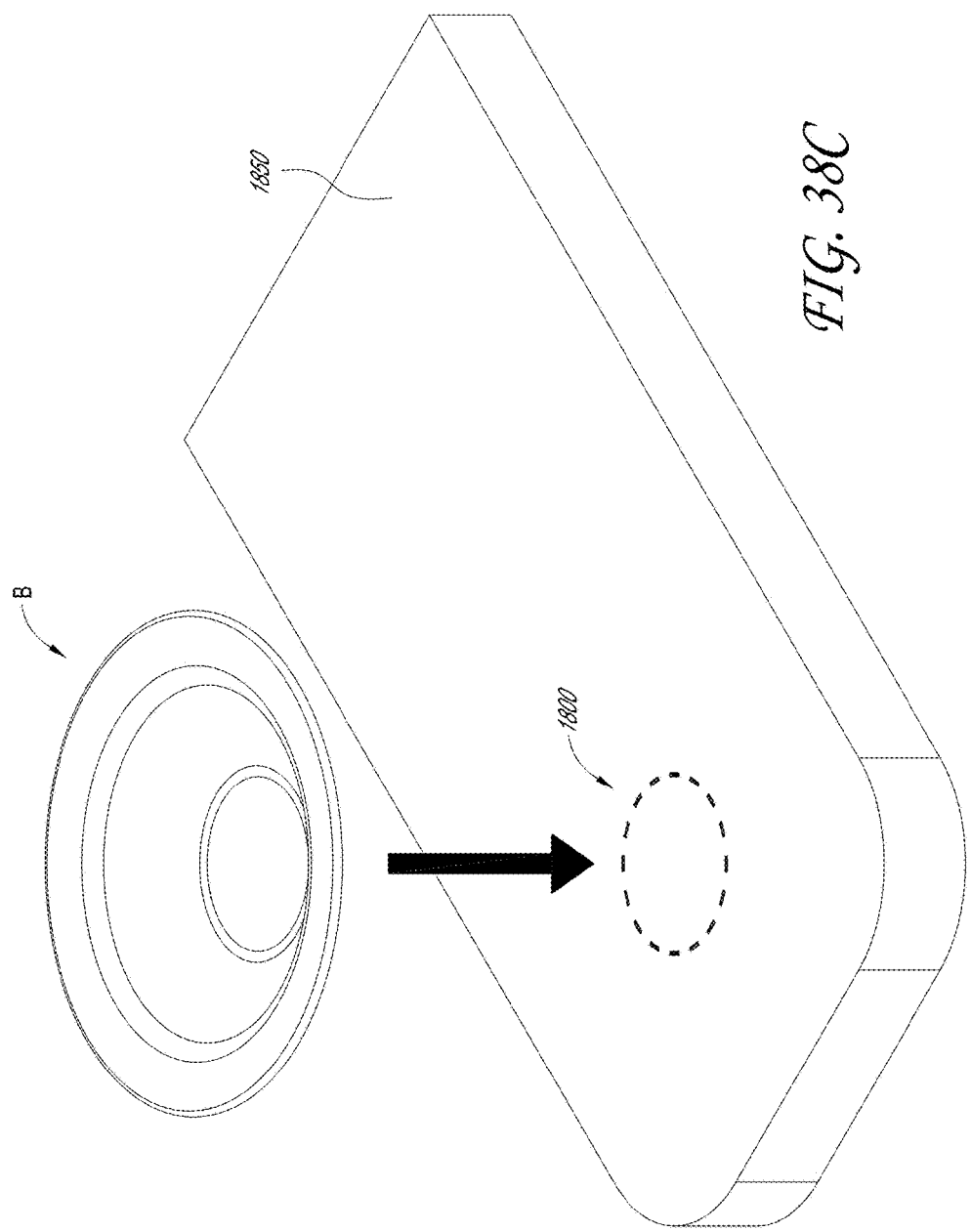

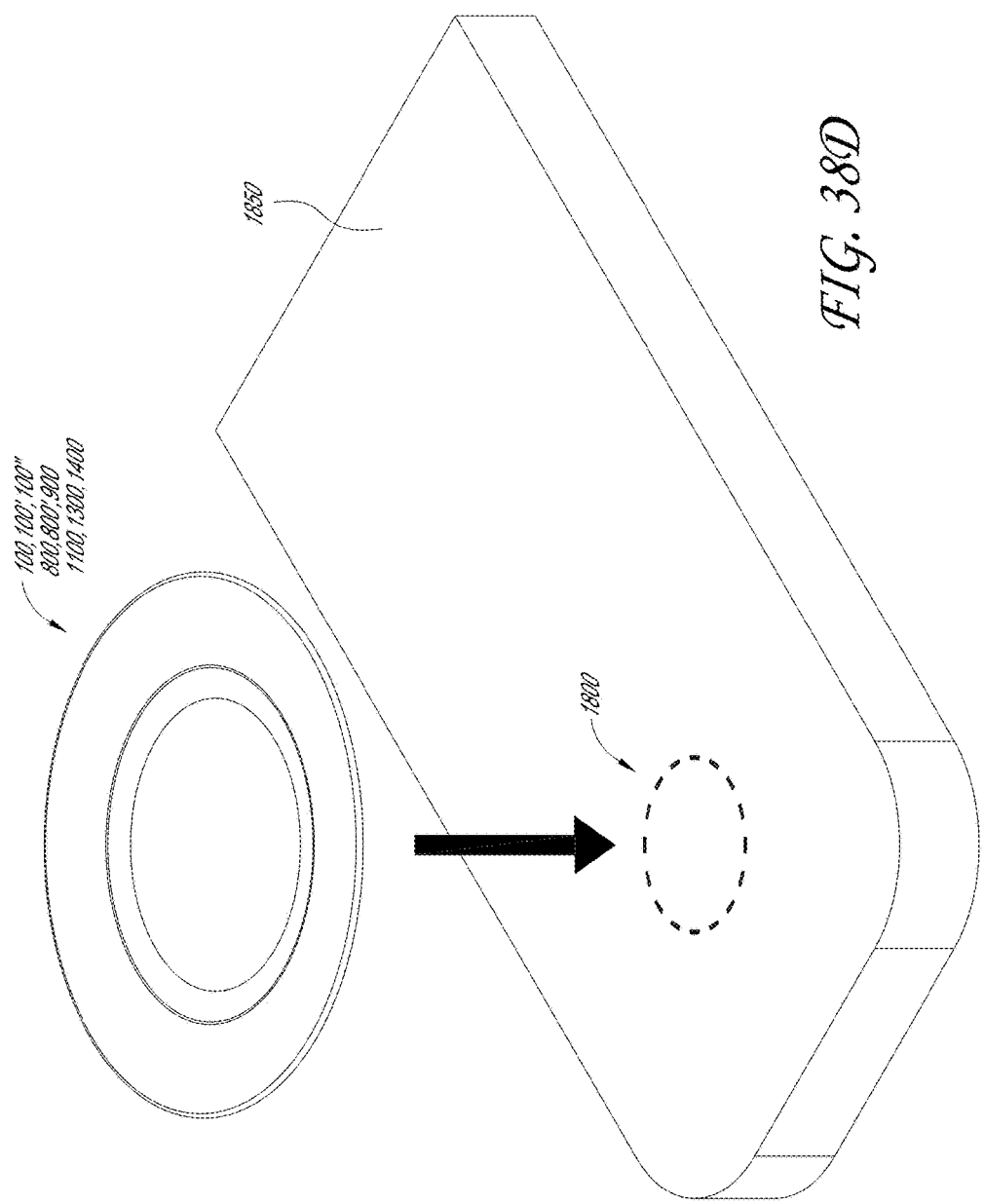

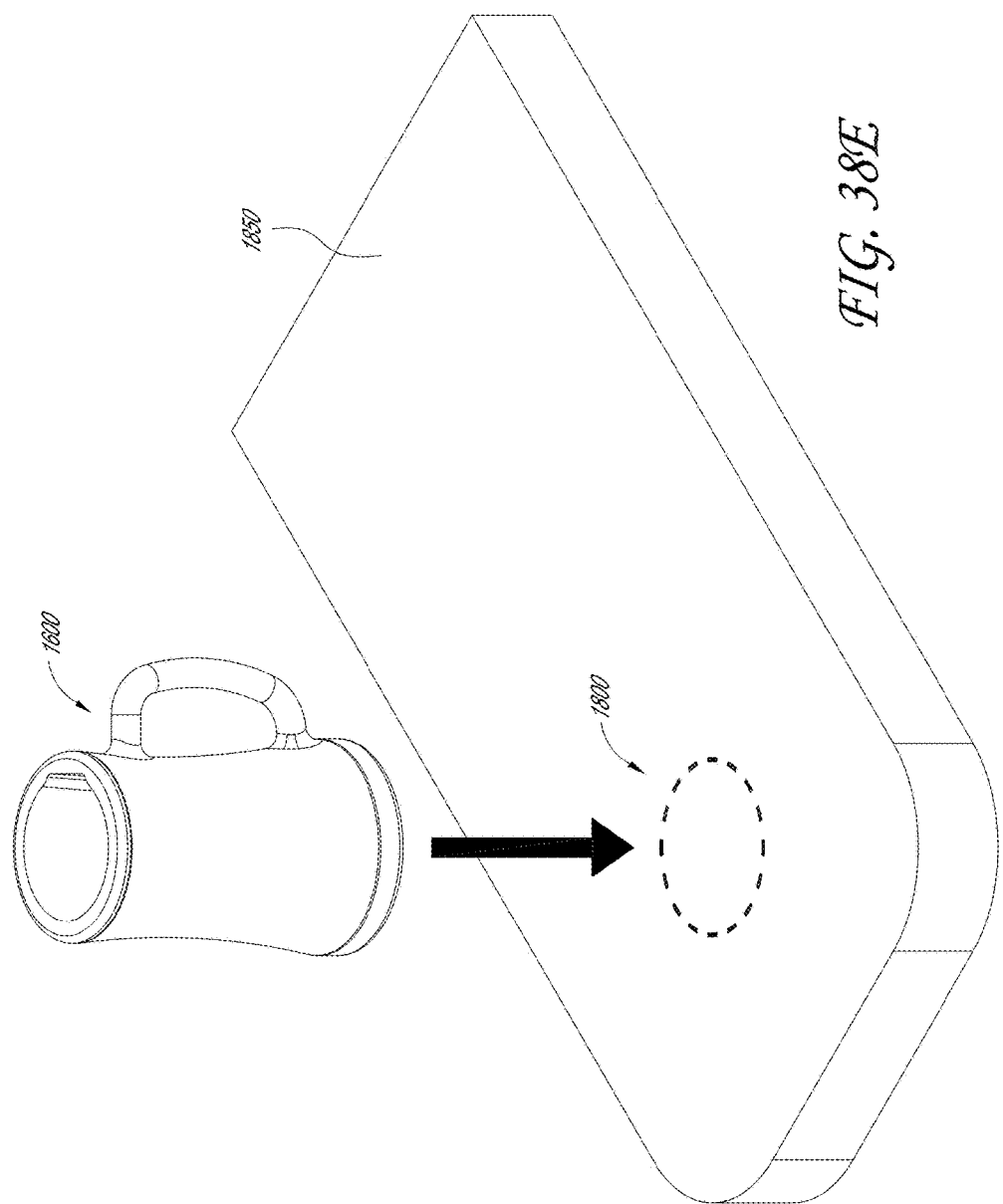

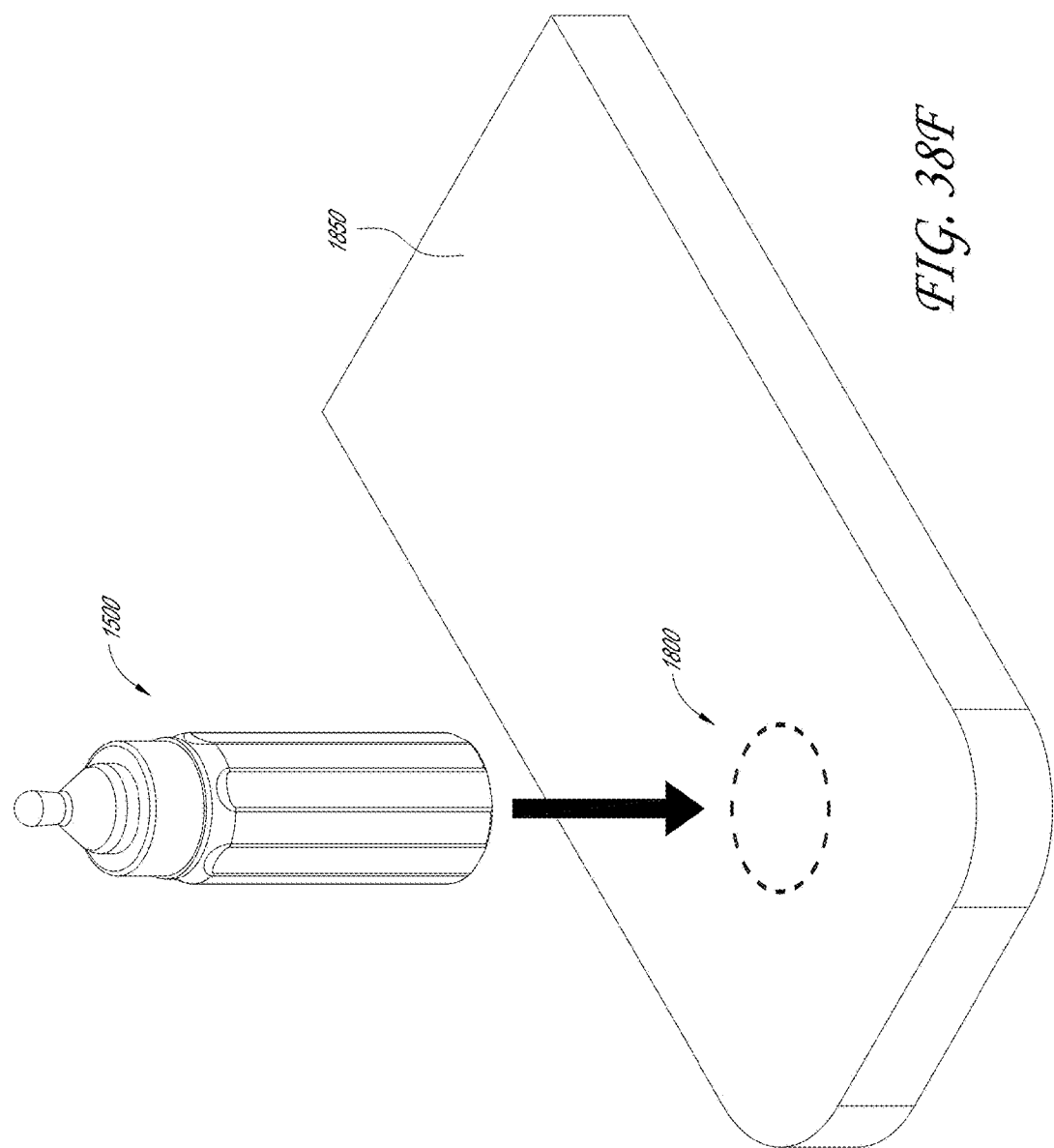

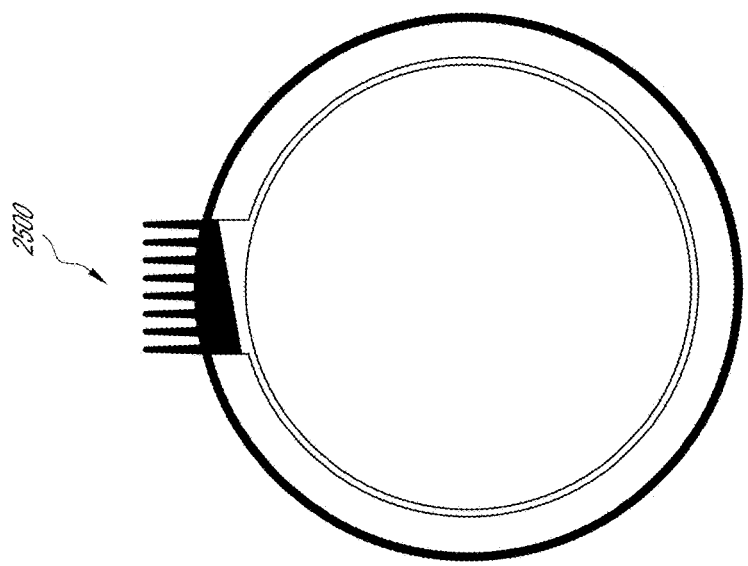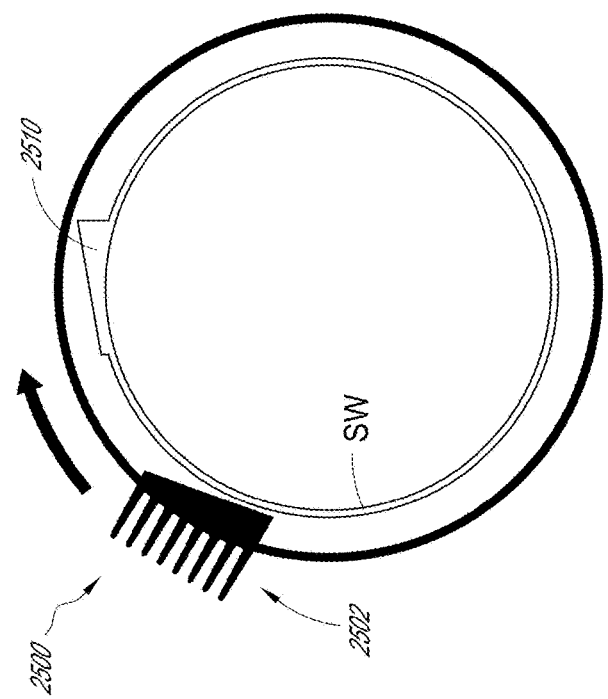
FIG. 45

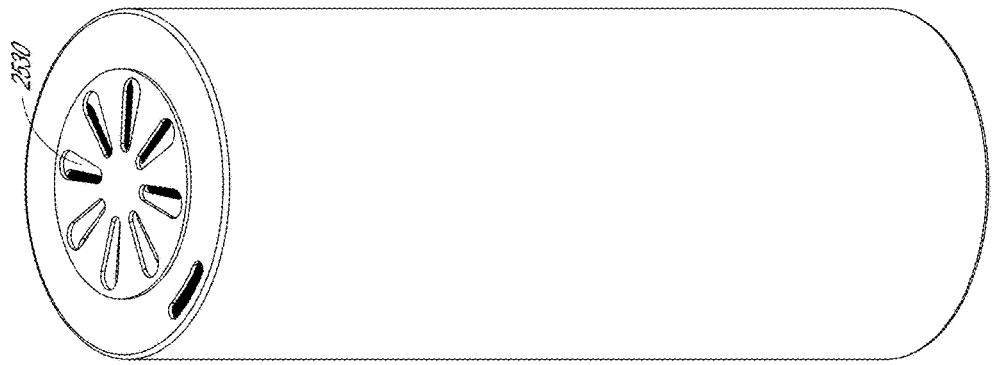
FIG. 46

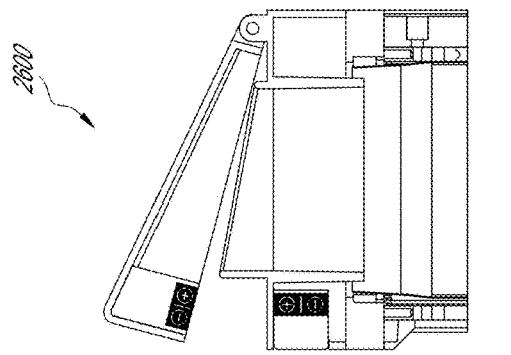
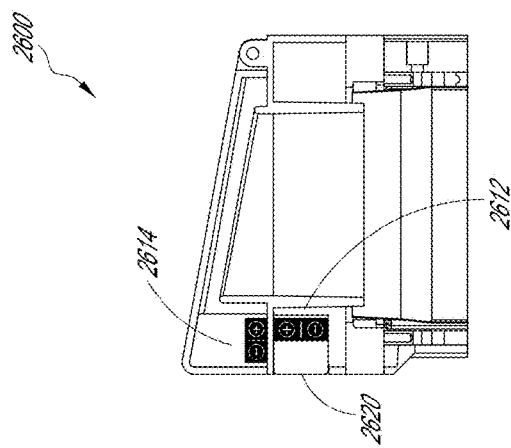
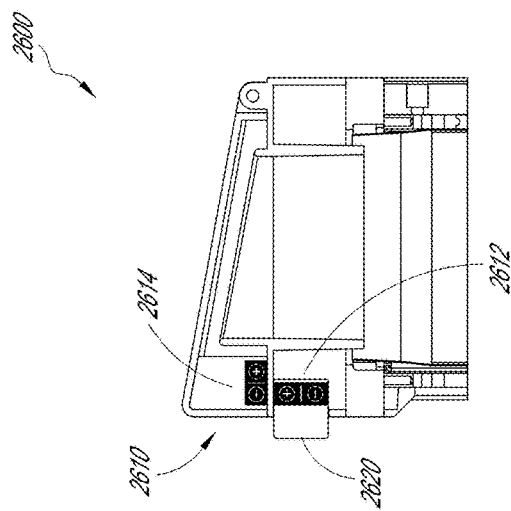
FIG. 47

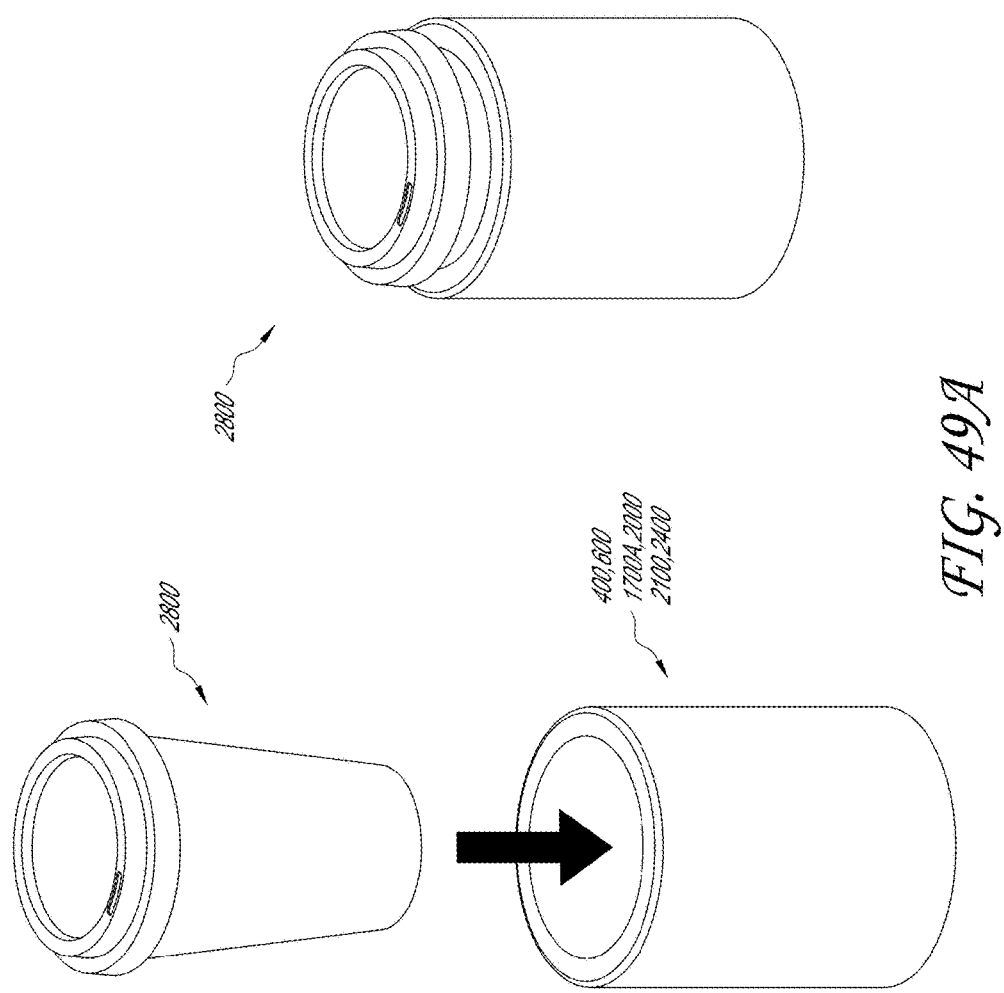

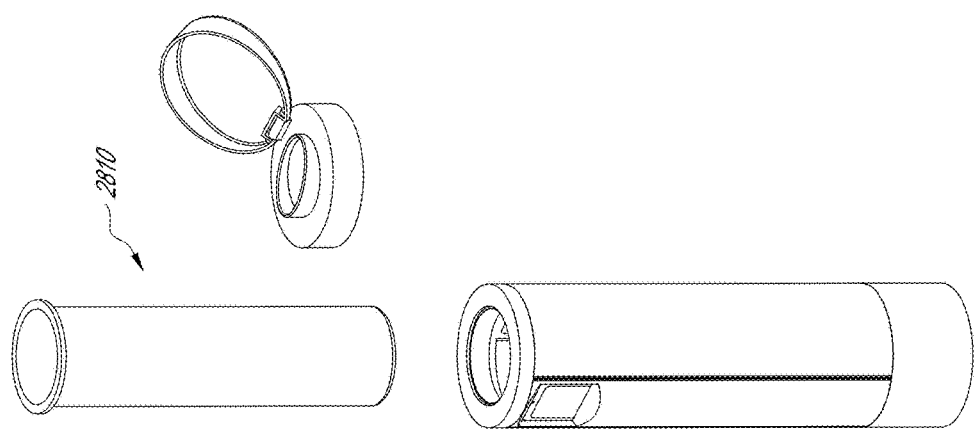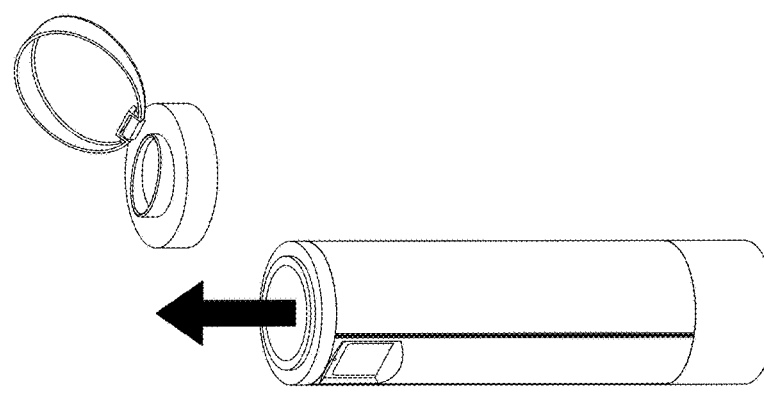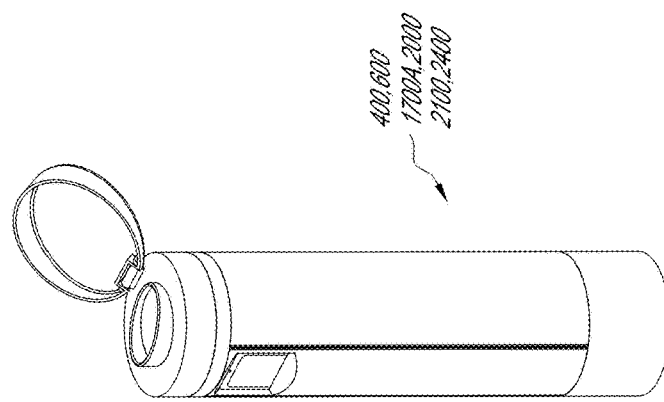
FIG. 49B

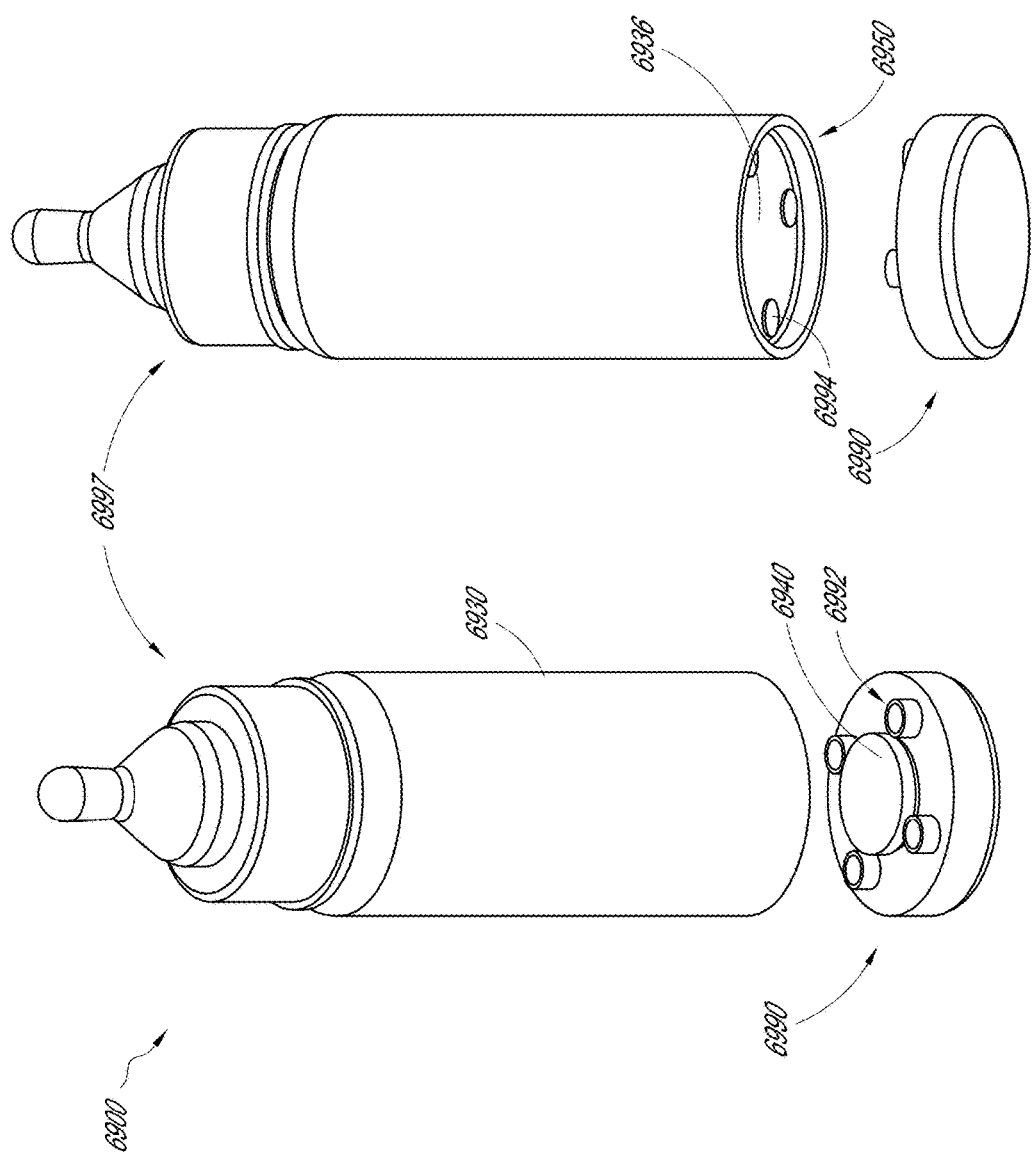

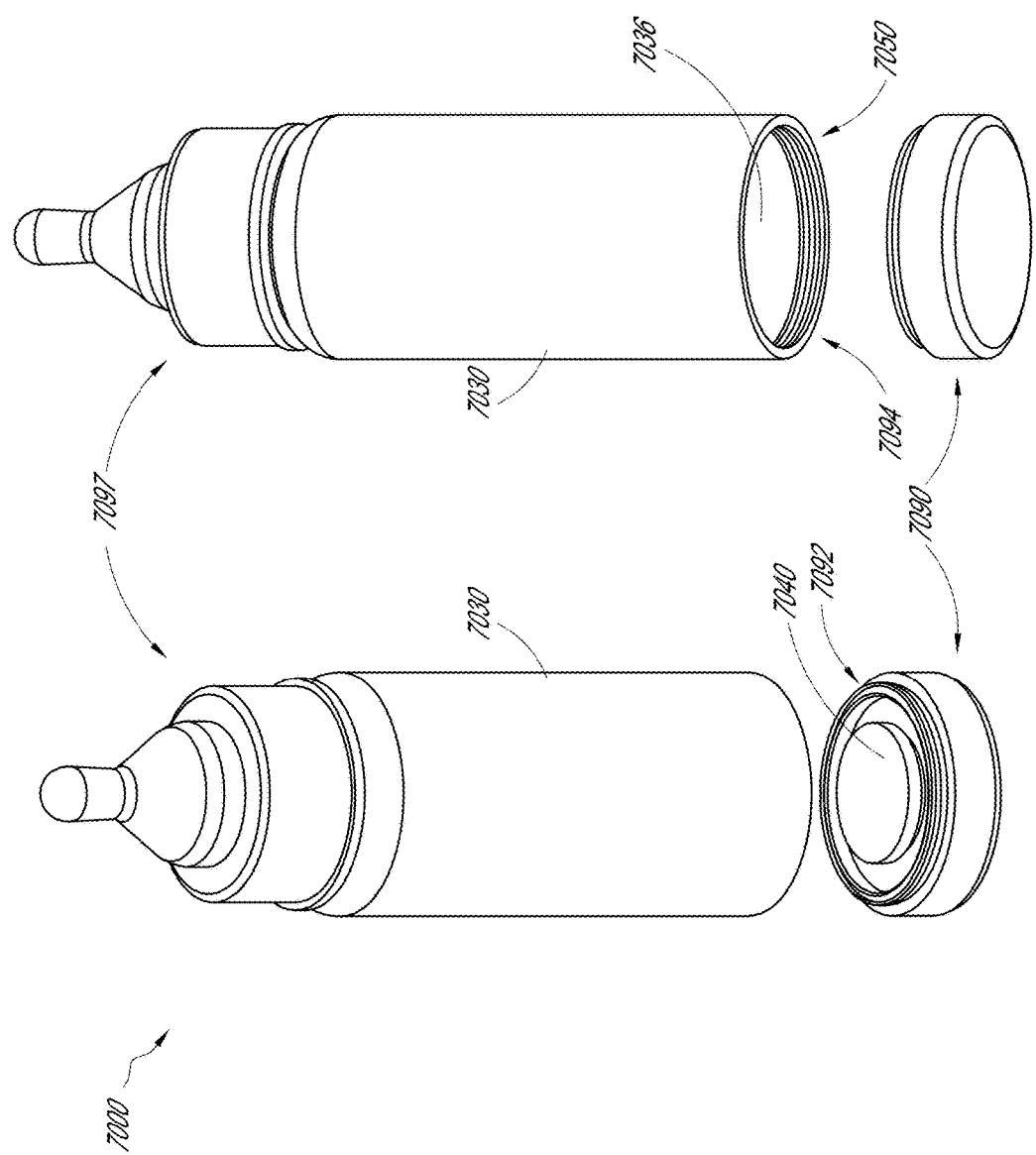

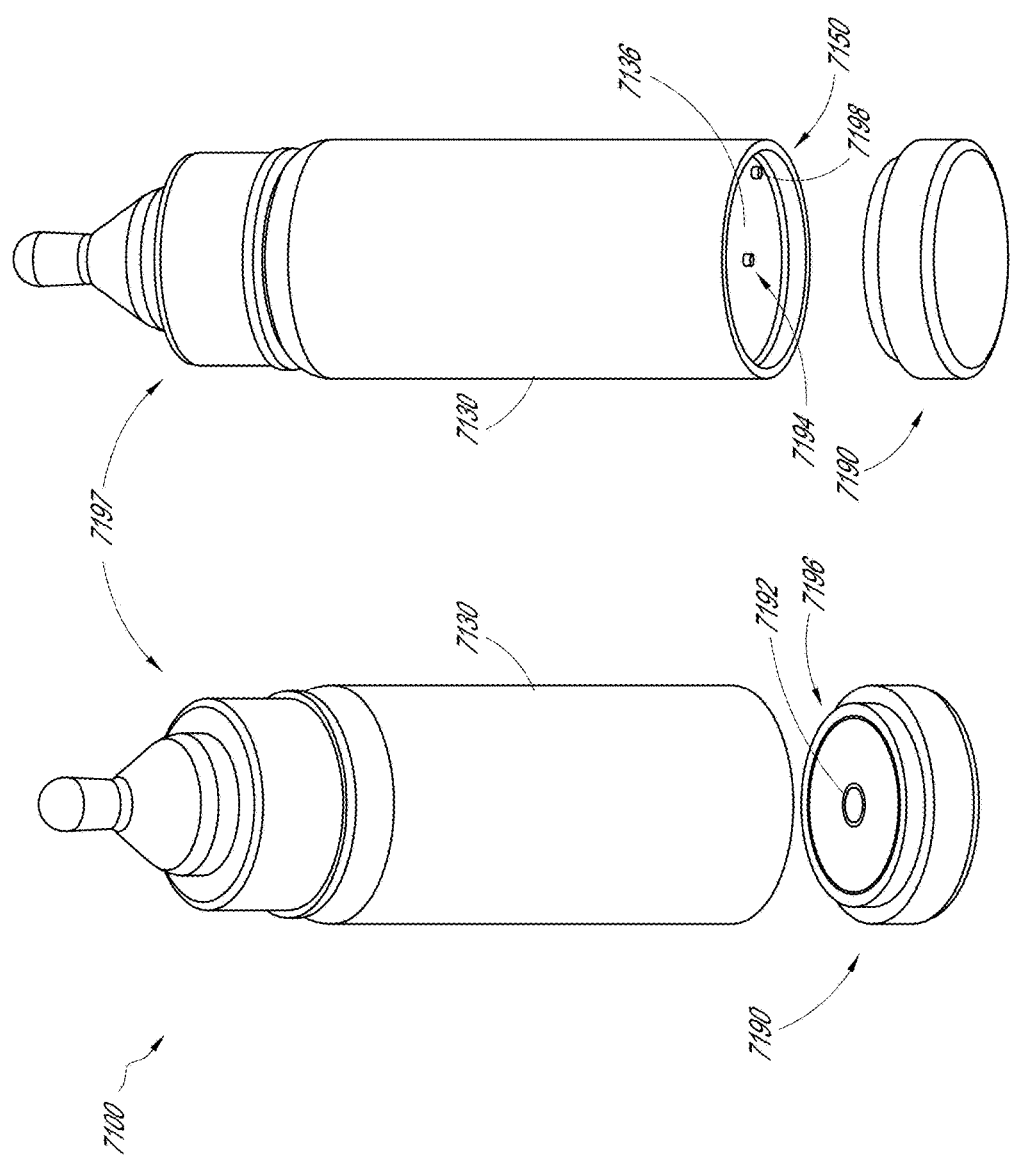

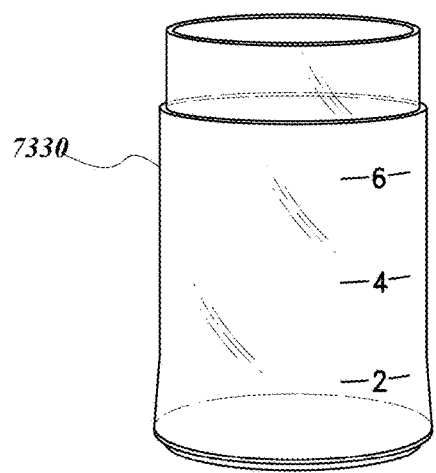
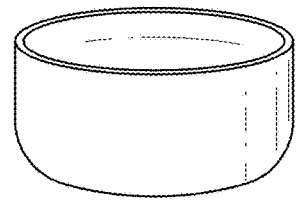
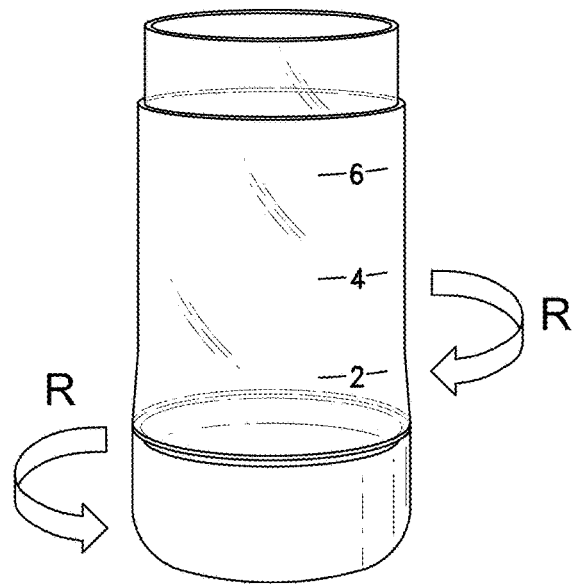
FIG. 76B  FIG. 76C

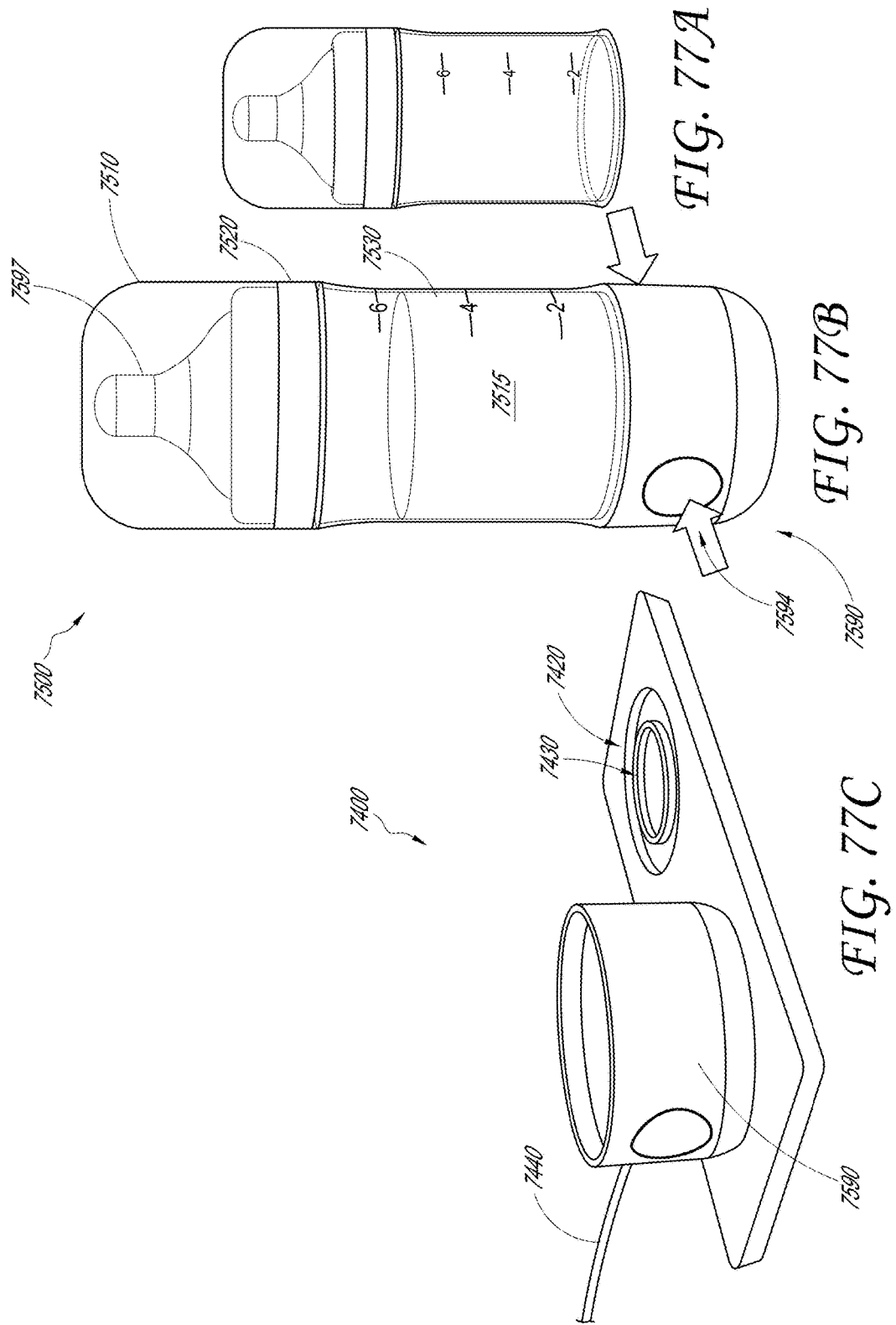

HEATED OR COOLED DISHWARE AND DRINKWARE AND FOOD CONTAINERS

RELATED APPLICATIONS

This application is a continuation-in-part application of U.S. application Ser. No. 14/712,813, filed May 14, 2015, which is a continuation-in-part application of U.S. application Ser. No. 14/312,366, filed Jun. 23, 2014, now U.S. Pat. No. 9,035,222, which is a continuation-in-part application of U.S. application Ser. No. 14/144,283, filed Dec. 30, 2013, now U.S. Pat. No. 8,759,721, which is a continuation-in-part application of U.S. application Ser. No. 13/830,934, filed Mar. 14, 2013, now U.S. Pat. No. 8,618,448, which is a continuation-in-part of U.S. application Ser. No. 13/287,967, filed Nov. 2, 2011, which claims priority under 35 U.S.C. § 119(e) to U.S. Provisional App. No. 61/409,493, filed Nov. 2, 2010, the entire contents of all of which is hereby incorporated by reference and should be considered a part of this specification.

BACKGROUND

Field

The invention is directed to dishware and drinkware and food containers, such as plates, mugs, soup containers and lunch boxes, and more particularly to actively heated or cooled dishware and drinkware and food containers.

Description of the Related Art

Dishware (e.g., plates, bowls), serverware (e.g., platters, serving dishes, hot plates) and drinkware (e.g., cups, mugs, travel mugs, liquid containers, baby bottles, drinking bottles) are sometimes made of ceramic materials. Plates are sometimes heated by placing into an oven, so that the food on the plate can be maintained warm for a longer time than if the plate was not heated. For example, in some restaurants, plates will be heated prior to food being placed thereon, or simultaneously with the food (e.g., a steak) thereon. For example, a plate holding a steak can be placed into an oven to cook the steak, and once removed the plate maintains the food warm for a while. In some instances, a plate or bowl might also be chilled to maintain food thereon cold for a longer period of time (e.g., salad, gazpacho) than if the plate was not chilled. However, such heating and cooling mechanisms are passive mechanisms that rely on the release of heat, in the case of a heated plate, or the absorption of heat, in the case of a chilled plate, by the plate based on the heat transfer properties of the ceramic material.

However, technology for actively heating, or cooling, dishwasher safe dishware or drinkware or food containers is not readily available. Accordingly, there is a need for dishware (e.g., plates, bowls), serverware (e.g., platters, serving dishes, hot plates), drinkware (e.g., cups, mugs, travel mugs, liquid containers, baby bottles, drinking bottles) and food containers (e.g. lunch boxes, soup containers) that can be actively heated or cooled during use.

SUMMARY

In accordance with one embodiment, an actively heated mug or travel mug is provided. The actively heated mug or travel mug comprises a body having a receiving portion for receiving and holding a liquid and a heating system. The heating system comprises one or more heating elements configured to heat one or more surfaces of the receiving portion of the body, one or more power storage elements, and a wireless power receiver configured to wirelessly receive power from a power source. The heating system further comprises control circuitry electrically connected to the wireless power receiver, the control circuitry configured to charge the one or more power storage elements and to control the delivery of electricity from the one or more power storage elements to the one or more heating elements. The heating system further comprises one or more sensors configured to sense a parameter of the liquid and/or sense a parameter of the heating system and communicate said sensed parameter information to the control circuitry. The control circuitry is configured to turn on, turn off, and/or operate the one or more heating elements at a given power setting based at least in part on the sensed parameter information.

In accordance with another embodiment, an actively heated mug or travel mug is provided. The actively heated mug or travel mug comprises a body having a receiving portion for receiving and holding a liquid, the body having a vacuum insulated chamber configured to reduce the rate in which heat energy exits the mug or travel mug, and a heating system. The heating system comprises one or more heating elements configured to heat one or more surfaces of the receiving portion of the body, one or more power storage elements, and a wireless power receiver configured to wirelessly receive power from a power source. The heating system further comprises control circuitry electrically connected to the wireless power receiver, the control circuitry configured to charge one or more power storage elements and to control the delivery of electricity from the one or more power storage elements to the one or more heating elements.

In accordance with another embodiment, an actively heated mug or travel mug is provided. The actively heated mug or travel mug comprises a body having a receiving portion for receiving and holding a liquid, and a heating system. The heating system comprises one or more heating elements configured to heat one or more surfaces of the receiving portion of the body, one or more heating elements configured to heat one or more surfaces of the receiving portion of the body, and control circuitry electrically connected to the wireless power receiver, the control circuitry configured to charge one or more power storage elements and to control the delivery of electricity from the one or more power storage elements to the one or more heating elements. The actively heated mug or travel mug further comprises a user interface on a surface of the body, the user interface being electrically connected to the control circuitry and having one or more user actuatable controls to provide operating instructions to the control circuitry. The control circuitry is configured to operate the one or more heating elements to actively heat at least a portion of the body to maintain the liquid in a heated state generally at a user selected temperature setting based at least in part on said instructions.

In accordance with another embodiment, an actively heated mug or travel mug is provided. The actively heated mug or travel mug comprises a body having a receiving portion for receiving and holding a liquid, and a heating system. The heating system comprises one or more heating elements configured to heat one or more surfaces of the receiving portion of the body, one or more power storage elements, a wireless power receiver configured to wirelessly receive power from a power source, and control circuitry electrically connected to the wireless power receiver, the control circuitry configured to charge one or more power storage elements and to control the delivery of electricity from the one or more power storage elements to the one or more heating elements. The heating system further comprises a wireless transmitter or receiver and/or transceiver configured to establish a communication connection with a remote device or mobile electronic device.

In accordance with another embodiment, an actively heated or cooled cup, mug, travel mug, baby bottle, beer mug, carafe, water bottle or liquid container is provided comprising a body having a receiving portion for receiving and holding a liquid and a heating or cooling system. The heating or cooling system comprises one or more heating or cooling elements configured to actively heat or cool at least a portion of the receiving portion of the body, control circuitry configured to control the operation of the one or more heating or cooling elements, and one or more liquid level sensors configured to sense a liquid level in the receiving portion and to communicate the sensed liquid level to the control circuitry. The control circuitry is configured to operate each of the one or more heating or cooling elements independently of each other based at least in part on the sensed liquid level, such that the control circuitry can turn off or turn on or reduce power to or increase power to at least one of the one or more heating or cooling elements based at least in part on the sensed liquid level. In a further aspect, where the one or more heating or cooling elements are one or more thermoelectric elements, the control circuitry can reverse polarity to at least one of the one or more thermoelectric elements.

In accordance with another embodiment, an actively heated or cooled cup, mug, travel mug, baby bottle, beer mug, carafe, water bottle or liquid container is provided comprising a body having a receiving portion for receiving and holding a liquid and a heating or cooling system. The heating or cooling system comprises one or more heating or cooling elements configured to actively heat or cool at least a portion of the receiving portion of the body, and control circuitry configured to control the operation of the one or more heating or cooling elements. The control of or location of the one or more heating or cooling elements is configured to induce a circulation of liquid within the receiving portion of the body to maintain substantially uniform liquid temperature within the volume of liquid in the receiving portion.

In accordance with another embodiment, an actively heated or cooled cup, mug, travel mug, baby bottle, beer mug, carafe, water bottle or liquid container is provided comprising a body having a receiving portion for receiving and holding a liquid and a heating or cooling system. The heating or cooling system comprises one or more heating or cooling elements configured to actively heat or cool at least a portion of the receiving portion of the body, one or more power storage elements, a wireless power receiver configured to wirelessly receiver power from a power source, control circuitry electrically connected to the wireless power receiver, the control circuitry configured to control the charging of the one or more power storage elements and to control the delivery of electricity from the one or more power storage elements to the one or more heating or cooling elements to maintain a temperature of the liquid at a predetermined drinking temperature or within a predetermined drinking temperature range, and one or more ultrasound liquid sensors configured to sense a level of the liquid in the receiving portion via a change in frequency and to communicate said sensed level information to the control circuitry. The control circuitry is configured to operate the one or more heating or cooling elements to actively heat or cool at least a portion of the receiving portion of the body to maintain the temperature of the liquid generally at a user selected or factory preset drinking temperature setting based at least in part on the sensed liquid level.

In accordance with another embodiment, an actively heated or cooled cup, mug, travel mug, baby bottle, beer mug, carafe, water bottle or liquid container is provided comprising a body having a receiving portion for receiving and holding a liquid and a heating or cooling system. The heating or cooling system comprises one or more heating or cooling elements configured to actively heat or cool at least a portion of the receiving portion of the body, one or more power storage elements, and control circuitry configured to control the charging of the one or more power storage elements and to control the delivery of electricity from the one or more power storage elements to the one or more heating or cooling elements to maintain a temperature of the liquid at a predetermined drinking temperature or within a predetermined drinking temperature range. A wireless transmitter or receiver and/or transceiver is configured to establish a communication connection with a remote device or mobile electronic device, the transceiver configured to transmit operation information to the remote device or mobile electronic device as well as to receive instructions from the remote device or mobile electronic device. A display screen is on a surface of the body, the display screen being electrically connected to the control circuitry.

In accordance with another embodiment, an actively heated or cooled cup, mug, travel mug, baby bottle, beer mug, carafe, water bottle or liquid container is provided comprising a body having a receiving portion for receiving and holding a liquid and a heating or cooling system. The heating or cooling system comprises one or more heating or cooling elements configured to actively heat or cool at least a portion of the receiving portion of the body, one or more temperature sensors configured to sense a temperature of the liquid in the receiving portion, and control circuitry configured to communicate with the one or more temperature sensors and to control the operation of the one or more heating or cooling elements based at least in part on the sensed temperature. A wireless transmitter or transceiver configured to establish a communication connection with a remote mobile phone or tablet computer, wherein the transmitter or transceiver is configured to transmit sensed temperature information or information related to sensed temperature information to the mobile phone or tablet computer to display said sensed temperature information on the mobile phone or tablet computer.

In accordance with another embodiment, an actively heated or cooled cup, mug, travel mug, baby bottle, beer mug, carafe, water bottle or liquid container is provided comprising a body having a receiving portion for receiving and holding a liquid and a heating or cooling system. The heating or cooling system comprises one or more heating or cooling elements configured to actively heat or cool at least a portion of the receiving portion of the body, one or more temperature sensors configured to sense a temperature of the liquid in the receiving portion, and control circuitry configured to communicate with the one or more temperature sensors and to control the operation of the one or more heating or cooling elements based at least in part on the sensed temperature. A wireless transmitter or transceiver configured to establish a communication connection with a remote mobile phone or tablet computer. A display screen or indicator lights are on a surface of the body, the display screen or indicator lights being electrically connected to the control circuitry and configured to display the sensed temperature information or display a message and/or visual indication related to the sensed temperature information.

The transmitter or transceiver is configured to transmit sensed temperature information or information related to sensed temperature information to the mobile phone or tablet computer to display said sensed temperature information or a message and/or notification related to the sensed temperature on the mobile phone or tablet computer.

In accordance with another embodiment, an actively heated or cooled cup, mug, travel mug, baby bottle, beer mug, carafe, water bottle or liquid container is provided comprising a body having a receiving portion for receiving and holding a liquid and a heating or cooling system. The heating or cooling system comprises one or more heating or cooling elements configured to actively heat or cool at least a portion of the receiving portion of the body, one or more temperature sensors configured to sense a temperature of the liquid in the receiving portion, and control circuitry configured to communicate with the one or more temperature sensors and to control the operation of the one or more heating or cooling elements based at least in part on the sensed temperature. A wireless receiver or transceiver is configured to establish a communication connection with a remote mobile phone or tablet computer, wherein the receiver or transceiver is configured to receive operating instructions from the remote mobile phone or tablet computer, the control circuitry configured to control the operation of the one or more heating or cooling elements at least in part based on said received operating instructions from the mobile phone or tablet computer.

In accordance with another embodiment, an actively heated or cooled cup, mug, travel mug, baby bottle, beer mug, carafe, water bottle or liquid container is provided comprising a body having a receiving portion for receiving and holding a liquid and a heating or cooling system. The heating or cooling system comprises one or more heating or cooling elements configured to actively heat or cool at least a portion of the receiving portion of the body, and one or more liquid level sensors configured to sense a liquid level in the receiving portion. A wireless transmitter or transceiver is configured to establish a communication connection with a remote mobile phone or tablet computer, wherein the transmitter or transceiver is configured to transmit sensed liquid level information to the mobile phone or tablet computer to display said liquid level information on the mobile phone or tablet computer.

In accordance with one aspect, an actively heated or cooled portable container is provided. The container comprises a portable body having a receiving portion defined by an inner sidewall and inner bottom wall for receiving and holding a liquid, and a heating and cooling system housed in the portable body. The heating and cooling system comprises a cooling element comprising a phase change material disposed in a chamber that surrounds at least a portion of the inner sidewall so that the phase change material is in thermal communication with at least a portion of the inner sidewall of the portable body, the phase change material configured to transition from one phase to a second phase at a predetermined temperature. The heating and cooling system also comprises a heating element in thermal communication with at least a portion of the inner sidewall or inner bottom wall of the portable body. The heating and cooling system also comprises control circuitry disposed in a portion of the portable body, the control circuitry configured to control the operation of the heating element. The heating and cooling system also comprises one or more power storage elements disposed in another portion of the portable body and configured to provide electrical energy to one or both of the heating element and control circuitry. The cooling element removes heat from a liquid disposed in the receiving portion that has a temperature above the predetermined temperature to lower the temperature of the liquid toward the predetermined temperature, and the control circuitry controls the heating element to add heat to the liquid in the receiving portion to maintain the temperature of the liquid at said predetermined temperature or increase the temperature of the liquid above said predetermined temperature.

In accordance with another aspect, an actively heated or cooled portable container is provided. The container comprises a portable body having a receiving portion defined by an inner sidewall and inner bottom wall for receiving and holding a liquid, and a heating and cooling system housed in the portable body. The heating and cooling system comprises means for passively cooling at least a portion of the inner sidewall of the portable body to remove heat from a liquid in the receiving portion of the portable body, a heating element in thermal communication with at least a portion of the inner sidewall or inner bottom wall of the portable body, control circuitry disposed in a portion of the portable body, the control circuitry configured to control the operation of the heating element, and one or more power storage elements disposed in another portion of the portable body and configured to provide electrical energy to one or both of the heating element and control circuitry. The control circuitry controls the heating element to add heat to the liquid in the receiving portion to maintain the temperature of the liquid at a predetermined temperature or increase the temperature of the liquid above said predetermined temperature.

In accordance with another aspect, an actively heated or cooled portable container is provided. The container comprises a portable body having a receiving portion defined by an inner sidewall and inner bottom wall for receiving and holding a liquid and an outer sidewall radially spaced apart from the inner sidewall to define an annular chamber therebetween. The container also comprises a heating and cooling system housed in the portable body, comprising a cooling element comprising a heat sink disposed in the annular chamber that is in thermal communication with at least a portion of the inner sidewall of the portable body, a heating element in thermal communication with at least a portion of the inner sidewall or inner bottom wall of the portable body, control circuitry disposed in a portion of the portable body, the control circuitry configured to control the operation of the heating element, and one or more power storage elements disposed in another portion of the portable body and configured to provide electrical energy to one or both of the heating element and control circuitry. The cooling element removes heat from a liquid disposed in the receiving portion, and wherein the control circuitry controls the heating element to add heat to the liquid in the receiving portion to maintain the temperature of the liquid at a predetermined temperature or increase the temperature of the liquid above said predetermined temperature.

In accordance with another aspect, an actively heated container is provided, comprising a portable body having a receiving portion defined by an inner sidewall and inner bottom wall for receiving and holding a liquid and an outer sidewall radially spaced apart from the inner sidewall to define an annular chamber therebetween. The container also comprises an active heating system, comprising one or more heating elements in thermal communication with at least a portion of the inner sidewall or inner bottom wall of the portable body, control circuitry disposed in a portion of the portable body, the control circuitry configured to control the operation of the one or more heating elements, and one or more power storage elements disposed in another portion of the portable body and configured to provide electrical energy to one or both of the control circuitry and the one or more heating elements. The control circuitry is configured to calculate a volume of the liquid in the receiving portion of the portable body based on sensed information indicative of a temperature of the liquid in the receiving portion.

In accordance with one aspect, a heated or cooled food container is provided. The food container comprises a lid movable between an open and a closed position, and an insulated body having a sidewall that defines a perimeter of the body and a base, the sidewall and base defining a chamber configured to be sealed by the lid when in the closed position. The food container also comprises a temperature control system with one or more heating or cooling elements disposed in the container configured to heat or cool at least a portion of the chamber.

In accordance with another aspect, an actively heated or cooled food container is provided. The food container comprises a lid movable between an open and a closed position and an insulated body having a sidewall that defines a perimeter of the body and a base, the sidewall and base defining a chamber configured to be sealed by the lid when in the closed position. The food container also comprises an active temperature control system that comprises one or more heating or cooling elements in thermal communication with one or both of the sidewall and the base and configured to heat or cool one or both of the sidewall and the base, one or more power storage elements configured to provide power to the one or more heating or cooling elements, and control circuitry configured to control the operation of the one or more heating or cooling elements. The active temperature control system also comprises a wireless communication module configured to communicate with a remote electronic device to one or both of transmit information to the remote electronic device and receive information from the remote electronic device.

BRIEF DESCRIPTION OF THE DRAWINGS

FIG. 23 is a schematic perspective view of the charging station of FIG. 21 holding a plurality of plates, bowls or serving dishes.

FIG. 24A is a schematic perspective view of the charting station of FIG. 23 with one of the plates, bowls or serving dishes shown dismounted from the charging station.

FIG. 24B is a schematic view of another embodiment of a charging station with a resonant coupling wireless power transmitter.

FIG. 24C is a schematic view of another embodiment of a charging station.

FIG. 37A is a schematic view showing communication between a mug and an electronic device (e.g., mobile phone).

FIG. 38B shows one embodiment of a wireless energy transmitter in a table, counter, or bar for transmitting power to a mug placed thereon.

FIG. 38C shows one embodiment of a wireless energy transmitter in a table, counter, or bar for transmitting power to a bowl placed thereon.

FIG. 38D shows one embodiment of a wireless energy transmitter in a table, counter, or bar for transmitting power to a plate placed thereon.

FIG. 38E shows one embodiment of a wireless energy transmitter in a table, counter, or bar for transmitting power to a beer mug placed thereon.

FIG. 38F shows one embodiment of a wireless energy transmitter in a table, counter, or bar for transmitting power to a baby bottle placed thereon.

FIG. 45 is a schematic cross-sectional view of a heat sink cooling mechanism.

FIG. 46 is a schematic view of another embodiment of a cooling mechanism.

FIG. 47 is a schematic view of one embodiment of a lid mechanism.

FIGS. 49A-49B show the use of a removable insert for holding liquid.

FIGS. 69A-69B show a perspective view of another embodiment of a drinkware container.

FIGS. 70A-70B show a perspective view of another embodiment of a drinkware container.

FIGS. 71A-71B show a perspective view of another embodiment of a drinkware container.

FIGS. 76A-76C show a schematic view of an embodiment of a drinkware container and charging base system.

FIGS. 77A-77C show an embodiment of a drinkware container assembly.

DETAILED DESCRIPTION

Figure 1:
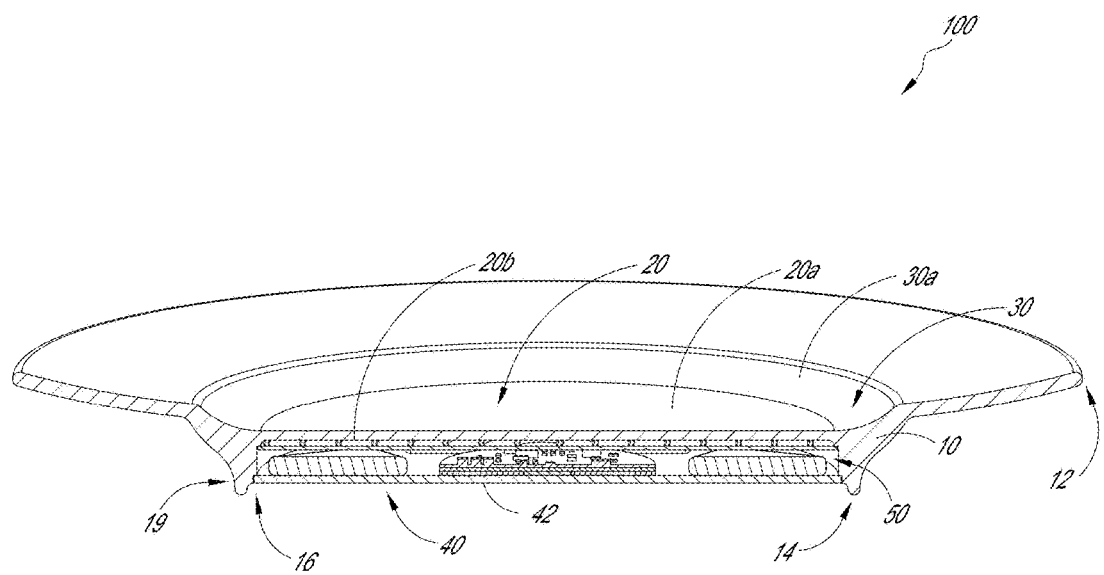
FIG. 1 is a schematic cross-sectional side view of one embodiment of a heated or cooled plate.
Figure 2:
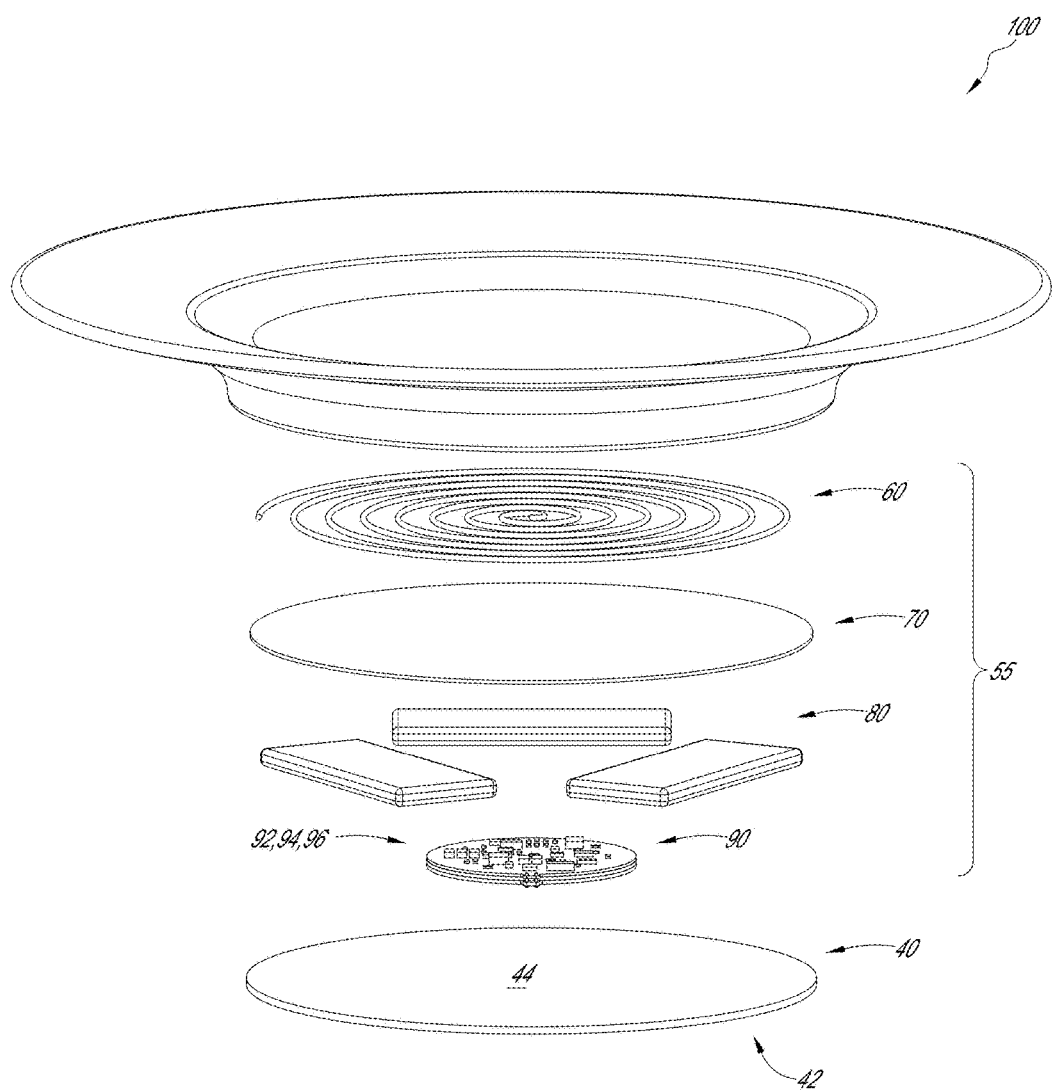
FIG. 2 is a schematic exploded view of the heated or cooled plate of FIG. 1.
Figure 3:
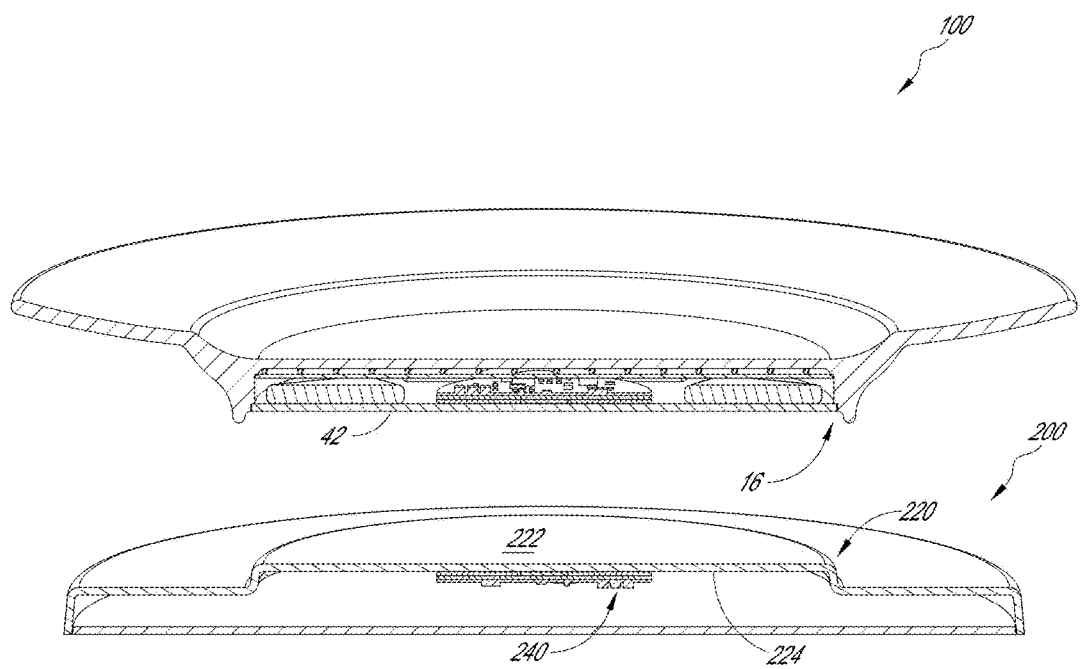
FIG. 3 is a schematic cross-sectional side view of the heated or cooled plate of FIG. 1 and a charging base for the plate.

FIGS. 1-3 show one embodiment of heated or cooled dishware or serverware. In particular, FIGS. 1-3 show one embodiment of a heated or cooled plate 100, bowl or serving dish. In the illustrated embodiment, the plate 100, bowl or serving dish has a circumferential wall 10 with a side surface 30a and a base 20 having a top surface 20a, where the side surface 30a and top surface 20a define a recess 30 that can hold food (e.g., receiving portion of the plate that holds food). In another embodiment, the plate 100, bowl or serving dish can be flat with a generally flat top surface (e.g., where the food receiving portion is not recessed). The wall 10 extends from a top edge 12 to a bottom edge 14. A bottom portion 40 of the plate 100, bowl or serving dish defines a bottom surface 42 of the plate 100, bowl or serving dish, which is recessed relative to the edge 14. A bottom section 19 defines a recess 16 of the plate 100, bowl or serving dish, such that the edge 14, not the bottom surface 42, contacts a table or counter surface when the plate 100, bowl or serving dish is placed on the table or counter surface. In another embodiment, the bottom surface 42 can be flush with the bottom edge 14, not recessed relative to the edge 14. In still another embodiment, the bottom surface 42 can protrude from the bottom of the plate 100, bowl or serving dish relative to the edge 14. The plate 100, bowl or serving dish can look (e.g., be sized and shaped) like a conventional plate and fit within standard dishwasher racks.

With continued reference to FIG. 1, the bottom portion 40 attaches to the wall 10 so that a cavity 50 is defined between the bottom portion 40 and the base 20, where the cavity 50 is sized to house several components, as described below. As shown in FIG. 2, the plate 100, bowl or serving dish can include a heating or cooling system 55, which can include a heating or cooling element 60, an insulative member 70, one or more electrical energy storage devices 80 electrically connected to the heating of cooling element 60, and an electronic module 90. The heating or cooling element 60, insulative member 70, electrical energy storage devices 80 and electronic module 90 can be disposed (e.g., embedded) in a bottom section of the plate 100, bowl or serving dish. In another embodiment, the heating or cooling system 55 can be housed in a module that is removably attachable to the plate 100, bowl or serving dish. In this embodiment, the heating or cooling element 60 and insulating member 70 can be a part of the removable module or can be disposed in the plate, and not part of the removable module.

In one embodiment, the heating or cooling element 60 can be heater wire or heating wire that is disposed adjacent a bottom surface 20b of the base 20 (e.g., adhered or otherwise secured to the bottom surface 20b), where the heater wire can heat up and transfer heat to the top surface 20a of the base 20 via conduction through the base 20 (e.g., to raise the temperature of the base 20 above ambient temperature to maintain food on the plate 100, bowl or serving dish warm, such as at a desired temperature or within a desired temperature range). In one embodiment, the heating or cooling system 55 can include a drive transistor to accommodate heavy switching current flowing from the electrical energy storage element 80 to one or more low resistance heating or cooling element 60. The insulative member 70 can be plate-like and disposed proximate the heating or cooling element 60 so that the heating or cooling element 60 is interposed between the insulative member 70 and the base 20. In one embodiment, the insulative member 70 can be a ceramic plate. However, in other embodiments, the insulative member 70 can be made of other suitable materials that are thermally insulative. In still other embodiments, the insulative member 70 can be excluded.

With continued reference to FIG. 2, the one or more energy storage devices 80 can in one embodiment be batteries, such as rechargeable batteries. For example, the one or more energy storage devices 80 can be lithium-ion (Li-ion) batteries or lithium polymer (Li-poly) batteries. However, in other embodiments where the energy storage devices 80 are batteries, the batteries can be other suitable types (e.g., lead acid, nickel cadmium, nickel metal hydride). In one embodiment, the battery can be provided in combination with a step-up transformer to provide the required voltage. In another embodiment, the one or more energy storage devices 80 can be capacitors. The one or more energy storage devices 80 can be electrically connected to the heating or cooling element 60 and configured to supply power to the heating or cooling element 60 to heat or cool at least a portion of the plate 100, bowl or serving dish.

The electronic module 90 can be attached to a top surface 44 of the bottom portion 40 and electrically connected to the one or more energy storage devices 80. In one embodiment, the electronic module 90 can include one or more of a wireless power receiver 92, control circuitry 94 (e.g., controller circuit, microcontroller, etc.) and a charger 96 (e.g., charging circuit) for charging the one or more energy storage devices 80. In other embodiments, the electronic module 90 can have different or additional electronics. The electronic module 90 can include a microcontroller unit (MCU) with capacitive sensing and graphic control features. In one embodiment, the wireless power receiver 92 is electrically connected to the battery charger 96, which is connected to the one or more energy storage devices 80 that are then electrically connected to the heating or cooling element 60 through a controller circuit 94. The control circuitry can also be used to manage the charging of the one or more energy storage devices 80. In another embodiment, where the energy storage devices 80 are excluded (as discussed further below), the wireless power receiver 92 can be electrically connected directly to the heating or cooling element 60. The control circuitry 94 can operate to manage the power delivered to the heating or cooling element 60.

In one embodiment, the bottom portion 40 can be removably attached to the plate 100, bowl or serving dish to allow access to the heating or cooling system 55 in the cavity 50. For example, the bottom portion 40 can be mechanically coupled to the plate 100, bowl or serving dish (e.g., with screws, a threaded interface between the bottom portion 40 and the plate 100, bowl or serving dish, a press-fit connection, etc.). The bottom portion 40 can be removed to allow the replacing of the one or more energy storage devices 80 and the servicing of the heating or cooling system 55. In one embodiment, the bottom portion 40 can be a water resistant lid that can be removably attachable (e.g., threaded on or screwed) to the plate 100, bowl or serving dish for accessing the heating or cooling system 55. In another embodiment, the bottom portion 40 can be a water resistant lid that can be removably attachable (e.g., threaded on or screwed) to the plate 100, bowl or serving dish for accessing the one or more energy storage devices 80. In yet another embodiment, the energy storage devices 80 can be in a pack that is attached (e.g., threaded, snap fit, screwed down) onto the bottom of the plate 100, bowl or serving dish, where the pack's electrical contacts connect with a set of electrical contacts on the bottom of the plate 100, bowl or serving dish, as shown for example in FIGS. 27-28 and described below. In still another embodiment, the one or more energy storage devices 80 can be sealed in the body of the plate 100 and not be removable (e.g., the heating or cooling system 55 and electronics of the plate 100 can be sealed in the plate so as to not be removable). This configuration (e.g., sealed energy storage elements 80 that are not removable) can also be incorporated into any other drinkware, dishware or serverware devices, such as the plate 100', 800, 800', 1100, 1300, 1400, mug 400 and travel mug 600, cup, baby bottle 1500, water bottle or liquid container discussed below.

With continued reference to FIG. 3, a charging base 200 can have a protruding or raised section 220 with a top surface 222 and a bottom surface 224. A wireless power transmitter 240 can be attached to the bottom surface 224. The protruding section 220 is preferably shaped and sized to at least partially fit into the recess 16 in the plate 100, bowl or serving dish, such that the top surface 222 is adjacent the bottom surface 42 of the bottom portion 40. Advantageously, the protruding section 220 fits at least partially into the recess 16 so as to generally align the electronic module 90 over the wireless power transmitter 240 to facilitate wireless power transmission between the wireless power transmitter 240 and the wireless power receiver 92. In another embodiment, the plate 100, bowl or serving dish can have a protruding portion and the charging base 200 a recessed portion, where the protruding portion fits at least partially within the recessed portion when the plate 100, bowl or serving dish is coupled to the charging base 200. The wireless power transmitter 220 can be electrically connected to a power source (not shown), such as a wall outlet, via a power cord (not shown).

In one embodiment, the wireless power transmitter 240 can be an induction coil and the wireless power receiver 92 can also be an induction coil. Therefore, in one embodiment, the charging base 200 can wirelessly transmit power from the power transmitter 240 to the wireless power receiver 92 via induction coupling. However, transmission of power from the wireless power transmitter 240 to the wireless power receiver 92 is not limited to inductive coupling. In other embodiments, other forms of short-distance wireless energy transfer can be used (e.g., microwave energy). In still other embodiments, further discussed below, long-distance wireless energy transfer can be used to transmit power to the wireless power receiver 92, without the use of a charging base.

In one embodiment, the heating or cooling system 55 is advantageously embedded or housed in the body of the plate 100, bowl or serving dish so that no portion of the heating or cooling system 55 is exposed or can be contacted by a user while holding the plate 100, bowl or serving dish. Therefore, the plate 100, bowl or serving dish can advantageously be exposed to water or other liquids, e.g., in a sink or in a dishwasher, without exposing the heating or cooling system 55 to said water or liquids, thereby inhibiting damage to the heating or cooling system 55. Additionally, by having all components embedded or housed in the body of the plate 100, bowl or serving dish, the plate 100, bowl or serving dish can be aesthetically pleasing as it looks like a conventional plate.

Figure 3A:
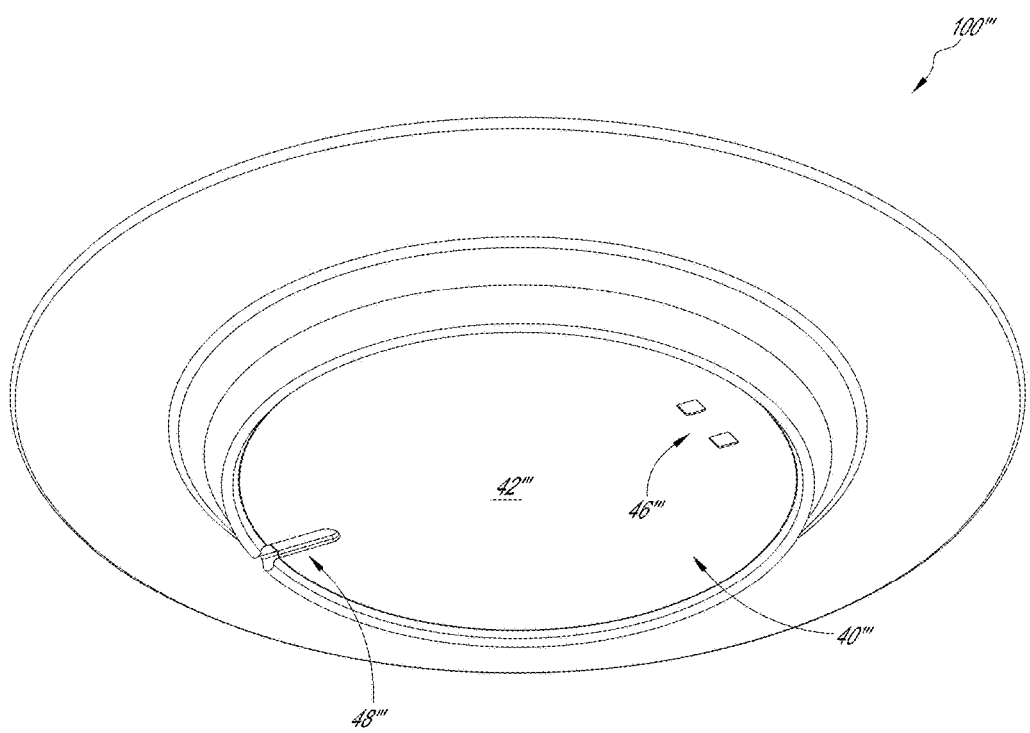
FIG. 3A is a schematic perspective bottom view of another embodiment of a heated or cooled plate that is similar to the plate of FIG. 1.
Figure 3B:
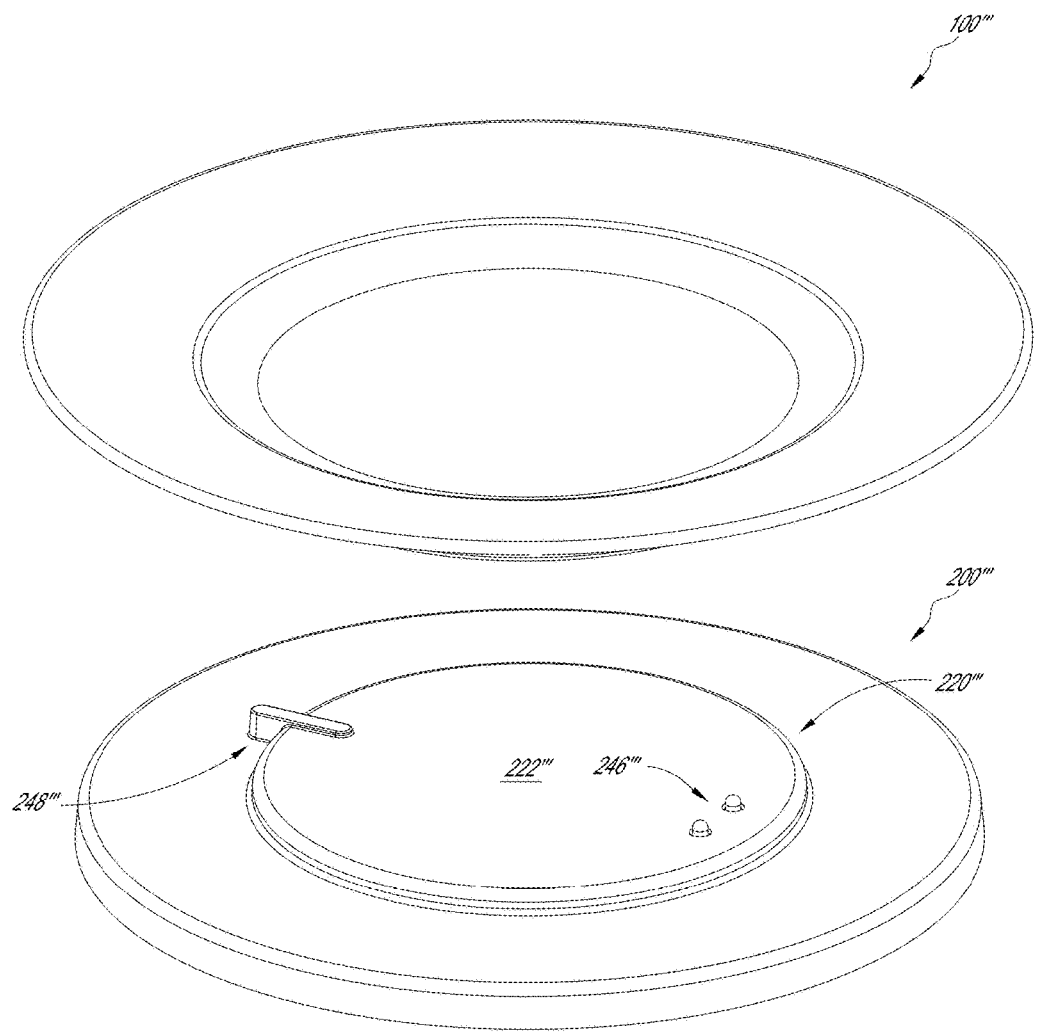
FIG. 3B is a schematic perspective top view of the heated or cooled plate of FIG. 3A and a charging base for the plate.

FIGS. 3A-3B shows another embodiment of a heated or cooled plate 100''', bowl or serving dish. The heated or cooled plate 100''', bowl or serving dish is similar to the heated or cooled plate 100, bowl or serving dish and includes the same components and features disclosed for the heated or cooled plate 100, except as noted below. Thus, the reference numerals used to designate the various components of the heated or cooled plate 100''', bowl or serving dish are identical to those used for identifying the corresponding components of the heated or cooled plate 100, bowl or serving dish in FIGS. 1-3, except that a "'''" has been added to the reference numerals.

In another embodiment, shown in FIGS. 3A and 3B, the plate 100''', bowl or serving dish can include one or more corrosion resistant electrical contacts 46''' on an outer surface of the plate 100''', bowl or serving dish, such as the bottom surface 42''' of the bottom portion 40''' of the plate 100''', bowl or serving dish, where the electrical contacts are sized and shaped to contact corresponding electrical contacts 246''' on the charging base 200''' (e.g., on the top surface 222''' of the protruding section 220''' of the charging base 200"), when the plate 100''', bowl or serving dish is placed on the charging base 200''' so that power is transmitted from the charging base 200''' to the energy storage devices 80''', heating or cooling element 60''' and/or electronic module 90''' in the plate 100''', bowl or serving dish through the electrical contacts 46''', 246'''. In one embodiment, the electrical contacts of the plate 100''', bowl or serving dish can protrude from a surface of the plate 100''', bowl or serving dish, such as electrical posts. In another embodiment, shown in FIG. 3A, the electrical contacts 46''' of the plate 100''', bowl or serving dish can be one or more contact pads on the bottom surface 42''' of the bottom portion 40''' of the plate 100''', bowl or serving dish, which can contact corresponding contacts, such as the pin contacts 246''' on the top surface 222''' of the charging base 200'''. However, the electrical contacts on the plate 100''', bowl or serving dish and charging base 200''' can have other suitable configurations. As shown in FIGS. 3A and 3B, the plate 100''' can have a slot 48''' on the bottom surface of the plate 100''', bowl or serving dish (e.g., formed on the bottom surface 42''' of the bottom portion 40''' of the plate 100''', bowl or serving dish) that is sized and shaped to receive a pin or key 248''' on the charging base 200'''. The slot 48''' and pin or key 248''' provide a "clocking" aspect of the plate 100''', bowl or serving dish that allows the electrical contacts 46''' of the plate 100''', bowl or serving dish to readily align with the electrical contacts 246''' of the charging base 200'''. However, in another embodiment, the slot can be formed on the charging base 200''' and the pin or key can be formed on the bottom of the plate 100''', bowl or serving dish. This configuration of electrical contacts and slot/key arrangement can also be incorporated into any other drinkware, dishware or serverware devices, such as the plate 800, 800', 1100, 1300, 1400, mug 400 and travel mug 600, cup, baby bottle 1500, water bottle or liquid container discussed below.

In another embodiment, the heating or cooling system 55 can be housed in a non-water proof module that can be removably attached to the plate 100, bowl or serving dish (e.g., threadably coupled to the plate 100, or coupled via a pin/slot assembly where the module twists into the bottom of a plate 100) to heat or cool the plate 100. In this embodiment, when the plate 100, bowl or serving dish is to be washed, the heating or cooling module can be decoupled from the plate 100, bowl or serving dish before the plate 100, bowl or serving dish is washed (e.g., placed in the dish washing machine). The heating or cooling module can then be placed on a corresponding charging station for use at a later time when it can again be coupled to a plate 100, bowl or serving dish to heat or cool food on the plate 100. The embodiment described above can apply to other forms of dishware (e.g., mug, cup, serving dish).

In another embodiment, the charging base 200 can be excluded and power can be transmitted to the wireless power receiver 92 via a remote power transmitter using long-distance wireless energy transmission, as further discussed below. In this embodiment, where the heated or cooled plate 100, bowl or serving dish also does not have energy storage devices, such as the energy storage devices 80, the heating or cooling element 60 is electrically connected to the wireless power receiver 92 via the control circuit 94, which is operable to control the amount of power that is provided to the heating or cooling element 60. During operation, if the plate 100, bowl or serving dish is out of range of the wireless power transmission, the heating or cooling element 60 will lose power and shut off. For example, in this embodiment if the plate 100, bowl or serving dish is not on a charging base, such as the charging base 200, or out of the range of power transmission from a remote wireless power transmitter, the heating or cooling element 60 in the plate 100, bowl or serving dish will lose power and shut off.

Figure 4:
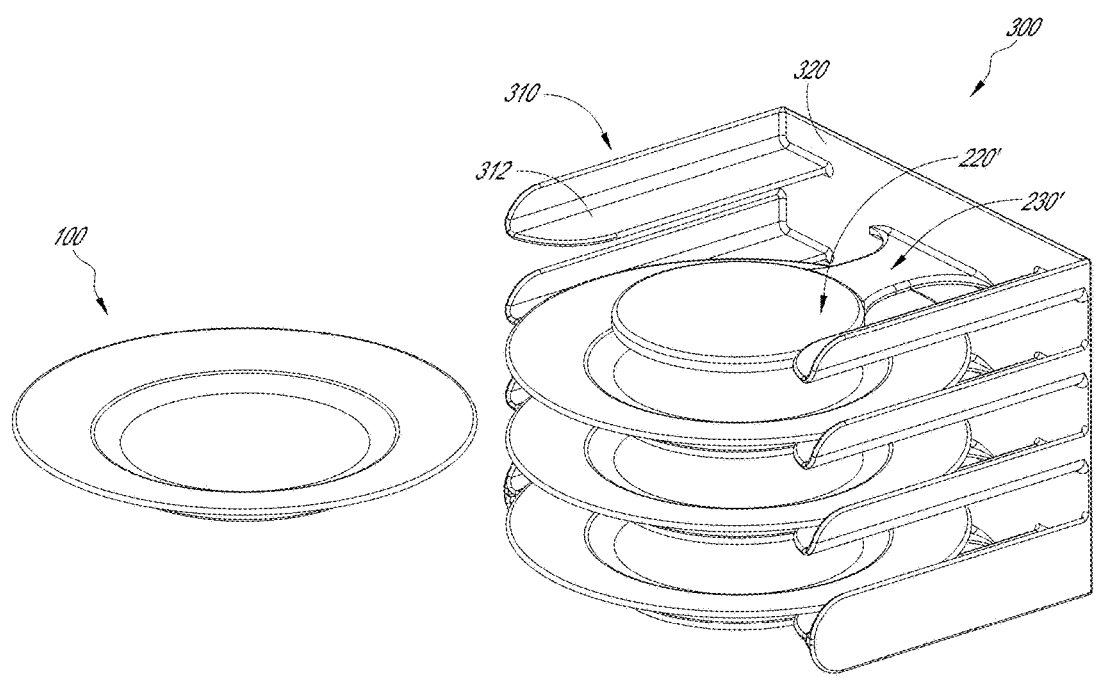
FIG. 4 is a schematic perspective view of a charging stand for storing multiple heated or cooled plates, and a plurality of heated or cooled plates stored on the stand.
Figure 5:
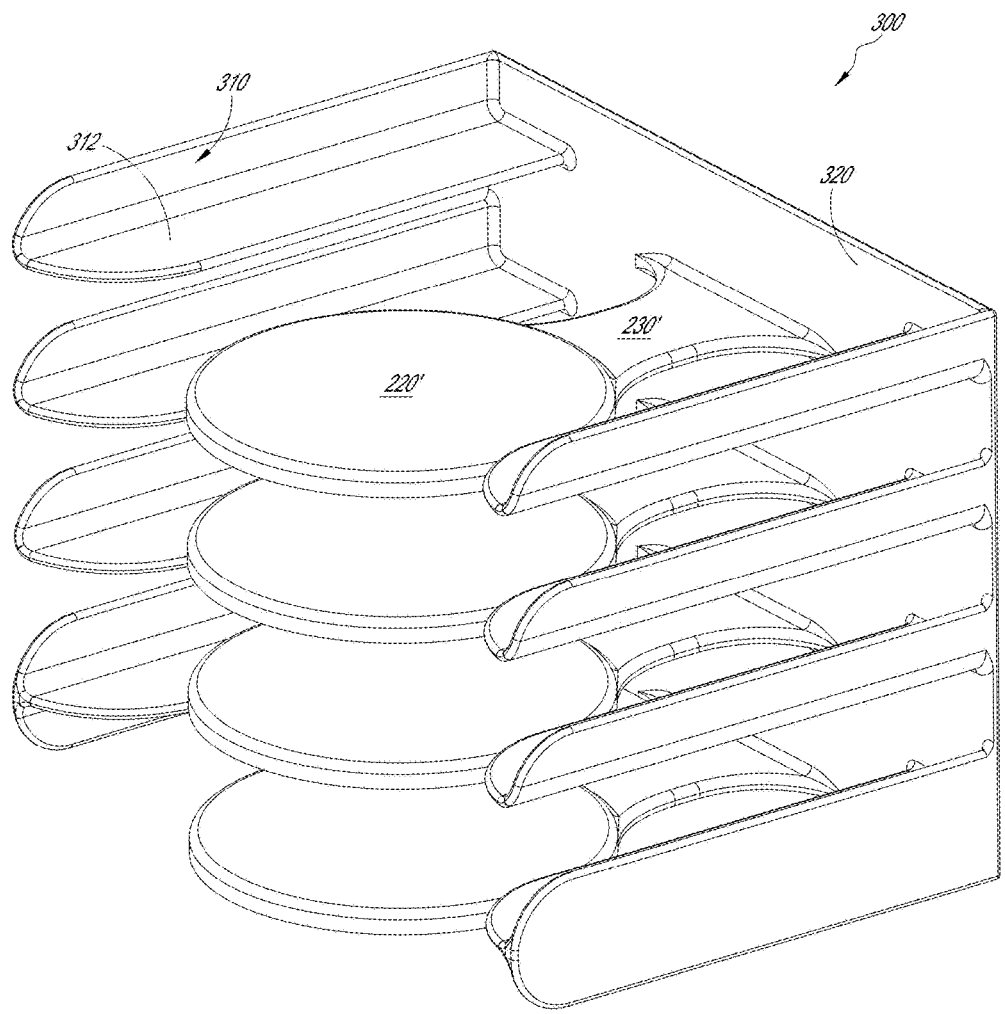
FIG. 5 is a schematic perspective view of the charging stand of FIG. 4.

FIGS. 4 and 5 show one embodiment of a charging stand 300 that can be stored in a cabinet, such as a kitchen cabinet, or on a countertop or in a pantry. The charging stand 300 can have a plurality of charging bases 220', each of which is attached to a rear wall 320 of the charging stand 300 by a connecting support 230'. The charging stand 300 can also have a pair of arms 310 on either side of the charging base 220', each arm 310 having a surface 312 that can contact at least a portion of the wall 10 of the plate 100, bowl or serving dish and helps support the plate 100 bowl or serving dish on the charging base 220'. Each of the charging bases 220' can have a wireless power transmitter, such as the wireless power transmitter 240, disposed therein, which can transmit power to a wireless power receiver in the heated or cooled plate 100, bowl or serving dish that is placed on the charging base 220'. The charging stand 300 can have a power cord (not shown) to connect the stand to, for example, a wall outlet, in order to electrically connect the wireless power transmitters in the charging bases 220' with the power source.

In another embodiment, the charging stand 300 can be excluded, and the plates 100 can be stacked on top of each other, with a single charging base at the bottom of the stack (e.g., the charging base 200 in FIG. 3) In this embodiment, the electronic module 90 in each plate 100, bowl or serving dish can include a repeater circuit that takes the power coming in from the wireless power receiver 92 (inside the plate 100) and then energizes a wireless power transmitter (not shown) which would be mounted just underneath bottom surface 20b inside the same plate 100. In this embodiment, when another plate is stacked on top of this plate 100, the top plate can receive power from the wireless power transmitter which is located in the plate 100, bowl or serving dish directly beneath it. In this manner, when a number of plates were stacked on top of each other, each plate would wirelessly receive power from the plate beneath it, and transmit power to the plate above it. In one embodiment, the energy storage devices are excluded from the plate 100, bowl or serving dish (or mug 400 or travel mug 600, cup, water bottle or liquid container discussed below), so the wireless power receiver can be electrically connected to the heating or cooling element. This allows a stack of plates 100 to be positioned on one stand.

Figure 6:
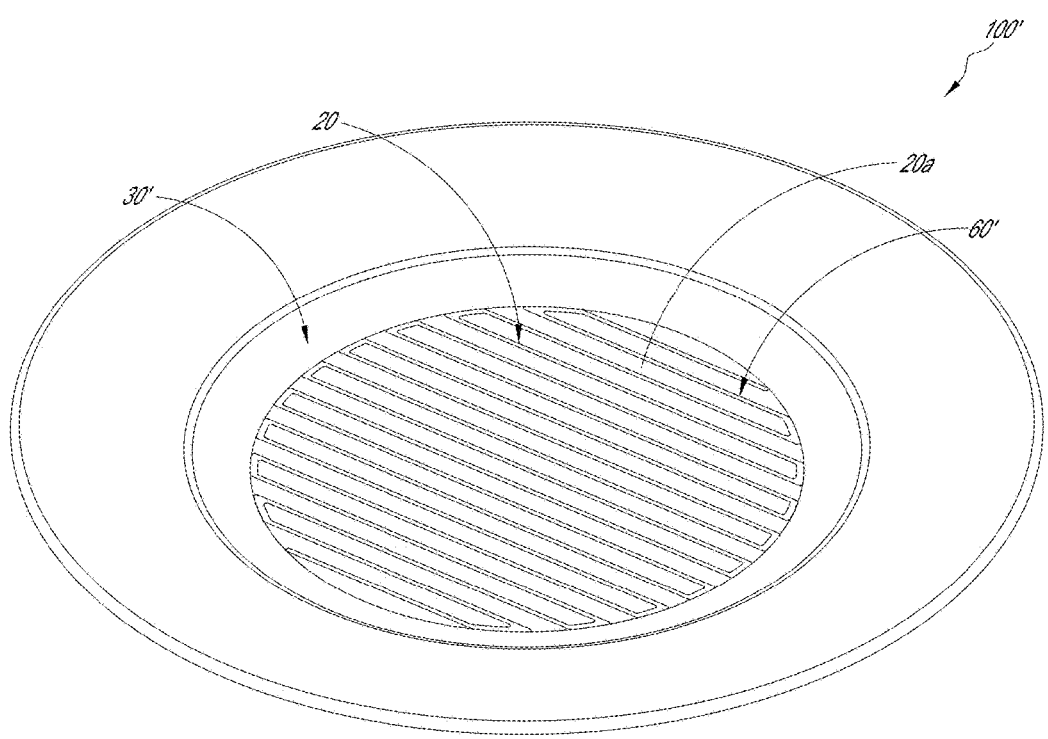
FIG. 6 is a schematic perspective top view of another embodiment of a heated or cooled plate.

FIG. 6 shows another embodiment of a heated or cooled plate 100'. The heated or cooled plate 100', bowl or serving dish is similar to the heated or cooled plate 100, bowl or serving dish and includes the same components and features disclosed for the heated or cooled plate 100, except as noted below. Thus, the reference numerals used to designate the various components of the heated or cooled plate 100', bowl or serving dish are identical to those used for identifying the corresponding components of the heated or cooled plate 100, bowl or serving dish in FIGS. 1-3, except that a "'" has been added to the reference numerals.

In the illustrated embodiment, the heated or cooled plate 100', bowl or serving dish has a heating or cooling element 60' that includes a trace pattern that is traced or laid onto at least a portion of the top surface 20a' of the base 20' of the plate 100'. For example, the trace pattern can be screen printed onto the top surface 20a' and have a connecting portion (not shown) that electrically connects the heating or cooling element 60' to the energy storage devices 80', wireless power receiver 92', and/or control circuitry 94'. This configuration of a heating or cooling element can also be incorporated into any other drinkware, dishware or serverware devices, such as the plate 800, 800', 1100, 1300, 1400, mug 400 and travel mug 600, cup, baby bottle 1500, water bottle or liquid container discussed below.

Figure 7:
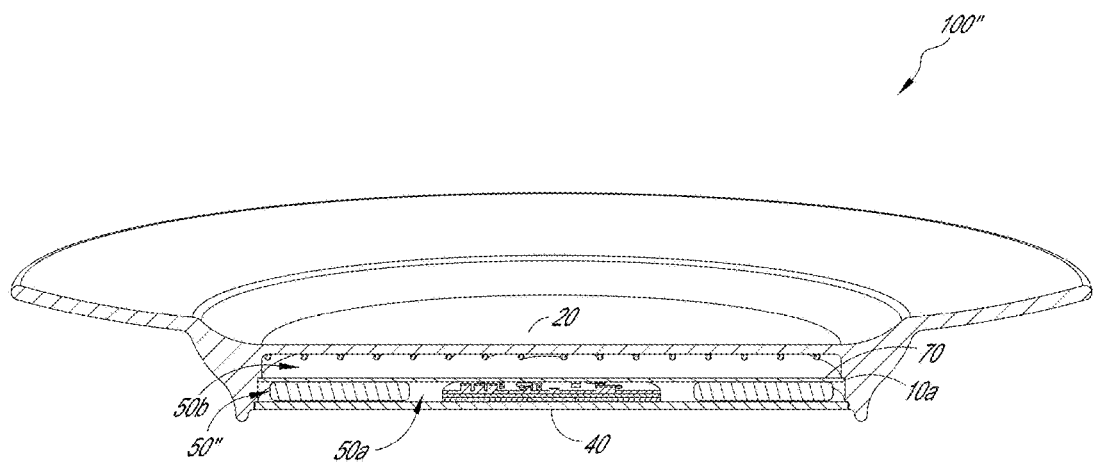
FIG. 7 is a schematic cross-sectional view of another embodiment of a heated or cooled plate.

FIG. 7 shows another embodiment of a heated or cooled plate 100". The heated or cooled plate 100", bowl or serving dish is similar to the heated or cooled plate 100, bowl or serving dish and includes the same components and features disclosed for the heated or cooled plate 100, except as noted below. Thus, the reference numerals used to designate the various components of the heated plate 100", bowl or serving dish are identical to those used for identifying the corresponding components of the heated plate 100, bowl or serving dish in FIGS. 1-3, except that a """ has been added to the reference numerals.

In the illustrated embodiment, the cavity 50" in the heated or cooled plate 100", bowl or serving dish can be subdivided by the insulative member 70 into a first cavity 50a between the bottom portion 40 and the insulative member 70 and a second cavity 50b between the insulative member 70 and the base 20. The energy storage devices 80 and electronic module 90 are disposed in the first cavity 50a. The insulative member 70 is positioned against a ledge 10a defined between the bottom portion 40 and the base 20 so that the insulative member 70 is spaced from the heating or cooling element 60, thereby defining the second cavity 50b. In the illustrated embodiment, the second cavity 50b is under a vacuum, which advantageously further thermally insulates the energy storage devices 80 and electronic module 90 from the heating or cooling element 60. Additionally, having the second cavity 50b under a vacuum advantageously allows the top surface 20a of the base 20 to maintain its temperature for a longer period of time, as the vacuum in the second cavity 50b inhibits heat transfer through the bottom of the plate 100''. In the illustrated embodiment, the heating or cooling element 60 can be electrically connected to the one or more energy storage devices 80 via a connector (not shown) that extends between the first and second cavities 50a, 50b (e.g., a trace line printed on the side wall of the first and second cavities 50a, 50b). This vacuum configuration can also be incorporated into any other drinkware, dishware or serverware devices, such as the plate 800, 800', 1100, 1300, 1400, mug 400 and travel mug 600, cup, baby bottle 1500, water bottle or liquid container discussed below.

Figure 8:
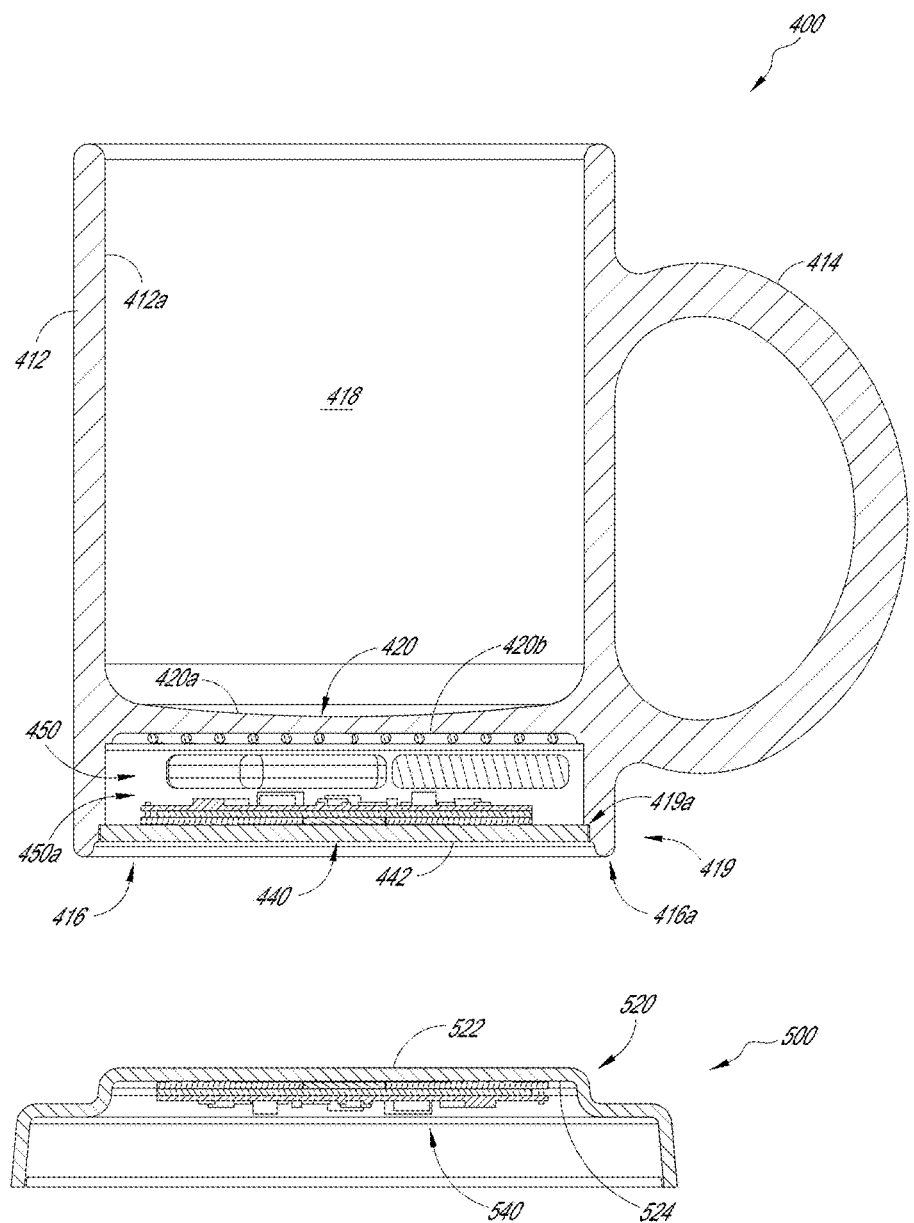
FIG. 8 is a schematic cross-sectional side view of one embodiment of a heated or cooled mug and its charging base.
Figure 9:
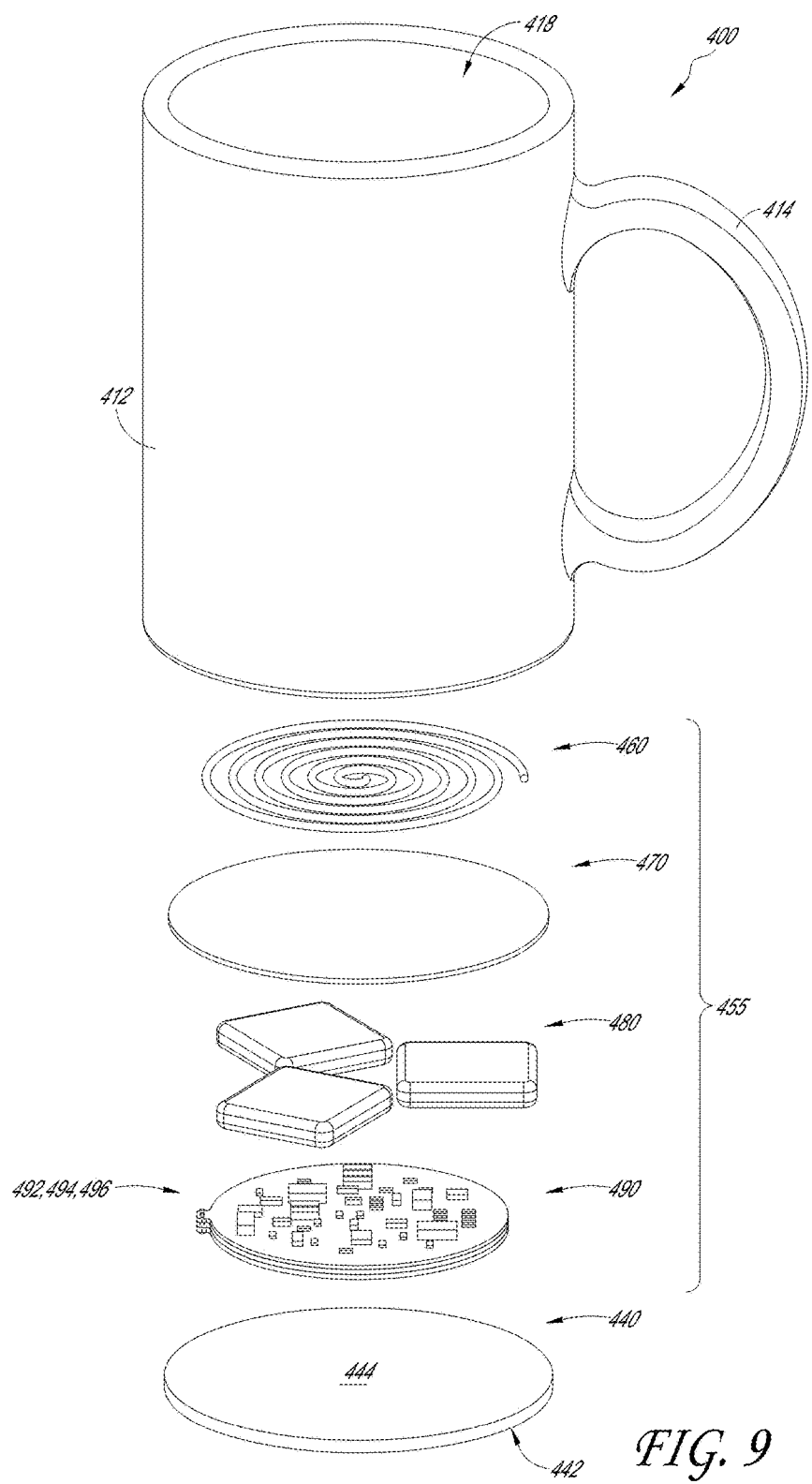
FIG. 9 is a schematic exploded view of the heated or cooled mug in FIG. 8.

FIGS. 8-9 illustrate a heated or cooled mug 400, cup, water bottle or liquid container with a circumferential wall 412 having a side surface 412a, a handle 414 and a base 420 having a top surface 420a, where the side surface 412a and top surface 420a define a cavity 418 that can hold a liquid or solid (e.g., coffee, soup, ice cream). The heated or cooled mug 400, cup, water bottle or liquid container can have a bottom portion 419 that defines a recess 450 between a bottom edge 416a and the base 420. A bottom member (e.g., plate) 440 can be positioned against a ledge 419a of the bottom portion 419, so as to define a cavity 450a between the bottom member 440 and the base 420. In the illustrated embodiment, a heating or cooling system 455 can be disposed (e.g., embedded) in the cavity 450a. The heating or cooling system 455 can include a heating or cooling element 460, an insulative member 470, one or more energy storage devices 480 and an electronic module 490, and these components can be arranged and connected in the same manner described above in connection with the heated or cooled plate 100. In another embodiment, the insulative member 470 can be excluded.

The heating or cooling element 460 can be disposed adjacent a bottom surface 420b of the base 420 so as to conduct heat through the base 420 to a top surface 420a of the base 420. In one embodiment, the heating or cooling element 460 can also be disposed within the wall 412 and behind a side surface 412 of the mug 400, cup, water bottle or liquid container. In one embodiment, the heating or cooling element 460 can be a heater wire or heating wire. In another embodiment, the heating or cooling element 460 can be a resistive heater. However, in other embodiments, the heating or cooling element 460 can include other suitable mechanisms. In one embodiment, the heating or cooling system 455 can include a drive transistor to accommodate heavy switching current flowing from the electrical energy storage element 480 to one or more low resistance heating or cooling element 460.

The electronic module 490 can be attached to a top surface 444 of the bottom member 440 and include one or more of a wireless power receiver 492, control circuitry 494 (e.g., controller circuit, microcontroller, etc.) and a charger 496 (e.g., charging circuit) for charging the one or more energy storage devices 480. The electronic module 490 can include a MCU with capacitive sensing and graphic control features. The control circuitry 494 can operate to manage the power delivered to the heating or cooling element 460. The control circuitry 494 can also be used to manage the charging of the one or more energy storage devices 480. In one embodiment, the wireless power receiver 492 is electrically connected to the battery charger 496, which is electrically connected to the energy storage devices 480 that in turn are electrically connected to the heating or cooling element 460. In another embodiment, where energy storage devices are excluded (as discussed further below), the wireless power receiver 492 can be electrically connected to the heating or cooling element 460. In one embodiment, the heating or cooling system 455 is completely disposed in the bottom portion 419 so that no part of the system 455 is visible (i.e., the mug 400 looks like a conventional mug). In another embodiment, the heating or cooling system 455 can be housed in a module that is removably attachable to the mug 400.

With continued reference to FIGS. 8-9, the bottom portion 440 can be axially spaced from the bottom edge 416a so as to define a recess 416 at the bottom of the mug 400, cup, water bottle or liquid container. A charging base 500 for the heated or cooled mug 400, cup, water bottle or liquid container can include a raised portion 520 with a top surface 522, where the raised portion 520 is sized and shaped to fit at least partially within the recess 416 when the mug 400, cup, water bottle or liquid container is placed on the charging base 500, so that a bottom surface 442 of the bottom member 440 is adjacent the top surface 522 of the raised portion 520. The charging base can include a wireless power transmitter 540 attached to a bottom surface 524 of the raised portion 520, where the wireless power transmitter 540 is arranged on the bottom surface 524 so as to generally align with the electronic module 490 when the mug 400, cup, water bottle or liquid container is positioned on the charging base 500 to facilitate wireless power transmission between the wireless power transmitter 540 and the wireless power receiver 492 (e.g., via short distance wireless energy transfer, such as inductive coupling, as discussed above). In another embodiment, the mug 400, cup, water bottle or liquid container can have a protruding portion at its bottom and the charging base 500 can have a corresponding recessed portion, where the protruding portion fits within the recessed portion when the mug 400, cup, water bottle or liquid container is coupled to the charging base 500. The wireless power transmitter 540 can be electrically connected to a power source (not shown), such as a wall outlet, via a power cord (not shown).

In one embodiment, the bottom member 440 can be removably attached to the mug 400, cup, water bottle or liquid container to allow access to the heating or cooling system 455 in the cavity 450a. For example, the bottom member 440 can be mechanically coupled to the mug 400, cup, water bottle or liquid container (e.g., with screws, a threaded interface between the bottom member 440 and mug 400, a press-fit connection). The bottom member 440 can be removed to allow the replacing of the one or more energy storage devices 480 and the servicing of the heating or cooling system 455. In one embodiment, the bottom member 440 can be a water resistant lid that can be removably attachable (e.g., threaded on or screwed) to the mug 400, cup, water bottle or liquid container for accessing the heating or cooling system 455. In another embodiment, the bottom member 440 can be a water resistant lid that can be removably attachable (e.g., threaded on or screwed) to the mug 400, cup, water bottle or liquid container for accessing the one or more energy storage devices 480. In yet another embodiment, the energy storage devices 480 can be in a pack that is attached (e.g., threaded, snap fit, screwed down) onto the bottom of the mug 400, where the pack's electrical contacts connect with a set of electrical contacts on the bottom of the mug 400.

In another embodiment, the charging base 500 can be excluded and power can be transmitted to the wireless power receiver 492 via a remote power transmitter using long-distance wireless energy transmission, as further discussed below. In this embodiment, where the heated or cooled mug 400, cup, water bottle or liquid container also does not have energy storage devices, such as the energy storage devices 480, the heating or cooling element 460 is electrically connected to the wireless power receiver 492 via the control circuit 494, which is operable to control the amount of power that is provided to the heating or cooling element 460. During operation, if the mug 400, cup, water bottle or liquid container is out of range of the wireless power transmission, the heating or cooling element 460 will lose power and shut off. For example, in this embodiment if the mug 400, cup, water bottle or liquid container is not on a charging base, such as the charging base 500, or out of the range of power transmission from a remote wireless power transmitter, the heating or cooling element 460 in the mug 400, cup, water bottle or liquid container will lose power and shut off.

The one or more energy storage devices 480 can advantageously supply power to the heating or cooling element 460 for a prolonged period of time before its power charge diminishes, thereby advantageously maintaining the contents of the mug 400, cup, water bottle or liquid container (e.g., soup, coffee, ice cream) hot or cold, for a prolonged period of time. In one embodiment, the energy storage devices 480 can power the heating or cooling element 460 for at least 15 minutes. In another embodiment, the energy storage devices 480 can power the heating or cooling element 460 for between about 30 minutes and about 60 minutes. However, in another embodiment, the energy storage devices 480 can power the heating or cooling element 460 for greater than 60 minutes. In another embodiment, the power level, or desired temperature, can be selected by the user (e.g., via a switch) which will extend or shorten the duration of time that the heating or cooling element 460 will run for, as further discussed below.

As discussed above, in one embodiment, the heating or cooling system 455 is advantageously embedded in the body of the mug 400, cup, water bottle or liquid container (e.g., embedded in the bottom portion 419 of the mug 400) so that no portion of the heating or cooling system 455 is exposed or can be contacted by a user while holding the mug 400, cup, water bottle or liquid container. Therefore, the mug 400, cup, water bottle or liquid container can advantageously be exposed to water or other liquids, e.g., in a sink or in a dishwasher, without exposing the heating or cooling system 455 to said water or liquids, thereby inhibiting damage to the heating or cooling system 455. Additionally, by being embedded in the body of the mug 460, the mug 460 can be aesthetically pleasing as it looks like a conventional mug.

In another embodiment, the heating or cooling system 455 can be housed in a non-water proof module that can be removably attached to the mug 400, cup, water bottle or liquid container (e.g., threadably coupled to the mug 400, or coupled via a pin/slot assembly where the module twists into the bottom of a mug 400) to heat or cool the mug 400, cup, water bottle or liquid container. In this embodiment, when the mug 400, cup, water bottle or liquid container is to be washed, the heating or cooling module can be decoupled from the mug 400, cup, water bottle or liquid container before the mug 400, cup, water bottle or liquid container is washed (e.g., placed in the dish washing machine). The heating or cooling module can then be placed on a corresponding charging station for use at a later time when it can again be coupled to a mug 400, cup, water bottle or liquid container to heat or cool the contents of the mug 400.

In another embodiment, the mug 400, cup, water bottle or liquid container can include one or more corrosion resistant electrical contacts (not shown) on an outer surface of the mug 400, such as the bottom surface 442 of the bottom portion 440 of the mug 400, where the electrical contacts are sized and shaped to contact corresponding electrical contacts (not shown) on the charging base 500 when the mug 400, cup, water bottle or liquid container is placed on the charging base 500. In one embodiment, the electrical contacts of the mug 400, cup, water bottle or liquid container can protrude from a surface of the mug 400, such as electrical posts. In another embodiment, the electrical contacts of the mug 400, cup, water bottle or liquid container can be one or more contact pads (not shown) on the bottom surface 442 of the bottom portion 440 of the mug 400, cup, water bottle or liquid container that can contact corresponding contact pads (not shown) on the top surface 522 of the charging base 500. However, the electrical contacts on the mug 400, cup, water bottle or liquid container and charging base 500 can have other suitable configurations.

Figure 9A:
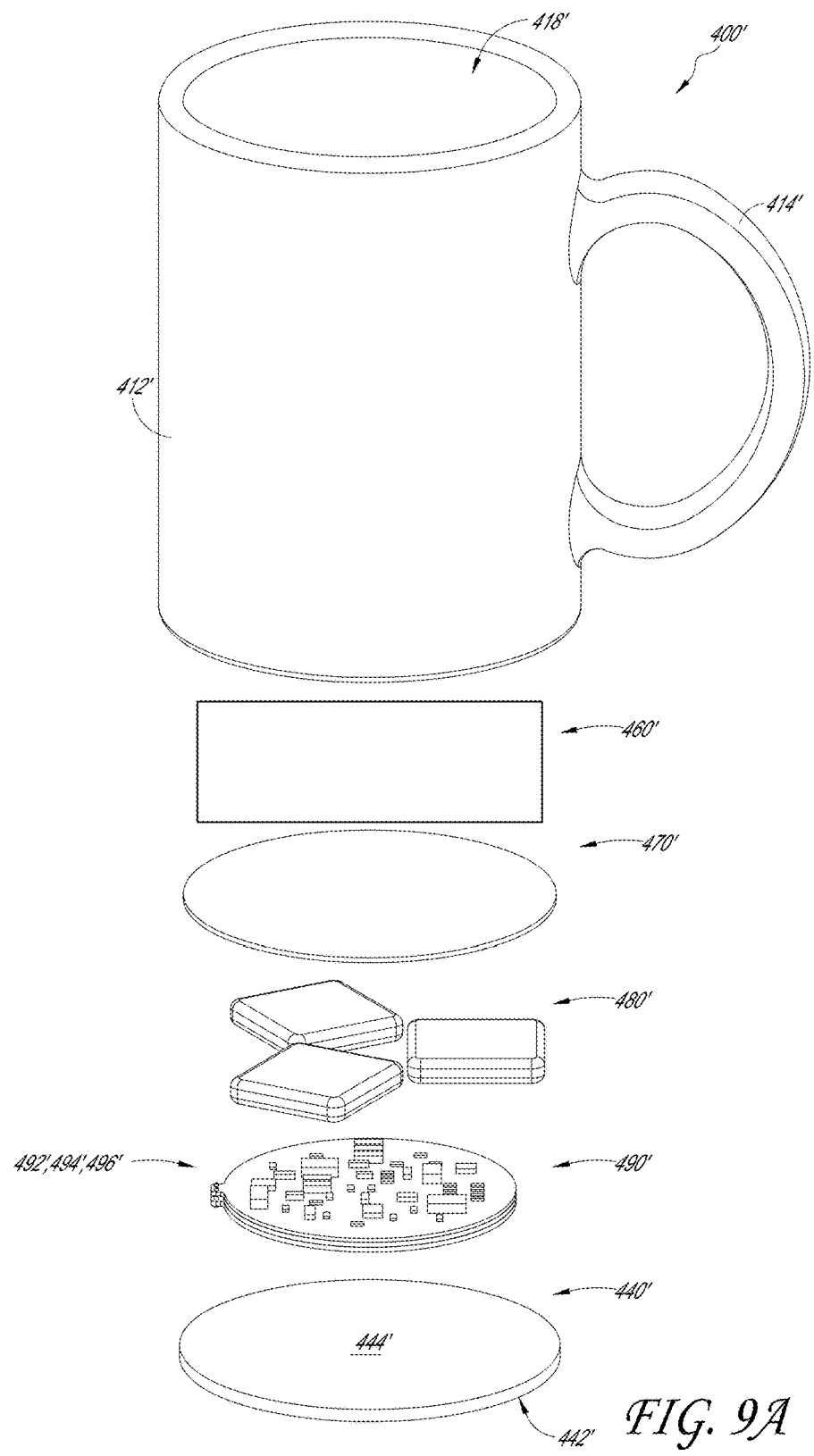
FIG. 9A is a schematic exploded view of another embodiment of a heated or cooled mug.

FIG. 9A shows another embodiment of a heated or cooled mug 400', cup, water bottle or liquid container. The heated or cooled mug 400', cup, water bottle or liquid container is similar to the heated or cooled mug 400, cup, water bottle or liquid container and includes the same components and features disclosed for the heated or cooled mug 400, except as noted below. Thus, the reference numerals used to designate the various components of the heated or cooled mug 400', cup, water bottle or liquid container are identical to those used for identifying the corresponding components of the heated or cooled mug 400, cup, water bottle or liquid container in FIGS. 8-9, except that a "'" has been added to the reference numerals.

In the illustrated embodiment, the heated or cooled mug 400', cup, water bottle or liquid container can have a heating or cooling element 460', which is shown schematically in FIG. 9A. In one embodiment, the heating or cooling element 460' can be a heater wire or heating wire, such as the heating or cooling element 460 shown in FIGS. 8-9. In another embodiment, the heating or cooling element 460' can be a resistive heater. However, in other embodiments, the heating or cooling element 460' can include other suitable mechanisms. In one embodiment, the heating or cooling element 460' can be an active cooling element or a passive cooling element. For example, where the heating or cooling element 460' is a passive cooling element, the heating or cooling element 460' can include a thermoelectric system with one or more Peltier elements in contact with, or in proximity to, the bottom surface 420*b* of the base 420. In another embodiment, where the heating or cooling element 460' is an active cooling element, the heating or cooling element 460' can include a chilled fluid circulation system with channels (not shown) disposed in contact with, or in proximity to, the bottom surface 420*b* of the base 420. In still another embodiment, the heating or cooling element 460' can be a FREON® cooling system with an expansion channel (not shown) inside a bottom portion 419 of the mug 400', cup, water bottle or liquid container (or other dishware device). However, the heating or cooling element 460' can include other suitable active cooling arrangements. Though the illustrated embodiment is for a heated or cooled mug 400', the heating or cooling element 460' can be incorporated into any dishware, drinkware or serverware device, such as the plate 100, bowl or serving dish and travel mug 600, cup, water bottle or liquid container (discussed below). In some embodiments, the dishware, drinkware or serverware device can include a heat sink (e.g., one or more fins) to dissipate heat generated by the heating or cooling element. In one embodiment, the heat sink can be incorporated into the body of the dishware, drinkware or serverware device. In another embodiment, the heat sink can be removably attached to the dishware, drinkware or serverware device. The heating or cooling element 460' can be operated to maintain liquid or solid food in the dishware, drinkware or serverware device warm or cool (e.g., to raise or lower the temperature of the receiving portion of the dishware, drinkware or serverware device above or below ambient temperature to maintain the food warm or cool, such as at a desired temperature or within a desired temperature range).

Figure 10:
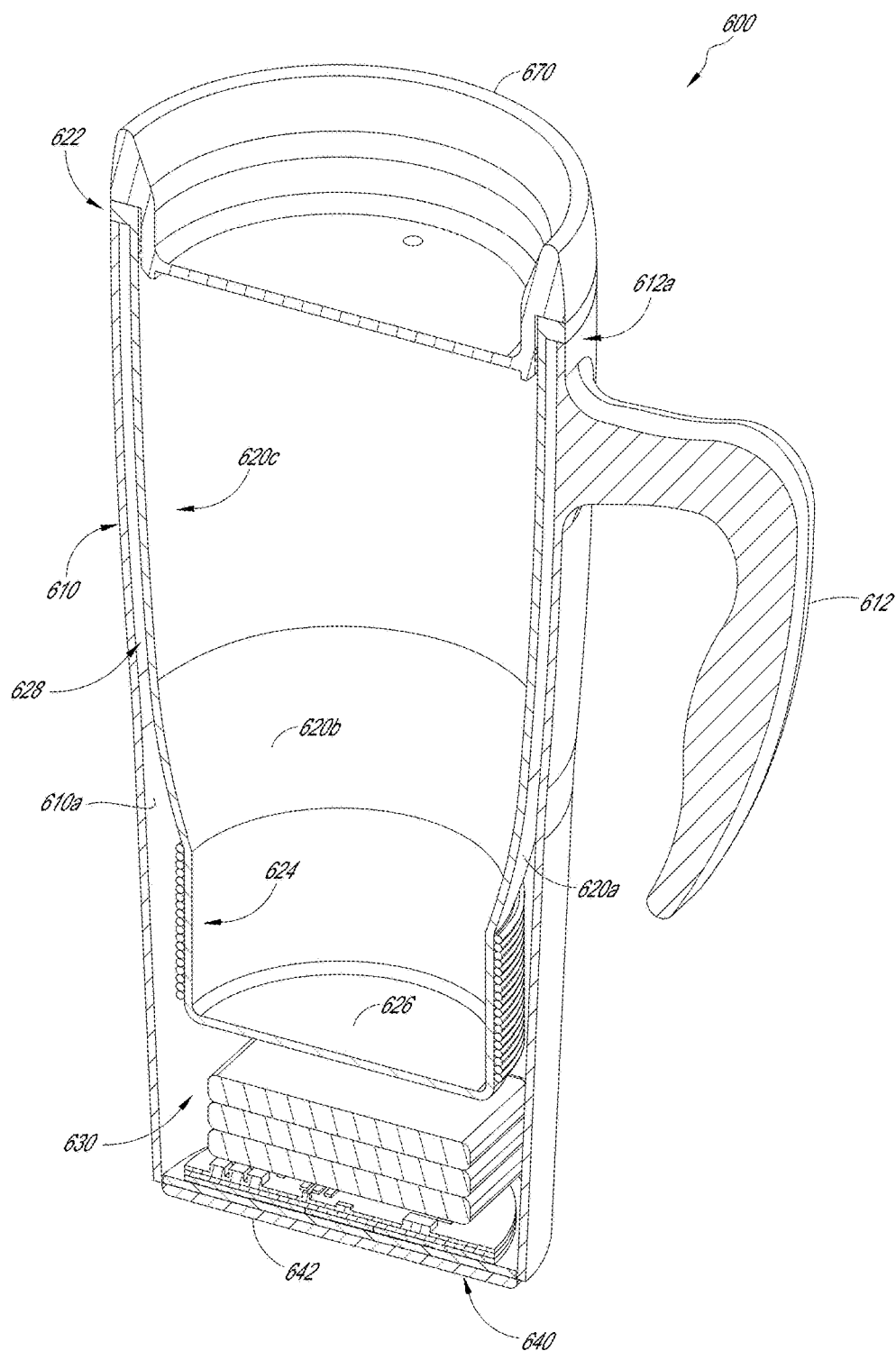
FIG. 10 is a schematic perspective cross-sectional view of one embodiment of a heated or cooled travel mug.
Figure 11:
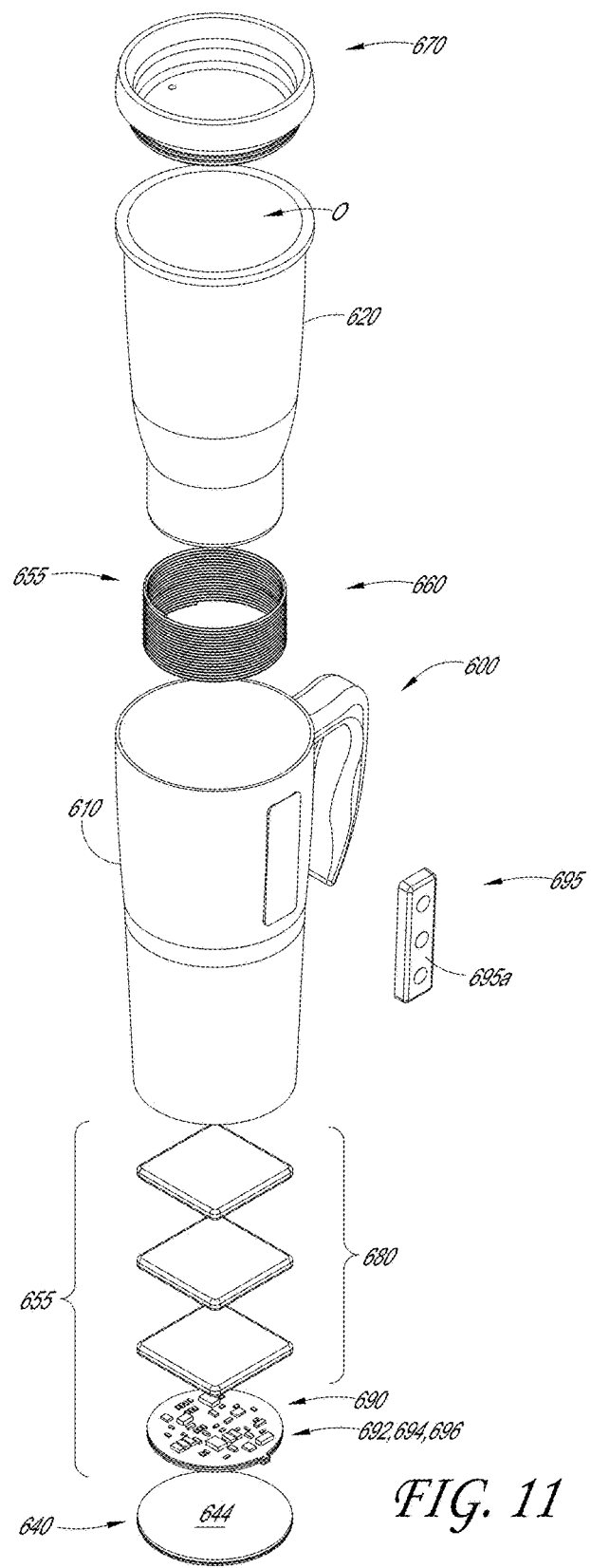
FIG. 11 is a schematic perspective exploded view of the heated or cooled travel mug of FIG. 10.
Figure 12:
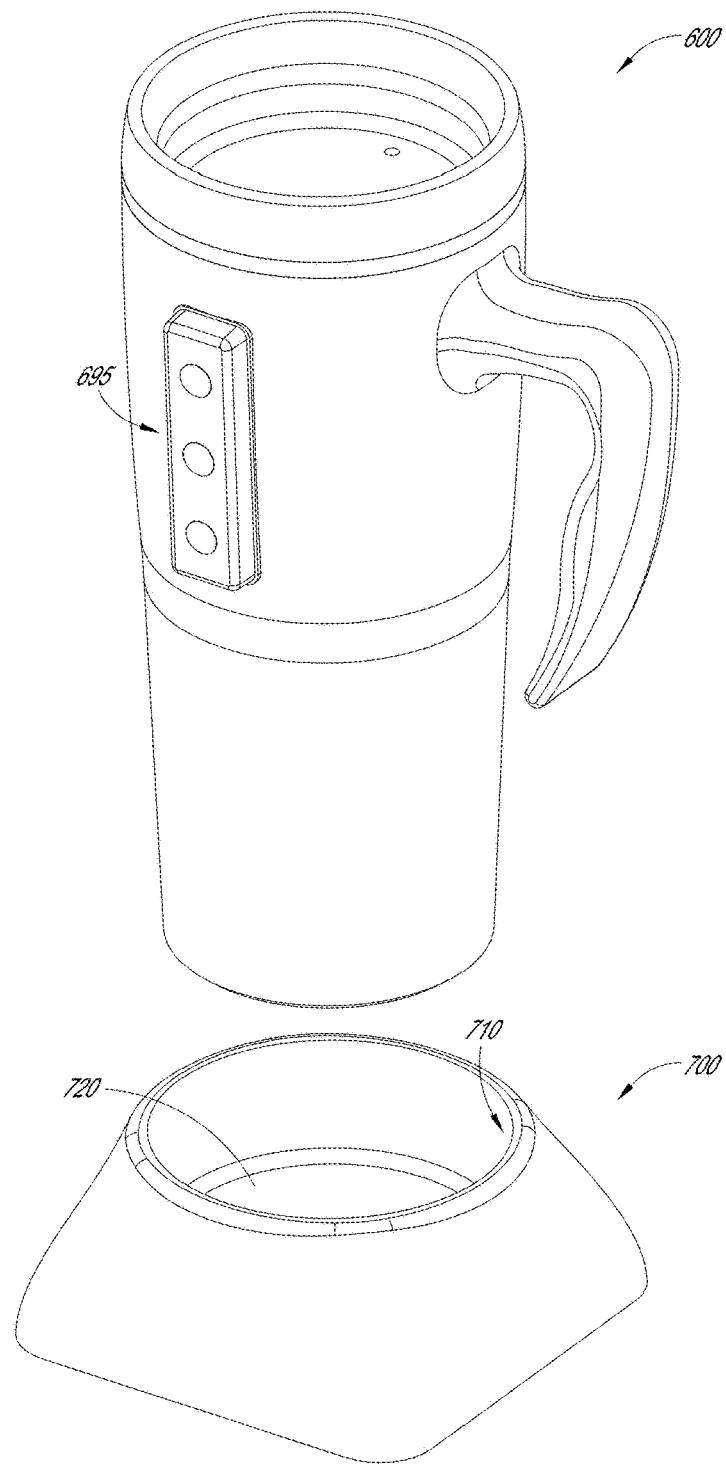
FIG. 12 is a schematic perspective view of the heated or cooled travel mug of FIG. 10 and its associated charging base.

FIGS. 10-12 show one embodiment of a travel mug 600, such as a travel coffee mug, that incorporates some of the same features described above with respect to the mug 400, cup, water bottle or liquid container. In the illustrated embodiment, the travel mug 600, cup, water bottle or liquid container has an outer circumferential wall 610, a handle 612 and a bottom portion 640, where the bottom portion 640 can, in one embodiment, be removably attached to the distal end of the outer circumferential wall 610. In the illustrated embodiment, the travel mug 600, cup, water bottle or liquid container has an inner circumferential wall 620 that extends from a proximal portion 622 to a base 626 and has a distal portion 624 adjacent the base 626. The inner circumferential wall 620 defines a chamber 620c (e.g., receiving portion) for holding a liquid (e.g., coffee, tea). The travel mug 600, cup, water bottle or liquid container can be sized to fit in a standard diameter cup holder of an automobile. Additionally, the travel mug 600, cup, water bottle or liquid container can have a height that allows the travel mug 600, cup, water bottle or liquid container to fit in a drawer (e.g., top drawer) of a dishwasher rack, such that the travel mug 600, cup, water bottle or liquid container can be placed upside down in the dishwasher for cleaning in a generally vertical orientation. In one embodiment, the travel mug 600, cup, water bottle or liquid container can hold about 16 ounces of liquid. However, other liquid containment sizes can be used.

The inner circumferential wall 620 can attach at its proximal portion 622 to a proximal end 612a of the outer circumferential wall 610. As shown in FIG. 10, the inner circumferential wall 620 is shaped relative to the outer circumferential wall 610 so as to define an annular gap 628 between the inner circumferential wall 620 and the outer circumferential wall 610. Additionally, the base 626 of the inner circumferential wall 620 is spaced apart from the bottom portion 640 so as to define a cavity 630 therebetween, where the cavity 630 is in communication with the annular gap 628. A cover 670 can be removably disposed over the opening O in the inner circumferential wall 620 to substantially seal the opening O.

With continued reference to FIGS. 10-11, the travel mug 600, cup, water bottle or liquid container can have a heating or cooling system 655 disposed in the cavity 630. In one embodiment, the heating or cooling system can include a heating or cooling element 660, one or more energy storage devices 680 and an electronic module 690, where these components can be arranged and connected in the same manner described above in connection with the heated or cooled plate 100, bowl or serving dish and heated or cooled mug 400, cup, water bottle or liquid container. The heating or cooling element 660 can be disposed adjacent the distal portion 624 of the inner circumferential wall 620. In the illustrated embodiment, the heating or cooling element 660 can be wrapped around the distal portion 624 and in contact with an outer surface 620a of the inner circumferential wall 620 at the location of the distal portion 624 so as to conduct heat through the distal portion 624 of the inner circumferential wall 620 and into the liquid in the chamber 620c. In one embodiment, the heating or cooling system 655 can include a drive transistor to accommodate heavy switching current flowing from the electrical energy storage element 680 to one or more low resistance heating or cooling element 660.

The electronic module 690 can be attached to a top surface 644 of the bottom portion 640 and can include one or more of a wireless power receiver 692 (e.g., that can receive power from an inductive coupling transmitter in a charging base or a charging pad), control circuitry 694 (e.g., controller circuit, microcontroller, etc.) and a charger 696 (e.g., charging circuit) for charging the one or more energy storage devices 680. The electronic module 690 can include a MCU with capacitive sensing and graphic control features. The control circuitry 694 can operate to manage the power delivered to the heating or cooling element 660. The control circuitry can also be used to manage the charging of the one or more energy storage devices 680. In another embodiment, an insulative member, such as the insulative member 70, 470 discussed above, can be disposed between the base 626 of the inner circumferential wall 620 and the electronic module 690 to thermally isolate the heating or cooling element 660 from the electronic module 690.

In one embodiment, the wireless power receiver 692 is electrically connected to the battery charger 696, which is electrically connected to the energy storage devices 680 that in turn are electrically connected to the heating or cooling element 660. In another embodiment, where energy storage devices 680 are excluded, the wireless power receiver 692 can be electrically connected to the heating or cooling element 660. In one embodiment, the heating or cooling system 655 is completely disposed in the cavity 630 so that no part of the system 655 is visible (i.e., the travel mug 600, cup, water bottle or liquid container looks like a conventional travel mug).

In one embodiment, the bottom portion 640 can be removably attached to the travel mug 600, cup, water bottle or liquid container to allow access to the heating or cooling system 655 in the cavity 630. For example, the bottom portion 640 can be mechanically coupled to the travel mug 600, cup, water bottle or liquid container (e.g., with screws, a threaded interface between the bottom portion 640 and travel mug 600, a press-fit connection). The bottom portion 640 can be removed to allow the replacing of the one or more energy storage devices 680 and the servicing of the heating or cooling system 655. In one embodiment, the bottom portion 640 can be a water resistant lid that can be removably attachable (e.g., threaded on or screwed) to the travel mug 600, cup, water bottle or liquid container for accessing the heating or cooling system 655. In another embodiment, the bottom portion 640 can be a water resistant lid that can be removably attachable (e.g., threaded on or screwed) to the travel mug 600, cup, water bottle or liquid container for accessing the one or more energy storage devices 680. In yet another embodiment, the energy storage devices 680 can be in a pack that is attached (e.g., threaded snap fit, screwed down) onto the bottom or side of the travel mug 600, where the pack's electrical contacts connect with a set of electrical contacts on the bottom or side of the travel mug 600, cup, water bottle or liquid container.

With continued reference to FIGS. 10-12, a charging base 700 for the travel mug 600, cup, water bottle or liquid container can include a recessed portion 710 with a base 720, where the recessed portion 710 is sized and shaped to at least partially receive the distal portion of the travel mug 600, cup, water bottle or liquid container therein, so that a bottom surface 642 of the bottom portion 640 is adjacent the base 720 when the travel mug 600, cup, water bottle or liquid container is placed on the charging base 700. The charging base 700 can include a wireless power transmitter (not shown) attached to a bottom surface of the base 720, in a similar manner as discussed above in connection with the charging base 200, 500. The wireless power transmitter is arranged on the bottom surface of the base 720 so as to generally align with the electronic module 690 when the travel mug 600, cup, water bottle or liquid container is positioned on the charging base 700 to facilitate wireless power transmission between the wireless power transmitter and the wireless power receiver 692 (e.g., via short distance wireless energy transfer, such as inductive coupling, as discussed above). In another embodiment, the travel mug 600, cup, water bottle or liquid container can have a recessed portion, and the charging base 700 a corresponding protruding portion that can at least partially fit within the recessed portion of the travel mug 600, cup, water bottle or liquid container when the travel mug 600, cup, water bottle or liquid container is coupled to the charging base 700. The wireless power transmitter can be electrically connected to a power source (not shown), such as a wall outlet, via a power cord (not shown).

In another embodiment, the charging base 700 can be excluded and power can be transmitted to the wireless power receiver 692 via a remote power transmitter using long-distance wireless energy transmission, as further discussed below. In this embodiment, where the travel mug 600, cup, water bottle or liquid container also does not have energy storage devices, such as the energy storage devices 680, the heating or cooling element 660 is electrically connected to the wireless power receiver 692 via the control circuit 694, which is operable to control the amount of power that is provided to the heating or cooling element 660. During operation, if the travel mug 600, cup, water bottle or liquid container is out of range of the wireless power transmission, the heating or cooling element 660 will lose power and shut off. For example, in this embodiment if the mug 600 is not on a charging base, such as the charging base 700, or out of the range of power transmission from a remote wireless power transmitter, the heating or cooling element 660 in the travel mug 600, cup, water bottle or liquid container will lose power and shut off. In still another embodiment, the travel mug 600, or plate 100, bowl or serving dish or mug 400, cup, water bottle or liquid container can include one or more energy storage devices 80, 480, 680 electrically connected to the heating or cooling element 60, 460, 660 and the electronic module 90, 490, 690 can switch to battery power (e.g., via the control circuit 94, 494, 694) when the travel mug 600, plate 100, bowl or serving dish or mug 400, cup, water bottle or liquid container is out of range of power transmission from the remote wireless power transmitter so that the heating or cooling element 60, 460, 660 can continue to heat or cool the contents of the travel mug 660, plate 100, bowl or serving dish or mug 400, cup, water bottle or liquid container for a period of time.

As with the embodiments discussed above, the heating or cooling element 660 can in one embodiment be a heater wire or heating wire. In another embodiment, the heating or cooling element 660 can be a resistive heater. However, in other embodiments, the heating or cooling element 660 can include other suitable mechanisms. In one embodiment, the heating or cooling element 660 can be an active cooling element or a passive cooling element. For example, where the heating or cooling element 660 is a passive cooling element, the heating or cooling element 660 can include a thermoelectric system with one or more Peltier elements. In another embodiment, where the heating or cooling element 660 is an active cooling element, the heating or cooling element 660 can include a chilled fluid circulation system with channels (not shown) disposed in contact with, or in proximity to, the distal portion 624 of the inner circumferential wall 620. In still another embodiment, the heating or cooling element 660 can be a FREON® cooling system with an expansion channel inside the bottom portion of the travel mug 600, cup, water bottle or liquid container (or other dishware device). However, the heating or cooling element 660 can include other suitable active cooling arrangements.

The one or more energy storage devices 680 can advantageously supply power to the heating or cooling element 660 for a prolonged period of time before its power charge diminishes, thereby advantageously maintaining the contents of the travel mug 600, cup, water bottle or liquid container (e.g., coffee, soft drink) hot or cold, for a prolonged period of time (e.g., while a user is commuting to work). In one embodiment, the energy storage devices 680 can power the heating or cooling element 660 for at least 15 minutes. In another embodiment, the energy storage devices 680 can power the heating or cooling element 660 for between about 30 minutes and about 60 minutes. However, in another embodiment, the energy storage devices 680 can power the heating or cooling element 660 for greater than 60 minutes.

In the illustrated embodiment, the travel mug 600, cup, water bottle or liquid container includes a user interface 695 that is electrically connected to the electronic module 690 via one or more electrical lines (not shown). In one embodiment, the electrical lines can include trace patterns screen printed on an inner surface 610a of the inner circumferential wall 610 and extend between the user interface 695 and the electronic module 690. In another embodiment, the electrical lines can include one or more standard electrical wires. The user interface 695 can include one or more user selection members 695a, such as buttons, which the user can actuate to effect a desired control of the heating or cooling system 655. For example, one of the user selection members 695a can be used to turn off the heating or cooling element 660 (e.g., if the user does not want to continue to heat or cool the contents of the travel mug 600). In another embodiment, one or more of the user selection members 695a can be used to control the heating or cooling element 660 to provide a desired temperature for the liquid in the travel mug 600, cup, water bottle or liquid container. In still another embodiment, at least one of the user selection members 695a can be used to set a timer for when power to the heating or cooling element 660 is to be turned off. However, the user selection members 695a can be used to control other parameters of the operation of the heating or cooling element 660. For example, the heating or cooling element 660 could have multiple power settings that can be set with the user selection members 695a. When set to a higher power setting the heating or cooling element 660 will run for a shorter period of time before the power storage element 680 can no longer power the heating or cooling element 660. When set to a lower power setting, the heating or cooling element 660 will run for a longer period of time before the power storage element 680 can no longer power the heating or cooling element 660. In another embodiment, the temperature level can be selected by a user via an adjustable thermostat on the user interface 695. The thermostat can advantageously be adjusted to one of multiple temperature settings by the user to control the heating or cooling element 660 within the travel mug 660 (or other dishware or drinkware device) in order to maintain its contents at a specified temperature or within a specified temperature range.

As discussed above, in one embodiment, the heating or cooling system 655 is advantageously housed in the body of the travel mug 600, cup, water bottle or liquid container (e.g., housed in the cavity 630) so that no portion of the heating or cooling system 655 is exposed or can be contacted by a user while holding the travel mug 600, cup, water bottle or liquid container. Therefore, the travel mug 600, cup, water bottle or liquid container can advantageously be exposed to water or other liquids, e.g., in a sink or in a dishwasher, without exposing the heating or cooling system 655 to said water or liquids, thereby inhibiting damage to the heating or cooling system 655. Additionally, by being housed in the body of the travel mug 660, the travel mug 660 can be aesthetically pleasing as it looks like a conventional travel mug. In another embodiment, the travel mug 600, cup, water bottle or liquid container can include one or more electrical contacts (e.g., electrical posts, contact pads) on an outer surface of the mug 600, as discussed above in connection with the mug 400, where the electrical contacts are sized and shaped to contact corresponding electrical contacts (not shown) on the charging base 700 when the travel mug 600, cup, water bottle or liquid container is placed on the charging base 700.

In another embodiment, the heating or cooling system 655 can be housed in a non-water proof module that can be removably attached to the travel mug 600, cup, water bottle or liquid container (e.g., threadably coupled to the travel mug 600, or coupled via a pin/slot assembly where the module twists into the bottom of a travel mug 600) to heat or cool the travel mug 600, cup, water bottle or liquid container. In this embodiment, when the travel mug 600, cup, water bottle or liquid container is to be washed, the heating or cooling module can be decoupled from the travel mug 600, cup, water bottle or liquid container before the travel mug 600, cup, water bottle or liquid container is washed (e.g., placed in the washing machine). The heating or cooling module can then be placed on a corresponding charging station for use at a later time when it can again be coupled to a travel mug 600, cup, water bottle or liquid container to heat or cool food on the travel mug 600, cup, water bottle or liquid container.

Figure 13:
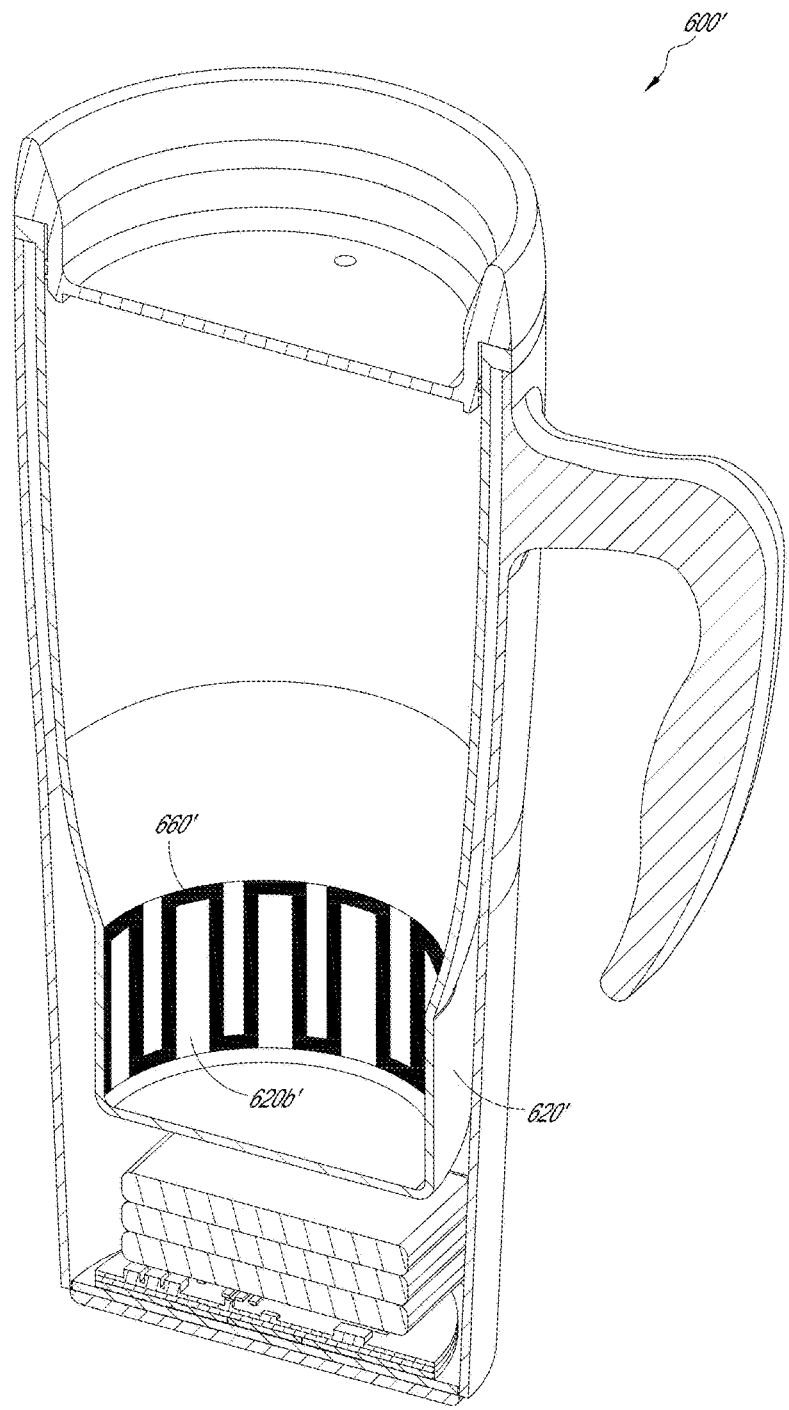
FIG. 13 is a schematic perspective cross-sectional view of another embodiment of a heated or cooled travel mug.

FIG. 13 shows another embodiment of a heated or cooled travel mug 600', cup, water bottle or liquid container. The heated or cooled travel mug 600', cup, water bottle or liquid container is similar to the heated or cooled travel mug 600, cup, water bottle or liquid container and includes the same components and features disclosed for the heated or cooled travel mug 600, except as noted below. Thus, the reference numerals used to designate the various components of the heated or cooled travel mug 600', cup, water bottle or liquid container are identical to those used for identifying the corresponding components of the heated or cooled travel mug 600, cup, water bottle or liquid container in FIGS. 10-12, except that a "'" has been added to the reference numerals.

In the illustrated embodiment, the heated or cooled travel mug 600', cup, water bottle or liquid container has a heating or cooling element 660' that includes a trace pattern that is traced or laid onto at least a portion of the inner surface 620*b*' of the distal portion 624' of the inner circumferential wall 620'. For example, the trace pattern can be screen printed onto the inner surface 620*b*' and have a connecting portion (not shown) that electrically connects the heating or cooling element 660' to the energy storage devices 680 or wireless power receiver 692. This heating or cooling element configuration can also be incorporated into any other drinkware, dishware or serverware devices, such as the plate 100, 100', 800, 800', 1100, 1300, 1400, mug 400, cup, baby bottle 1500, water bottle or liquid container discussed below.

Figure 14:
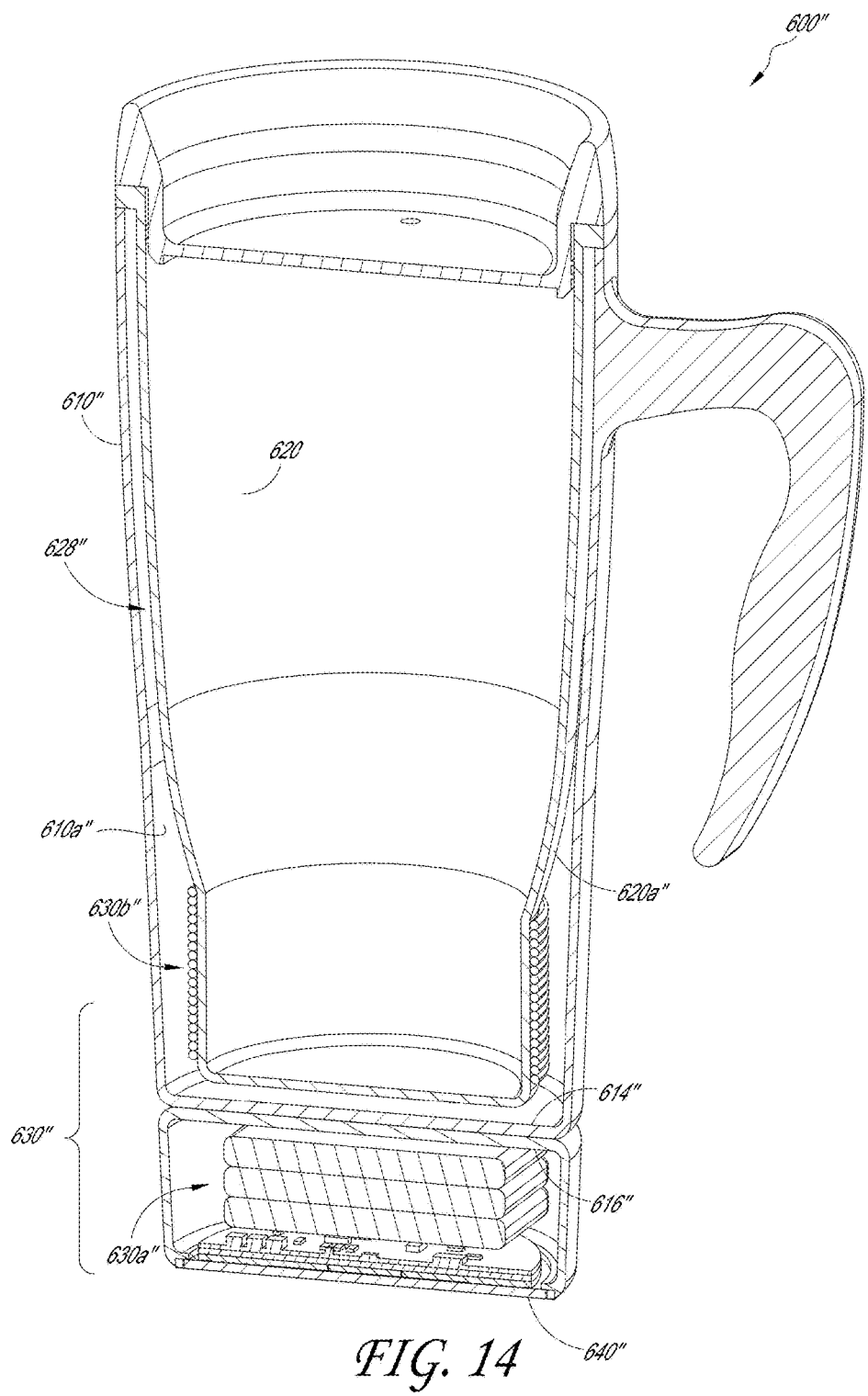
FIG. 14 is a schematic perspective cross-sectional view of another embodiment of a heated or cooled travel mug.
Figure 15:
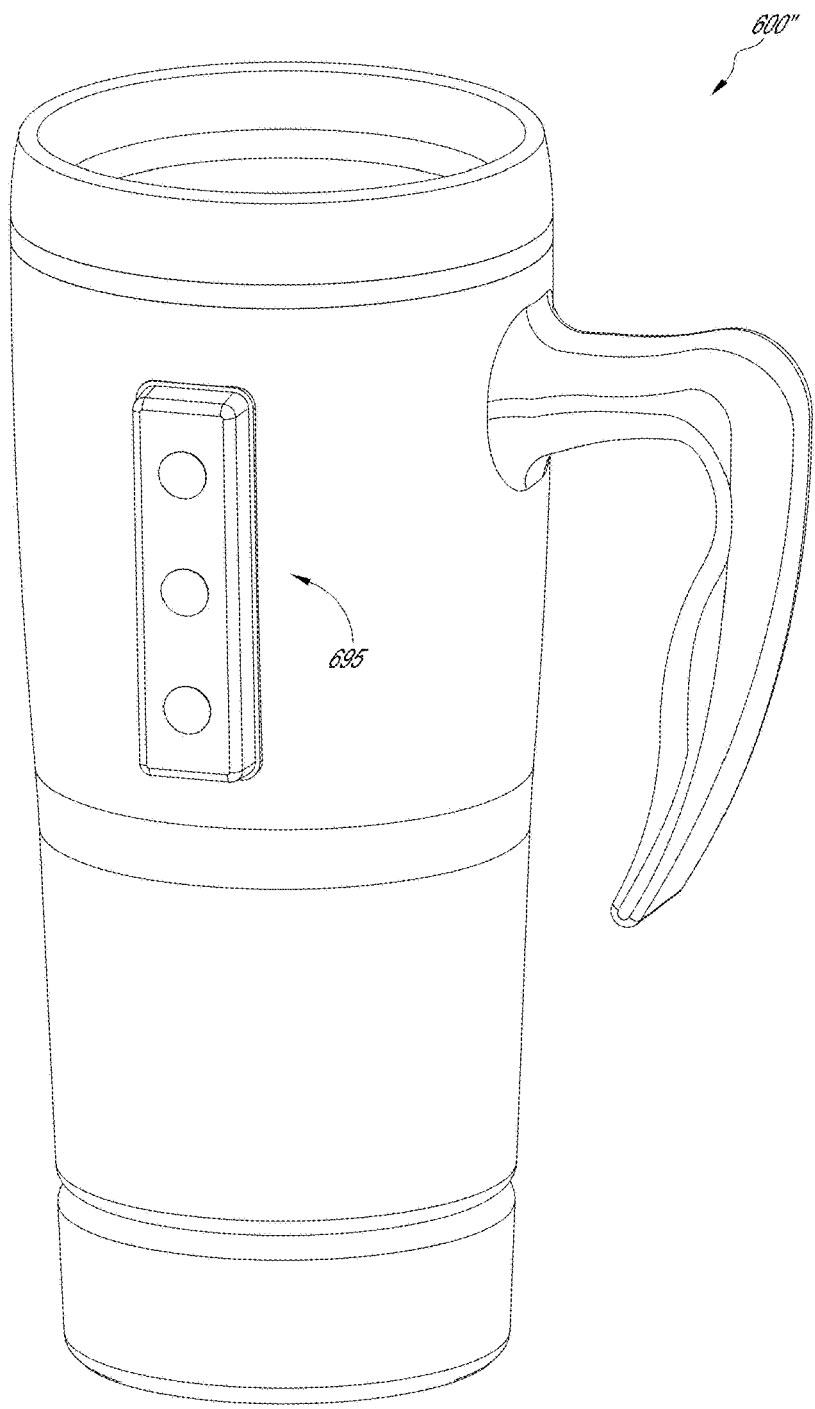
FIG. 15 is a schematic perspective view of the heated or cooled travel mug of FIG. 14.

FIG. 14 shows another embodiment of a heated or cooled travel mug 600", cup, water bottle or liquid container. The heated or cooled travel mug 600", cup, water bottle or liquid container is similar to the heated or cooled travel mug 600, cup, water bottle or liquid container and includes the same components and features disclosed for the heated or cooled travel mug 600, except as noted below. Thus, the reference numerals used to designate the various components of the heated or cooled travel mug 600", cup, water bottle or liquid container are identical to those used for identifying the corresponding components of the heated or cooled travel mug 600, cup, water bottle or liquid container in FIGS. 10-12, except that a "'"" has been added to the reference numerals.

In the illustrated embodiment, the cavity 630" in the heated or cooled travel mug 600", cup, water bottle or liquid container can be subdivided by a base 614" of the outer cylindrical wall 610" and an adjacent top wall 616" into a first cavity 630*a*" between the bottom portion 640" and the top wall 616" and a second cavity 630*b*" between the base 614" of the outer cylindrical wall 610" and the annular gap 628". The energy storage devices 680 and electronic module 690 are disposed in the first cavity 630*a*". In the illustrated embodiment, the second cavity 630*b*" is under a vacuum, which advantageously further thermally insulates the energy storage devices 680 and electronic module 690 from the heating or cooling element 660. Additionally, having the second cavity 630*b*" under a vacuum advantageously allows the inner surface 620*b* of the inner circumferential wall 620 to maintain its temperature for a longer period of time, and therefore maintain the temperature of the liquid in the chamber C for a longer period of time, as the vacuum in the second cavity 630*b*" inhibits heat transfer through the outer cylindrical wall 610" and base 614". In the illustrated embodiment, the heating or cooling element 660 can be electrically connected to the one or more energy storage devices 680 and the electronic module 690 with a connector (e.g., one or more wires, or a trace line printed on the side wall 620*a*", 610*a*" of the inner and outer circumferential walls 610", 620) (not shown) that extends between the first and second cavities 630*a*", 630*b*". This vacuum arrangement can also be incorporated into any other drinkware, dishware or serverware devices, such as the plate 100, 100', 800, 800', 1100, 1300, 1400, mug 400, cup, baby bottle 1500, water bottle or liquid container discussed below.

In one embodiment, the heating or cooling system 55, 455, 655 is embedded or housed in the body of the dishware device (e.g., plate 100, mug 400, travel mug 600, etc.). In another embodiment, the heating or cooling system 55, 455, 655 can be housed in a closed water-resistant or water-proof compartment, such as the cavity 50, 450, 630 disposed in a recess of the dishware device. For example, in one embodiment the compartment can be disposed in said recess such that a surface of the compartment is flush with the surrounding surface of the dishware device. In another embodiment, the compartment can protrude from a surface of the dishware device. In one embodiment, the water resistant or water-proof compartment can be removably disposed in said recess of the dishware device (e.g., the compartment can be removably attachable to the dishware, drinkware or serverware device). In another embodiment, the water resistant or water-proof compartment can be fixed within said recess (e.g., attached to the dishware device within the recess via an adhesive, screws, etc.).

As discussed above, in one embodiment power can be transmitted wirelessly from a wireless power transmitter, such as the power transmitter 240, 540, to a wireless power receiver, such as the power receiver 92, 492, 692, via short-distance wireless energy transfer, such as inductive coupling. In another embodiment, the wireless power receiver 92, 492, 692 of the heated or cooled dishware and drinkware, such as the mug 400, plate 100, bowl or serving dish and travel mug 600, can receive power from a remote transmitter via long-distance wireless energy transmission, so that a charging base need not be used to transmit power to the heated or cooled dishware and drinkware.

In one embodiment, the remote transmitter can be disposed on a wall or ceiling of a home or restaurant, or can be disposed outside the home or restaurant. The transmitter can wirelessly transmit power over a distance of a few to several meters to the wireless power receiver 92, 492, 692 using resonant inductive coupling. In one embodiment, an inductive coil in the remote transmitter can have a capacitance plate attached to each end of the coil wire. As electricity travels through the coil, the coil can resonate with a resonant frequency that is a product of the inductance of the coil and the capacitance of the plates. The wireless power receiver, such as the wireless power receiver 92, 492, 692, can have a similar inductive coil with the same resonant frequency as the inductive coil in the remote transmitter, so that energy can be transmitted from the transmitter to the wireless power receiver 92, 492, 692. Accordingly, the heated or cooled dishware or drinkware, such as the mug 400, plate 100, bowl or serving dish and travel mug 600, cup, water bottle or liquid container can be powered wirelessly without the use of a charging base.

In use, a user can charge the one or more energy storage devices, such as the energy storage devices 80, 480, 680, via the charging base and/or the remote transmitter. Once charged, the dishware or drinkware can be heated or cooled via the heating or cooling element 60, 460, 660 thereof to maintain food or liquids therein warm or chilled, as the case may be, for a prolonged period of time. Additionally, since the heating or cooling system 55, 455, 655 is disposed (e.g., embedded) in the body of the dishware or drinkware, such as the mug 400, plate 100, bowl or serving dish or travel mug 600, the dishware and drinkware can be exposed to water (e.g., in a sink or dishwasher) while inhibiting damage to the heating or cooling system 55, 455, 655. In another embodiment, as discussed above, the heating or cooling system 55, 455, 655 can be housed in a closed water resistant or water-proof compartment, where said compartment is fixed or removably attachable to the dishware device (e.g., mug 400, plate 100, etc.).

In one embodiment, the dishware or drinkware device (e.g., plate 100, bowl, serving dish, mug 400, travel mug 600, cup, water bottle or liquid container) can include an orientation sensor (e.g., gyro) that senses the orientation of the dishware or drinkware device, and communicates with the electronic module 90, 490, 690 to control the operation of the dishware or drinkware device. For example, the gyro can sense when the plate 100, bowl or serving dish has been turned on its side or when the mug 400, cup, water bottle, liquid container or travel mug 600 have been turned upside down (e.g., when loading into a dishwasher) and communicates a signal to the electronic module 90, 490, 690 to discontinue power to the heating or cooling element 60, 460, 660, thereby turning the heating or cooling element off. However, other suitable devices (e.g., sensors) other than a gyro can be used to sense the orientation of the dishware, drinkware or serverware device, such as the plate 100, mug 400, cup, water bottle, liquid container or travel mug 600. In another embodiment, the dishware or drinkware device (e.g. plate 100, bowl, serving dish, mug 400, travel mug 600, cup, water bottle or liquid container) can have one or more accelerometer sensors which can sense changes in velocity or changes in motion or in orientation of the dishware or drinkware.

In one embodiment, the orientation (or tilt) sensor can sense when the plate 100, bowl or serving dish is tilted more than a certain predetermined amount (e.g., more than 45°) from the horizontal axis, and the electronic module 90 turns off power to the heating or cooling system 55 (e.g., to the heating or cooling element 60) and disables user interface buttons (discussed further below) on the plate 100, bowl or serving dish. The plate 100, bowl or serving dish can then be inserted into a dishwasher for cleaning. The user interface buttons can be enabled once the plate 100, bowl or serving dish is placed back on the charging station, such as the charging stand 300.

In another embodiment, the orientation (or tilt) sensor can sense when the mug 400, cup, water bottle, liquid container or travel mug 600 is tilted by more than a certain predetermined amount (e.g., more than 135°) from the upright vertical axis, and the electronic module 490, 690 turns off power to the heating or cooling system 455, 655 (e.g., to the heating or cooling element 460, 660) and disables user interface buttons and sensors (such as liquid sensors or liquid level sensors, discussed further below) on the mug 400, cup, water bottle, liquid container or travel mug 600. The mug 400, cup, water bottle, liquid container or travel mug 600 can then be inserted into a dishwasher for cleaning. The user interface buttons can be enabled once the mug 400, cup, water bottle, liquid container or travel mug 600 is returned to a right side up orientation, and the mug 400, cup, water bottle, liquid container or travel mug 600 can again be operated by selecting the "on" button thereon, or by placing the mug 400, cup, water bottle, liquid container or travel mug 600 back on its associated charging stand 500, 700 and thereafter removing it, which resets the operation of the electronic module 490, 690.

Though the orientation or tilt sensor feature disclosed above may be described in connection with a plate 100, mug 400 or travel mug 600, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, baby bottle 1500, beer mug 1600, travel mug 1700A, 2000, 2100, 2400, bread basket 2200, tortilla warmer 2300, and the scope of disclosure and the invention is understood to cover such liquid containers, drinkware, dishware and serverware.

Automatic Shut-Off

In one embodiment, the electronic module 90, 490, 690 of the plate 100, mug 400 or travel mug 600 (or bowl, serving dish, cup, water bottle or liquid container) can automatically turn off power to the heating or cooling element 60, 460, 660 (e.g., via the control circuitry 94, 494, 694), when a predetermined level of the one or more electrical energy storage devices 80, 480, 680 (e.g., batteries) is detected. For example, if the charge or electrical energy storage level of the one or more electrical energy storage devices 80, 480, 680 is below a predetermined percentage of an amount corresponding to a full charge, the electronic module 90, 490, 690 can shut-off power to the heating or cooling element 60, 460, 960 to inhibit damage to the electrical energy storage devices 80, 480, 680 or other components of the plate 100, mug 400 or travel mug 600 (or bowl, serving dish, cup, water bottle or liquid container). In one embodiment, the predetermined power level of the electrical energy storage devices 80, 460, 660 below which power to the heating or cooling element(s) 60, 460, 660 is shut off can be about 30%. However, in other embodiments, the predetermined charge level can be higher or lower than this value (e.g., 20%).

Though the automatic shut-off feature disclosed above may be described in connection with a plate 100, mug 400 or travel mug 600, one of skill in the art will recognize that it can also apply to any liquid container, drinkware, dishware or serverware (e.g., bowl, serving dish, hot plate, cup, bottle, baby bottle and/or liquid container), including the plate 100', 800, 800', 900, 1100, 1300, 1400, baby bottle 1500, beer mug 1600, travel mug 1700A, 2000, 2100, 2400, bread basket 2200, tortilla warmer 2300, and the scope of disclosure and the invention is understood to cover such liquid containers, drinkware, dishware and serverware.

Timed Shut-Off

In another embodiment, the electronic module 90, 490, 690 of the plate 100, mug 400 or travel mug 600 (or bowl, serving dish, water bottle or liquid container) can automatically turn off power to the heating or cooling element 60, 460, 660 (e.g., via the control circuitry 94, 494, 694) after a predetermined period of time during which the heating or cooling element 60, 460, 660 has been operating (e.g., continuously operating or intermittently operating). For example, in one embodiment, the predetermined period of time can be 3 hours. In another embodiment, the predetermined period of time can be 20 minutes. In still another embodiment, the predetermined period of time can be 5 hours. However, the predetermined period of time can be higher or lower than this.

Though the timed shut-off feature disclosed above may be described in connection with a plate 100, mug 400 or travel mug 600, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, baby bottle 1500, beer mug 1600, travel mug 1700A, 2000, 2100, 2400, bread basket 2200, tortilla warmer 2300, and the scope of disclosure and the invention is understood to cover such liquid containers, drinkware, dishware and serverware.

Operation Based on Food Detection

In one embodiment, the plate 100, bowl or serving dish can have a have one or more sensors (such as sensors 820A-820D in FIG. 16) that sense when food has been placed on the plate, bowl or serving dish and sends a signal to the electronic module 90 (e.g., sends a signal to the controller circuit 94) to control the operation of the heating or cooling element 60 based at least in part on the signal. For example, the electronic module 90 can turn on the heating or cooling element 60 upon receiving the signal that food has been placed on the plate 100, bowl or serving dish. In one embodiment, the sensor can be a weight sensor. In one embodiment, the sensor can be a pressure sensor. In one embodiment, the sensor can be a liquid sensor. In one embodiment, the sensor can be a proximity sensor. In one embodiment, the sensor can be an optical sensor. In one embodiment, the sensor can be a near field sensor. In one embodiment, the sensor can sense a change in resonant frequency when food is placed on the plate, bowl or serving dish. For example, a component of the plate 100, bowl or serving dish can transmit or broadcast a signal at a standard frequency and the sensor can sense a change or shift in the frequency of the signal (e.g., ultrasound type detection). In one embodiment, the frequency can be above or below an inductive coupling frequency (e.g., above or below about 100-120 kHz). For example, in one embodiment, the broadcast frequency of the signal can be about 40-50 kHz. In an embodiment where the sensor is an optical sensor, the plate 100, bowl or serving dish can act as an optical filter and the optical signal can be transmitted through the plate, bowl or serving dish. In such an embodiment, the sensor would sense a modulated signal, relative to the set optical signal, which would indicate the presence of food on the plate 100. In another embodiment, the sensor could be a temperature sensor (such as sensors 820A-820D in FIG. 16), which could detect a change in temperature (due to placement of food on the plate 100, bowl or serving dish), to thereby sense the presence of food on the plate 100, bowl or serving dish. Any combination of the above sensing techniques can be used to enhance the food detection capabilities of the plate 100, bowl or serving dish.

Similarly, the mug 400 or travel mug 600 (or cup, water bottle or liquid container) can have a sensor, or combination of sensors such as the sensors discussed above, to sense when liquid is present within the mug 400 or travel mug 600, cup, water bottle or liquid container. In one embodiment, when the mug 400 or travel mug 600 is removed from its associated charging station 500, 700 or inductive coupling power pad, the electronic module 490, 690 can place the mug 400 and travel mug 600 in standby mode and activate the liquid sensor. In one embodiment, the liquid sensor can be located at a bottom inner surface of the mug 400 or travel mug 600, or at a distance from the bottom surface of the mug 400 or travel mug 600 (e.g., at ½ inch or 1 inch from the bottom along the inner side surface, though other locations are possible). Once liquid is poured into the mug 400 or travel mug 600, the liquid sensor can sense the liquid (e.g., via sensing of a change in temperature, weight, pressure, electrical conductivity, electrical continuity, electrical resistance between two conductors, change in frequency detection, optical sensor, or any combination of sensors above) and turn on the heating or cooling system 455, 655 (e.g., after liquid has been sensed for a predetermined period of time, such as 2 seconds, or substantially instantaneously if desired, such as within less than 0.1 sec or 0.1 msec of sensing. In one embodiment, the mug 400 or travel mug 600 can have a visual indicator or screen (e.g., digital screen) that can be activated upon turning on of the heating or cooling system 455, 655 (e.g., illustrating an illuminated logo, or temperature mode, or displaying the temperature of the liquid, etc.). In another embodiment, the visual indicator can be an illuminated logo or icon or can be a simple indicator light which tells the user that the heating or cooling system 455, 655 has been activated. Once on, the mug 400 or travel mug 600 can operate the heating or cooling element 460, 660 at a predetermined user selected temperature (e.g., the temperature selected by the user the last time the mug 400 or travel mug 600 was used, or a new temperature that the user has selected). The user can change the power level setting or temperature setting via one or more buttons (e.g., soft touch, touch switch, dial, push-button, touch pad, etc.) on a user interface of the mug 400 or travel mug 600, cup, water bottle or liquid container. In another embodiment, the power level or temperature setting can be adjusted using a dial, a switch, a gesture sensor, or any other type of user-interface mechanism in communication with the electronic module 490, 690. In one embodiment, the user-interface display on the mug 400 or travel mug 600 can warn a user if the liquid within the mug 400 or travel mug 600 is too hot to consume or is above or below a predetermined temperature (e.g., the user's preferred or selected temperature).

The heating or cooling system 455 or 655 of the mug 400 or travel mug 600 can be configured to turn off once the liquid sensor (or combination of sensors) senses that the liquid inside the mug 400 or travel mug 600 has been depleted to a predetermined level or depleted completely. Once liquid is again poured into the mug 400 or travel mug 600 so that the sensor (or combination of sensors) senses the poured liquid, the mug 400 or travel mug 600 can again be operated as described above.

Additionally, the mug 400 or travel mug 600 can have one or more liquid level sensors for detecting a liquid level in the mug 400 or travel mug 600, cup, water bottle or liquid container. The one or more liquid level sensors can be of the type discussed above (e.g., sensing a change in temperature, weight, pressure, electrical conductivity, electrical continuity, electrical resistance between two conductors, frequency detection such as ultrasound frequency detection, change in frequency, optical sensor, or any combination above) and can communicate sensed information to the electronic module 490, 690, which can transmit information to one or more indicators (e.g., visual indicators or audible indicator, such as a sound, or a vibration) on the mug 400 or travel mug 600 to indicate to the user the amount of liquid left in the mug 400 or travel mug 600, cup, water bottle or liquid container (or that the liquid in the cup, mug, or travel mug is at, above, or below, the user preferred drinking temperature). In one embodiment, the liquid level sensor can be used in combination with the orientation sensor (e.g. gyro) so that the liquid level within the mug 400 or travel mug 600 will only be taken when the mug 400 or travel mug 600 is in the upright position. This technique would advantageously avoid the improper reading of the liquid level when the user tilts the mug off of vertical axis to take a drink. In one embodiment, the one or more liquid level sensors can communicate signals to the electronic module 490, 690, allowing the electronic module 490, 690 to determine if the mug 400, travel mug 600, cup, water bottle or liquid container has been tilted. Accordingly, the one or more liquid level sensors can operate as orientation sensors to sense an orientation of the mug 400, travel mug 600, cup, water bottle or liquid container.

In one embodiment, the cup, mug 400, travel mug 600, 1700A, 2000, 2100, 2400, water bottle or liquid container (such as beer mug 1600, baby bottle 1500) can have one or more liquid level sensors (e.g. ultrasound sensors, as discussed above). In one embodiment, the cup, mug 400, travel mug 600, 1700A, 2000, 2100, 2400, water bottle or liquid container (such as beer mug 1600, baby bottle 1500) can have a plurality of liquid level sensors (e.g., disposed at various vertical locations of the sidewall, such as sidewall SW in FIG. 34A). In one embodiment, the one or more liquid level sensors can communicate liquid level information to the electronic module (such as electronic module EM, see FIG. 44), and the electronic module can operate the one or more heating or cooling elements (e.g., see HC in FIG. 44) based at least in part on said sensed level information. For example, in one embodiment the electronic module could turn on, turn off or adjust power to at least one of the one or more heating or cooling elements based at least in part on said sensed level information.

In one embodiment, where the one or more heating or cooling elements are arranged vertically on a sidewall (e.g., a panel embedded in the sidewall) of the cup, mug 400, travel mug 600, 1700A, 2000, 2100, 2400, water bottle or liquid container (such as beer mug 1600, baby bottle 1500), as discussed further below, the electronic module can turn off each of the heating or cooling elements as the liquid level drops below the vertical location of said heating or cooling element (see FIGS. 34A-34C). This can advantageously allow the efficient operation of the heating or cooling elements, as they are not operated once the liquid level has dropped below the location of the heating or cooling element.

In one embodiment, the liquid level sensing of a cup, mug, travel mug, baby bottle, beer mug, carafe, water bottle or liquid container can be achieved through sensed electrical characteristics of the heating or cooling elements (e.g. when a heating or cooling element is submerged beneath a liquid level, or alternatively, exposed above a liquid level, the control circuitry can be configured to recognize the difference in the electrical characteristics of the heating or cooling element in order to determine if a heating or cooling element is below or above a liquid level). In this embodiment, the heating or cooling elements can be used to determine a general liquid level within the cup, mug, travel mug, baby bottle, beer mug, carafe, water bottle or liquid container. This method of sensing is also advantageous for sensing if the liquid is near or not near a heating or cooling element (e.g. if the user places his or her cup, mug, travel mug, baby bottle, beer mug, carafe, water bottle or liquid container on its side, or partially on its side, the control circuitry can sense that the liquid is not in thermal contact with said heating or cooling element, and can turn off or reduce power to said heating or cooling element).

Though operation based on sensing the presence of food (solid or liquid) disclosed above may be described in connection with a plate 100, mug 400 or travel mug 600, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, baby bottle 1500, beer mug 1600, travel mug 1700A, 2000, 2100, 2400, bread basket 2200, tortilla warmer 2300, and the scope of disclosure and the invention is understood to cover such liquid containers, drinkware, dishware and serverware.

Power Level Adjustment to Heating/Cooling Element Based on Food Heat Absorption

In one embodiment, the plate 100, mug 400 or travel mug 600 (or bowl, serving dish, cup, water bottle or liquid container) can have a temperature sensor (such as the sensors 820A-820D in FIG. 16) in communication with the electronic module 90, 490, 690 (e.g., in communication with the control circuitry 94, 494, 694). The temperature sensor can sense a temperature of food placed on the plate 100, bowl or serving dish or sense a temperature of a liquid poured into the mug 400, travel mug 600, cup, water bottle or liquid container. The temperature sensor can be an infrared sensor, a thermistor, thermocouple, a diode type sensor, a resistance temperature detector (RTD) sensor or any other suitable type of temperature sensor.

With respect to the plate 100, bowl or serving dish, the sensor (such as sensors 820A-820D of plate 800 in FIG. 16) can sense the temperature of the food placed on the plate 100, bowl or serving dish and communicate the sensed temperature to the electronic module 90, which can then modulate power to the heating or cooling element 60 to vary (e.g. increase or decrease) the amount of energy provided by the heating or cooling element 60 to the plate, bowl or serving dish based on the difference between the sensed temperature and a user selected temperature set point for the plate 100, bowl or serving dish. In one embodiment, if when placed on the plate, bowl or serving dish the food is above the user selected temperature set point, the electronic module 90 can control the heating or cooling element 60 to not activate (or to shut-off if the heating or cooling element 60 has been in operation). This can advantageously extend the working time of the one or more electrical energy storage devices 80 (e.g., between charging events), which can allow the heating or cooling system 55 to have a longer working time (e.g., between charging events of the one or more electrical energy storage devices 80). In another embodiment, the electronic module 90 can control the operation of the heating or cooling element 60 to actively decrease or increase the temperature of the food toward the user selected temperature set point. As the temperature of the food on the plate 100, bowl or serving dish decreases or increases, the electronic module 90 can control the operation of the heating or cooling element 60 (e.g., adjust the power level up or down to increase or decrease the amount of energy provided by the heating or cooling element 60) based at least in part on feedback to the electronic module 90 from the food temperature sensor to provide energy to the food to maintain the temperature of the food at the user selected temperature set point, or within a given temperature range about the user selected temperature set point. In one embodiment, the temperature sensor can be located on the food-receiving surface of the plate 100, bowl or serving dish generally at the center, or multiple sensors can be spread out across the food-receiving surface of the plate, bowl or serving dish so that an average temperature can be used (e.g., sensors 820A-820D on surface S of plate 800 in FIG. 16, or sensors 920 on surface S of plate 900 in FIG. 18). In another embodiment, discussed further below, where the plate 100, bowl or serving dish has a plurality of heating or cooling elements 60 (e.g., heating or cooling elements 860A-D in FIG. 16, or heating or cooling elements 960 in FIG. 18) that provide energy to different sections (e.g., quadrants) of the plate 100, bowl or serving dish, a plurality of temperature sensors can be provided, each temperature sensor associated with one of said different sections of the plate 100, bowl or serving dish. In still another embodiment, the temperature sensor can be located so that it is in communication with the food receiving surface of the plate 100, bowl or serving dish even if the sensor is not located on the food receiving surface (e.g., the sensor can be located on an underside of the heated portion of the plate 100, bowl or serving dish).

With respect to the mug 400, travel mug 600, cup, water bottle or liquid container, the sensor can sense the temperature of the liquid poured into the mug 400, travel mug 600, cup, water bottle or liquid container, and communicate the sensed temperature to the electronic module 490, 690, which can then modulate power to the heating or cooling element 460, 660 to vary (e.g. increase or decrease) the amount of energy provided by the heating or cooling element 460, 660 to the mug 400, travel mug 600, cup, water bottle or liquid container based on the difference between the sensed temperature and a user selected temperature set point for the mug 400, travel mug 600, cup, water bottle or liquid container. In one embodiment, if when poured into the mug 400, travel mug 600, cup, water bottle or liquid container the liquid (e.g., coffee, tea) is above the user selected temperature set point, the electronic module 490, 690 can control the heating element 460, 660 to not activate (or to shut-off if the heating element 460, 660 has been in operation). This can advantageously extend the working time of the one or more electrical energy storage devices 480, 680 (e.g., between charging events), which can allow the heating or cooling system 455, 655 to have a longer working time (e.g., between charging events of the one or more electrical energy storage devices 480, 680).

In another embodiment, the electronic module 490, 690 can control the operation of the heating or cooling element 460, 660 to actively decrease the temperature of the liquid toward the user selected temperature set point. As the temperature of the liquid in the mug 400, travel mug 600, cup, water bottle or liquid container decreases, the electronic module 490, 690 can control the operation of the heating or cooling element 460, 660 (e.g., adjust the power level up or down to increase or decrease the amount of energy provided by the heating or cooling element 460, 660) based at least in part on feedback to the electronic module 490, 690 from liquid temperature sensor to provide energy to the liquid to maintain the temperature of the liquid at the user selected temperature set point, or within a given temperature range about the user selected temperature set point. In one embodiment, the temperature sensor can be located on the liquid-receiving surface of the mug 400, travel mug 600, cup, water bottle or liquid container. For example, in one embodiment, the temperature sensor can be provided on an inner side surface of the mug 400, travel mug 600, cup, water bottle or liquid container a certain distance (e.g., one inch, or other distance) from a bottom surface. In another embodiment, the temperature sensor can be provided on the bottom surface of the liquid-receiving portion of the mug 400, travel mug 600, cup, water bottle or liquid container. In still another embodiment, the temperature sensor can be located so that it is in communication with the liquid receiving surface of the mug 400, travel mug 600, cup, water bottle or liquid container, even if the sensor is not located on the inner surface (e.g., sensor could be located beneath the surface or integrated into the surface) of the mug 400, travel mug 600, cup, water bottle or liquid container.

Though power level adjustment to the heating or cooling element 60, 460, 660 based on heat absorption of the food item (solid or liquid) disclosed above may be described in connection with a plate 100, mug 400 or travel mug 600, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, baby bottle 1500, beer mug 1600, travel mug 1700A, 2000, 2100, 2400, bread basket 2200, tortilla warmer 2300, and the scope of disclosure and the invention is understood to cover such liquid containers, drinkware, dishware and serverware.

Thermal Protector Switch

In one embodiment, the plate 100 (or bowl or serving dish), mug 400 and travel mug 600 (or cup, water bottle or liquid container) can have a thermal protection switch (e.g., as part of the controller circuit 94, 494, 694). In use, if the temperature of the heating or cooling system 55, 455, 655 (e.g., the temperature of the heating or cooling element 60, 460, 660) of the plate 100, bowl, serving dish, mug 400, travel mug 600, cup, water bottle or liquid container rises above a predetermined temperature (e.g., a predetermined high temperature limit), the thermal protection switch will open a circuit that electrically connects the electronic module 90, 490, 690 and the heating or cooling element 60, 460, 660, so that the heating or cooling element will turn off.

Though the thermal protection switch (or circuit) disclosed above may be described in connection with a plate 100, mug 400 or travel mug 600, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, baby bottle 1500, beer mug 1600, travel mug 1700A, 2000, 2100, 2400, bread basket 2200, tortilla warmer 2300, and the scope of disclosure and the invention is understood to cover such liquid containers, drinkware, dishware and serverware.

Battery Maintenance

In one embodiment, where the one or more electrical energy storage devices 80, 480, 680 are batteries, the plate 100, bowl, serving dish, mug 400, travel mug 600, cup, water bottle or liquid container can have smart battery functions to maximize the life of the one or more batteries 80, 480, 680. For example, the electronic module 90, 490, 690 can operate the heating or cooling system 55, 455, 655 so that the one or more batteries 80, 480, 680 are drained at certain intervals. In one embodiment, the electronic module 90, 490, 690 (e.g., charging circuit 96, 496, 696) can monitor cell balancing of the one or more batteries 80, 480, 680 during operation, as well as the discharge rate of the one or more batteries 80, 480, 680. The charging circuit 96, 496, 696 can also monitor the one or more batteries 80, 480, 680 to determine if they are all giving up energy generally equally, as well as that the battery level is not unsafe.

Additionally, the charging circuit 96, 496, 696 can control the charging operation of the plate 100, bowl, serving dish, mug 400, travel mug 600, cup, water bottle or liquid container to ensure the one or more batteries 80, 480, 680 are not overcharged and can discontinue the charging process once battery charge reaches full capacity. In another embodiment, if a plate 100, bowl, serving dish, mug 400, travel mug 600, cup, water bottle or liquid container has been sitting on the charging station for a while without use and the battery level has decreased over time, the charging circuit 96, 496, 696 can sense this drop off in battery level and allow the one or more batteries 80, 480, 680 to be charged to reach a predetermined full charge level. The charging circuit 96, 496, 696 can also sense a discharge rate for the one or more batteries 80, 480, 680. If the discharge rate exceeds a rate that is acceptable or will cause long-term damage to the one or more batteries 80, 480, 680, the electronic module 90, 490, 690 can provide a visual indication, audible indication, and/or reduce power to the heating or cooling element 60, 460, 660.

Though smart battery functions (e.g., maintenance) disclosed above may be described in connection with a plate 100, mug 400 or travel mug 600, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, baby bottle 1500, beer mug 1600, travel mug 1700A, 2000, 2100, 2400, bread basket 2200, tortilla warmer 2300, and the scope of disclosure and the invention is understood to cover such liquid containers, drinkware, dishware and serverware.

Isolated Heating Areas

Figure 16:
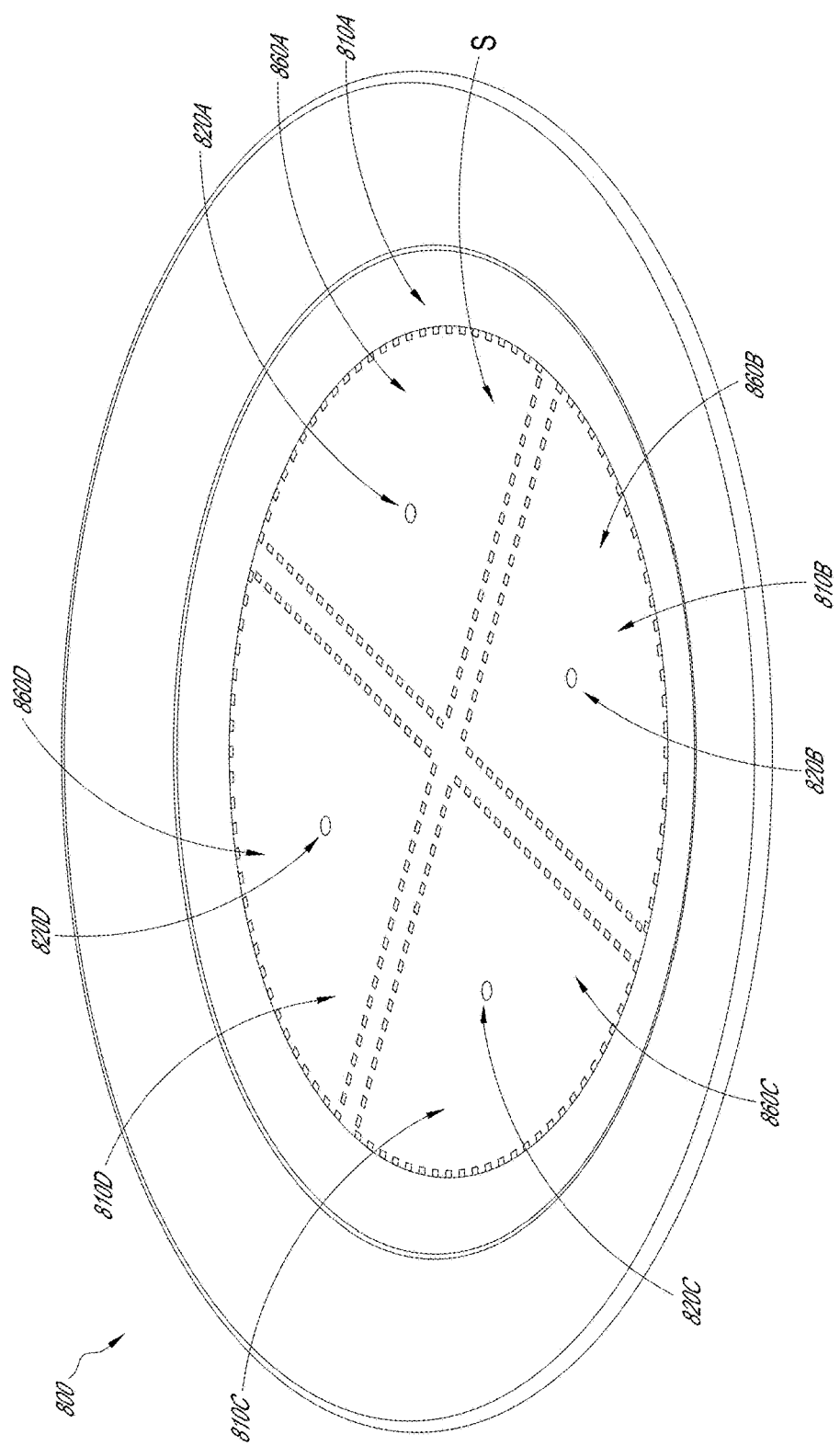
FIG. 16 is a schematic perspective view of another embodiment of a heated or cooled plate, bowl or serving dish.

FIG. 16 shows another embodiment of a plate 800, bowl or serving dish. The plate 800, bowl or serving dish is similar to the plate 100, 100' described above and includes the same components (with the same numerical identifiers) and features disclosed for the plate 100, 100', except as noted below.

Figure 17:
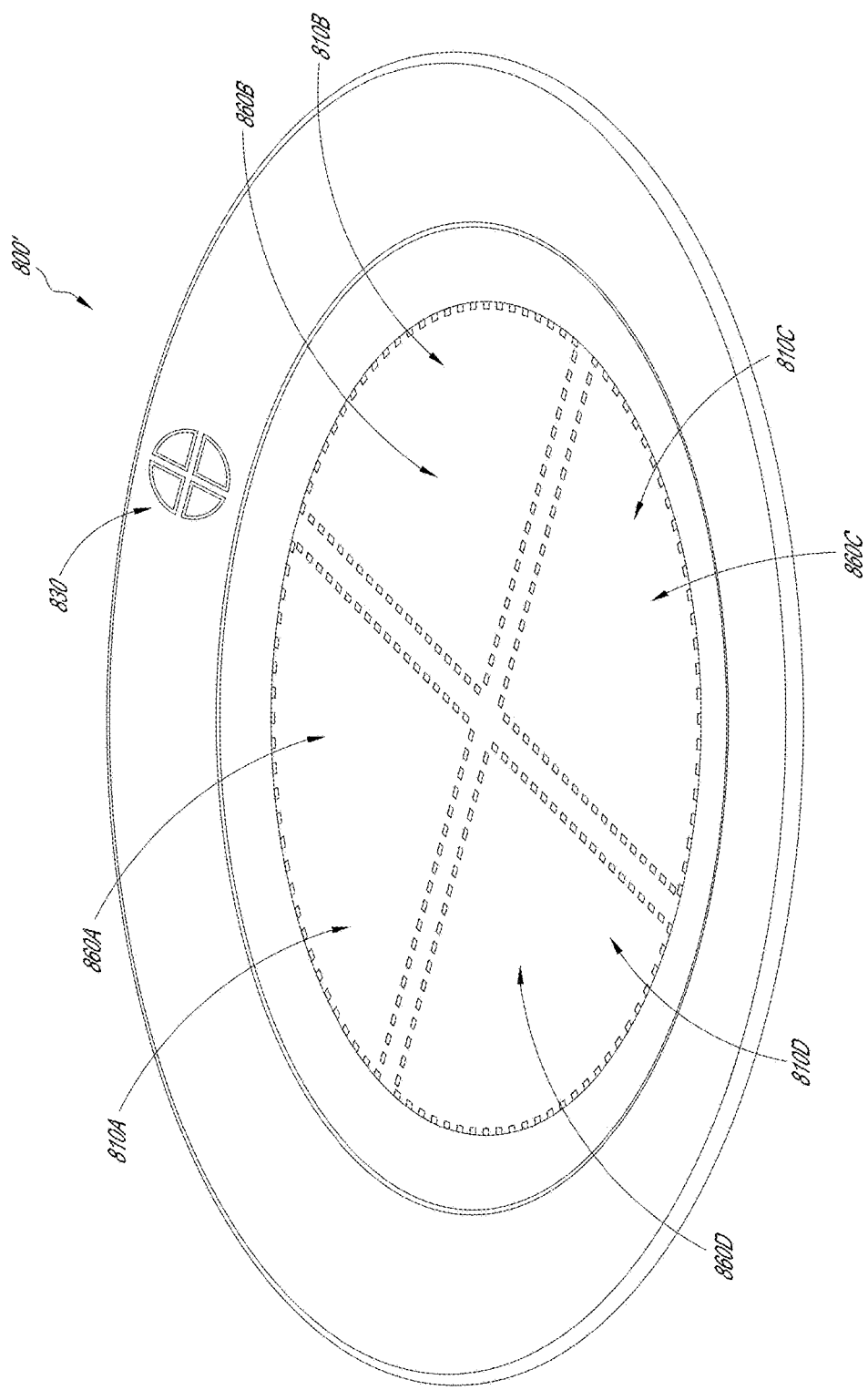
FIG. 17 is a schematic perspective view of another embodiment of a heated or cooled plate, bowl or serving dish.

In one embodiment, the plate 800, bowl or serving dish can have a plurality of heating or cooling elements 860A-860D, each of the heating or cooling elements 860A-860D associated with a particular section (e.g., quadrant, half, or other fraction) 810A-810D of the plate 800, bowl or serving dish (e.g., a section of a flat portion of the plate where food is placed), isolated from each other, and being operated by the electronic module 90 independently of the other heating or cooling elements 860A-860D based on input from the user (e.g., via a user interface on the plate 800, bowl or serving dish, discussed further below). For example, the plurality of heating or cooling elements 860A-860D could be arranged in a grid, where each of the heating or cooling elements 860A-860D can heat a section of the plate 800, bowl or serving dish associated with that portion of the grid. For example, the user could turn on and off the heating or cooling element 860A-860D in a particular area (e.g., quadrant) of the plate 800, bowl or serving dish via a user interface, such as the user interface 830 of plate 800' in FIG. 17. The plate 800' is similar to the plate 100, 100', 800 described above and includes the same components (with the same numerical identifiers) and features disclosed for the plate 100, 100', 800, except as noted below. In one embodiment, the plate 800, 800', bowl or serving dish could provide a visual indicator 830 of which sections (e.g., quadrants) of the plate 800, 800', bowl or serving dish have the heating or cooling element 860A-860D turned on or off (or in cooling mode versus heating mode), described further below. Said visual indication could be provided (e.g., on a rim or edge of the plate 800, 800', bowl or serving dish, as shown in FIG. 17) via one or more light sources or visual indicators (e.g., electroluminescence, OLEDs, or any other type of flat light emitter or slide light emitter, or edge lighting or a digital screen) in communication with the electronic module 90. In another embodiment, the sections of the plate 800, 800', bowl or serving dish that are being actively heated or cooled could be illuminated using one or more light sources, such as those described above.

In one embodiment, one section 810A-810D of the plate 800, 800', bowl or serving dish can have its associated heating or cooling element 860A-860D turned on to heat the section of the plate 800, 800', bowl or serving dish (e.g., where the section receives a hot food item, such as steak), and another section 810A-810D (e.g., quadrant, half) of the plate 800, 800', bowl or serving dish could have its associated heating or cooling element 860A-860D turned off where the section of the plate 800, 800', bowl or serving dish receives a cold food item, such as salad). As discussed above, the plate 800, 800', bowl or serving dish can have a plurality of temperature sensors 820A-820D for sensing a temperature of food placed on the plate 800, 800', bowl or serving dish, where each (or a plurality) of the temperature sensors 820A-820D is associated with one of said sections 810A-810D of the plate 800, 800', bowl or serving dish. The temperature sensor 820A-820D can communicate the sensed temperature to the electronic module 90 (e.g., to the control circuitry 94), and the electronic module 90 can determine whether a hot (e.g., steak) or cold (e.g., salad) food item is placed on the particular section of the plate 800, 800', bowl or serving dish based at least in part on the temperature sensed by the temperature sensor 820A-820D in that section 810A-810D. The electronic module 90 can turn on the heating element 860A-860D associated with that section 810A-810D if a hot food item has been placed thereon, or keep the heating element 860A-860D off if a cold food item has been placed thereon. In another embodiment, the electronic module 90 can control at least one operating parameter of the heating or cooling system 55 (e.g., of the one or more heating or cooling elements 860A-860D) of the one or more plates 800, 800', bowl or serving dishes based at least in part on an average of sensed temperature information from the plurality of temperature sensors 820A-820D. For example, the one or more temperature sensors 820A-820D associated with a particular section 810A-810D of the plate 800, 800', bowl or serving dish can communicate temperature information to the electronic module 90, the control circuitry 94 can average the sensed temperatures, and the electronic module can control operation of the heating or cooling element 860A-860D based at least in part on the average of the sensed temperatures (e.g., increase power to the heating or cooling element 860A-860D if the average temperature is below the user selected temperature set point or a range about said set point, maintain the same power to the heating or cooling element 860A-860D if the average temperature is within said range about the user selected temperature set point, or maintain power to the heating or cooling element 860A-860D off if the average temperature is above said range about the user selected temperature set point).

Figure 18:
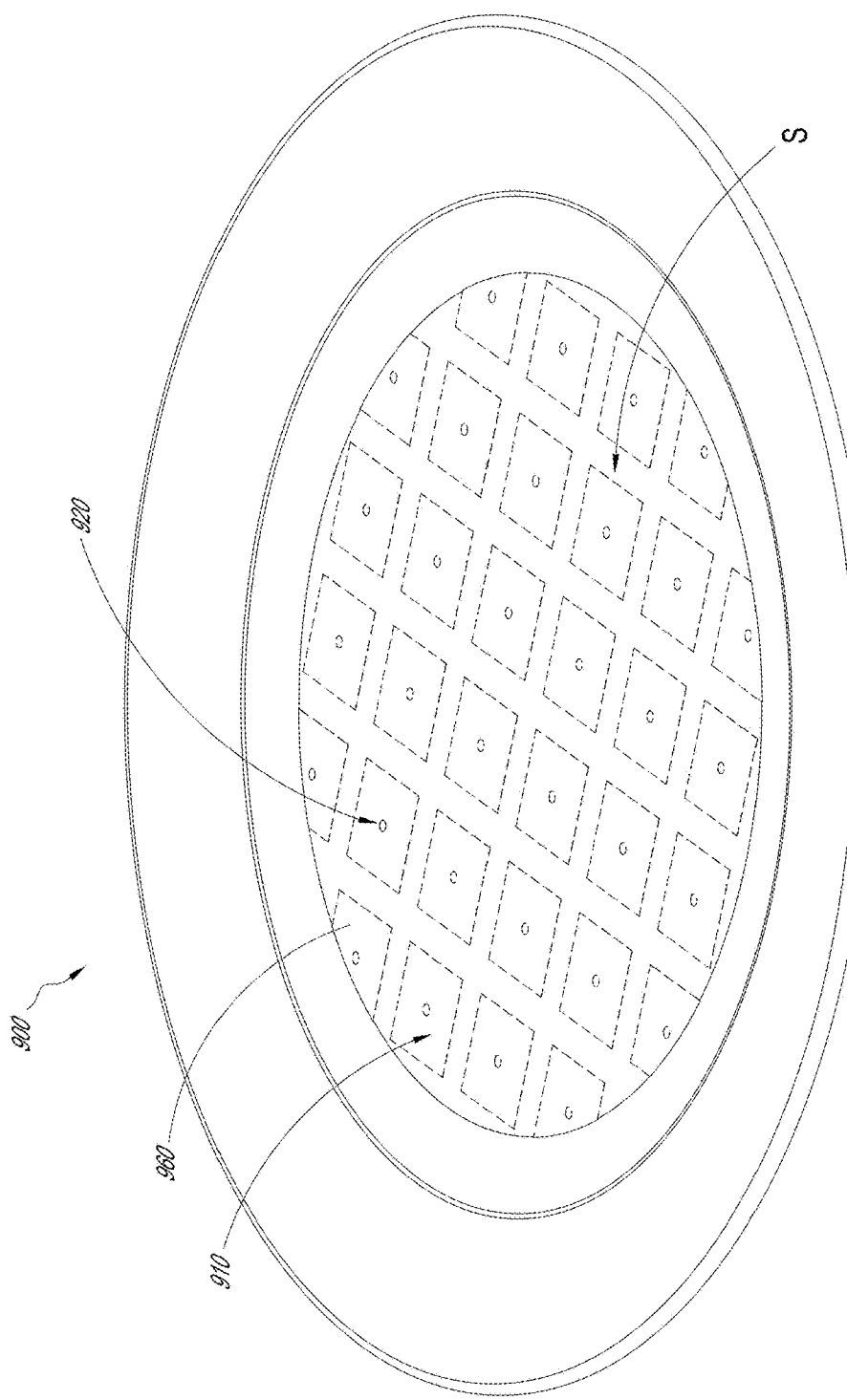
FIG. 18 is a schematic perspective view of another embodiment of a heated or cooled plate, bowl or serving dish.

FIG. 18 shows another embodiment of a plate 900, bowl or serving dish. The plate 900 is similar to the plate 100, 100', 800, 800' described above and includes the same components (with the same numerical identifiers) and features disclosed for the plate 100, 100', 800, 800', except as noted below.

In one embodiment, the plate 900, bowl or serving dish can have a plurality of heating or cooling elements 960 that can be a plurality of thermoelectric elements (e.g., Peltier elements), where each of the thermoelectric elements 960 is associated with a different section 910 (e.g., quadrant, half, other fraction) of the plate 900, bowl or serving dish. The electronic module 90 can control power delivery to each of the thermoelectric elements 960, and the polarity to the thermoelectric element to control whether the thermoelectric element 960 (e.g., Peltier element) operates as a heating device or as a cooling device to heat or cool the particular section 910 of the plate 900, bowl or serving dish associated with the thermoelectric element 960. As discussed above, each of the sections 910 of the plate 900, bowl or serving dish can have a separate temperature sensor 920 for sensing the temperature of the food placed on that section 910 of the plate 900, bowl or serving dish. The temperature information can be communicated to the electronic module 90, which can then operate the thermoelectric elements 960 to heat or cool the particular section 910 of the plate 900, bowl or serving dish based at least in part on the sensed temperature information. For example, if a hot food item (e.g., steak) is placed on one or more sections 910 of the plate 900, bowl or serving dish, the electronic module 90 can control the operation of the thermoelectric element 960 associated with the one or more sections 910 to operate as a heating element to heat the one or more sections 910 of the plate 900, bowl or serving dish to maintain the hot food item at a certain temperature (or within a range of a user selected temperature). Additionally, if a cold food item (e.g., salad) is placed on another section 910 of the plate 900, bowl or serving dish, the electronic module 90 can control the operation of the electronic element 960 associated with that section 910 to operate as a cooling element to cool the section 910 of the plate 900, bowl or serving dish to maintain the cold food item at a certain temperature (e.g., the initial sensed temperature of the cold food item). In another embodiment, a Peltier type cooling system can be used in combination with a heating system (e.g. one or more heating elements) so that all or a portion of the plate can be either heated or cooled. In another embodiment, the plurality of heating or cooling elements can be heating elements.

Though the isolated heating areas disclosed above may be described in connection with a plate 800, 800', 900, one of skill in the art will recognize that it can also apply to any liquid container, drinkware, dishware or serverware (e.g., bowl, serving dish, hot plate, cup, mug 400, travel mug 600 and/or liquid container), including the plate 100', 800, 800', 900, 1100, 1300, 1400, baby bottle 1500, beer mug 1600, travel mug 1700A, 2000, 2100, 2400, bread basket 2200, tortilla warmer 2300, and the scope of disclosure and the invention is understood to cover such liquid containers, drinkware, dishware and serverware.

In one embodiment, the cup, mug 400, travel mug 600, 1700A, 2000, 2100, 2400, baby bottle 1500, beer mug 1600, and/or liquid container can have one or more heating or cooling elements (e.g., Peltier elements, heater wire, etc.) HC, as discussed above, such as a plurality of heating or cooling elements HC. The one or more heating or cooling elements HC (e.g., multiple heating or cooling elements HC) can be arranged along or around a side wall SW (e.g., incorporated into the side wall) of the cup, mug 400, travel mug 600, 1700A, 2000, 2100, 2400, baby bottle 1500, beer mug 1600, and/or liquid container, as shown in FIGS. 34A-34C. In one embodiment, the one or more heating or cooling elements HC can be arranged along or around a sidewall at two or more locations (e.g., have multiple heating or cooling elements on two opposite sides, or wrapping around the circumference) of the cup, mug 400, travel mug 600, 1700A, 2000, 2100, 2400, baby bottle 1500, beer mug 1600, water bottle or liquid container.

In one embodiment, as discussed above, the one or more heating or cooling elements HC (e.g., a plurality of heating or cooling elements HC) can be operated independently of each other (e.g., each of the heating or cooling elements, such as Peltier elements, can be operated to heat or cool depending on the selected mode of operation).

Figure 34A:
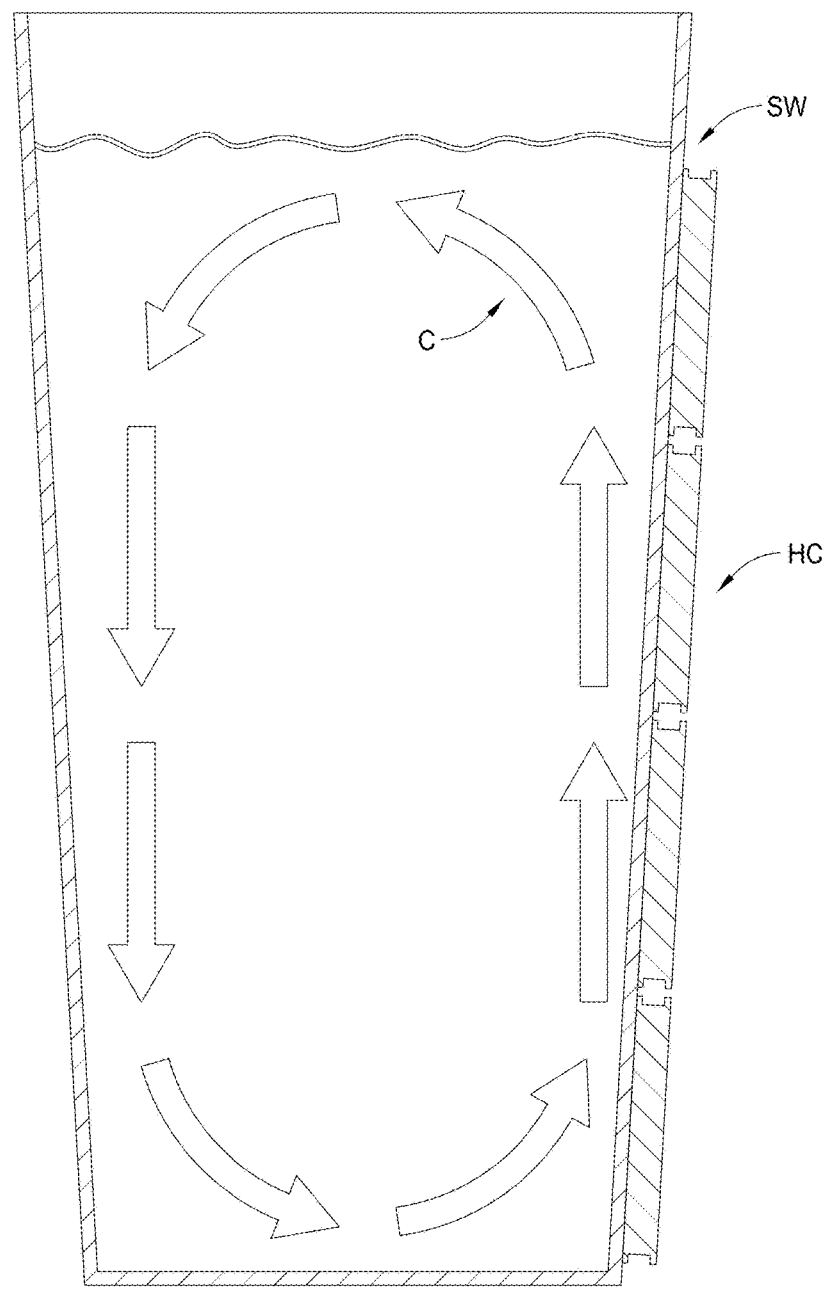
FIG. 34A is a schematic diagram showing counterclockwise circulation of liquid flow induced by a heating or cooling system in a cup, mug, travel mug, water bottle or liquid container.
Figure 34B:
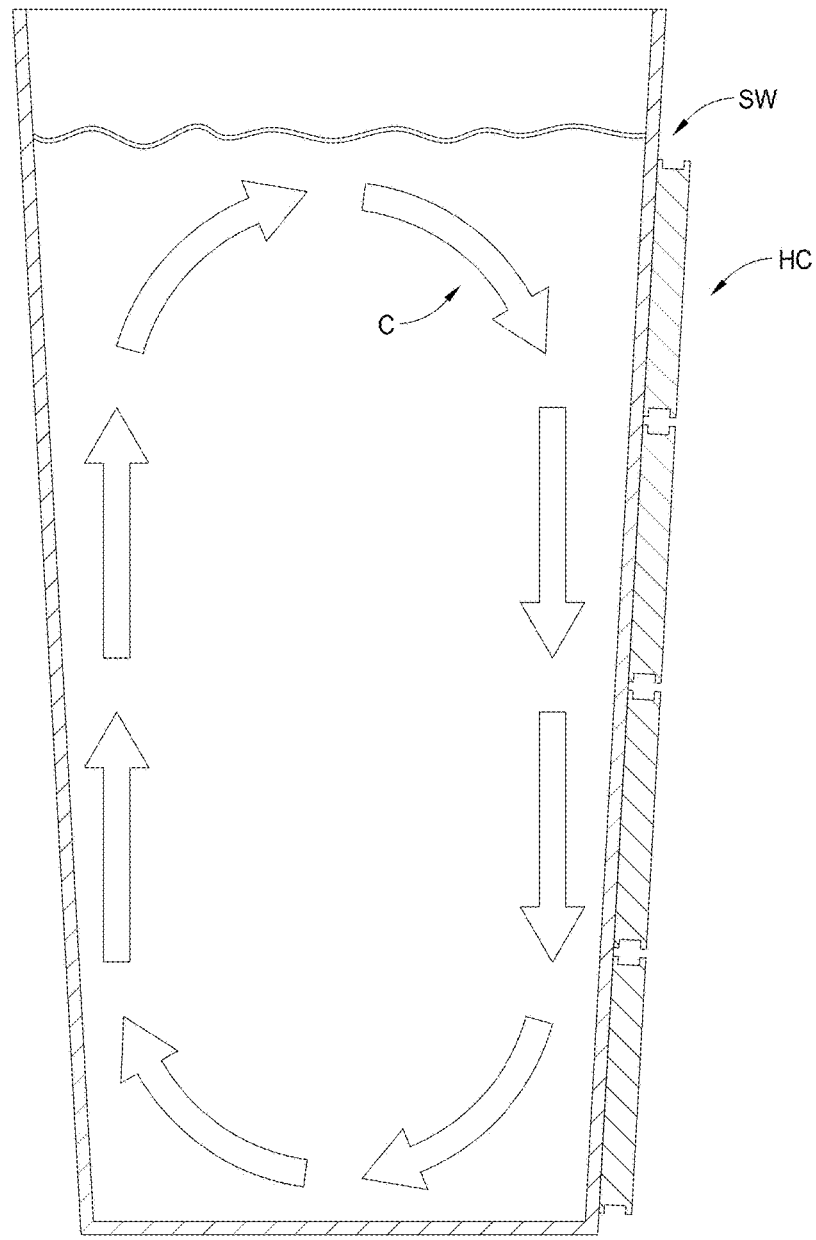
FIG. 34B is a schematic diagram showing clockwise circulation of liquid flow induced by a heating or cooling system in a cup, mug, travel mug, water bottle or liquid container.
Figure 34C:
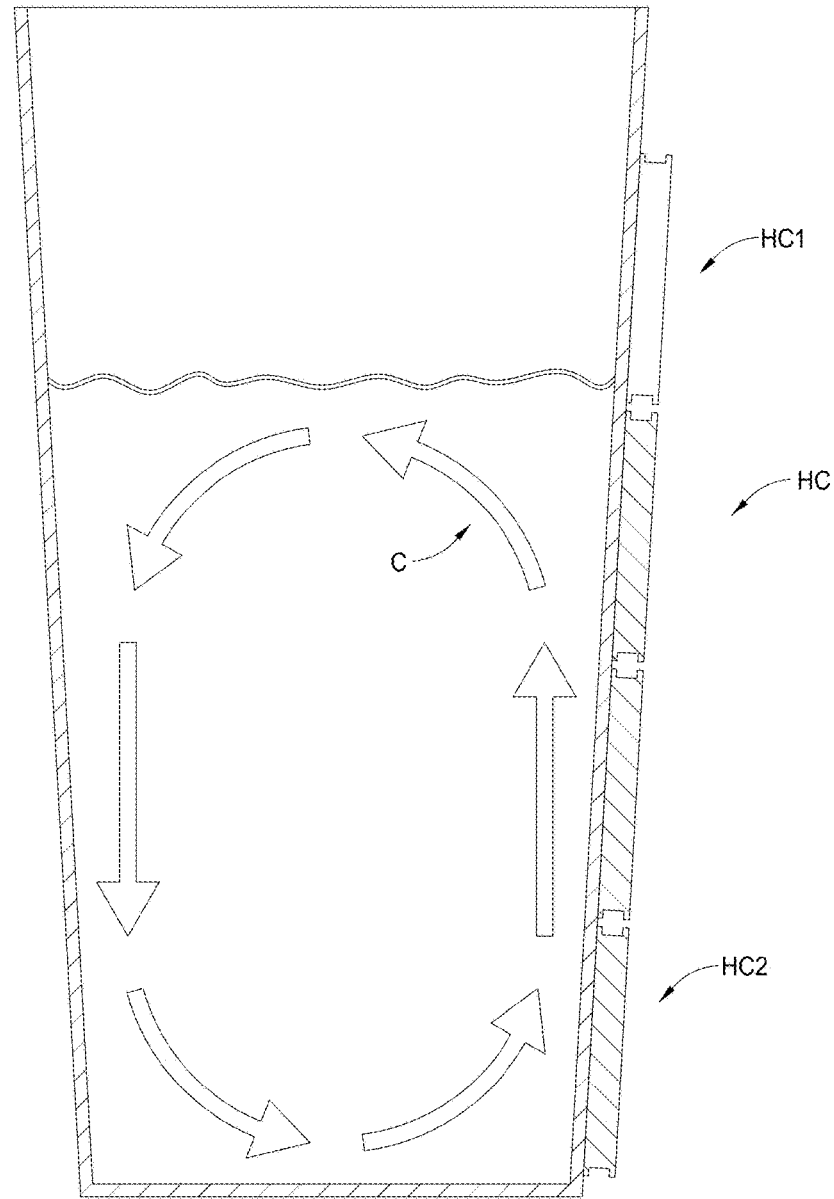
FIG. 34C is a schematic diagram showing counterclockwise circulation of liquid flow induced by a heating or cooling system in a cup, mug, travel mug or liquid container, where operation (e.g., turning off, on) of one or more heating and cooling elements depends at least in part on sensed liquid level.

In one embodiment, the cup, mug 400, travel mug 600, 1700A, 2000, 2100, 2400, baby bottle 1500, beer mug 1600, water bottle or liquid container can have a plurality of thermoelectric elements along a side wall SW (such as shown in FIGS. 34A-34C). Control circuitry can be used to turn on or off the plurality of thermoelectric elements all together or independently. The control circuitry can also reverse the polarity to the thermoelectric elements all together or independently, so that the thermoelectric elements can be used to actively heat or actively cool the liquid within the cup, mug 400, travel mug 600, 1700A, 2000, 2100, 2400, baby bottle 1500, beer mug 1600, water bottle or liquid container depending on the polarity of the power that is delivered to said thermoelectric elements.

In one embodiment, the cup, mug 400, travel mug 600, 1700A, 2000, 2100, 2400, baby bottle 1500, beer mug 1600, water bottle or liquid container can have one thermoelectric element along a side wall SW. Control circuitry can be used to turn on or off the thermoelectric element. The control circuitry can also reverse the polarity to the thermoelectric element, so that the thermoelectric element can be used to actively heat or actively cool the liquid within the cup, mug 400, travel mug 600, 1700A, 2000, 2100, 2400, baby bottle 1500, beer mug 1600, water bottle or liquid container depending on the polarity of the power that is delivered to the said thermoelectric element.

In another embodiment, the cup, mug 400, travel mug 600, 1700A, 2000, 2100, 2400, baby bottle 1500, beer mug 1600, water bottle or liquid container can have one or more thermoelectric elements which can be used to actively cool the liquid within the cup, mug 400, travel mug 600, 1700A, 2000, 2100, 2400, baby bottle 1500, beer mug 1600, water bottle or liquid container, and one or more heating elements (e.g. heater wire) which can be used to actively heat the liquid within the cup, mug 400, travel mug 600, 1700A, 2000, 2100, 2400, baby bottle 1500, beer mug 1600, water bottle or liquid container.

In one embodiment, the heating or cooling elements HC can be operated (e.g., by the electronic module, such as the electronic module 690, 2090, 2190 disclosed herein) to induce, promote, facilitate or generate a circulation of liquid flow C (i.e. convection currents) within the cup, mug 400, travel mug 600, 1700A, 2000, 2100, 2400, baby bottle 1500, beer mug 1600, water bottle or liquid container, so as to facilitate a more uniform (e.g., even, constant) temperature across the volume of liquid. For example, the heating or cooling elements HC can be selectively operated to induce a counterclockwise flow C (i.e. convection current), as shown in FIG. 34A. In another embodiment, the heating or cooling elements HC can be selectively operated to induce a clockwise flow C (i.e. convection current), as shown in FIG. 34B. Advantageously, the circulation of liquid flow C or "waterfall effect", where liquid circulates between the upper portion and the lower portion of the cup, mug 400, travel mug 600, 1700A, 2000, 2100, 2400, water bottle or liquid container (e.g., beer mug 1600, baby bottle 1500) can cause natural convection heat transfer within the cup, mug 400, travel mug 600, 1700A, 2000, 2100, 2400, water bottle or liquid container to thereby allow for more uniform heating or cooling of the liquid in the cup, mug 400, travel mug 600, 1700A, 2000, 2100, 2400, water bottle or liquid container. In one embodiment, said circulation of the liquid advantageously results in the liquid in the bottom portion and the liquid in the top portion of the cup, mug 400, travel mug 600, 1700A, 2000, 2100, 2400, water bottle or liquid container having substantially the same temperature (e.g., differ in temperature by less than 15 degrees F., differ in temperature by less than 10 degrees F., differ in temperature by less than 5 degrees F., differ in temperature by less than 3 degrees F., differ in temperature by less than 1 deg. F.) such that the liquid in the cup, mug 400, travel mug 600, 1700A, 2000, 2100, 2400, water bottle or liquid container has a substantially uniform temperature.

In one embodiment, the circulation effect can be induced, promoted, facilitated or generated simply by the strategic location of the heating or cooling element HC, or a plurality of heating or cooling elements HC. For example, in one embodiment, to actively cool the liquid within the cup, mug 400, travel mug 600, 1700A, 2000, 2100, 2400, baby bottle 1500, beer mug 1600, water bottle or liquid container, one or more cooling elements can be used (e.g. thermoelectric element), and can be located near a top level of the container, so that the liquid that is cooled by the one or more cooling elements HC begins to drop which displaces the warmer liquid that was at the bottom, which causes that warmer liquid to then rise, and the cycle repeats, which advantageously establishes a uniform liquid temperature within the cup, mug 400, travel mug 600, 1700A, 2000, 2100, 2400, baby bottle 1500, beer mug 1600, water bottle or liquid container. In another example, in yet another embodiment, to actively cool the liquid within the cup, mug 400, travel mug 600, 1700A, 2000, 2100, 2400, baby bottle 1500, beer mug 1600, water bottle or liquid container, one or more cooling elements HC can be used (e.g. thermoelectric element), and can be located along a side wall of the cup, mug 400, travel mug 600, 1700A, 2000, 2100, 2400, baby bottle 1500, beer mug 1600, water bottle or liquid container, so that the liquid that is cooled by the one or more cooling elements HC begins to drop along the side wall which displaces the warmer liquid that was at the bottom, which causes that warmer liquid to then rise, and the cycle repeats, which advantageously establishes a uniform liquid temperature within the cup, mug 400, travel mug 600, 1700A, 2000, 2100, 2400, baby bottle 1500, beer mug 1600, water bottle or liquid container. In yet another example, to actively heat the liquid within the cup, mug 400, travel mug 600, 1700A, 2000, 2100, 2400, baby bottle 1500, beer mug 1600, water bottle or liquid container, one or more heating elements HC can be used (e.g. thermoelectric element, heater wire, etc.), and can be located near a base of the cup, mug 400, travel mug 600, 1700A, 2000, 2100, 2400, baby bottle 1500, beer mug 1600, water bottle or liquid container, so that the liquid that is heated by the one or more heating elements HC begins to rise to the top which displaces the cooler liquid that was at the top, which causes that cooler liquid to then fall, and the cycle repeats, which advantageously establishes a uniform liquid temperature within the cup, mug 400, travel mug 600, 1700A, 2000, 2100, 2400, baby bottle 1500, beer mug 1600, water bottle or liquid container. In yet another example, to actively heat the liquid within the cup, mug 400, travel mug 600, 1700A, 2000, 2100, 2400, baby bottle 1500, beer mug 1600, water bottle or liquid container, one or more heating elements HC can be used (e.g. thermoelectric element, heater wire, etc.), and can be located along a side wall or around a side wall, near the bottom portion of the cup, mug 400, travel mug 600, 1700A, 2000, 2100, 2400, baby bottle 1500, beer mug 1600, water bottle or liquid container, so that the liquid that is heated by the one or more heating elements begins to rise to the top which displaces the cooler liquid that was at the top, which causes that cooler liquid to then fall, and the cycle repeats, which advantageously establishes a uniform liquid temperature within the cup, mug 400, travel mug 600, 1700A, 2000, 2100, 2400, baby bottle 1500, beer mug 1600, water bottle or liquid container.

In one embodiment, the circulation effect can be induced, promoted, facilitated or generated by operating one or more of a plurality of heating or cooling elements HC. For example, in one embodiment, the circulation C can be induced, promoted, facilitated or generated by operating one of the plurality of heating or cooling elements HC (e.g., located in the top portion of the cup, mug, travel mug, baby bottle, beer mug, water bottle or liquid container). In another embodiment, the circulation can be induced, promoted, facilitated or generated by operating two of the plurality of heating or cooling elements HC (e.g., located in the top portion of the cup, mug, travel mug, baby bottle, beer mug, water bottle or liquid container). In still another embodiment, the circulation can be induced, promoted, facilitated or generated by operating more than two of the plurality of heating or cooling elements HC (e.g., located in the top portion of the cup, mug 400, travel mug 600, 1700A, 2000, 2100, 2400, baby bottle 1500, beer mug 1600, water bottle or liquid container. In one embodiment, the cup, mug 400, travel mug 600, 1700A, 2000, 2100, 2400, baby bottle 1500, beer mug 1600, water bottle or liquid container can have four heating and cooling elements HC (e.g., in a panel disposed on or incorporated in a side wall of the cup, mug, travel mug, water bottle or liquid container), such as shown in FIGS. 34A-34C. However, in other embodiments, the cup, mug, travel mug, water bottle or liquid container can have fewer than four or more than four heating or cooling elements HC. In one embodiment, the one or more heating or cooling elements HC are preferably arranged on the cup, mug 400, travel mug 600, 1700A, 2000, 2100, 2400, baby bottle 1500, beer mug 1600, water bottle or liquid container and/or operated in a manner that such circulation of fluid is induced, promoted facilitated or generated.

In one embodiment, the heating or cooling elements HC can be spaced from each other (e.g., vertically spaced) along the sidewall of the cup, mug 400, travel mug 600, 1700A, 2000, 2100, 2400 baby bottle 1500, beer mug 1600, water bottle or liquid container. In another embodiment, the heating or cooling elements HC can be adjacent each other. In still another embodiment, each of the heating or cooling elements HC can be in contact with at least one adjacent heating and cooling element. In one embodiment, the heating or cooling elements HC can be arranged in a panel (e.g., a panel of Peltier elements) or a cluster (e.g. a cluster of Peltier elements).

Figure 44:
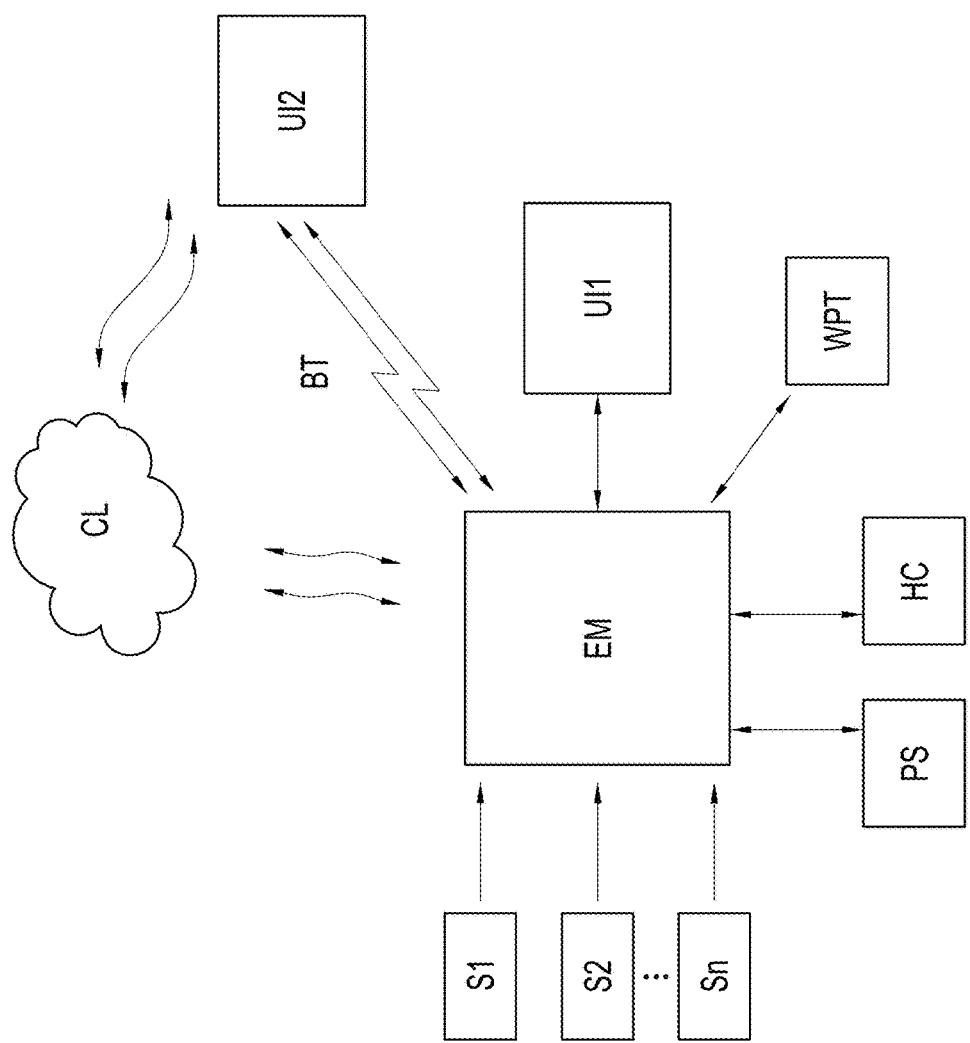
FIG. 44 is a schematic block diagram showing communication between an electronic module in actively heated/cooled drinkware, dishware, or serverware and a user interface thereon and/or on a remote electronic device.

In one embodiment, the electronic module of the cup, mug 400, travel mug 600, 1700A, 2000, 2100, 2400, baby bottle 1500, beer mug 1600, water bottle or liquid container can operate the one or more heating and cooling elements HC (e.g., Peltier elements, resistive coil heaters) to induce, promote, facilitate or generate said circulation flow C based at least in part on the sensed liquid level information sensed by the one or more liquid level sensors (e.g., ultrasound sensors) as discussed above (and as discussed further with respect to FIG. 44 herein). For example, where the electronic module (such as the electronic module 490, 690, 2090, 2190, EM) operates two or more heating or cooling elements HC in an upper portion of the cup, mug 400, travel mug 600, 1700A, 2000, 2100, 2400, water bottle or liquid container (e.g., beer mug 1600, baby bottle 1500) to generate said circulation of flow C (e.g., even if there are more than two heating or cooling elements HC in the sidewall SW of the cup, mug 400, travel mug 600, 1700A, 2000, 2100, 2400, water bottle or liquid container), as the liquid level drops below the first HC1 of the two or more heating and cooling elements HC, the electronic module can turn said first heating and cooling element HC1 off. Optionally, the electronic module can also turn on, activate, or power on another heating or cooling element HC2 below the second of the two heating and cooling elements HC so that there remain two or more heating and cooling elements HC in operation to effect said circulation flow.

Figure 34D:
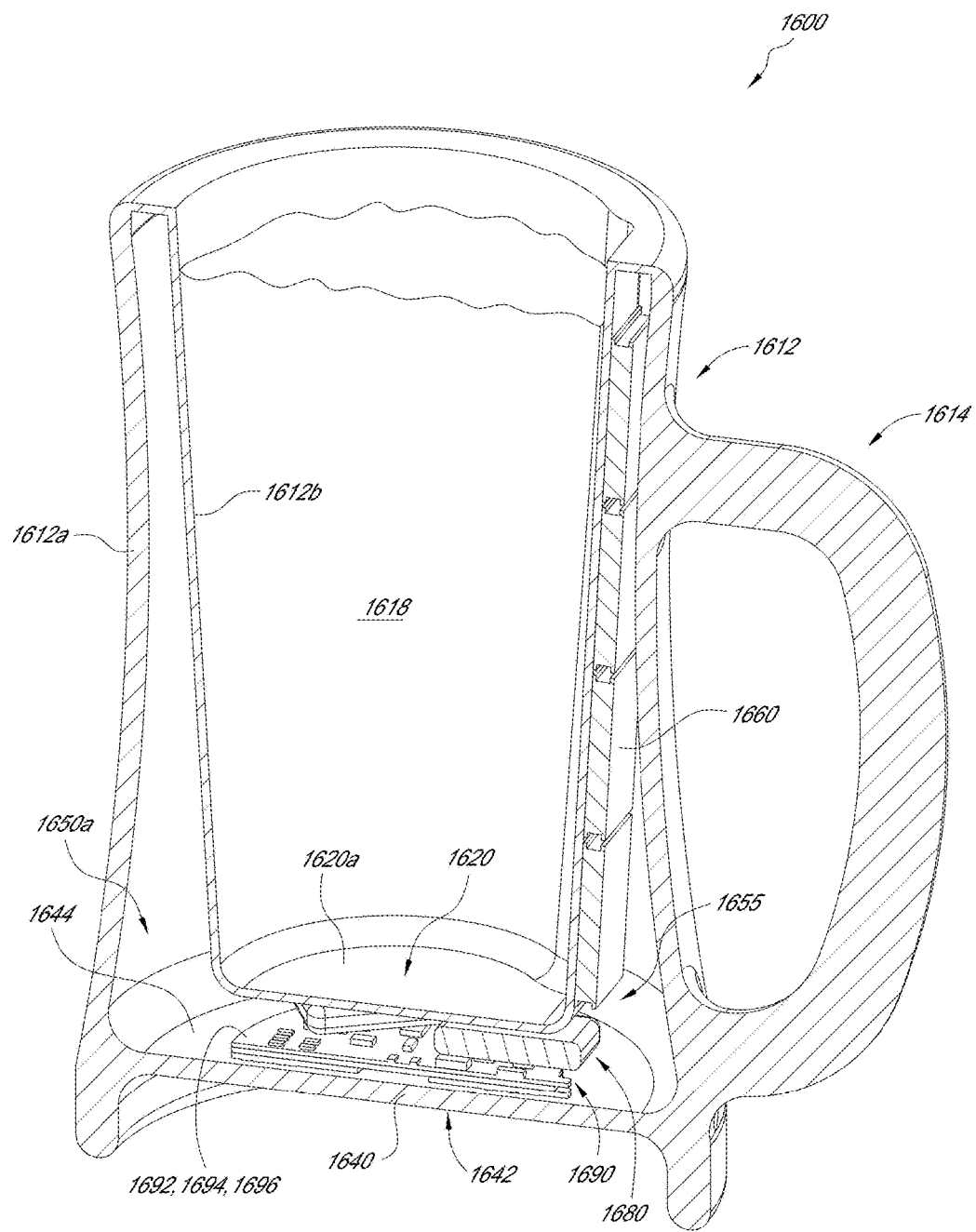
FIG. 34D is a schematic cross-sectional view of one embodiment of a chilled drinkware unit, such as a beer mug.
Figure 34E:
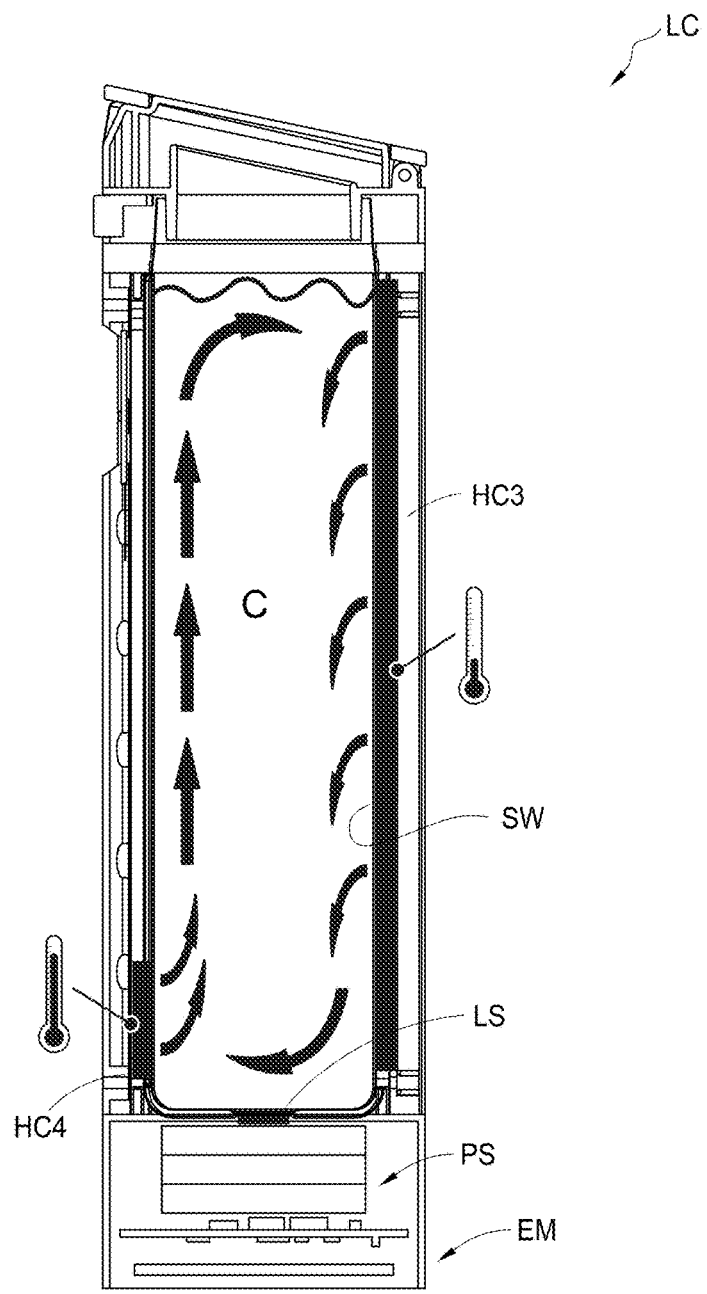
FIG. 34E shows a schematic cross-sectional view of one embodiment of a liquid container with one or more heating or cooling elements.

FIG. 34E shows one embodiment of a liquid container LC (e.g., a cup, mug 400, travel mug 600, 1700A, 2000, 2100, 2400, baby bottle 1500, beer mug 1600, water bottle). The liquid container can have one or more power storage elements PS (e.g., batteries), an electronic module EM and one or more heating or cooling elements HC, as described in embodiments herein. In the illustrated embodiment, the liquid container LC can have a cooling element HC3 that can be in thermal communication with at least a portion (e.g., one side) of a circumferential side wall SW that defines the liquid holding chamber (e.g., along at least a portion of the height of the holding chamber) and can have a heating element HC4 in thermal communication with at least another portion (e.g., an opposite side) of the circumferential wall SW. In the illustrated embodiment, the cooling element HC3 can have a greater height than the heating element HC4. In another embodiment, the height of the heating element and cooling element can be the same. In another embodiment the heating element can have a greater height than the cooling element. The liquid container LC can have a sensor LS disposed at the bottom of the liquid holding chamber. In one embodiment, the sensor LS can be a liquid level sensor, such as an ultrasound sensor. In other embodiments, the liquid level sensor can be other types of sensors discloses herein. In still other embodiments, the sensor LS can be a liquid quality sensor (e.g., pH sensor), a temperature sensor, a tilt sensor, etc., as described herein.

In the illustrated embodiment, the cooling element HC3 is operated (e.g., by the electronic module EM) to cool at least a portion of the wall SW it is in thermal communication with, while the heating element HC4 is operated to heat at least a portion of the wall SW it is in thermal communication with. In one embodiment, the cooling element HC3 is optionally operated at a higher power level than the heating element HC4. Advantageously, operation of the heating and cooling elements HC3, HC4 induces, promotes, facilitates or generates the circulation C of the liquid within the chamber. In one embodiment, the one or more cooling elements on one side of the liquid container can induce a liquid falling effect (the coldest liquid within a body of liquid will sink) along that side SW of the liquid container. On the opposite side wall, one or more heating elements can induce a liquid rising effect (the hottest liquid within a body of liquid will rise). The falling of liquid down one side of the liquid container and the rising of the liquid along the opposite side of the liquid container can induce a circulation effect, advantageously circulating the liquid within the liquid container. This circulation effect can be used to stir or mix the liquid within the liquid container for the sake of discouraging more buoyant particles from separating from less buoyant particles, or the circulation effect can be used to keep the temperature of the liquid within the liquid container substantially uniform.

Figure 34F:
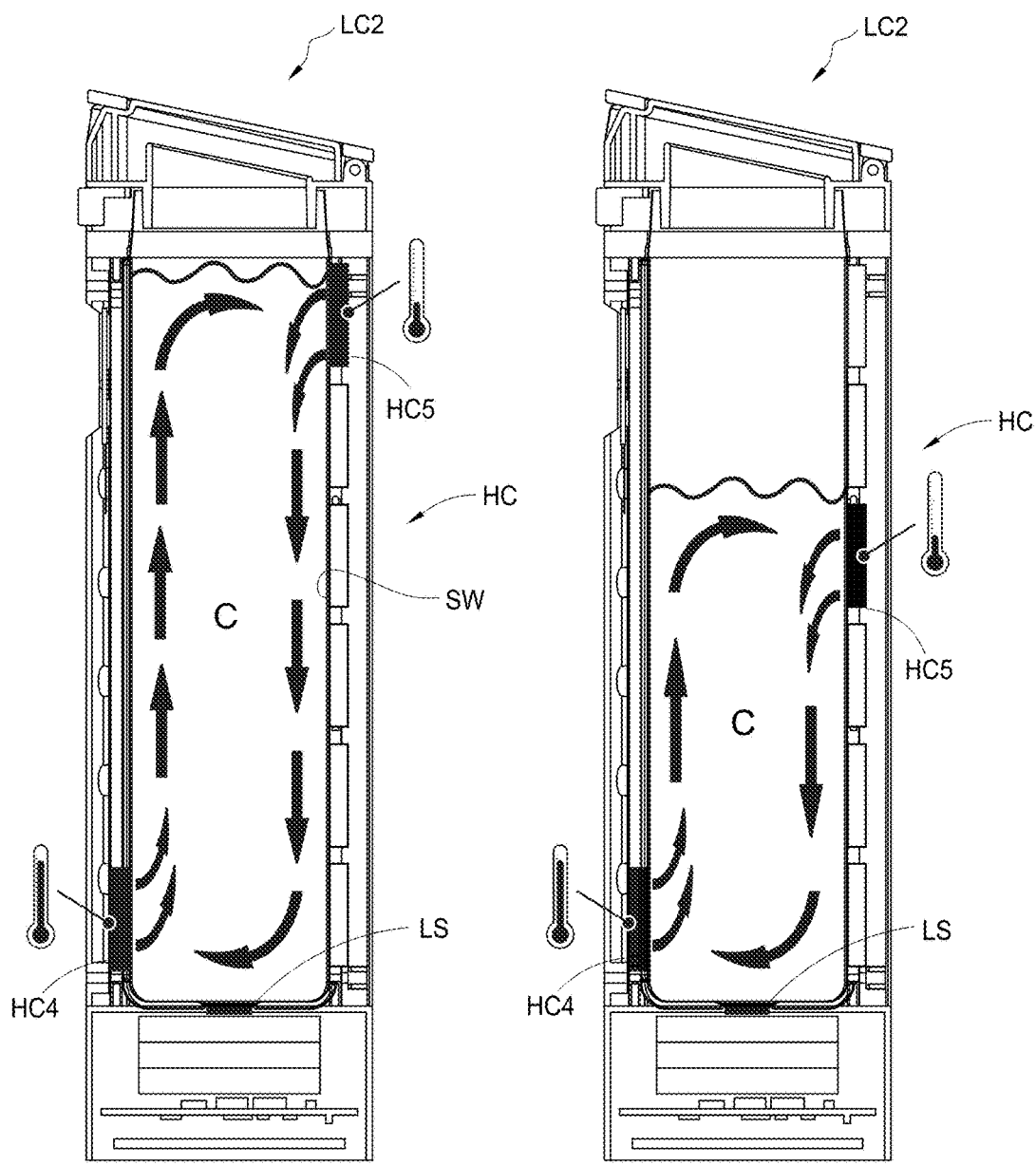
FIG. 34F shows a schematic cross-sectional view of another embodiment of a liquid container with one or more heating or cooling elements.

FIG. 34F shows another embodiment of a liquid container LC2 (e.g., a cup, mug 400, travel mug 600, 1700A, 2000, 2100, 2400, baby bottle 1500, beer mug 1600, water bottle) that is similar to the liquid container LC except as described below. The liquid container LC2 has one or more (e.g., multiple) heating or cooling elements HC in thermal communication with at least a portion of the circumferential side wall SW of the liquid holding chamber, and a heating or cooling element HC4 in thermal communication with another portion (e.g., an opposite side) of the side wall SW.

In the illustrated embodiment, a cooling element HC5 of the one or more heating or cooling elements HC is operated (e.g., by the electronic module EM) to cool the portion of the side wall SW it is in thermal communication with, while the heating element HC4 is operated to heat the portion of the wall SW it is in thermal communication with. At least a portion of the cooling element HC5 is disposed below liquid level. As the liquid level drops (e.g., due to consumption of the liquid by the user), the heating and cooling elements HC are operated (e.g., by the electronic module EM based at least in part on the sensed liquid level sensed by the liquid level sensor LS) so that only one or more cooling elements HC5 at least partially below the liquid level or in thermal communication with the liquid, are operated. Advantageously, operation of the heating and cooling elements HC5, HC4 induces, promotes, facilitates or generates the circulation C of the liquid within the chamber.

Figure 34G:
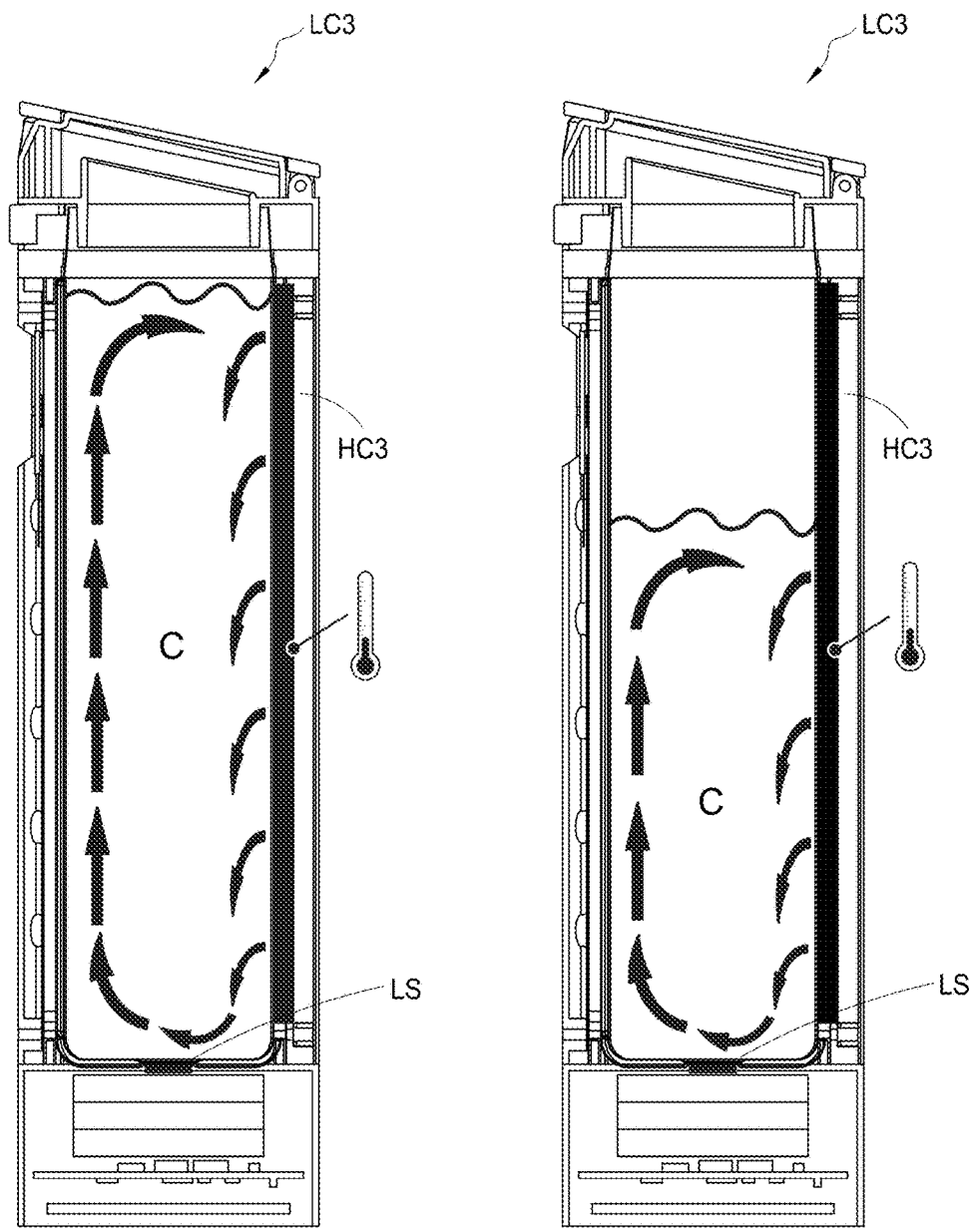
FIG. 34G shows a schematic cross-sectional view of another embodiment of a liquid container with one or more heating or cooling elements.

FIG. 34G shows another embodiment of a liquid container LC3 (e.g., a cup, mug 400, travel mug 600, 1700A, 2000, 2100, 2400, baby bottle 1500, beer mug 1600, water bottle) that is similar to the liquid container LC except as described below. The liquid container LC3 can have a cooling element HC3 that can be in thermal communication with at least a portion (e.g., one side) of a circumferential side wall SW that defines the liquid holding chamber (e.g., along at least portion of the height of the holding chamber). Unlike the liquid container LC, the liquid container LC3 does not have another heating or cooling element on another portion (e.g., on an opposite side) of the holding chamber.

In the illustrated embodiment, the cooling element HC3 is operated (e.g., by the electronic module EM) to cool the portion of the wall SW it is in thermal communication with. As shown in FIG. 34G, the cooling element HC3 can remain in operation regardless of the change in liquid level, so that operation of the cooling element HC3 in this embodiment does not depend on the sensed liquid level. The orientation and placement of the cooling element HC3 along a sidewall of the liquid container can induce a liquid falling effect down that side of the liquid container and can induce, promote, facilitate or generate the circulation C of the liquid within the chamber.

Figure 34H:
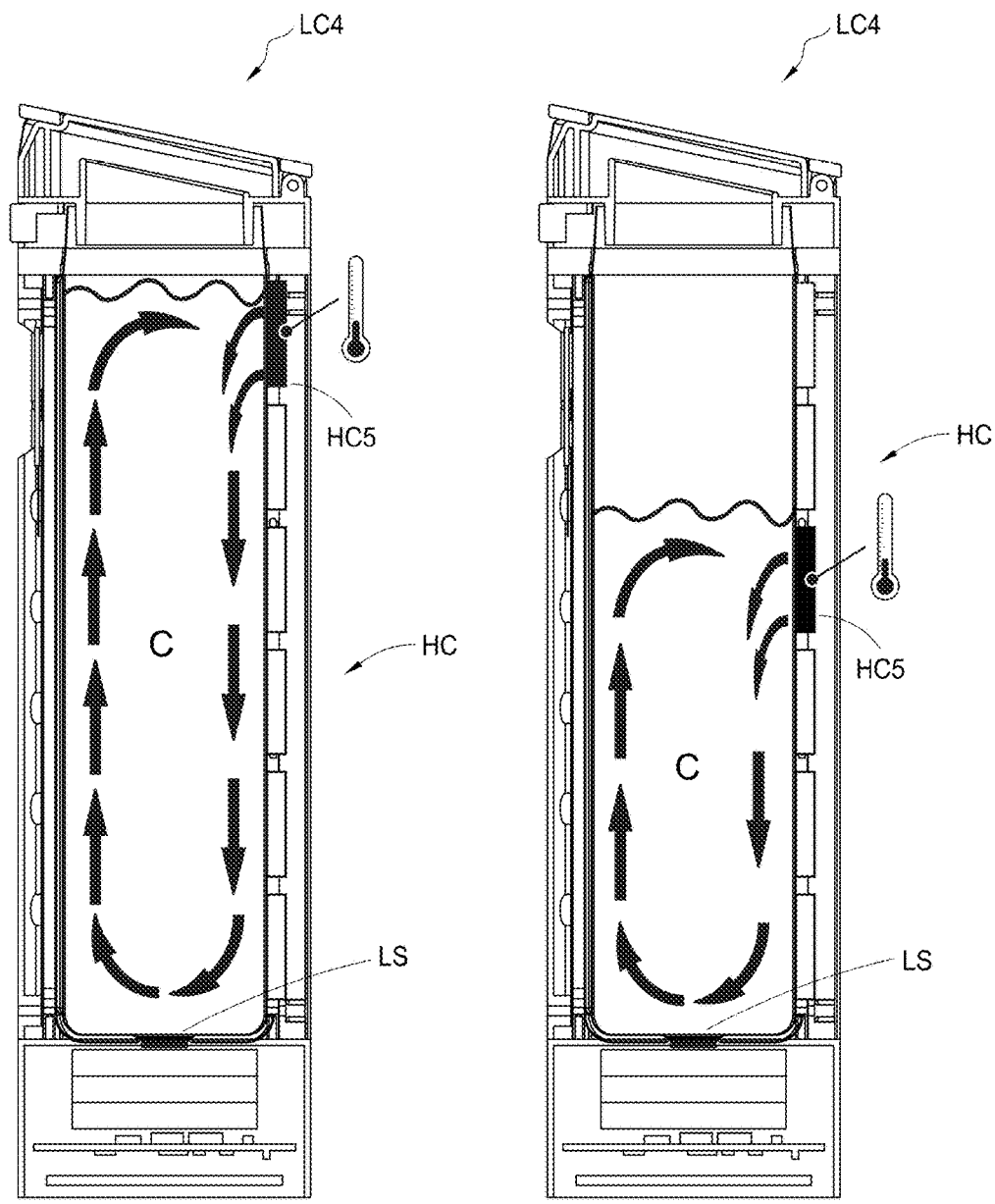
FIG. 34H shows a schematic cross-sectional view of another embodiment of a liquid container with one or more heating or cooling elements.

FIG. 34H shows another embodiment of a liquid container LC4 (e.g., a cup, mug 400, travel mug 600, 1700A, 2000, 2100, 2400, baby bottle 1500, beer mug 1600, water bottle) that is similar to the liquid container LC2 except as described below. The liquid container LC4 has one or more (e.g., multiple) cooling elements HC in thermal communication with at least a portion of the circumferential side wall SW of the liquid holding chamber. Unlike the liquid container LC2, the liquid container LC4 does not have a heating element on another portion (e.g., on an opposite side) of the holding chamber.

In the illustrated embodiment, a cooling element HC5 of the one or more cooling elements HC is operated (e.g., by the electronic module EM) to cool the portion of the side wall SW it is in thermal communication with. At least a portion of the cooling element HC5 is disposed below liquid level. As the liquid level drops (e.g., due to consumption of the liquid by the user), the cooling elements HC are operated (e.g., by the electronic module EM based at least in part on the sensed liquid level sensed by the liquid level sensor LS) so that only one or more cooling elements HC5 at least partially below the liquid level or in thermal communication with the liquid, are operated. Advantageously, operation of the cooling element HC5 induces, promotes, facilitates or generates the circulation C of the liquid within the chamber.

Figure 34I:
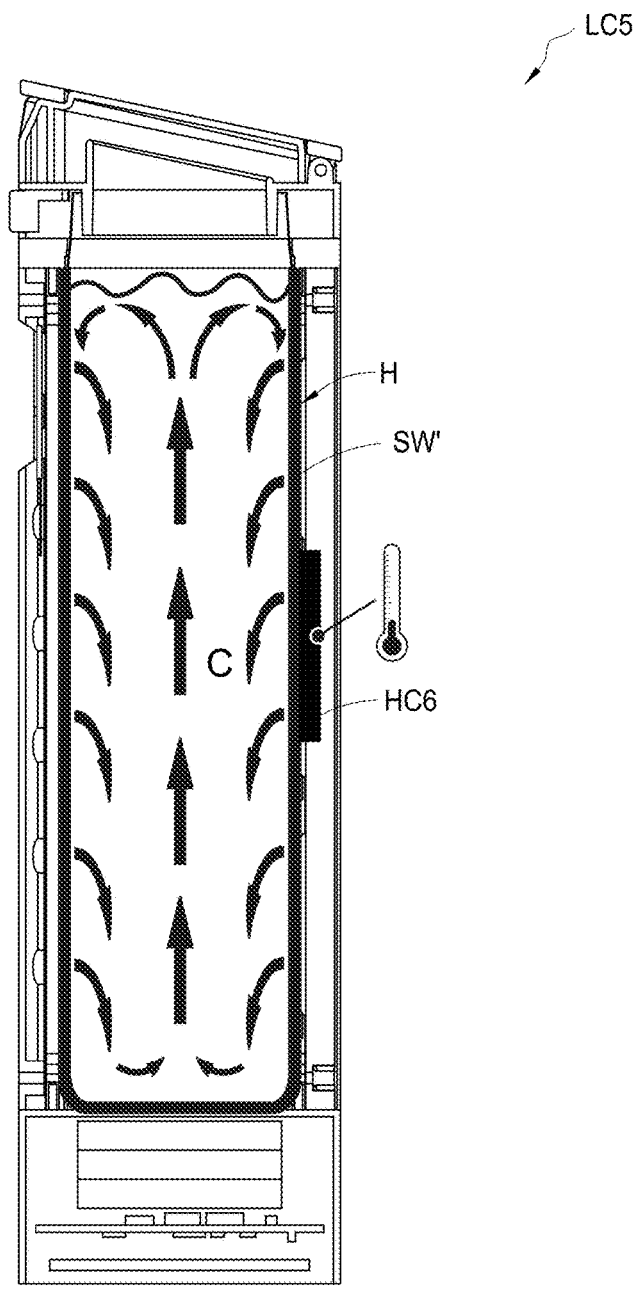
FIG. 34I shows a schematic cross-sectional view of another embodiment of a liquid container with one or more heating or cooling elements.

FIG. 34I shows another embodiment of a liquid container LC5 (e.g., a cup, mug 400, travel mug 600, 1700A, 2000, 2100, 2400, baby bottle 1500, beer mug 1600, water bottle). The liquid container LC5 can include a liquid holding chamber H with thermally conductive walls SW'. The liquid container LC5 can also have a heating or cooling element HC6 in thermal communication with at least a portion of the liquid holding chamber H.

In the illustrated embodiment, the heating and cooling element HC6 is operated (e.g., by the electronic module EM) to cool the liquid holding chamber H about the periphery of the liquid holding chamber H, which advantageously induces, promotes, facilitates or generates the circulation C of the liquid within the chamber as shown. In the illustrated embodiment, the liquid level sensor can optionally be excluded, and the heating and cooling element HC can be operated independent of the liquid level in the chamber. In another embodiment, only a portion of the sidewall SW' of the liquid holding chamber H is thermally conductive (e.g. thermally conductive bands or belts can wrap around the outer circumference of the liquid holding chamber H, or in another example, certain areas of the liquid holding chamber H can be thermally conductive and other areas may not be). In one embodiment, a cooling element HC6 can be operated to cool at least a portion of the side walls SW' around the perimeter of a liquid chamber and can lower the temperature of the liquid nearest to the side walls. In this embodiment the liquid along the side walls becomes colder than that liquid in the remaining body of liquid and will fall in a downwards direction along the sidewall of the liquid holding chamber H. This can advantageously induce a circulation effect, circulating the liquid within the liquid container LC5. This circulation effect can be used to stir or mix the liquid within the liquid container for the sake of discouraging more buoyant particles from separating from less buoyant particles, or the circulation effect can be used to keep the temperature of the liquid within the liquid container LC5 substantially uniform. In another embodiment (not shown in the illustration), one or more heating elements can be added to the above embodiment and can be in thermal contact with a base or a bottom of the liquid holding chamber H. In this embodiment, the heating element can be operated to heat at least a portion of the liquid near the center of the liquid chamber, at the base, so that it can further support the rise of hotter liquid up the center of the body of liquid (this would further strengthen the circulation effect).

Figure 34J:
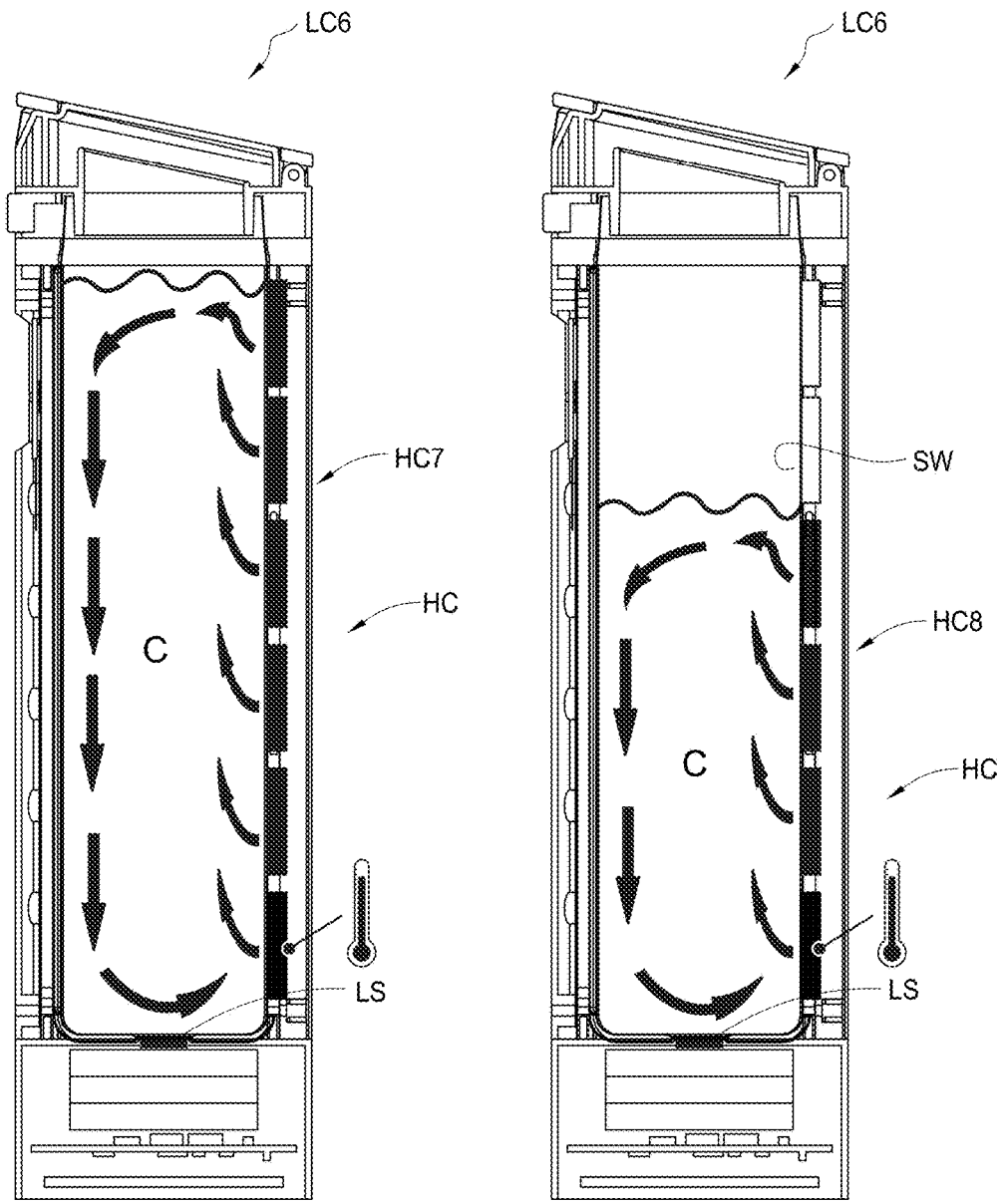
FIG. 34J shows a schematic cross-sectional view of another embodiment of a liquid container with one or more heating or cooling elements.

FIG. 34J shows another embodiment of a liquid container LC6 (e.g., a cup, mug 400, travel mug 600, 1700A, 2000, 2100, 2400, baby bottle 1500, beer mug 1600, water bottle) that is similar to the liquid container LC7 except as described below. The liquid container LC6 has one or more (e.g., multiple) heating elements HC in thermal communication with at least a portion of the circumferential side wall SW of the liquid holding chamber. Unlike the liquid container LC7, the liquid container LC6 operates all heating elements HC7 that are at least partially below the liquid level or in thermal contact with the liquid in the holding chamber. As the liquid level drops, the number of heating elements HC8 that are operated drops.

In the illustrated embodiment, heating elements HC7, HC8 of the one or more heating elements HC are operated (e.g., by the electronic module EM) to heat the portion of the side wall SW they are in thermal communication with. Advantageously, operation of the heating element HC7, HC8 induces, promotes, facilitates or generates the circulation C of the liquid within the chamber as shown.

Figure 34K:
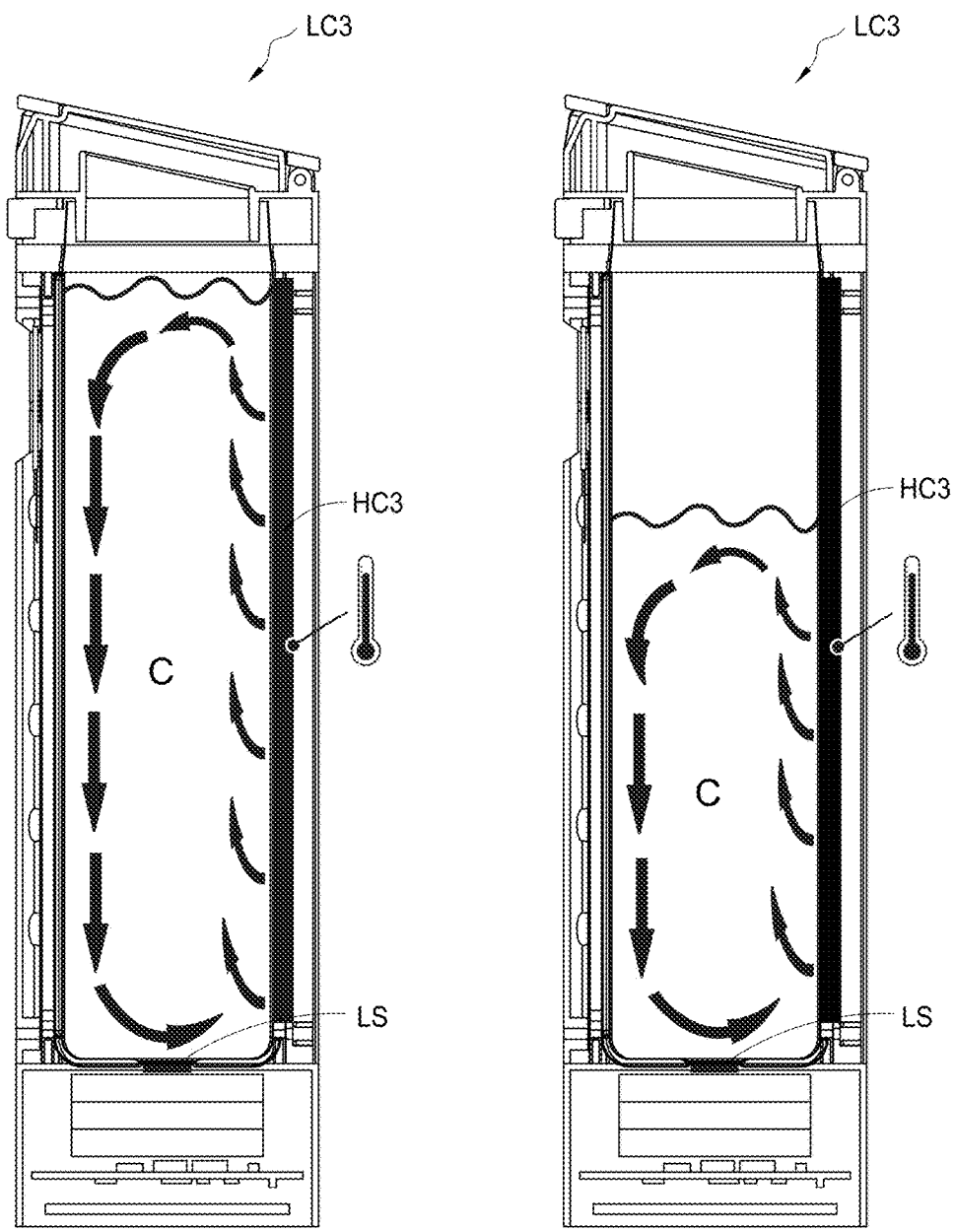
FIG. 34K shows a schematic cross-sectional view of the liquid container of FIG. 34G operating in heating mode.

FIG. 34K shows the liquid container LC3 (e.g., a cup, mug 400, travel mug 600, 1700A, 2000, 2100, 2400, baby bottle 1500, beer mug 1600, water bottle). In this embodiment, the heating element HC3 that is in thermal communication with at least a portion (e.g., one side) of a circumferential wall SW that defines the liquid holding chamber (e.g., along at least portion of the height of the holding chamber) is operated (e.g., by the electronic module EM) to heat the portion of the side wall SW it is in thermal communication with. As shown in FIG. 34K, the heating element HC3 can remain in operation regardless of the change in liquid level, so that operation of the heating element HC3 in this embodiment does not depend on the sensed liquid level. Advantageously, operation of the heating elements HC3 induces, promotes, facilitates or generates the circulation C of the liquid within the chamber.

Figure 34L:
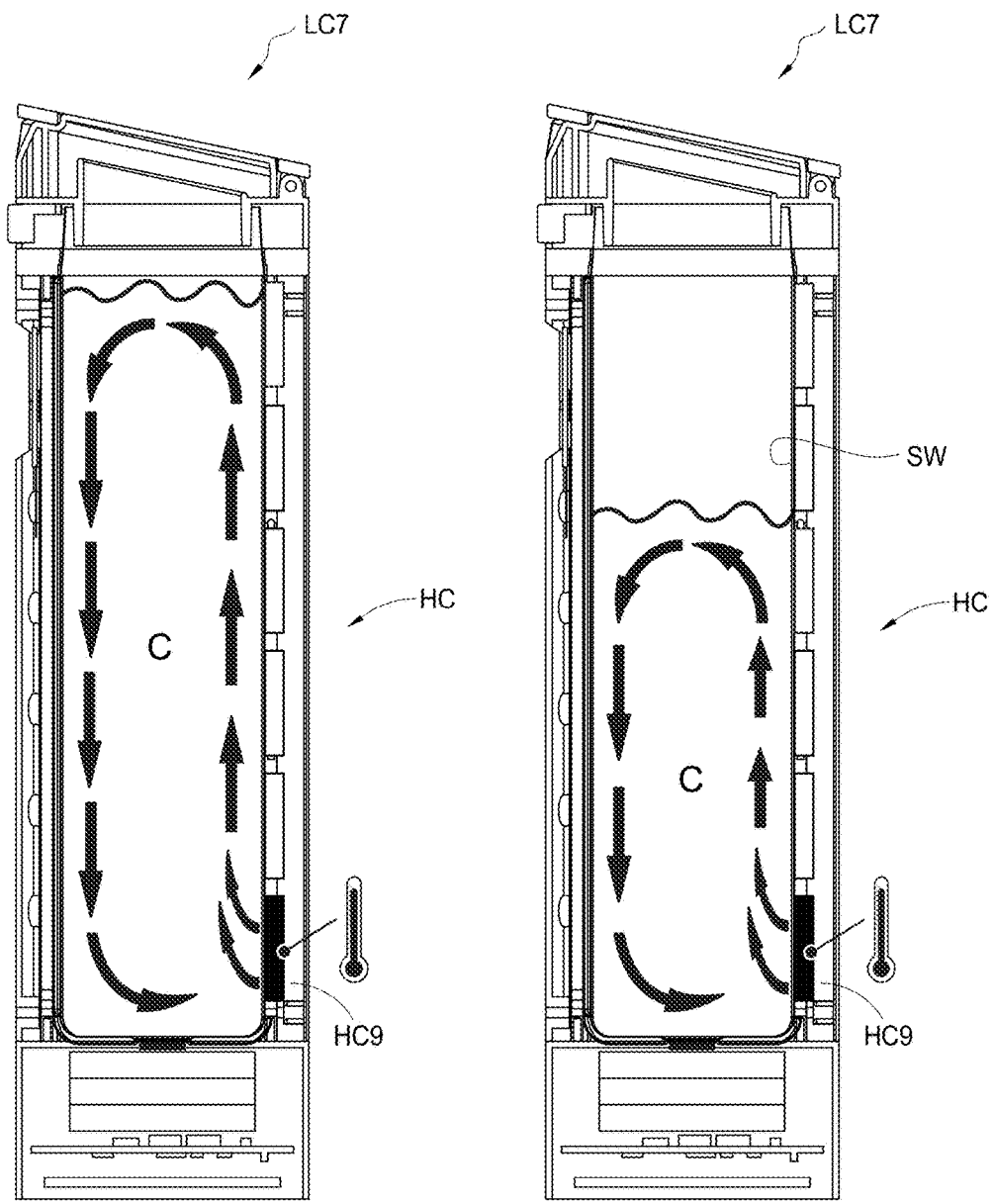
FIG. 34L shows a schematic cross-sectional view of another embodiment of a liquid container with one or more heating or cooling elements.

FIG. 34L shows another embodiment of a liquid container LC7 (e.g., a cup, mug 400, travel mug 600, 1700A, 2000, 2100, 2400, baby bottle 1500, beer mug 1600, water bottle) that is similar to the liquid container LC4 except as described below. The liquid container LC7 has one or more (e.g., multiple) heating elements HC in thermal communication with at least a portion of the circumferential side wall SW of the liquid holding chamber.

In the illustrated embodiment, a heating element HC9 of the one or more heating elements HC is operated (e.g., by the electronic module EM) to heat the portion of the side wall SW it is in thermal communication with. As shown in FIG. 34L, the heating element HC9 is proximate the bottom the holding chamber of the liquid container LC7 and operation of the heating element HC9 does not change with the change in liquid level. Advantageously, operation of the heating element HC9 induces, promotes, facilitates or generates the circulation C of the liquid within the chamber.

Figure 34M:
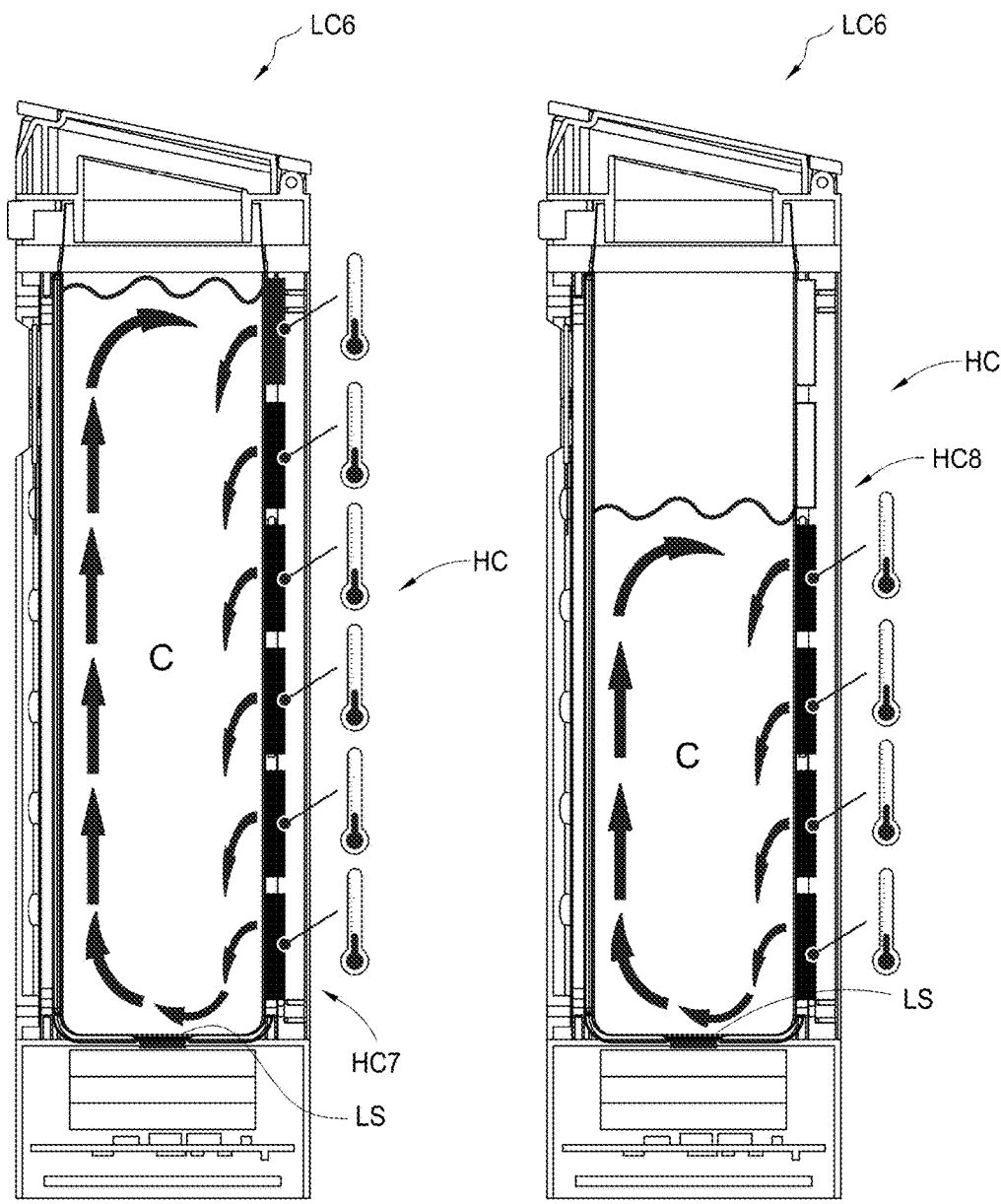
FIG. 34M shows a schematic cross-sectional view of the liquid container of FIG. 34J operating in cooling mode.

FIG. 34M shows the liquid container LC6 (e.g., a cup, mug 400, travel mug 600, 1700A, 2000, 2100, 2400, baby bottle 1500, beer mug 1600, water bottle) operating in cooling mode. The liquid container LC6 operates all cooling elements HC7 that are at least partially below the liquid level or in thermal contact with the liquid in the holding chamber. As the liquid level drops, the number of heating and cooling elements HC8 that are operated drops.

In one embodiment, circulation or mixing of the liquid within a cup, mug 400, travel mug 600, 1700A, 2000, 2100, 2400, baby bottle 1500, beer mug 1600, water bottle or liquid container can be accomplished using kinetic movement such as a diaphragm that moves in and out, similar to the cone of an audio speaker (e.g., a diaphragm attached to, embedded in or otherwise incorporated into the body, such as sidewall, of the container). In another embodiment, circulation or mixing of the liquid within a cup, mug 400, travel mug 600, 1700A, 2000, 2100, 2400, baby bottle 1500, beer mug 1600, water bottle or liquid container can be accomplished using sound waves or sound vibrations (e.g. a small speaker or piezoelectric speaker mounted to a surface of the cup, mug 400, travel mug 600, 1700A, 2000, 2100, 2400, baby bottle 1500, beer mug 1600, water bottle or liquid container). In another embodiment, circulation or mixing of the liquid within a cup, mug 400, travel mug 600, 1700A, 2000, 2100, 2400, baby bottle 1500, beer mug 1600, water bottle or liquid container can be accomplished using kinetic movement such as a piston or shaft that moves in and out, causing a disruption of the liquid and therefore mixing the liquid. In another embodiment, circulation or mixing of the liquid within a cup, mug 400, travel mug 600, 1700A, 2000, 2100, 2400, baby bottle 1500, beer mug 1600, water bottle or liquid container can be accomplished using kinetic movement such as one or more rotating mixer blades or arms (e.g., attached to or otherwise incorporated into the body of the container). In such embodiments, the cup, mug 400, travel mug 600, 1700A, 2000, 2100, 2400, baby bottle 1500, beer mug 1600, carafe, water bottle or liquid container can have a single heating or cooling element (e.g., a single thermoelectric element), which can optionally be disposed in a bottom portion (e.g., base portion) thereof, and the mechanical or kinetic or acoustic mixing mechanism can be operated (e.g., by the control unit or electronics module) to circulate or mix the liquid within the liquid receiving portion so that the temperature of the liquid volume is generally uniform.

In another embodiment, the cup, mug 400, travel mug 600, 1700A, 2000, 2100, 2400, baby bottle 1500, beer mug 1600, carafe, water bottle or liquid container can have one or more heating or cooling elements (e.g., thermoelectric element), such as the heating or cooling elements HC, 60, 460, 1660 along a side wall SW that moves along at least a portion of the length of the sidewall SW as the liquid level changes. In one embodiment, the one or more heating or cooling elements (e.g., thermoelectric element) can be mounted on a track attached to a surface (e.g., inner surface, outer surface) of the liquid receiving portion. The one or more heating or cooling elements can be attached to a float member that floats on the liquid level, such that the one or more heating or cooling elements remain at least partially submerged under the liquid line, and as the user drinks the liquid and the liquid level drops, the one or more heating or cooling elements will move (e.g., downward) along the side wall SW so that it remains at least partially submerged under the liquid level line. In one embodiment, the cup, mug 400, travel mug 600, 1700A, 2000, 2100, 2400, baby bottle 1500, beer mug 1600, carafe, water bottle or liquid container has at least one heating or cooling element (e.g., thermoelectric element) that moves along the side wall SW (e.g., riding on a track), as discussed above, and can be moved using electromagnets, or a motor or can be manually moved along the track. Where the heating or cooling element is a thermoelectric element, control circuitry can be used to turn on or off the thermoelectric element. The control circuitry can also reverse the polarity to the thermoelectric element, so that the thermoelectric element can be used to actively heat or actively cool the liquid within the cup, mug 400, travel mug 600, 1700A, 2000, 2100, 2400, baby bottle 1500, beer mug 1600, water bottle or liquid container depending on the polarity of the power that is delivered to the said thermoelectric element.

In another embodiment, the cup, mug 400, travel mug 600, 1700A, 2000, 2100, 2400, baby bottle 1500, beer mug 1600, carafe, water bottle or liquid container can have one or more heating or cooling elements (e.g., thermoelectric element, heater coil, etc.), such as the heating or cooling elements HC, 60, 460, 1660 operatively coupled to one or more heat pipes that direct thermal energy to or from one or more portions of the liquid receiving portion of the cup, mug 400, travel mug 600, 1700A, 2000, 2100, 2400, baby bottle 1500, beer mug 1600, carafe, water bottle or liquid container. For example, one heat pipe can direct thermal energy to or from a base portion, another heat pipe can direct thermal energy to or from a middle portion and another heat pipe can direct thermal energy to or from a top portion of the cup, mug 400, travel mug 600, 1700A, 2000, 2100, 2400, baby bottle 1500, beer mug 1600, carafe, water bottle or liquid container. In one embodiment, a valve member (e.g., an electromagnetic assembly) can be actuated to direct thermal energy to or from the heating or cooling element to or from a particular heat pipe or heat pipes to thereby direct thermal energy to or from a desired portion of the liquid receiving portion. In one embodiment, the cup, mug 400, travel mug 600, 1700A, 2000, 2100, 2400, baby bottle 1500, beer mug 1600, carafe, water bottle or liquid container can have one or more heating or cooling elements (e.g., thermoelectric element, heater coil, etc.) selectively thermally connected to one or more heat pipes, as discussed above. For example, actuation of the valve can thermally connect the heating or cooling element to a particular heat pipe and deactivation of the valve can thermally disconnect the heating or cooling element from said heat pipe. In one embodiment, the cup, mug 400, travel mug 600, 1700A, 2000, 2100, 2400, baby bottle 1500, beer mug 1600, carafe, water bottle or liquid container can have one or more heating or cooling elements (e.g., thermoelectric element, heater coil, etc.) thermally connected to one or more heat pipes that direct thermal energy to or from one or more portions of the liquid receiving portion of the cup, mug 400, travel mug 600, 1700A, 2000, 2100, 2400, baby bottle 1500, beer mug 1600, carafe, water bottle or liquid container. Where the heating or cooling element is a thermoelectric element, control circuitry can be used to turn on or off the thermoelectric element. The control circuitry can also reverse the polarity to the thermoelectric element, so that the thermoelectric element can be used to actively heat or actively cool the liquid within the cup, mug 400, travel mug 600, 1700A, 2000, 2100, 2400, baby bottle 1500, beer mug 1600, water bottle or liquid container depending on the polarity of the power that is delivered to the said thermoelectric element.

Though the features disclosed above may be described in connection with a travel mug, mug, cup, water bottle or liquid container (such as the mug 400, and travel mug 600), one of skill in the art will recognize that this embodiment can also apply to any liquid container, drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Generation of Electricity with Heating or Cooling Elements

In one embodiment, one or more of the heating or cooling elements HC can generate electricity that can be used (e.g., by the electronic module, such as the electronic module 490, 690, 2090, 2190, EM) to charge the one or more power storage devices (e.g., the power storage devices 480, 680, 2080, 2180, PS). In another embodiment, one or more thermoelectric elements within a cup, mug 400, bowl B, travel mug 600, 1700A, 2000, 2100, 2400, baby bottle 1500, water bottle or liquid container (such as those disclosed in embodiments herein) can receive heat energy from hot liquid that has been poured into said cup, mug 400, bowl B, travel mug 600, 1700A, 2000, 2100, 2400, baby bottle 1500, water bottle or liquid container and the heat energy can be converted to electricity. This electricity can be used to recharge one or more power storage elements PS or can be used to directly power a specific feature (such as a thermostat or a BLUETOOTH® radio, or WiFi radio, or indicator lights, or an indicator display which displays the temperature of the liquid, or any of the features described within this specification). In another embodiment, one or more thermoelectric elements within a cup, mug 400, bowl B, travel mug 600, 1700A, 2000, 2100, 2400, baby bottle 1500, water bottle or liquid container can receive heat energy from hot liquid that has been poured into said cup, mug 400, bowl B, travel mug 600, 1700A, 2000, 2100, 2400, baby bottle 1500, water bottle or liquid container and the heat energy can be converted to electricity. The control circuitry within said cup, mug 400, bowl B, travel mug 600, 1700A, 2000, 2100, 2400, baby bottle 1500, water bottle or liquid container can direct such electricity to charge the one or more power storage devices (e.g., power storage elements PS, batteries, capacitors) disclosed herein, which can advantageously prolong the working period of the cup, mug 400, bowl B, travel mug 600, 1700A, 2000, 2100, 2400, baby bottle 1500, water bottle or liquid container (e.g., maintain the liquid at the predetermined or preselected temperature or temperature range for a longer period of time).

In another embodiment, the control circuitry within the cup, mug 400, bowl B, travel mug 600, 1700A, 2000, 2100, 2400, baby bottle 1500, water bottle or liquid container can activate one or more of a plurality of thermoelectric elements (such as those disclosed herein, for example HC) in order to actively heat or cool the liquid within the cup, mug 400, bowl B, travel mug 600, 1700A, 2000, 2100, 2400, baby bottle 1500, water bottle or liquid container. In this embodiment, the one or more thermoelectric elements that are not in use (i.e. not powered up to actively heat or cool the liquid) can be used to generate electricity (e.g. from the heat energy of the liquid) and can be used to charge the one or more power storage elements (e.g., power storage elements PS, batteries, capacitors). In another embodiment, the electricity generated by the not-in-use thermoelectric elements can be used to directly or indirectly direct power to the one or more thermoelectric elements that are in use (i.e. powered up to actively heat or cool the liquid).

In another embodiment, the control circuitry within the cup, mug 400, bowl B, travel mug 600, 1700A, 2000, 2100, 2400, baby bottle 1500, water bottle or liquid container can activate one or more of a plurality of thermoelectric elements in order to actively heat the liquid within the cup, mug 400, bowl B, travel mug 600, 1700A, 2000, 2100, 2400, baby bottle 1500, water bottle or liquid container. In this embodiment, if the liquid that is poured into the cup, mug 400, bowl B, travel mug 600, 1700A, 2000, 2100, 2400, baby bottle 1500, water bottle or liquid container is a higher temperature than the user-selected or factory-selected temperature set point, the one or more thermoelectric elements can be used to generate electricity (to charge the one or more power storage elements, such as PS) until the point in which the user-selected or factory-selected liquid temperature has been reached. At this point, the one or more thermoelectric elements can be utilized by the control circuitry in order to maintain said liquid temperature (i.e. be powered up to emit heat and be controlled by the control circuitry). This embodiment uses the thermoelectric elements both to generate electricity and also to actively heat the liquid within the cup, mug 400, bowl B, travel mug 600, 1700A, 2000, 2100, 2400, baby bottle 1500, water bottle or liquid container, and the dual purpose use of said thermoelectric elements is controlled by the control circuitry. This configuration advantageously takes advantage of the hot liquid in the cup, mug 400, bowl B, travel mug 600, 1700A, 2000, 2100, 2400, baby bottle 1500, water bottle or liquid container in order to generate electricity while the liquid is too hot. This allows the one or more power storage elements to be charged or receive additional charging, so that the duration of time that the liquid can be kept at the temperature set point is prolonged.

In another embodiment, one or more thermoelectric generators can be used independent of the heating or cooling elements HC, and can be used to generate electricity to charge one or more energy storage devices within a cup, mug 400, bowl B, travel mug 600, 1700A, 2000, 2100, 2400, baby bottle 1500, water bottle or liquid container.

In another embodiment, the cup, mug, bowl, travel mug, baby bottle, water bottle or liquid container can have a port in which an external electronic device (e.g., mobile phone, radio, fitness monitoring device, PDA) can be connected, and the electricity generated from the thermoelectric elements can be used to power or charge said external electronic device. In a similar embodiment, wireless power can be used (as opposed to a port) to electrically connect an external electronic device (e.g. mobile phone, radio, fitness monitoring device, PDA) so that the external electronic device can receive power from the cup, mug 400, bowl B, travel mug 600, 1700A, 2000, 2100, 2400, baby bottle 1500, water bottle or liquid container.

In another embodiment, there need not be an electricity generator within the cup, mug 400, bowl B, travel mug 600, 1700A, 2000, 2100, 2400, baby bottle 1500, water bottle or liquid container. A port or wireless power transmitter within the cup, mug 400, bowl B, travel mug 600, 1700A, 2000, 2100, 2400, baby bottle 1500, water bottle or liquid container can be used to transmit power to an external electronic device (e.g. mobile phone, radio, fitness monitoring device, PDA) in order to power or charge said external electronic device. The one or more power storage elements (e.g. power storage elements PS, batteries or capacitors) within the cup, mug 400, bowl B, travel mug 600, 1700A, 2000, 2100, 2400, baby bottle 1500, water bottle or liquid container can be used to provide the electricity that is used to transmit to said external electronic device.

Though the generation of electricity with the heating or cooling elements HC disclosed above may be described in connection with a mug 400, travel mug 600, 1700A, 2000, 2100, 2400, water bottle or liquid container (such as a beer mug 1600 or baby bottle 1500), one of skill in the art will recognize that it can also apply to any liquid container, drinkware, dishware or serverware (e.g., bowl, serving dish, hot plate), including the plate 100', 800, 800', 900, 1100, 1300, 1400, bread basket 2200, tortilla warmer 2300, and the scope of disclosure and the invention is understood to cover such liquid containers, drinkware, dishware and serverware.

Chilled Drinkware (e.g., Beer Mug)

FIG. 34D shows one embodiment of chilled drinkware 1600. In the illustrated embodiment, the chilled drinkware 1600 can be a beer mug 1600. The beer mug 1600 can have a body 1612 with a circumferential wall 1612a, an inner side surface 1612b, a handle 1614 and a base 1620 having a top surface 1620a, where the inner side surface 1612b and top surface 1620a define a cavity 1618 that can hold a liquid (e.g., beer, soft drink, water). The beer mug 1600 can have a cooling system 1655 which can be disposed (e.g., embedded) in a cavity 1650a between the circumferential wall 1612a and the inner side surface 1612b. The cooling system 1655 can include one or more cooling elements 1660 (e.g. Peltier elements) disposed against an outer surface of the inner side surface 1612b so as to cool said inner side surface 1612b and thereby cool the liquid in the cavity 1618, an insulative member 1670, one or more energy storage devices 1680 and an electronic module 1690, and these components can be arranged and connected in the same manner described above in connection with the heated or cooled plate 100, mug 400, or travel mug 600. In one embodiment, one or more heat sinks can be thermally attached to the one or more cooling elements 1660 (heat sinks not shown). In another embodiment, an active cooling system (e.g. fan, diaphragm cooler, etc.) can be used to actively cool said heat sinks (not shown). In another embodiment, the insulative member 1670 can be excluded. In another embodiment, the one or more power storage devices or elements 1680 can be excluded.

The electronic module 1690 can be attached to a top surface 1644 of a bottom member 1640 of the mug 1600 and include one or more of a wireless power receiver 1692, control circuitry 1694 (e.g., controller circuit, microcontroller, etc.) and optionally a charger 1696 (e.g., charging circuit) for charging the one or more energy storage devices 1680 in embodiments where the mug 1600 includes the energy storage devices 1680. The electronic module 1690 can include a MCU with capacitive sensing and graphic control features. The control circuitry 1694 can operate to manage the power delivered to the one or more cooling elements 1660, which in one embodiment can be controlled independently of each other as discussed herein. The control circuitry 1694 can also be used to manage the charging of the one or more energy storage devices 1680. In one embodiment, the wireless power receiver 1692 is electrically connected to the battery charger 1696, which is electrically connected to the energy storage devices 1680 that in turn are electrically connected to the cooling element 1660. In another embodiment, where energy storage devices 1680 are excluded (as discussed above), the wireless power receiver 1692 can be electrically connected to the cooling elements 1660 (and can be controlled by control circuitry to maintain a specific temperature set point). In one embodiment, the cooling system 1655 is completely disposed in the body 1612 so that no part of the system 1655 is visible (i.e., the mug 1600 looks like a conventional mug). In another embodiment, the cooling system 1655 can be housed in a module that is removably attachable to the mug 1600. In another embodiment, a portion of the cooling system can be disposed in the body and a portion of the cooling system can be disposed outside the body (e.g. heat sink, etc.).

As discussed herein, the wireless power receiver 1692 can receive power from a wireless power transmitter (e.g., in a charging base on which the mug is placed, in a table, bar, counter or desk that incorporates a wireless power transmitter, etc.). Where a charging base is used, in one embodiment at least a portion of the charging base can extend into the bottom of the mug 1600 or be proximate the bottom surface of the mug 1600.

In one embodiment, the bottom member 1640 can be removably attached to the mug 1600 to allow access to the cooling system 1655 in the cavity 1650a. For example, the bottom member 1640 can be mechanically coupled to the mug 1600 (e.g., with screws, a threaded interface between the bottom member 1640 and mug 1600, a press-fit connection). The bottom member 1640 can be removed to allow the replacing of the one or more energy storage devices 1680 and the servicing of the cooling system 1655. In one embodiment, the bottom member 1640 can be a water resistant lid that can be removably attachable (e.g., threaded on or screwed) to the mug 1600, cup, water bottle or liquid container for accessing the cooling system 1655. In another embodiment, the bottom member 1640 can be a water resistant lid that can be removably attachable (e.g., threaded on or screwed) to the mug 1600 for accessing the one or more energy storage devices 1680. In yet another embodiment, the energy storage devices 1680 can be in a pack that is attached (e.g., threaded, snap fit, screwed down) onto the bottom of the mug 1600, where the pack's electrical contacts connect with a set of electrical contacts on the bottom of the mug 1600.

In another embodiment, the mug 1600 can include one or more corrosion resistant electrical contacts (not shown) on an outer surface of the mug 1600, such as a bottom surface 1642 of the bottom portion 1640 of the mug 1600, where the electrical contacts are sized and shaped to contact corresponding electrical contacts (not shown) (e.g., on a charging base when the mug 1600 is placed on the charging base). In one embodiment, the electrical contacts of the mug 1600 can protrude from a surface of the mug 1600, such as electrical posts. In another embodiment, the electrical contacts of the mug 1600, cup, water bottle or liquid container can be one or more contact pads (not shown) on the bottom surface 1642 of the bottom portion 1640 of the mug 1600, cup, water bottle or liquid container that can contact corresponding contact pads (not shown) on the charging base. However, the electrical contacts on the mug 1600 and associated charging base can have other suitable configurations.

The mug 1600 can operate in a similar manner as discussed above in connection with the mug 400 or travel mug 600. In one embodiment, where the mug 1600 has power storage devices 1680, the electronic module 1690 can store energy received (wirelessly via the wireless power receiver 1692, or via a direct electrical connection as discussed above) in the power storage devices 1680 for powering the one or more cooling elements 1660. In another embodiment, where power storage devices 1680 are excluded, said received energy or power can be directed to the cooling elements 1660.

As discussed herein, the active cooling systems described in embodiments above can be incorporated into chilled drinkware, such as a beer mug 1600. The active cooling system 1655 can include one or more cooling elements 1660 (e.g., Peltier elements) on a wall 1612b (e.g., sidewall) of the beer mug body 1612 that can cool a liquid in the receiving cavity 1618 of the mug. In some embodiments, the mug 1600 can include one or more power storage elements 1680 that can supply power to the one or more cooling elements 1660. The mug 1600 can optionally include a wireless power receiver 1692 that can wirelessly receive power from a power source, as discussed in the embodiments herein, and control circuitry 1694 that can operate the one or more cooling elements 1660, and charge the one or more power storage elements 1680. The mug 1600 can also incorporate all of the sensors discussed herein (e.g., liquid level sensors, temperature sensors, tilt sensors). The one or more cooling elements 1660 can be operated in unison or individually and independent of each other, as described herein (e.g., to induce circulation of liquid flow, to maintain the liquid at a predetermined or preselected temperature or temperature range). In one embodiment, the one or more cooling elements 1660 can be operated to maintain the liquid in the mug at 60 degrees F. or less. In another embodiment, the one or more cooling elements 1660 can be operated to maintain the liquid in the mug at 50 degrees F. or less, such as about 45 degrees F. In another embodiment, the one or more cooling elements 1660 can be operated to maintain the liquid in the mug at 40 degrees F. or less. In one embodiment, the beer mug 1600 can have a user interface, which can allow the user to turn on or off the cooling system or set a specific liquid temperature set point or mode of cooling operation (e.g., High, Medium, Low), or set an approximate liquid temperature set point. In another embodiment, the beer mug can be controlled via wireless remote or via mobile electronic device (e.g. mobile phone or tablet).

Though the chilled drinkware disclosed above may be described in connection with a beer mug 1600, one of skill in the art will recognize that it can also apply to any liquid container, drinkware, dishware or serverware (e.g., bowl, serving dish), including the plate 100, 100', 800, 800', 900, 1100, 1300, 1400, cup, mug 400, travel mug 600, 1700A, 2000, 2100, 2400, baby bottle 1500, and the scope of disclosure and the invention is understood to cover such liquid containers, drinkware, dishware and serverware.

Wireless Power Transmitter

As discussed in the embodiments herein, the cup, mug 400, travel mug 600, 1700A, 2000, 2100, 2400, water bottle or liquid container (e.g., chilled drinkware, such as beer mug 1600, baby bottle 1500) can have an active heating or cooling system. In one embodiment, the heating or cooling system can include a wireless power receiver that receives power (e.g., via induction) from a power source and uses it to store energy in one or more power storage devices PS (see FIG. 44), which can then provide power to one or more heating or cooling elements HC (e.g., the elements can be operated to provide both heating and cooling). In another embodiment, the heating or cooling system can exclude power storage devices PS and power is transmitted from the wireless power receiver to the one or more heating or cooling elements HC (or can be transmitted to the electronics module EM which can control the power flow to the heating or cooling elements HC).

In one embodiment, the power source can be one or more wireless power transmitters 1800 (e.g., and inductive power pad) that can be attached to, coupled to, embedded in, or otherwise incorporated into a table top, counter top, bar top, desk top or any other support surface 1850. In use, as shown in FIGS. 38A-38F, the user can place the actively heated or cooled bowl B, plate 100, 100', 100", 800, 800', 900, 1100, 1300, 1400, cup, mug 400, travel mug 600, 1700A, 2000, 2100, 2400, water bottle or liquid container (e.g., chilled drinkware such as a beer mug 1600, baby bottle 1500) on said table top, counter top, bar top, desk top or support surface 1850 and the wireless power transmitter 1800 therein can provide wireless power to the wireless power receiver in actively heated or cooled bowl B, plate 100, 100', 100", 800, 800', 900, 1100, 1300, 1400, cup, mug 400, travel mug 600, 1700A, 2000, 2100, 2400, water bottle or liquid container (e.g., chilled drinkware such as a beer mug 1600, baby bottle 1500). As discussed above, where the heating or cooling system includes one or more power storage devices, said transmitted wireless power can be used to store energy in the one or more power storage devices (e.g., charge the batteries). In embodiments where the heating or cooling system excludes power storage devices, said transmitted wireless power can be used to provide power to the one or more heating or cooling elements via the electronic module of the heating or cooling system.

In another embodiment, said transmitted wireless power can be used to provide power directly to the one or more heating or cooling elements (e.g., HC, see FIG. 44) within the bowl B, plate 100, 100', 100", 800, 800', 900, 1100, 1300, 1400, cup, mug 400, travel mug 600, 1700A, 2000, 2100, 2400, water bottle or liquid container (e.g., chilled drinkware such as a beer mug 1600, baby bottle 1500), and the electronic module can be omitted. This embodiment of said dishware can have a wireless power receiver and one or more heating or cooling elements, and no other circuitry, or very minimal circuitry, in order to keep manufacturing costs low. In another embodiment, said transmitted wireless power can be used to provide power to the one or more heating or cooling elements within the bowl B, plate 100, 100', 100", 800, 800', 900, 1100, 1300, 1400, cup, mug 400, travel mug 600, 1700A, 2000, 2100, 2400, water bottle or liquid container (e.g., chilled drinkware such as a beer mug 1600, baby bottle 1500), and said dishware can have a simple circuit that can limit the power to the one or more heating or cooling elements or can have a simple thermostat circuit that can keep the temperature of the liquid at a predetermined temperature or temperature range. As such, the wireless power transmitters 1800 can be incorporated into tables (indoor or outdoor), counters or bars at cafes or coffee shops, restaurants, bars, as well as into desk tables (e.g., at work, school). Such wireless power transmitters 1800 can also be incorporated into cup holders (e.g., at movie theatres, in an automobile, etc.).

In one embodiment, where the liquid container is a coffee cup with the active heating or cooling system incorporated therein, in the manner discussed herein, a wireless power transmitter can be attached to, coupled to, embedded in or otherwise incorporated in a saucer plate associated with the coffee cup and on which the coffee cup can rest. The saucer plate can in turn be connected to a power source (e.g., wall outlet) and can provide power to the heating or cooling system in the coffee cup. In one embodiment, the saucer plate can have one or more power storage elements, which can be charged and can provide power to said coffee cup via electrical contacts or wireless power. In another embodiment, the saucer plate can be a different form factor, such as a disc shape, or cradle shape, or any other suitable shape that the coffee cup can sit on. These embodiments can have all of the same features and/or functions as the saucer plate (described above).

In another embodiment, the wireless power transmitter can be coupled to, attached to, embedded in or otherwise incorporated into a cup holder (e.g., in an automobile, truck, bus, boat, airplane) that can receive the cup, mug 400, travel mug 600, 1700A, 2000, 2100, 2400, beer mug 1600, water bottle or liquid container therein, such that the wireless power transmitter can transmit power to the wireless power receiver in the cup, mug 400, travel mug 600, 1700A, 2000, 2100, 2400, beer mug 1600, water bottle or liquid container when the latter is placed in or supported by the cup holder.

Figure 38A:
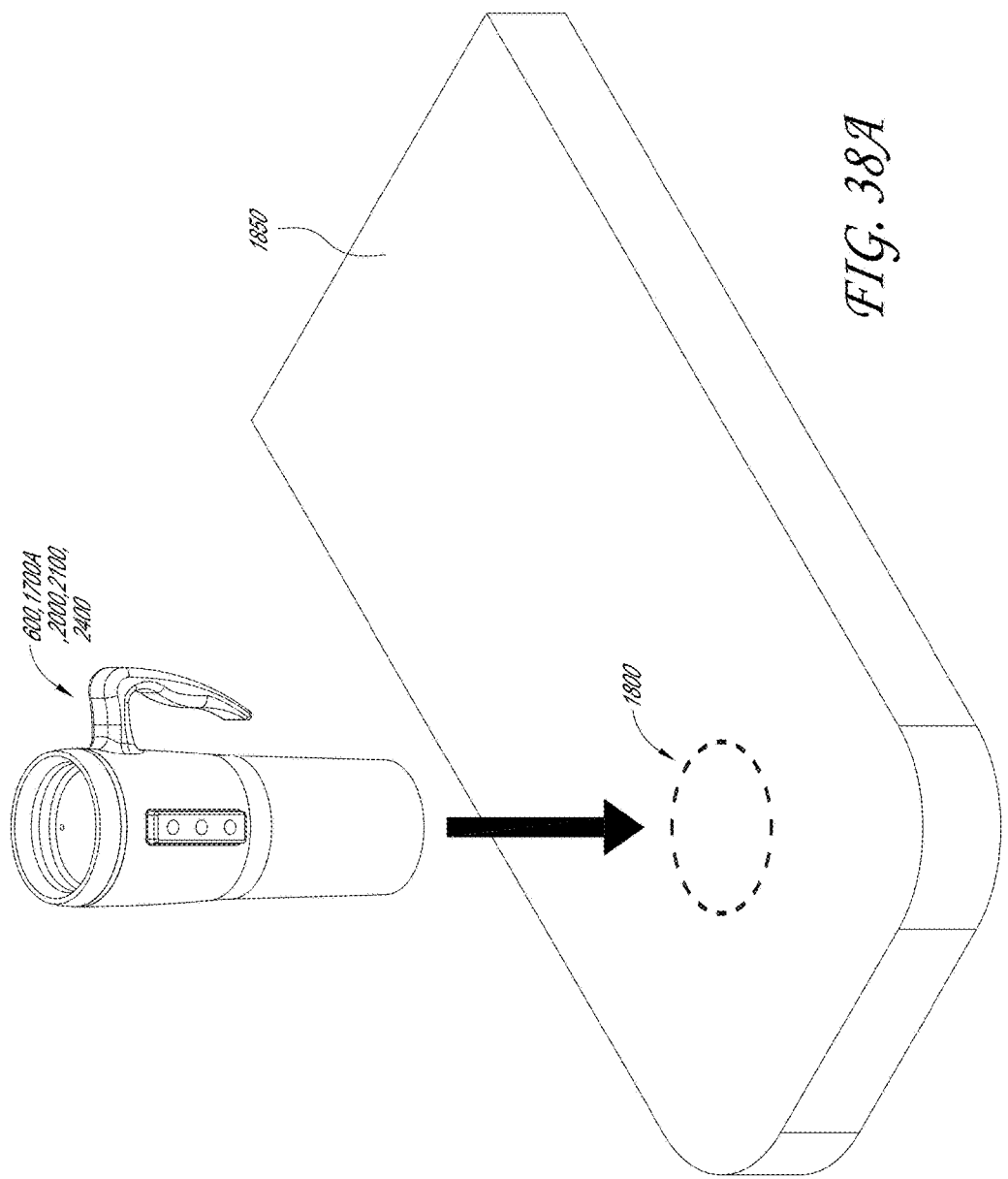
FIG. 38A shows one embodiment of a wireless energy transmitter in a table, counter, or bar for transmitting power to a travel mug placed thereon.
Figure 38G:
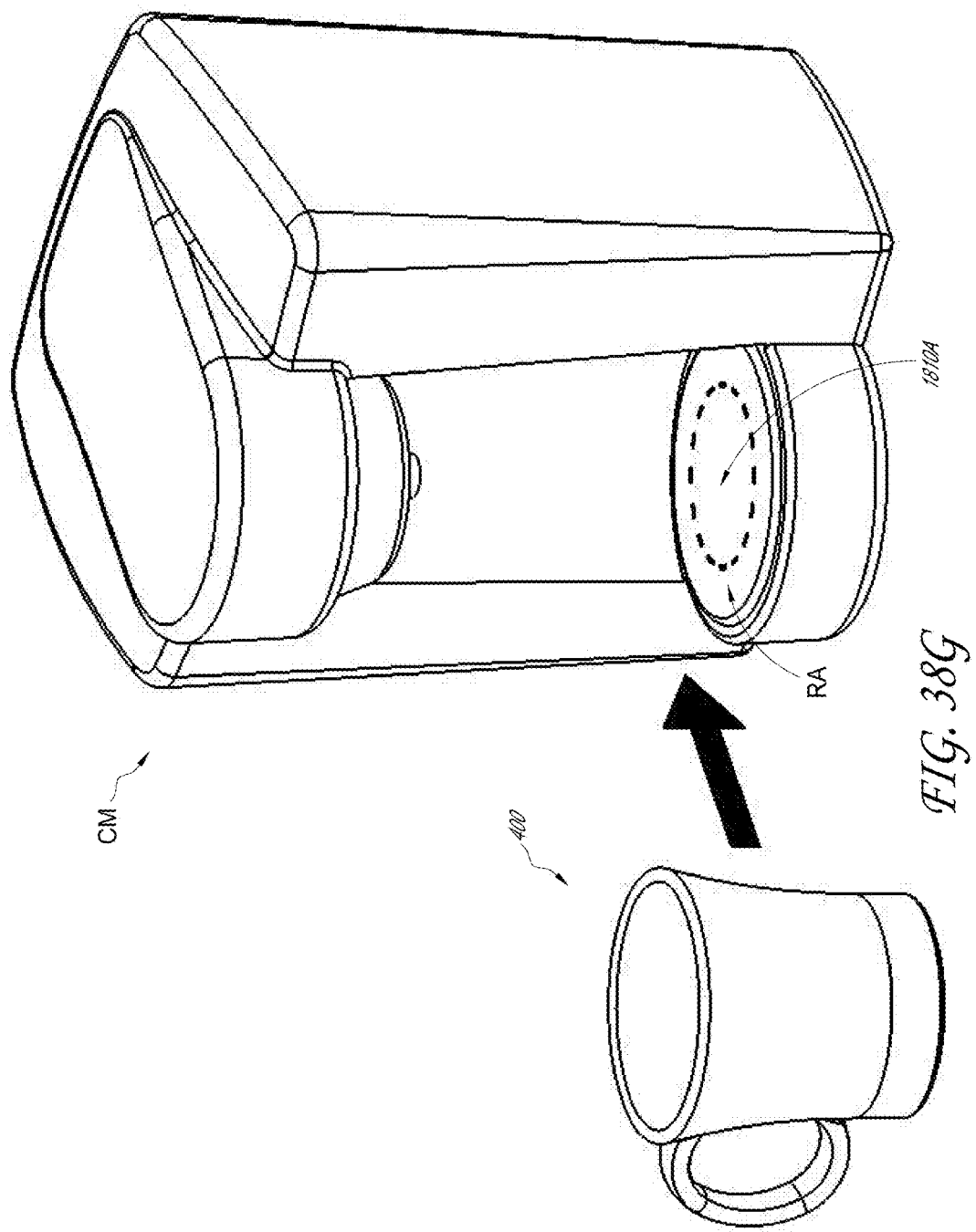
FIGS. 38G-H shows one embodiment of a wireless energy transmitter in a coffee or tea making machine.
Figure 38H:
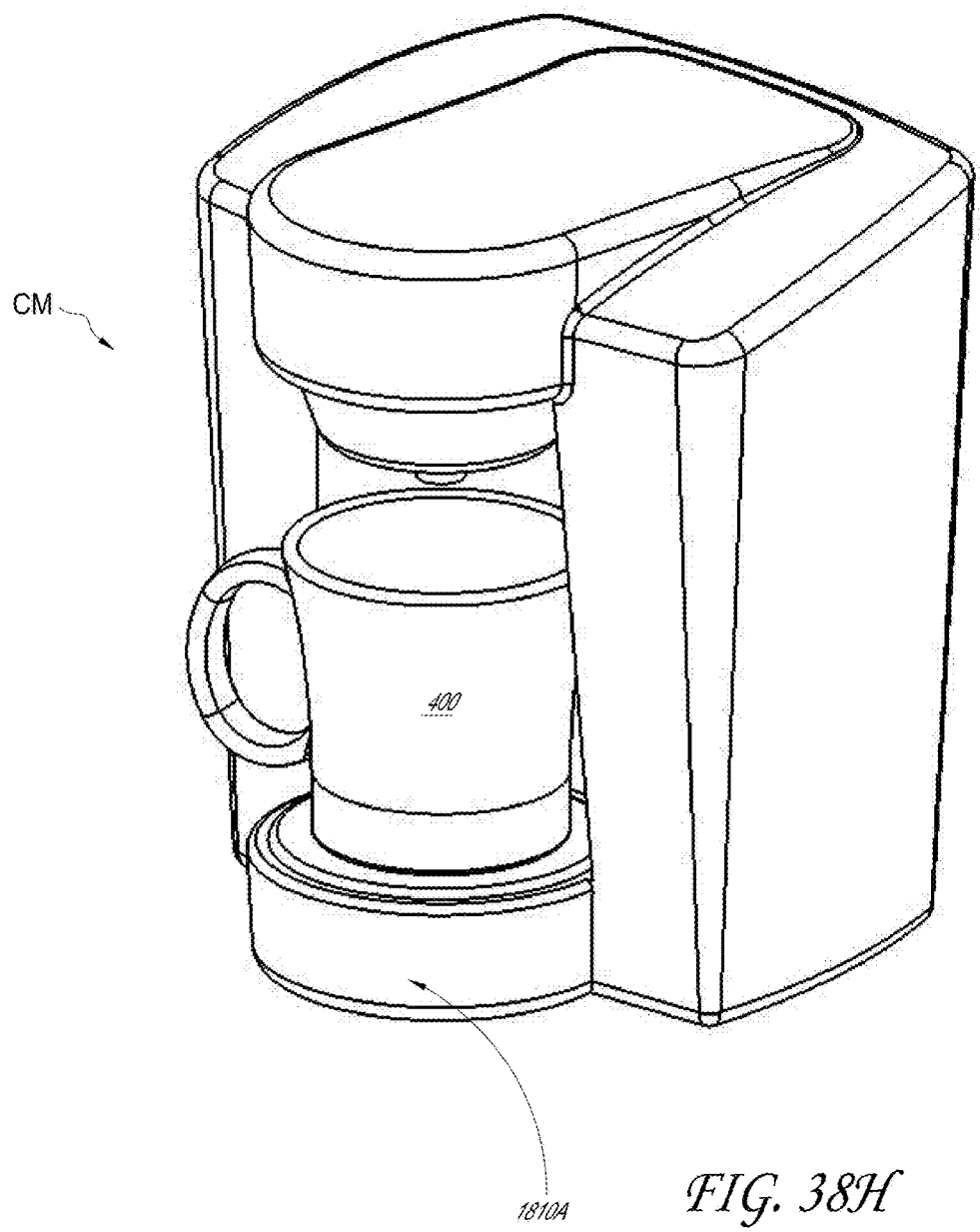

In another embodiment, shown in FIGS. 38G-38H, the wireless power transmitter can be attached to, coupled to, embedded in or otherwise incorporated in a container receiving area 1810 of a coffee making machine CM (e.g., a single-serving coffee machine, or coffee machine with a carafe, etc.). When the cup, mug 400, travel mug 600, 1700A, 2000, 2100, 2400, coffee carafe, water bottle or liquid container is placed on the receiving area RA of the machine CM it can sit over the wireless power transmitter 1810A, which can transmit power to the wireless power receiver in the cup, mug 400, travel mug 600, 1700A, 2000, 2100, 2400, coffee carafe, water bottle or liquid container. As previously discussed, said wireless power can be used to store energy in one or more power storage devices (e.g., 680, 2080, 2180) of the cup, mug 400, travel mug 600, 1700A, 2000, 2100, 2400, coffee carafe, water bottle or liquid container or it can be directly directed to the heating or cooling elements in embodiments where the cup, mug 400, travel mug 600, 1700A, 2000, 2100, 2400, coffee carafe, water bottle or liquid container exclude power storage devices. The cup, mug 400, travel mug 600, 1700A, 2000, 2100, 2400, coffee carafe, water bottle or liquid container can in one embodiment use the power received from the wireless power transmitter to pre-heat the liquid receiving area of the cup, mug 400, travel mug 600, 1700A, 2000, 2100, 2400, coffee carafe, water bottle or liquid container either before or coincident with delivery of liquid from the machine into the receiving area. Such implementation of a wireless power transmitter into the coffee making machine can advantageously provide a mechanism for a preheating system within the cup, mug 400, travel mug 600, 1700A, 2000, 2100, 2400, coffee carafe, water bottle or liquid container. In one embodiment, where the cup, mug 400, travel mug 600, 1700A, 2000, 2100, 2400, coffee carafe, water bottle or liquid container has one or more power storage devices (e.g. batteries, capacitors, etc.), once the cup, mug 400, travel mug 600, 1700A, 2000, 2100, 2400, coffee carafe, water bottle or liquid container is removed from the receiving area of the coffee making machine, the electronic module (e.g., electronic module EM in FIG. 44 or other control circuitry) can operate the one or more heating or cooling elements to maintain the liquid at the user selected or predetermined temperature or temperature range. In other embodiments, where the power storage elements are excluded, once the cup, mug 400, travel mug 600, 1700A, 2000, 2100, 2400, coffee carafe, water bottle or liquid container is removed from the receiving area of the coffee making machine, the cup, mug 400, travel mug 600, 1700A, 2000, 2100, 2400, coffee carafe, water bottle or liquid container will slowly cool down over time, in accordance with the heat dissipation characteristics of the material of the cup, mug, travel mug, coffee carafe, water bottle or liquid container. Thermal materials can be used to prolong the amount of time that the cup, mug, travel mug, water bottle or liquid container stays hot (e.g. phase change material, etc.). In one embodiment, the said cup, mug, travel mug, coffee carafe, water bottle or liquid container can have an inductive coupling receiver and a heating or cooling element (e.g., heating or cooling element HC, such as a Peltier element, resistive heater). In another embodiment, there can be other circuitry in the said cup, mug, travel mug, coffee carafe, water bottle or liquid container, such as a temperature sensor (e.g., the temperature sensors 820A-820D, 920, or S1-Sn in FIG. 44) and an electronics module (e.g., electronic module 90, EM in FIG. 44) which can regulate the temperature of the heating or cooling elements.

In another embodiment, said cup, mug, travel mug, coffee carafe, water bottle or liquid container can have a wireless power receiver, a thermostat circuit, a temperature sensor, and one or more heating or cooling elements (e.g., a heater coil). In this embodiment, when the cup, mug, travel mug, coffee carafe, water bottle or liquid container is placed in the receiving area of the coffee making machine, and the wireless power transmitter of the machine is turned on, the cup, mug, travel mug, coffee carafe, water bottle or liquid container can use its thermostat circuit to control the pre-heating process at a user selected or predetermined temperature or temperature range. This embodiment can have a user interface, or can exclude a user-interface and rely on a factory set temperature or temperature range. In another embodiment, similar to the above embodiment, instead of using a thermostat circuit, said cup, mug, travel mug, coffee carafe, water bottle or liquid container can have a wireless power receiver, a power limiting device (i.e. current limiter, voltage limiter or wattage limiter), and heating or cooling elements (e.g., a heater coil). In this embodiment, when the cup, mug, travel mug, coffee carafe, water bottle or liquid container is placed in the receiving area of the coffee making machine, and the wireless power transmitter of the coffee making machine is turned on, the cup, mug, travel mug, coffee carafe, water bottle or liquid container can use its power limiting device to control the pre-heating temperature at a user selected or predetermined temperature or temperature range. This embodiment can have a user interface, or can exclude a user-interface and rely on a factory predetermined temperature or temperature range. In another embodiment, said cup, mug, travel mug, coffee carafe, water bottle or liquid container can have a wireless power receiver and one or more heating or cooling elements. In this embodiment, the user can select a pre-heat temperature or pre-heat temperature range (e.g. "low" or "medium" or "high") for said cup, mug, travel mug, coffee carafe, water bottle or liquid container via a user interface located on the coffee making machine. In this embodiment, the coffee making machine can limit or control the power level of its wireless power transmitter (based on the user-selected temperature or temperature range), so as to control the amount of power delivered to the wireless power receiver within the cup, mug, travel mug, coffee carafe, water bottle or liquid container. In this embodiment the coffee making machine can use a voltage limiter or an amperage limiter or a wattage limiter or can slowly modulate or pulse the power or use pulse width modulation (PWM) (e.g., pulsing of power at a high frequency) to adjust the power level provided by the wireless power transmitter in the coffee making machine to the wireless power receive in the cup, mug, travel mug, carafe, water bottle or liquid container, and thereby adjust the power provided to the one or more heating or cooling elements (e.g., heater coil) of the cup, mug, travel mug, carafe, water bottle or liquid container. In this manner, a specific power level can be provided to the one or more heating or cooling elements in order to heat or cool the liquid holding portion of the cup, mug, travel mug, carafe, water bottle or liquid container to a specific temperature or temperature range (e.g., low, medium, high). This embodiment advantageously allows the user to select a pre-heat temperature or pre-heat temperature range for the cup, mug, travel mug, coffee carafe, water bottle or liquid container directly on the coffee maker machine, and the manufacturing costs for the cup, mug, travel mug, coffee carafe, water bottle or liquid container can be reduced due to the reduced number of components within the cup, mug, travel mug, coffee carafe, water bottle or liquid container. This embodiment can have a user interface on the coffee machine (as described above), or can exclude a user-interface and rely on a factory predetermined temperature or temperature range. In another embodiment, the cup, mug, travel mug, coffee carafe, water bottle or liquid container can have a temperature sensor, a wireless transmitter for transmitting data, one or more heating or cooling elements and a wireless power receiver. In this embodiment, the temperature sensor can transmit sensed temperature information to the coffee maker, so that the coffee maker can regulate the power level that is delivered to the cup, mug, travel mug, coffee carafe, water bottle or liquid container, at least in part based on said sensed information received from the temperature sensor. In this embodiment, the coffee maker machine can regulate power to its wireless power transmitter in order to control the temperature of at least a portion of the liquid receiving portion of the cup, mug, travel mug, coffee carafe, water bottle or liquid container. Although the machine described in the above embodiments is a coffee making machine, the above embodiments can work with a tea making machine, or coffee and tea making machine, or other hot or cold liquid dispensing machines.

As discussed previously, the cup, mug, travel mug, coffee carafe, water bottle or liquid container can have a user-selected temperature set point or mode (e.g., low, medium, high). As discussed herein, such user-selected temperature set point or range can be provided, in one embodiment, via a user interface on the cup, mug, travel mug, coffee carafe, water bottle or liquid container. In one embodiment, the base of the coffee making machine could have a user interface (e.g., temperature set point selector, such as a dial) with which the user could preset the temperature for the cup, mug, travel mug, coffee carafe, water bottle or liquid container that is placed on the base or receiving area. In other embodiments, the cup, mug, travel mug, coffee carafe, water bottle or liquid container can have a preselected temperature set point (e.g., a factory pre-set temperature). In still another embodiment, the cup, mug, travel mug, coffee carafe, water bottle or liquid container need not have a preselected (e.g., at factory) or user selected temperature set point. Rather, the amount of heat provided by the heating or cooling element can be controlled by the amount of amperage, voltage or wattage passed through the induction transmitter. In such an embodiment, the coffee making machine could include a potentiometer that controls the amperage (or voltage or wattage) provided to the base or receiving area of the coffee making machine to set the temperature on the cup, mug or travel mug placed on the receiving area. Although the machine described in the above embodiments is a coffee making machine, the above embodiments can work with a tea making machine, or coffee and tea making machine, or other hot or cold liquid dispensing machines.

Though the wireless power transmitter disclosed above may be described in connection with a cup, mug, travel mug, coffee carafe, water bottle or liquid container, one of skill in the art will recognize that it can also apply to any liquid container, drinkware, dishware or serverware (e.g., bowl, serving dish, hot plate), including the plate 100', 800, 800', 900, 1100, 1300, 1400, bread basket 2200, tortilla warmer 2300, and the scope of disclosure and the invention is understood to cover such liquid containers, drinkware, dishware and serverware.

Wireless Control

In one embodiment, operation of the plate 100, bowl, serving dish, mug 400, travel mug 600, cup, water bottle or liquid container can be controlled wirelessly (e.g., via Wi-Fi, BLUETOOTH®, ZIGBEE™, IR or RF communication). For example, the electronic module 90, 490, 690 can include a communication transceiver (e.g., Wi-Fi, BLUETOOTH®, ZIGBEE™, IR or RF transceiver) that allows the plate 100, bowl, serving dish, mug 400, travel mug 600, cup, water bottle or liquid container to send information to the remote device, as well as to receive information and/or instructions from the remote device. In one embodiment, the plate 100, bowl, serving dish, mug 400, travel mug 600, cup, water bottle or liquid container can have an IP address and be linked to a user via a Wi-Fi network. Accordingly, the plate 100, bowl, serving dish, mug 400, travel mug 600, 1700A, 2000, 2100, 2400, cup, water bottle or liquid container (e.g., beer mug 1600, baby bottle 1500) can connect wirelessly to a cloud (e.g., a cloud-based communication system). In another embodiment, the plate 100, bowl, serving dish, mug 400, travel mug 600, cup, water bottle or liquid container can have a near field communication (NFC) pad, so that a user can use their mobile electronic device to connect to the plate 100, bowl, serving dish, mug 400, travel mug 600, cup, water bottle or liquid container via BLUETOOTH® (e.g., via a BLUETOOTH® link using a BLUETOOTH® chip) or other wireless communication means.

In one embodiment, the remote device can be a wireless remote control. In another embodiment, the remote device can be a mobile electronic device (e.g., smart phone, PDA, tablet computer, laptop, notebook, etc.) that can communicate via the cloud, or that can be paired or synchronized (e.g., via BLUETOOTH®), with the plate 100, bowl, serving dish, mug 400, travel mug 600, cup, water bottle or liquid container (e.g., chilled drinkware, baby bottle). With respect to plates 100, bowls, serving dishes, mugs 400, cups, water bottles or liquid containers, the mobile electronic device can be paired with one of the plates 100, bowls, serving dishes, mugs 400, cups, water bottles or liquid containers to control the operation of that individual plate 100, bowl, serving dish, mug 400, cup, water bottle or liquid container or can be paired with a plurality of plates 100, bowls, serving dishes, mugs 400, cups, water bottles or liquid containers to control the operation of the plurality of plates 100, bowls, serving dishes, mugs 400, cups, water bottles or liquid containers at the same time.

In one embodiment, a mobile application (e.g., an IPHONE™, ANDROID™ BLACKBERRY® or WINDOWS® mobile application) can be installed on the mobile electronic device to allow the mobile electronic device to communicate with the one or more plates 100, bowls, serving dishes, mugs 400, travel mugs 600, cups, water bottles or liquid containers (e.g., via the cloud or via a BLUETOOTH® connection).

The wireless remote control or mobile electronic device can receive operational data from the one or more plates 100, bowls, serving dishes, mugs 400, travel mugs 600, cups, water bottles or liquid containers with which the wireless remote control or mobile electronic device communicates via the cloud or is paired (e.g., via BLUETOOTH®). For example, charge level of the one or more batteries 80, 480, 680; heating/cooling status or temperature of the plate 100 bowl or serving dish or different sections of the plate 100 bowl or serving dish, or of the cup, liquid container, mug 400 or the travel mug 600; ambient temperature; and/or diagnostic information for the heating or cooling system 55, 455, 655 can be communicated to the wireless remote control or mobile electronic device. In one embodiment, the mobile electronic device can receive information from the one or more plates 100, bowls, serving dishes, mugs 400, travel mugs 600, 1700A, 2000, 2100, 2400, cups, water bottles or liquid containers (e.g., via the cloud or via a near field communication system, or via Wi-Fi or via BLUETOOTH®). For example, the mobile electronic device could receive information on how many cups of coffee the user has had throughout the day. Additionally, using the liquid level sensors (discussed above), the mobile electronic device could receive information from the cup, mug 400, travel mug 600, 1700A, 2000, 2100, 2400, water bottle or liquid container on the volume (e.g., ounces) of liquid (e.g., coffee, tea, water, milk, formula, beer, soft drink) that the user has consumed (e.g., on a daily basis, on a weekly basis, on a monthly basis, etc.). Accordingly, the cup, mug 400, travel mug 600, 1700A, 2000, 2100, 2400, water bottle or liquid container could communicate with the cloud to provide information on the coffee, beer, water (etc.) intake of the user, thereby tracking user behavior. The user could use such information to track information about their habits (e.g., times of day that they drink coffee, number of cups of coffee consumed a day, type of coffee drink or tea that they like, etc.). Such information could also be used to limit user intake (e.g., of coffee), by communicating such habit information (e.g., set by the user via the user interface on the cup, mug 400, travel mug 600, 1700A, 2000, 2100, 2400, baby bottle 1500, water bottle or liquid container, or via a mobile application or website, as discussed further herein, or stored on the cloud based on information compiled from the user over, for example a week, a month, etc.) to the user via the cup, mug 400, travel mug 600, 1700A, 2000, 2100, 2400, baby bottle 1500, water bottle or liquid container. For example, the cup, mug or travel mug could activate an alarm (e.g., visual alarm, auditory alarm) to let the user know when the intake limit for coffee has been reached for the day, such drink limit information communicated from the cloud to the cup, mug, baby bottle, travel mug, water bottle or liquid container. Similarly, the chilled drinkware (e.g., beer mug) could activate an alarm (e.g., visual alarm, auditory alarm, etc.) when the number of beers consumed reaches a preselected limit (e.g., chosen by the user, bartender, etc.) via an electronic device (e.g., mobile electronic device, desk top computer, etc.) through the cloud or a near field communication system, or can be selected via a user-interface on the chilled drinkware device (e.g., beer mug 1600).

As discussed above, the information collected by the one or more plates 100, bowls, serving dishes, mugs 400, travel mugs 600, 1700A, 2000, 2100, 2400, cups, baby bottles 1500, water bottles or liquid containers can be sent to a cloud based data collection/storage system that the user can access via a dashboard interface on an electronic device (e.g., a mobile electronic device, a desktop computer, etc.). In one embodiment, the cloud could be local, where the user's mobile phone, PDA, tablet computer, etc., can link to a router and can then be used to send instructions to and receive information from the one or more plates 100, bowls, serving dishes, mugs 400, travel mugs 600, 1700A, 2000, 2100, 2400, cups, baby bottles 1500, water bottles or liquid containers. Accordingly, in one embodiment, the electronic device (e.g., mobile electronic device, desktop computer) could communicate with the one or more plates 100, bowls, serving dishes, mugs 400, travel mugs 600, 1700A, 2000, 2100, 2400, cups, baby bottles 1500, water bottles or liquid containers, without using the internet.

In one embodiment, the information stored on the cloud can be communicated to social networking sites, e.g., by the user, to share information (e.g., progress in reducing coffee intake, or sharing the user's favorite type of coffee or tea drinks, or the user's daily coffee or tea drinking habits, etc.) with the user's social network.

RFID Tag

In one embodiment, the cup, mug, travel mug, water bottle or liquid container can have an RFID tag. In this embodiment, user data can be transmitted via the RFID tag to an RFID reader at a coffee shop, tea shop, coffee café, café, grocery store, food & beverage location, or other retail location. The RFID tag can communicate certain data, such as the user's favorite coffee or tea drink, or the user's drinking habits, or what coffee and/or tea shops the user has visited, or what other retail locations the user has visited, or what temperature the user prefers to keep his or her coffee or tea drink. In another embodiment, the RFID tag can receive information from the retail location (e.g., the RFID tag can receive information on the specific coffee or tea purchased, such as where it was grown, etc.), and such information can be displayed to the user (e.g., via a visual display on the cup, mug, travel mug, carafe, water bottle or liquid container). In another embodiment, the RFID tag within the cup, mug, travel mug, water bottle or liquid container can be used to pay for the beverage, food or merchandise that the user chooses to purchase. In this embodiment, the RFID tag within the cup, mug, travel mug, water bottle or liquid container can communicate with an RFID reader of the coffee shop, tea shop, coffee café, café, grocery store, food & beverage location or other retail location, and can communicate the user's identification information, or account information, or credit card information, or bank account information, or credit account information (e.g. such as a coffee shop credit account or coffee shop pre-paid account, or a credit account or pre-paid account of another suitable type). In this embodiment, the user can use his or her cup, mug, travel mug, water bottle or liquid container to pay for food, beverage or other merchandise. In another embodiment, the RFID tag within the cup, mug, travel mug, water bottle or liquid container can be used as part of a customer loyalty rewards program. As an example, the coffee shop, tea shop, coffee café, grocery store, food & beverage location or other retail location can reward the user a free cup of coffee or tea for every 10 cups of coffee or tea that the user purchases. Each time the user purchases a cup of coffee or tea, the RFID tag can communicate said information to an RFID reader, or the purchasing data can be stored on the RFID tag, or within other data storage circuitry inside the cup, mug, travel mug, water bottle or liquid container, or on a cloud based data storage system, or a local or remote data storage system. Although the example given above states one free cup of coffee or tea for every ten cups of coffee or tea purchased, other rewards programs can be used (e.g. food, beverage, merchandise, rewards points, reward dollars, dollars, currency, etc. can be extended to the customer in exchange for total amount of coffee or tea consumed or purchased by the customer, or certain types of coffee or tea purchased by the customer, or a reward points system, or other beverages purchased, or total amount of dollars spent, or number of times per day, month, or year the customer makes purchases, or any other suitable rewards program can be used). In one embodiment, the reward points, or rewards dollars, or other reward program information can be displayed on the user's cup, mug, travel mug, water bottle or liquid container via a display screen or can be displayed on the user's mobile electronic device, or cell phone, or tablet or on the cloud, or on the user's dashboard, or on a website or on a mobile phone or tablet application, etc. In another embodiment, the RFID tag within the cup, mug, travel mug, water bottle or liquid container can communicate information to an RFID reader within a coffee shop, tea shop, coffee café, café, grocery store, food & beverage location or other retail location for the purposes of accumulating data that can be used to calculate the approximate or exact amount of paper cups or disposable cups not used or number of trees saved, etc. In this embodiment, as an example, when the user uses his or her cup, mug, travel mug, water bottle or liquid container to consume a purchased beverage, a disposable cup has been saved (i.e. not used). This user data can be collected and can be transmitted via the RFID tag and ultimately can be displayed on the user's cup, mug, travel mug, water bottle or liquid container via a display screen or can be displayed on the user's mobile electronic device, or cell phone, or tablet, or on the user's internet dashboard, or on a website or on a mobile phone or tablet application, or on a social media website or app, or on a screen inside or outside the coffee shop, tea shop, coffee café, café, grocery store, food & beverage location or other retail location, etc. (e.g. total number or approximate total number of trees saved, or total number of disposable cups saved or not used, or total carbon footprint offset, or other suitable green or eco initiative information). In this embodiment, the information can be single user information (e.g. how many disposal cups the user has independently saved) or the data collection can be cumulative and can include data from a group of users or all users, etc. (e.g., total number or approximate total number of disposable cups saved, or trees saved, or carbon footprint offset, across all users of said RFID tag enabled cups, mugs, travel mugs, water bottles or liquid containers). In another embodiment, the user's data can be collected and displayed directly on a screen of the user's cup, mug, travel mug, water bottle or liquid container or can be displayed on a screen of the user's mobile phone or mobile electronic device via BLUETOOTH® pairing (e.g. how many disposal cups the user has independently saved or the number of trees saved, or total carbon footprint offset, etc.) and in this embodiment the use of transmitted user data (e.g. RFID tag) would not be necessary. Although the embodiments described in this paragraph use an RFID tag and RFID reader to communicate data, other suitable methods of wireless communication can be used to transmit said data (e.g. the cup, mug, travel mug, water bottle or liquid container can communicate said data via a WiFi connection, or via a BLUETOOTH® radio, or via ZIGBEE™ radio, or via near field communication (NFC), or any other suitable RF, Infrared or ultrasound transmitter or receiver). In one embodiment, multiple stages of communications can lead to the data arriving in a targeted location (e.g. a BLUETOOTH® radio of the cup, mug, travel mug, water bottle or liquid container can transmit certain data to a mobile electronic device (via BLUETOOTH® paring) and the mobile electronic device can relay or transmit said data to the internet via its cellular or WiFi connection to the internet).

In another embodiment, the data described in this paragraph above can be transmitted to the coffee shop, tea shop, coffee café, café, grocery store, food & beverage location or other retail location via a QR code that is displayed on a screen of the user's cup, mug, travel mug, water bottle or liquid container (e.g. the user can pay for beverage, food or merchandise via the use of a QR code that is displayed on a screen of the user's cup, mug, travel mug, water bottle or liquid container, or a user can transmit reward points information, or identification information, or any other information, as outlined in this paragraph above, via a QR code on a screen of the user's cup, mug, travel mug, water bottle or liquid container). In another embodiment, said QR code can be displayed on a mobile phone, or mobile electronic device via a wireless transmission of data from the cup, mug, travel mug, water bottle or liquid container to the user's mobile phone or mobile electronic device. Although the embodiment described in this paragraph utilizes a QR code, in other embodiments another graphic or symbol or barcode can be used instead of a QR code.

In one embodiment, the wireless remote control or mobile electronic device can display the temperature of the liquid that is within the cup, mug 400, travel mug 600, water bottle or liquid container (e.g., sensed by the one or more temperature sensors in the cup, mug 400, travel mug 600, water bottle or liquid container). In one embodiment, the wireless remote control or mobile electronic device can display the liquid level within the cup, mug 400, travel mug 600, water bottle or liquid container (e.g., sensed by the one or more liquid level sensors in the cup, mug 400, travel mug 600, water bottle or liquid container). In another embodiment, the wireless remote control or mobile electronic device can display the temperature of the food that is on the plate 100, 800, 900 or serving dish or the temperature of the food or soup within the bowl (e.g., sensed by the one or more temperature sensors 820A-820D, 920).

The wireless remote control or mobile electronic device can be used by the user to communicate instructions to the one or more plates 100, bowls, serving dishes, mugs 400, travel mugs 600, cups, water bottles or liquid containers with which the wireless remote control or mobile electronic device communicates (e.g., via the cloud) or is paired or associated with (e.g., via BLUETOOTH®, via near field communication system, via WiFi, etc.). For example the user can operate the wireless remote control or mobile electronic device to turn on or off one or more heating or cooling elements 60, 60' in a plate 100, 100', bowl or serving dish, cup, mug, travel mug, water bottle or liquid container or a set of plates 100, 100', bowls or serving dishes, cups, mugs, travel mugs, water bottles or liquid containers (e.g., turn on or off a plurality of heating or cooling elements 60, 60' associated with different sections of the plate 100, 100', bowl or serving dish or set of plates 100, 100', bowl or serving dishes), which would advantageously allow operation of a large number of plates, cups, mugs, serving dishes, etc., at the same time, for example by a catering company; to provide temperature set points for different sections of the plate 100, 100', bowl or serving dish, or cup, mug, travel mug, water bottle or liquid container or plates 100, 100', bowl or serving dishes, or cups, mugs, travel mugs, water bottles or liquid containers; to set times (e.g., for how long one or more of the heating or cooling elements 60, 60' is to operate); or to set limited function mode features, as described further below. However, the wireless remote control or mobile electronic device can be used to provide instructions to the one or more plates 100, bowls, serving dishes, mugs 400, travel mugs 600, cups, water bottles or liquid containers to control any operational parameter (e.g. temperature mode). Such functionality advantageously allows the user to control the one or more plates 100, bowls, serving dishes, mugs 400, travel mugs 600, 1700A, 2000, 2100, 2400, cups, water bottles or liquid containers (e.g., chilled drinkware, such as beer mugs 1600) remotely. For example, if a user left the actively heated or cooled travel mug in his or her car, the user could turn off operation of the travel mug remotely via their smartphone or tablet computer or laptop computer, etc.

Though the wireless communication via the cloud, BLUETOOTH®, WiFi, or near field communication system disclosed above may be described in connection with a mug 400, travel mug 600, 1700A, 2000, 2100, 2400, water bottle or liquid container (such as a beer mug 1600 or baby bottle 1500), one of skill in the art will recognize that it can also apply to any liquid container, drinkware, dishware or serverware (e.g., bowl, serving dish, hot plate), including the plate 100', 800, 800', 900, 1100, 1300, 1400, bread basket 2200, tortilla warmer 2300, and the scope of disclosure and the invention is understood to cover such liquid containers, drinkware, dishware and serverware.

In one embodiment, the one or more plates 100, bowls, serving dishes, mugs 400, travel mugs 600, cups, water bottles or liquid containers can have a color-mixing LED indicator as a visual indicator which can be adjusted to an individual color (e.g., one user's plate can have a pink glowing indicator, another user's plate can have a blue glowing indicator), allowing the users to identify their specific plate 100, bowl, serving dish, mug 400, travel mug 600, cup, water bottle or liquid container paired with their individual remote control or mobile electronic device. In another embodiment, each of the one or more plates 100, bowls, serving dishes, mugs 400, travel mugs 600, cups, water bottles or liquid containers can have a digital readout, allowing each user to have an identifier displayed (e.g., a name, numerical identifier, symbol, unique marking). In another embodiment, the plates 100, bowls, serving dishes, mugs 400, travel mugs 600, cups, water bottles or liquid containers can be sold in a multi-piece set or as individual unique units with a permanent identifier marking (e.g. logo, sticker, number, letter, icon, housing shape, housing color, a colored portion of the housing, glowing colored light, name or any other suitable identifier marking) so that the individual user can pair to their unique plate 100, bowl, serving dish, mug 400, travel mug 600, cup, water bottle or liquid container. In another embodiment, the individually marked plates 100, bowls, serving dishes, mugs 400, travel mugs 600, cups, water bottles or liquid containers can all be controlled together or in groups via a wireless remote or mobile electronic device.

Figure 35:
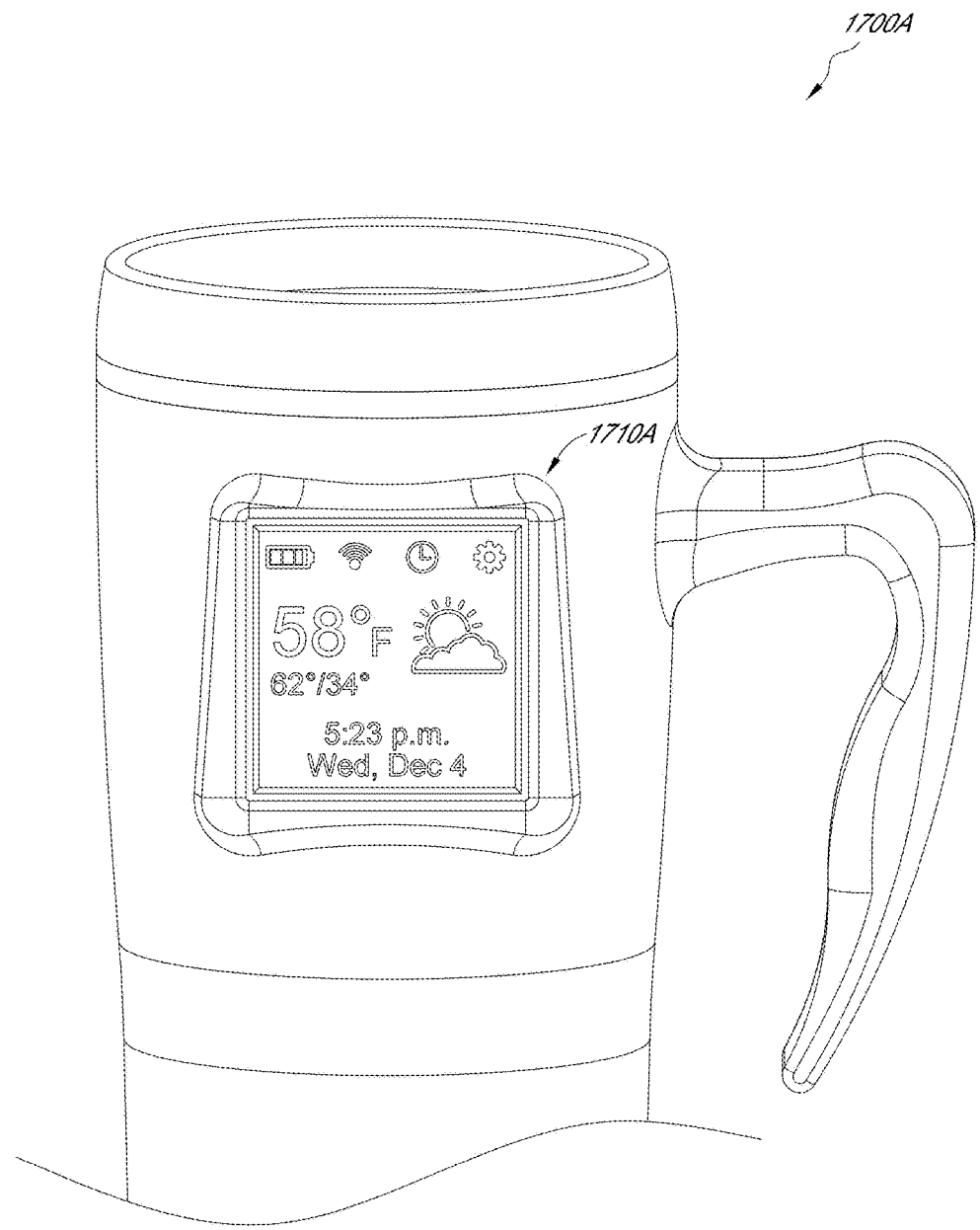
FIG. 35 is a schematic view of a user interface on a travel mug depicting weather information.
Figure 36:
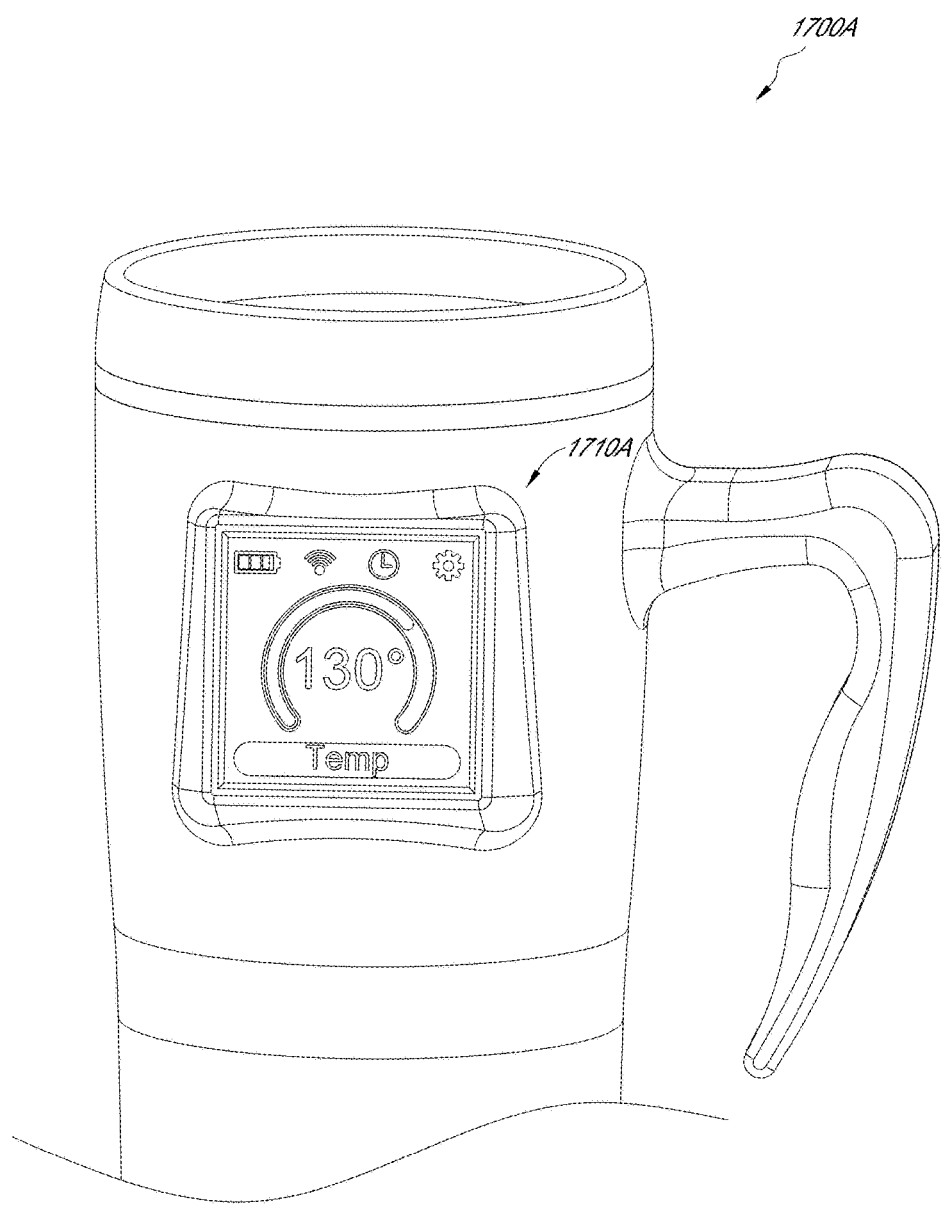
FIG. 36 is a schematic view of a user interface on a travel mug depicting the temperature of the liquid in the travel mug.
Figure 37:
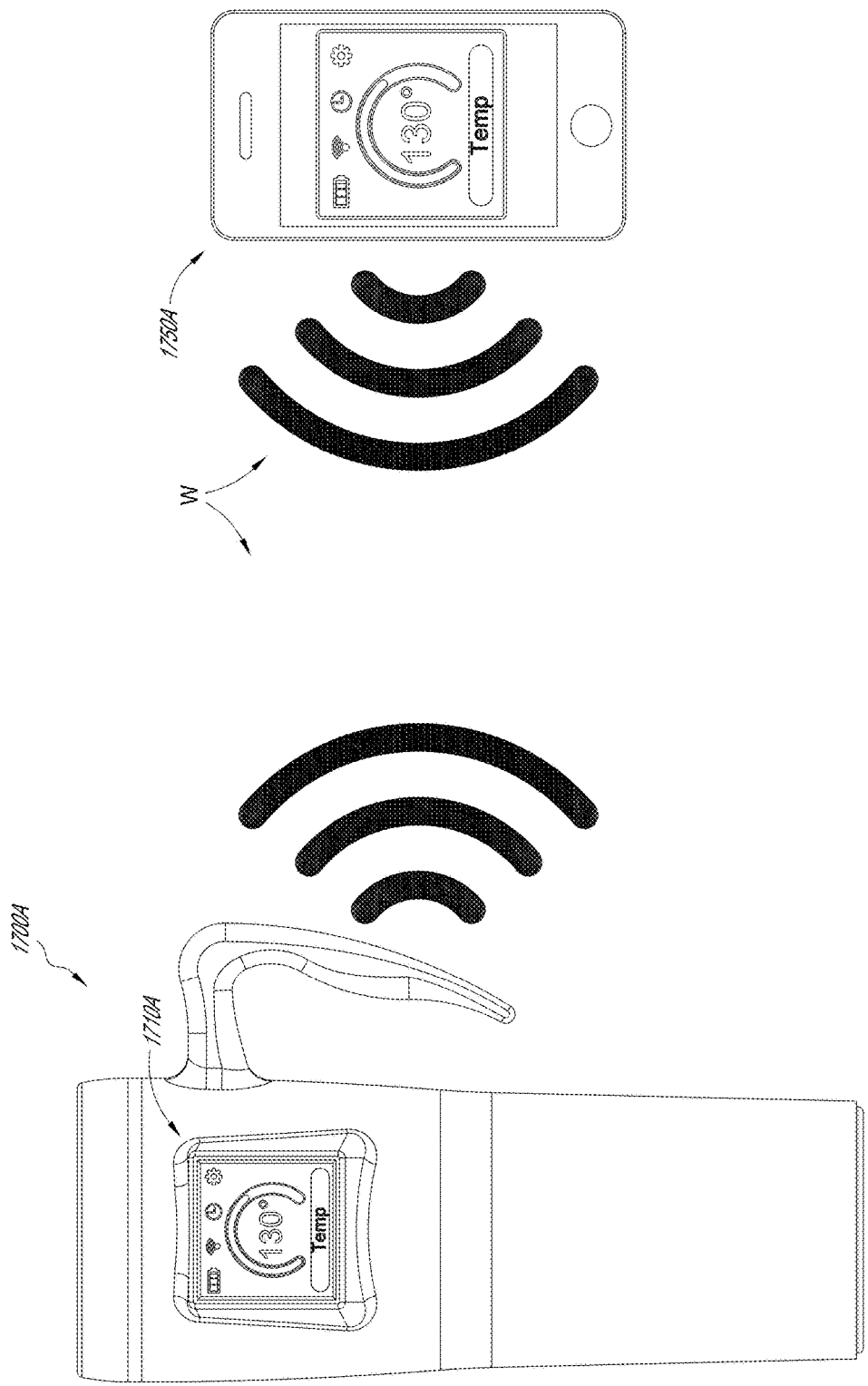
FIG. 37 is a schematic view showing communication between a travel mug and an electronic device (e.g., mobile phone).

As discussed above, the one or more plates 100, bowls, serving dishes, mugs 400, travel mugs 600, cups, water bottles or liquid containers (e.g. beer mugs 1600, coffee carafes, baby bottles 1500) can have a user interface, such as a digital screen, that can display operational information (e.g., temperature, liquid level, battery charge level) as well as information communicated to the one or more plates 100, bowls, serving dishes, mugs 400, travel mugs 600, cups, water bottles or liquid containers (e.g., from the cloud or via BLUETOOTH® from a mobile electronic device). FIGS. 35-37 show one embodiment of a travel mug 1700A with a user interface 1710A. The travel mug 1700A can have a structural arrangement and heating or cooling system similar to the one described herein for the mug 400, travel mug 600, 2000, 2100, 2400. In the illustrated embodiment, the user interface 1710A can be a digital screen (e.g., LCD screen). The user interface 1710A can display operational information (e.g., temperature, liquid level, battery charge level) of the travel mug 1700A (e.g., operational information communicated from the electronic module to the user interface 1710A), and optionally, can also display information communicated wirelessly W to the travel mug 1700A from an electronic device, such as a mobile electronic device 1750A (see FIG. 37) or from the internet via a WiFi connection. As discussed above, in one embodiment, information can be communicated via the cloud. In another embodiment, as illustrated in FIG. 37, the mobile electronic device 1750A can communicate with the travel mug 1700A, as an example via a BLUETOOTH® connection, where the mobile electronic device 1750A can be paired with one or more travel mugs 1700A. In one embodiment, the travel mug 1700A can receive information (e.g., via the cloud, via BLUETOOTH®) such as time, date, financial information (e.g., stock information), weather information such as expected high and low temperature for the day, personal information (e.g., appointments from calendar, birthday reminders, information from social networking sites) and displays the information on the user interface 1710A. In one embodiment, as discussed previously, the user can input instructions via the user interface 1710A (e.g., change beverage temperature set point, change the heating or cooling system setting between, for example, a variety of power modes, a sleep mode, an on mode or an off mode).

In one embodiment, the user interface 1710A (e.g., digital screen) can go into sleep mode, for example, if motion of the travel mug 1700A (or of the plate, cup, mug, baby bottle, water bottle or liquid container with said user interface) is not detected after a certain period of time, in order to preserve energy (e.g., battery power). In on embodiment, the user interface 1710A (e.g., digital screen) can be "woken up" by moving or shaking the travel mug 1700A (or of the plate, cup, mug, bay bottle, water bottle or liquid container with said user interface), which can cause a motion sensor (e.g., gyroscope, tilt sensor, such as those disclosed above) to send a signal to the electronic module to power-on the user interface 1710A. In another embodiment, the user interface 1710A (e.g., digital screen) can be "woken up" via a gesture sensor (as discussed herein), where the user can wave a hand in front of the sensor or near the sensor, which can then send a signal to the electronic module to power-on the user interface 1710A. In other embodiments, sensors other than a gesture sensor can be used to sense a motion by the user, such as a motion sensor, infrared sensor, which can sense motion (e.g., the user approaching the travel mug 1700A, or the plate, cup, mug, baby bottle, water bottle or liquid container, etc.). In still another embodiment, the user interface 1710A (e.g., digital screen) can be "woken up" via a contact sensor that can sense when the user touches the travel mug 1700A (or the plate, cup, mug, baby bottle, water bottle or liquid container, etc.) and communicates a signal to the electronic module to power-on the user interface 1710A. In yet another embodiment, the user interface 1710A (e.g., digital screen) can be "woken up" via a push button switch or other type of switch.

Though the communication with the user interface disclosed above may be described in connection with a travel mug 1700A, one of skill in the art will recognize that it can also apply to any liquid container, drinkware, dishware or serverware (e.g., bowl, serving dish, hot plate), including the plate 100', 800, 800', 900, 1100, 1300, 1400, cup, mug 400, travel mug, 600, 2000, 2100, 2400, beer mug 1600, baby bottle 1500, bread basket 2200, tortilla warmer 2300, and the scope of disclosure and the invention is understood to cover such liquid containers, drinkware, dishware and serverware.

FIG. 37A shows the mug 400 paired with the mobile electronic device 1750. The mobile electronic device 1750 can communicate wirelessly W with the mug 400 to transmit information thereto (e.g., to set the operating temperature of one or more heating and cooling elements HC of the mug 400) and/or to receive information therefrom (e.g., sensed liquid temperature, sensed liquid level, battery charge level). As discussed above, in one embodiment, information can be communicated via the cloud. In another embodiment, as illustrated in FIG. 37, the mobile electronic device 1750A can communicate with the mug 400, as an example via a BLUETOOTH® connection, where the mobile electronic device 1750A can be paired with one or more mugs 400. The mug 400 can have a wireless power receiver, one or more energy storage devices, one or more heating or cooling elements, one or more temperature sensors, control circuitry and a wireless transceiver, as disclosed in embodiments herein. In another embodiment, the transceiver is excluded and the mug 400 can have a user interface to set the temperature at which the heating or cooling elements are to heat the liquid in the mug 400 to. In another embodiment, the transceiver and the user interface can be excluded and the mug 400 can have a factory pre-set temperature or temperature range at which the one or more heating or cooling elements operate at.

In another embodiment, the mug 400 can also have a motion sensor (e.g., vibration sensor, accelerometer, gyro, etc.). While the heating or cooling elements are in operation, if the motion sensor detects no motion of the mug 400 for a predetermined amount of time (e.g., 15 minutes), which can be stored in a memory that communicates with the electronic module of the mug 400, the heating or cooling elements will be turned off (e.g., the electronic module will cease supplying power to the heating or cooling elements). In another embodiment, the automatic turn-off time period can be adjusted by a user (e.g., via a remote mobile device). In another embodiment, sensed movement or motion by the motion sensor can turn on the one or more heating or cooling elements.

In another embodiment, the one or more plates 100, bowls, serving dishes, mugs 400, travel mugs 600, 1700A, 2000, 2100, 2400, cups, water bottles or liquid containers (such as a beer mug 1600 or baby bottle 1500) can have a gesture sensor, which can allow the user to control operation of the plate 100, bowl, serving dish, mug 400, travel mug 600, 1700A, 2000, 2100, 2400, cup, water bottle or liquid container (e.g., beer mug 1600, baby bottle 1500) with one or more gestures (e.g., of the user's face, eyes, arms, hands or fingers).

Though the wireless control disclosed above may be described in connection with a plate 100, mug 400 or travel mug 600, 1700A, 2000, 2100, 2400, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, beer mug 1600 or baby bottle 1500, bread basket 2200, tortilla warmer 2300, and the scope of disclosure and the invention is understood to cover such liquid containers, drinkware, dishware and serverware.

In one embodiment, the one or more plates 100, bowls, serving dishes, mugs 400, travel mugs 600, 1700A, 2000, 2100, 2400, cups, water bottles or liquid containers (e.g., chilled drinkware, baby bottle 1500) can communicate (e.g., via WiFi or ZIGBEE™ or the cloud or BLUETOOTH®, etc.) with one or more electronic devices (e.g., mobile electronic devices such as mobile telephones, PDAs, tablet computers, laptop computers or electronic watch or desktop computers). In one embodiment, the one or more cups, mugs 400, travel mugs 600, 1700A, 2000, 2100, 2400, water bottles or liquid containers (e.g., chilled drinkware such as beer mug 1600, baby bottles 1500) can send an alert (e.g., visual signal, auditory signal, worded message) to the electronic device when the liquid level in the cup, mug 400, travel mug 600, 1700A, water bottle or liquid container reaches a predetermined level or set point (as sensed by the one or more liquid sensors) so that the person with the electronic device (which could be the user or a different person) can know that it's time to replenish the liquid (e.g., water, coffee, tea, beer, alcohol) in the one or more cups, mugs, travel mugs, water bottles or liquid containers (e.g., chilled drinkware, such as beer mugs, baby bottles, etc.). In one example, this can advantageously allow the user or their assistant to replenish the drinks in the one or more cups, mugs, travel mugs, water bottles or liquid containers in an efficient manner and without unduly interrupting the holder of the cup, mug, travel mug, water bottle or liquid container. For example, when used in a boardroom environment, the drinks can be replenished without unduly interrupting a meeting. In another embodiment, where in a bar or restaurant environment, this can advantageously allow the waitress/waiter or barkeep to efficiently replenish drinks without having to constantly monitor the user of the cup, mug, travel mug, water bottle or liquid container to see if they are in need of a refill (e.g., water, soft drink, coffee, tea, alcohol, such as beer, etc.).

In another embodiment, when the liquid level in the one or more cups, mugs, travel mugs, water bottles or liquid containers reaches a predetermined level or set point (as discussed above), an alert can be sent to a mobile electronic device (of the user, of a third person, etc.) and the mobile electronic device can access a navigation application to locate the nearest location (e.g., coffee shop, convenience store, restaurant) where the user can replenish the liquid in their cup, mug, travel mug, water bottle or liquid container.

In one embodiment, discussed above, the one or more cups, mugs, travel mugs, water bottles or liquid containers can be in wireless communication with an automobile or vehicle and the one or more cups, mugs, travel mugs, water bottles or liquid containers (e.g., chilled drinkware, baby bottles) can communicate (e.g., via BLUETOOTH®) with the automobile or vehicle to provide the information discussed in the embodiments above (e.g., volume of liquid left or liquid level, liquid temperature, battery charge level). The automobile's or vehicle's communication system can be used to provide said information to the user via the user interface on the vehicle. In one embodiment, the user can also control the operation of the one or more cups, mugs, travel mugs, water bottles or liquid containers via the vehicle's user interface (e.g., via touch controls or voice activated controls). In one embodiment, when the liquid level within the cup, mug, travel mug, water bottle or liquid container drops below a predetermined level, the vehicle's user interface can provide information on nearby locations (e.g., coffee shops, convenience stores, gas stations, restaurants) where the user can replenish the liquid in the cup, mug, travel mug, water bottle or liquid container.

Though the alert notification based on liquid or food level disclosed above may be described in connection with a cup, mug 400, travel mug 600, 1700A, 2000, 2100, 2400, water bottle or liquid container, one of skill in the art will recognize that it can also apply to any liquid container, drinkware, dishware or serverware (e.g., bowl, serving dish, hot plate), including the plate 100', 800, 800', 900, 1100, 1300, 1400, baby bottle 1500, beer mug 1600, bread basket 2200, tortilla warmer 2300, and the scope of disclosure and the invention is understood to cover such liquid containers, drinkware, dishware and serverware.

Sensing Boldness of Liquid

In one embodiment, the one or more cups, mugs, travel mugs, liquid containers or water bottles (e.g., drinkware or baby bottles) can include one or more quality sensors (such as the sensor LS in FIG. 34E) that can sense a quality of the liquid contained therein, such as the boldness (e.g., of coffee or tea), flavor, acidity, caffeine, calories, sugar, etc. In one embodiment, the one or more quality sensors can be visual sensors, light sensors, ultrasound sensors, pH sensors, chlorine sensors, fluoride sensors, taste sensors, or other suitable types of sensors. In one embodiment, the one or more drink quality sensors can sense the quality (e.g., boldness, flavor, acidity, caffeine, calories, sugar, sodium content, chlorine content, fluoride content, etc.) of the drink and communicate the sensed information to the electronic module, which can communicate the information to the user via a user interface on the cup, mug, travel mug, water bottle or liquid container (e.g., drinkware or baby bottle), or communicate the information wirelessly to an electronic device (e.g., mobile electronic device such as a smart phone, PDA, tablet computer; desk top computer, etc.), either via the cloud, as discussed above, or via a wireless connection (e.g., BLUETOOTH® or WiFi or ZIGBEE™). The drink quality information can be communicated on a display screen or in the form of a verbal message, a text message, a visual message, a meter, a visual signal (e.g., glowing or blinking lights), an auditory signal or other suitable signals. In one embodiment, the one or more quality sensors can be used to communicate boldness information on coffee. In another embodiment, the one or more quality sensors can be used to communicate information to the user when a tea bag steeping process is completed. In another embodiment, the one or more drink quality sensors can be used to determine if milk or formula has gone bad inside of a baby bottle or liquid container and communicate said information to the user. In another embodiment, the one or more drink quality sensors can be used to determine if milk or formula inside of a baby bottle or liquid container is healthy to drink and communicate said information to the user.

Figure 38I:
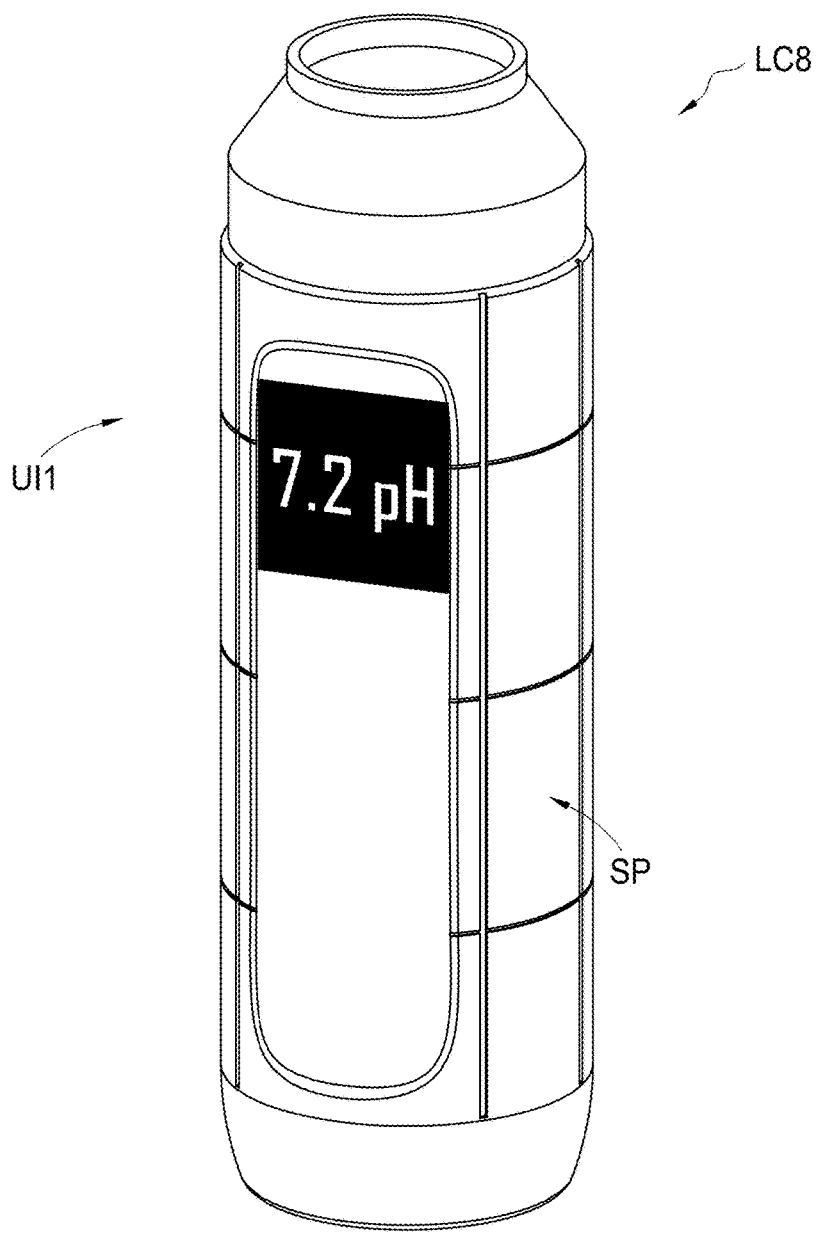
FIG. 38I shows one embodiment of a liquid container with a liquid quality sensor.

FIG. 38I shows one embodiment of a liquid container LC8 (e.g., a cup, mug 400, travel mug 600, 1700A, 2000, 2100, 2400, baby bottle 1500, beer mug 1600, water bottle). The liquid container LC8 can include one or more quality sensors that can sense a quality of the liquid contained therein, such as the boldness (e.g., of coffee or tea), flavor, acidity, caffeine, calories, sugar, etc. In one embodiment, the one or more quality sensors can be visual sensors, light sensors, ultrasound sensors, pH sensors, chlorine sensors, fluoride sensors, taste sensors, or other suitable types of sensors. In one embodiment, the one or more drink quality sensors can sense the quality (e.g., boldness, flavor, acidity, caffeine, calories, sugar, sodium content, chlorine content, fluoride content, etc.) of the drink and communicate the sensed information to the electronic module, which can communicate the information to the user via a user interface UI1 on the cup, mug, travel mug, water bottle or liquid container (e.g., drinkware or baby bottle), or communicate the information wirelessly to an electronic device (e.g., mobile electronic device such as a smart phone, PDA, tablet computer; desk top computer, etc.), either via the cloud, as discussed above, or via a wireless connection (e.g., BLUETOOTH® or WiFi or ZIGBEE™). The drink quality information can be communicated on a display screen UI1 or in the form of a verbal message, a text message, a visual message, a meter, a visual signal (e.g., glowing or blinking lights), an auditory signal or other suitable signals.

In one embodiment, the liquid container LC8 (e.g., water bottle) can have a liquid quality sensor, as discussed above, a wireless power receiver, one or more power storage elements PS, and can exclude a heating or cooling system. In another embodiment, the wireless power receiver can be replaced with a kinetic electricity generator, as discussed further below. In one embodiment, the liquid container LC8 can have one or more solar panels SP on an outside surface thereof for collecting solar energy that can be used to power the one or more quality sensors, visual display, etc.

Though the quality sensor disclosed above may be described in connection with a mug 400, travel mug 600, 1700A, 2000, 2100, 2400, water bottle or liquid container, one of skill in the art will recognize that it can also apply to any liquid container, drinkware, dishware or serverware (e.g., bowl, serving dish, hot plate), including the plate 100', 800, 800', 900, 1100, 1300, 1400, baby bottle 1500, beer mug 1600, bread basket 2200, tortilla warmer 2300, etc. and the scope of disclosure and the invention is understood to cover such liquid containers, drinkware, dishware and serverware.

In one embodiment, the cup, mug, travel mug, water bottle or liquid container can have a timer feature which can be set and or activated by the user or by a third party (e.g. an employee of a coffee shop). Said timer feature can alert the user as to when the tea bag steeping process is complete. The alert can be an audible sound, a notification on a display screen, a notification or audible sound on the user's mobile electronic device or mobile phone, or any other suitable means of notifying the user).

Vacuum Sealed Mug

Figure 39:
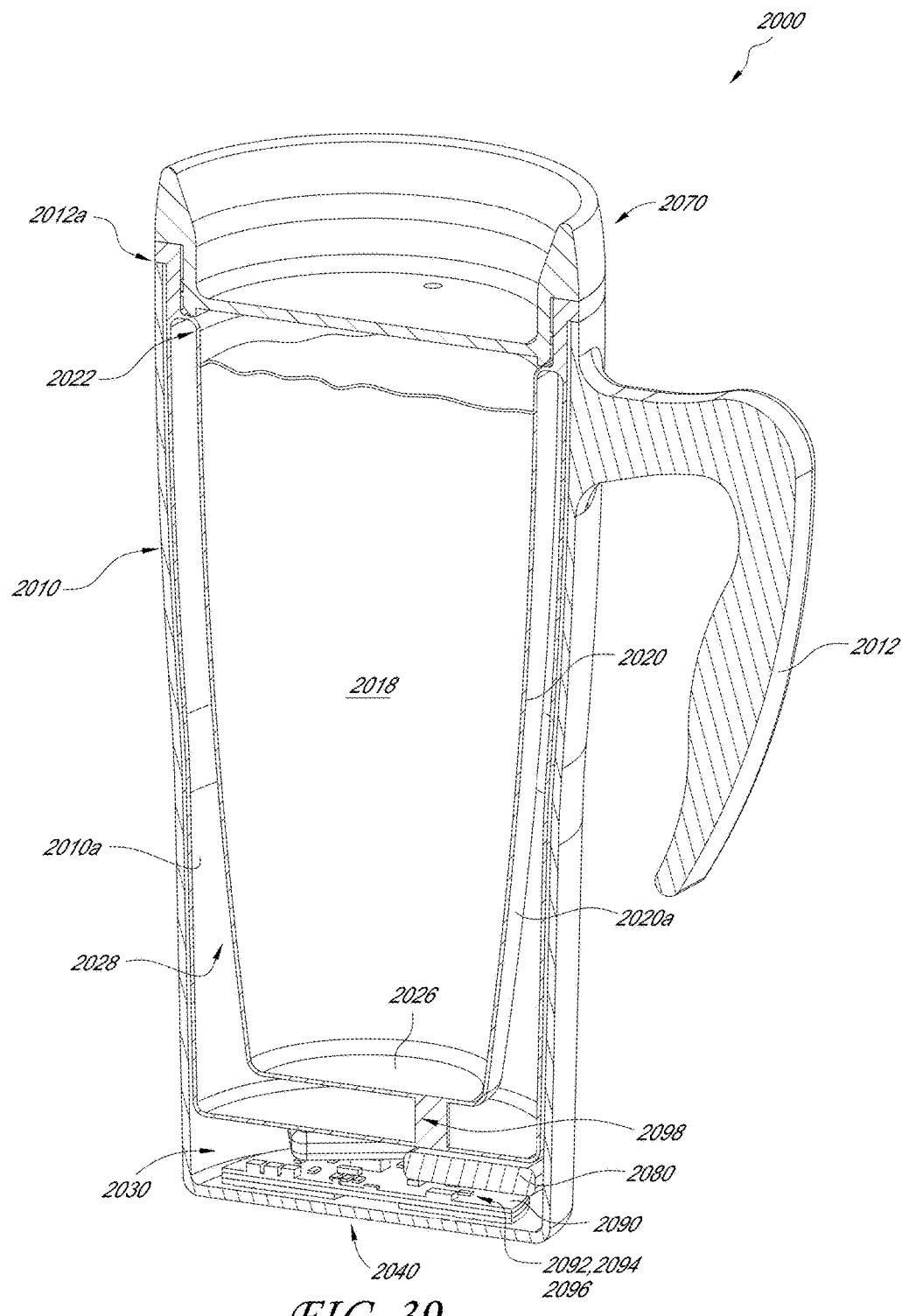
FIG. 39 is a schematic cross-sectional view of one embodiment of a double walled travel mug.

FIG. 39 shows one embodiment of a travel mug 2000, such as a travel coffee mug, that can incorporate some of the same features described above with respect to the mug 400, cup, travel mug 600, 1700A, water bottle or liquid container. In the illustrated embodiment, the travel mug 2000 has an outer circumferential wall 2010, a handle 2012 and a bottom portion 2040, where the bottom portion 2040 can, in one embodiment, be removably attached to the distal end of the outer circumferential wall 2010. In the illustrated embodiment, the travel mug 2000 has an inner circumferential wall 2020 that extends from a proximal portion 2022 to a base 2026. The inner circumferential wall 2020 defines a chamber 2018 (e.g., receiving portion or cavity) for holding a liquid (e.g., coffee, tea). The travel mug 2000 can in on embodiment be sized to fit in a standard diameter cup holder (e.g., in an automobile, theatre). Additionally, the travel mug 2000 can be sized (e.g., have a height) to allow it to fit in a drawer (e.g., top drawer) of a dishwasher rack, such that the travel mug 2000 can be placed upside down in the dishwasher for cleaning in a generally vertical orientation. In one embodiment, the travel mug 2000 can hold about 16 ounces of liquid. However, other liquid containment sizes can be used (e.g., 12 oz., 24 oz., etc.).

The inner circumferential wall 2020 can attach at its proximal portion 2022 to a proximal end 2012a of the outer circumferential wall 2010. The inner circumferential wall 2020 is shaped relative to the outer circumferential wall 2010 so as to define an annular gap 2028 between the inner circumferential wall 2020 and the outer circumferential wall 2010. Additionally, the base 2026 of the inner circumferential wall 2020 is spaced apart from the bottom portion 2040 so as to define a cavity 2030 therebetween, where the cavity 2030 is walled off or separated from the annular gap 2028. A cover 2070 can be removably disposed over the opening in the inner circumferential wall 2020 to substantially seal the top of the cavity or liquid receiving portion 2018.

The travel mug 2000 can have a heating or cooling system 2055, similar to heating or cooling systems discloses herein, such as for the mug 400, travel mug 600, plate 100 (e.g., a system that can have one or more Peltier elements that can operate in heating and cooling modes to selectively provide heating and cooling to the liquid in the travel mug 2000), though for simplicity the heating elements of the heating or cooling system have been excluded from FIG. 39. In one embodiment, the heating or cooling system 2055 can include one or more energy storage devices 2080 and an electronic module 2090, where these components can be arranged and connected in the same manner described above in connection with the heated or cooled plate 100, bowl or serving dish and heated or cooled mug 400, travel mug 600, cup, water bottle or liquid container. One or more heating or cooling elements (not shown) can be disposed adjacent the inner wall 2020 (e.g., along at least a portion of the height of the inner wall 2020), such as in contact with an outer surface 2020a of the inner circumferential wall 2020 to thereby provide heating or cooling to the liquid in the chamber or cavity 2018.

The electronic module 2090 can be attached to the bottom portion 2040 and can include one or more of a wireless power receiver 2092 (e.g., that can receive power from an inductive coupling transmitter in a charging base, such as charging base 700, or a charging pad, such as one embedded in a table as discussed herein), control circuitry 2094 (e.g., controller circuit, microcontroller, etc.) and a charger 2096 (e.g., charging circuit) for charging the one or more energy storage devices 2080. The electronic module 2090 can include a MCU with capacitive sensing and graphic control features. The control circuitry 2094 can operate to manage the power delivered to the one or more heating or cooling elements. The control circuitry 2094 can also be used to manage the charging of the one or more energy storage devices 2080.

In one embodiment, the wireless power receiver 2092 is electrically connected to the battery charger 2096, which is electrically connected to the energy storage devices 2080 that in turn are electrically connected to the heating or cooling elements. In another embodiment, where energy storage devices 2080 are excluded, the wireless power receiver 2092 can be electrically connected to the heating or cooling elements.

In one embodiment, the bottom portion 2040 can be removably attached to the travel mug 2000 to allow access to the heating or cooling system 2055 in the cavity 2030. For example, the bottom portion 2040 can be mechanically coupled to the travel mug 2000, (e.g., with screws, a threaded interface between the bottom portion 640 and travel mug 600, a press-fit connection). The bottom portion 2040 can be removed to allow the replacing of the one or more energy storage devices 2080 and the servicing of the heating or cooling system 2055. In one embodiment, the bottom portion 2040 can be a water resistant lid that can be removably attachable (e.g., threaded on or screwed) to the travel mug 2000, cup, water bottle or liquid container for accessing the heating or cooling system 2055. In another embodiment, the bottom portion 2040 can be a water resistant lid that can be removably attachable (e.g., threaded on or screwed) to the travel mug 2000, cup, water bottle or liquid container for accessing the one or more energy storage devices 2080. In yet another embodiment, the energy storage devices 2080 can be in a pack that is attached (e.g., threaded snap fit, screwed down) onto the bottom or side of the travel mug 2000, where the pack's electrical contacts connect with a set of electrical contacts on the bottom or side of the travel mug 2000, cup, water bottle or liquid container.

With continued reference to FIG. 39, the travel mug 2000 is a double walled unit with the inner wall 2020 and the outer wall 2010. In one embodiment, the travel mug 2000 can be vacuum sealed, such that a vacuum exists in the gap 2028. In another embodiment, the travel mug 2000 need not be vacuum sealed, but can have the double wall structure separated by the gap 2028. In the illustrated embodiment, one or more spacers 2098 interconnects the base 2026 of the inner wall 2020 and the inner surface 2010a of the outer wall 2010. In one embodiment, the one or more spacers 2098 can be of a thermally conductive material (e.g., aluminum, copper). The one or more spacers 2098 can advantageously provide a thermal bridge to transfer heat from the cavity 2018 to the outer wall 2010a. In one embodiment, the inner wall 2020 and surface 2010a are part of a single piece (e.g., monolithic piece) that can be inserted into the body of the travel mug 2000.

A temperature sensor (e.g., thermistor, thermostat) can be connected to the outer wall 2010a and can be in thermal communication with the one or more spacers 2098 to thereby provide a temperature reading of the temperature in the cavity 2018. The temperature sensor can communicate with the electronic module 2090, which can communicate the sensed temperature information as discussed herein (e.g., communicate it to a user interface of the travel mug 2000, communicate it to an electronic device, such as a mobile electronic device, via the cloud or a near field communication system). This embodiment advantageously allows obtaining of temperature information from the cavity 2018 in a double walled travel mug 2000 (e.g., a vacuum sealed mug) without the need to extend wiring through a vacuum chamber in the gap 2028.

In another embodiment, the one or more spacers 2098 can alternatively (or additionally) serve as a sound bridge and allow the sensing of liquid volume or level within the cavity 2018. For example, a sound generator (e.g., an ultrasound generator) can be coupled to the outer wall 2010 adjacent one of the one or more spacers 2098 and generate a signal (e.g., a vibration signal) that can be communicated into the liquid in the cavity 2018 via the spacer 2098. A microphone (e.g., an ultrasound microphone) can be coupled to the outer wall 2010 adjacent another of the one or more spacers 2098 and communicate a signal to the electronic module 2090, which could determine a volume (or level) of liquid in the cavity 2018 based on a comparison of the frequency of the signal generated by the sound generator and the frequency received by the microphone. In another embodiment an ultrasound sensor can be used where the speaker and microphone are part of one sensor device, and that sensor device can be coupled to an outer wall of the vacuum sealed chamber, in close proximity to or in audible communication with the spacer 2098.

In another embodiment, where the spacer 2098 is excluded, a temperature sensor (e.g., thermistor, thermostat), or ultrasound sensor, can be coupled to the outer surface of the base 2026 and one or more wires run through the outer wall 2010 with an air-tight seal (if the travel mug is vacuum sealed) or non-airtight seal (if the travel mug is not vacuum sealed) between the dual wall unit to thereby provide temperature and/or liquid level or volume information from the cavity 2018 to the electronic module 2090.

Figure 40:
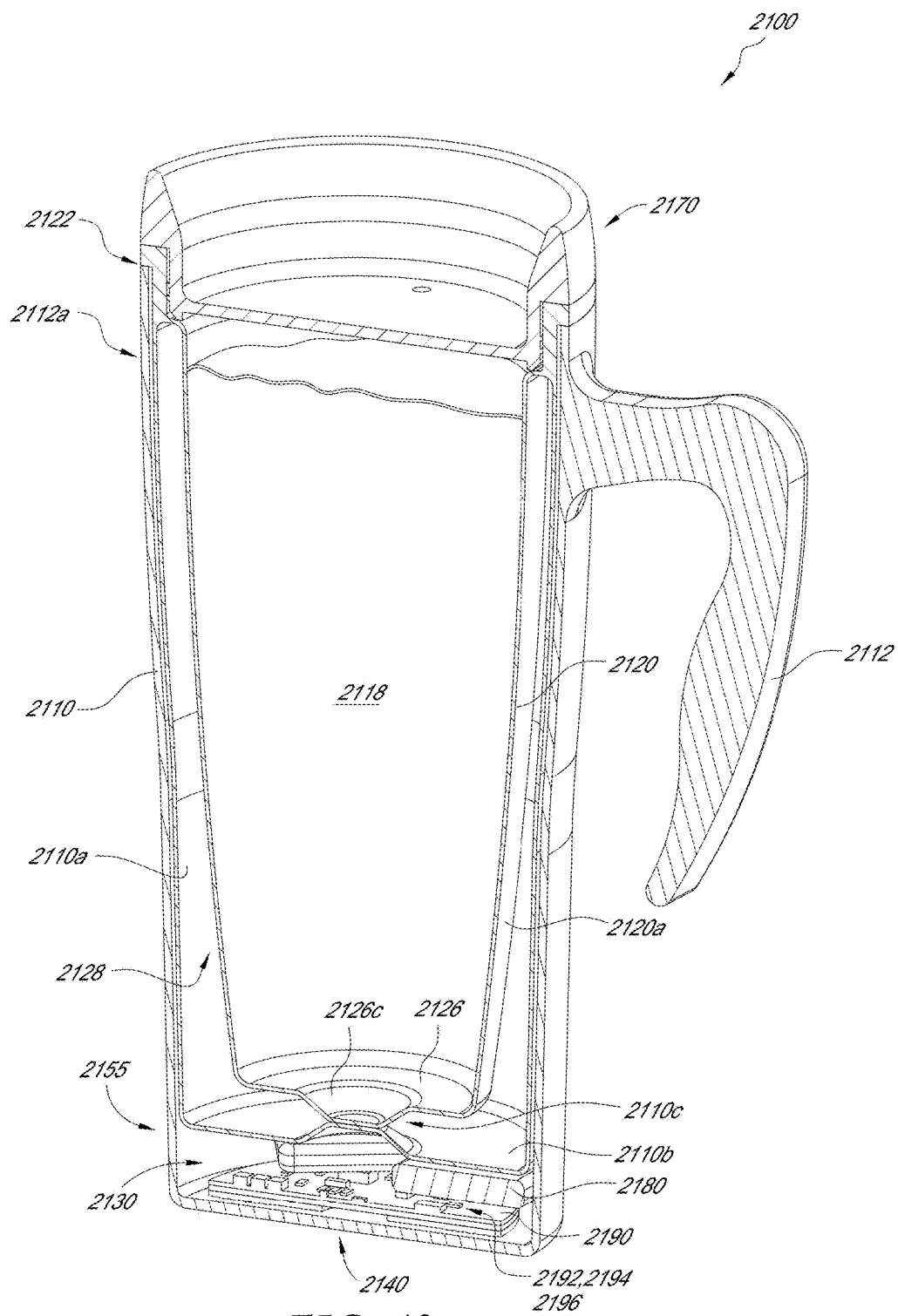
FIG. 40 is a schematic cross-sectional view of another embodiment of a double-walled travel mug.

FIG. 40 shows another embodiment of a travel mug 2100. The travel mug 2100 is similar to the travel mug 2000 and can include many of the same features. As such, similar features in the travel mug 2100 and travel mug 2000 have similar numerical identifiers, except that the identifier for the feature in the travel mug 2100 is prefaced by "21" instead of "20". The description below therefore focuses on the features of the travel mug 2100 that differ from the travel mug 2000.

The travel mug 2100 can be a double walled unit with an inner wall 2120 and an outer wall 2110. The base 2126 of the inner wall 2120 can have one or more portions 2126c that can contact one or more portions 2110c of a base 2110b of the outer wall 2110. A temperature sensor (e.g., thermistor, thermostat) can be connected to the one or more portions 2110c of the base 2110b to thereby provide a temperature reading of the temperature in the cavity 2118. The temperature sensor can communicate with the electronic module 2190, which can communicate the sensed temperature information as discussed herein (e.g., communicate it to a user interface of the travel mug 2100, communicate it to an electronic device, such as a mobile electronic device, via the cloud or a BLUETOOTH® connection). This embodiment advantageously allows obtaining of temperature information from the cavity 2118 in a double walled travel mug 2100 (e.g., a vacuum sealed mug) without the need to extend wiring through a vacuum chamber in the gap 2128 and without the use of a spacer between the inner wall 2120 and the outer wall 2110a. In one embodiment, the inner wall 2120 and surface 2110a are part of a single piece (e.g., monolithic piece) that can be inserted into the body of the travel mug 2100.

In another embodiment, the contact between the one or more portions 2126c of the inner wall 2100 and one or more portions 2110c of the outer wall 2110 can alternatively (or additionally) serve as a sound bridge and allow the sensing of liquid volume or level within the cavity 2118. For example, a sound generator (e.g., an ultrasound generator) can be coupled to the outer surface of the outer wall 2110c adjacent one of said contacting one or more portions 2126c of the inner wall 2126 and one or more portions 2110c of the outer wall 2110b and generate a signal (e.g., a vibration signal) that can be communicated into the liquid in the cavity 2118. A microphone (e.g., an ultrasound microphone) can be coupled to an outer surface of the outer wall 2110c adjacent another of said contacting one or more portions 2126c of the inner wall 2126 and one or more portions 2110c of the outer wall 2110b and communicate a signal to the electronic module 2190, which could determine a volume (or level) of liquid in the cavity 2118 based on a comparison of the frequency of the signal generated by the sound generator and the frequency received by the microphone.

In still another option, not shown, the one or more portions 2126c can have an opening defined by an edge that can be coupled (e.g., welded) to the one or more portions 2110c of the outer wall 2110b such that the temperature or liquid volume/level sensors can be attached to an outer surface of the outer wall 2110b and so their signals need only pass through the single wall.

Though the temperature and/or liquid sensing disclosed above may be described in connection with a travel mug 2000, 2100, one of skill in the art will recognize that it can also apply to any liquid container, drinkware, dishware or serverware (e.g., bowl, serving dish, hot plate), including the plate 100', 800, 800', 900, 1100, 1300, 1400, cup, mug 400, travel mug 600, 1700A, 2400, beer mug 1600, baby bottle 1500, bread basket 2200, tortilla warmer 2300, etc. and the scope of disclosure and the invention is understood to cover such liquid containers, drinkware, dishware and serverware.

Bread Basket

Figure 41:
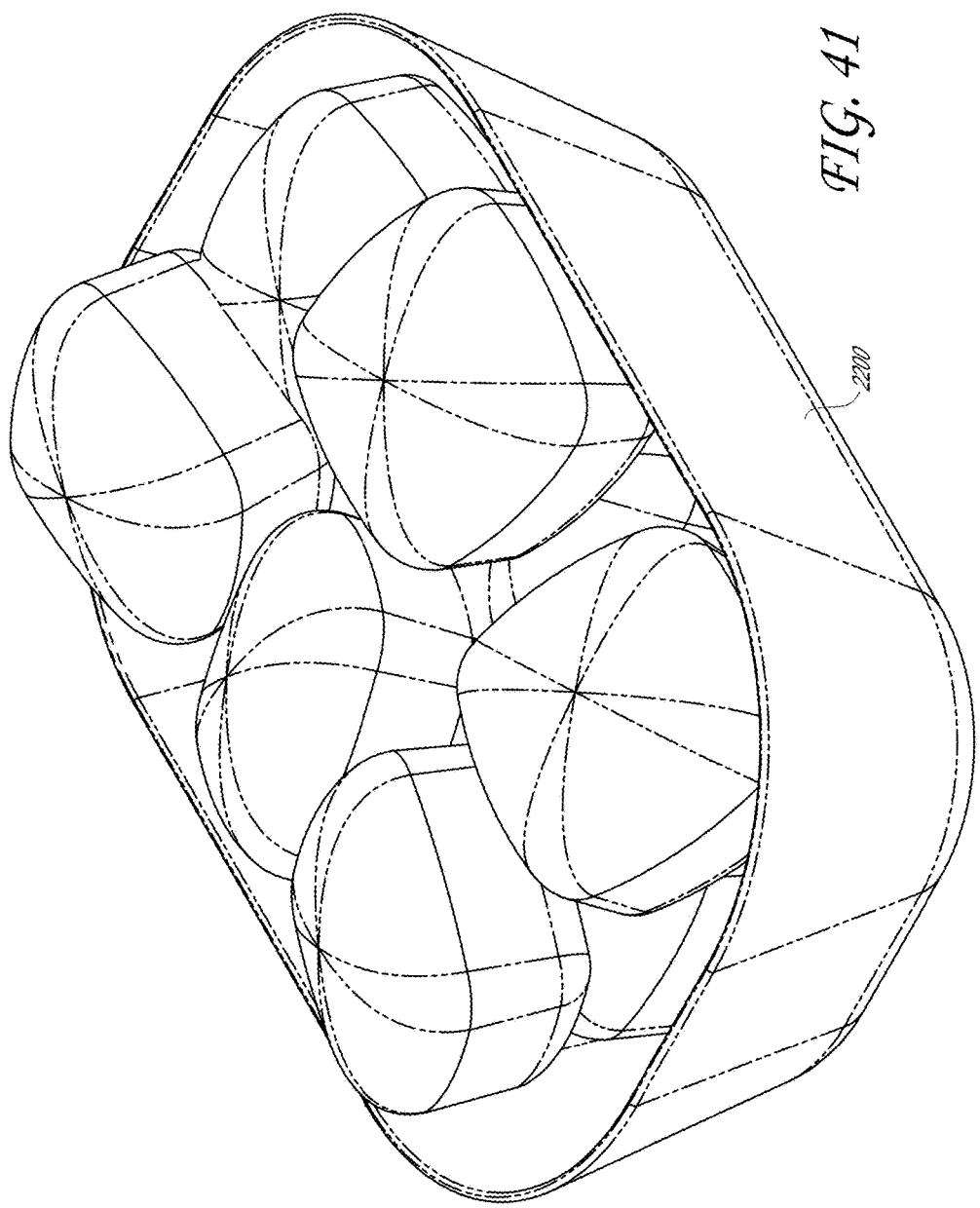
FIG. 41 is a schematic view of an actively heated bread basket.

FIG. 41 shows a bread basket 2200 that can include many of the features discussed above with respect to the plate 100, bowl, serving dishes, mugs 400, travel mugs 600, 1700A, 2000, 2100. In particular, the bread basket 2200 or bread warmer device can include a heating system (not shown), which can include one or more heating elements, an electronic module (including a wireless power receiver, control circuitry and/or charging circuitry), and one or more sensors to sense operating parameters of the heating system and the temperature of the bread basket. In one embodiment, the bread basket or bread warmer can have a heating system (e.g. one or more heating elements), one or more power storage elements (e.g. battery or capacitor) and a thermostat circuit (or can exclude a thermostat circuit). In this embodiment, the one or more power storage elements within the bread basket or bread warmer can be charged via inductive coupling, or other wireless power configurations, or via electrical contacts on the bread basket or bread warmer, or via a connection cable, or the one or more power storage elements can be removable and charged on a charging station. In another embodiment, the power storage elements can be excluded. In this embodiment, the bread warmer or bread basket can receive power via wireless power or via electrical contacts or a connection cable and can use said power to activate one or more heating elements within the bread warmer or bread basket. This embodiment can be used to pre-heat the bread basket or bread warmer, or the electrical connection can be maintained and the bread basket or bread warmer can stay actively heated while the bread is being served. A thermostat circuit can also be used, optionally, within this embodiment. The operation of the heating system in the bread basket 2200 or bread warmer can be similar to that disclosed herein for other embodiments (e.g., the plate 100; bowl; serving dish; mugs 400; travel mugs 600, 1700A, 2000, 2100; beer mug 1600, etc.).

Tortilla Warmer

Figure 42:
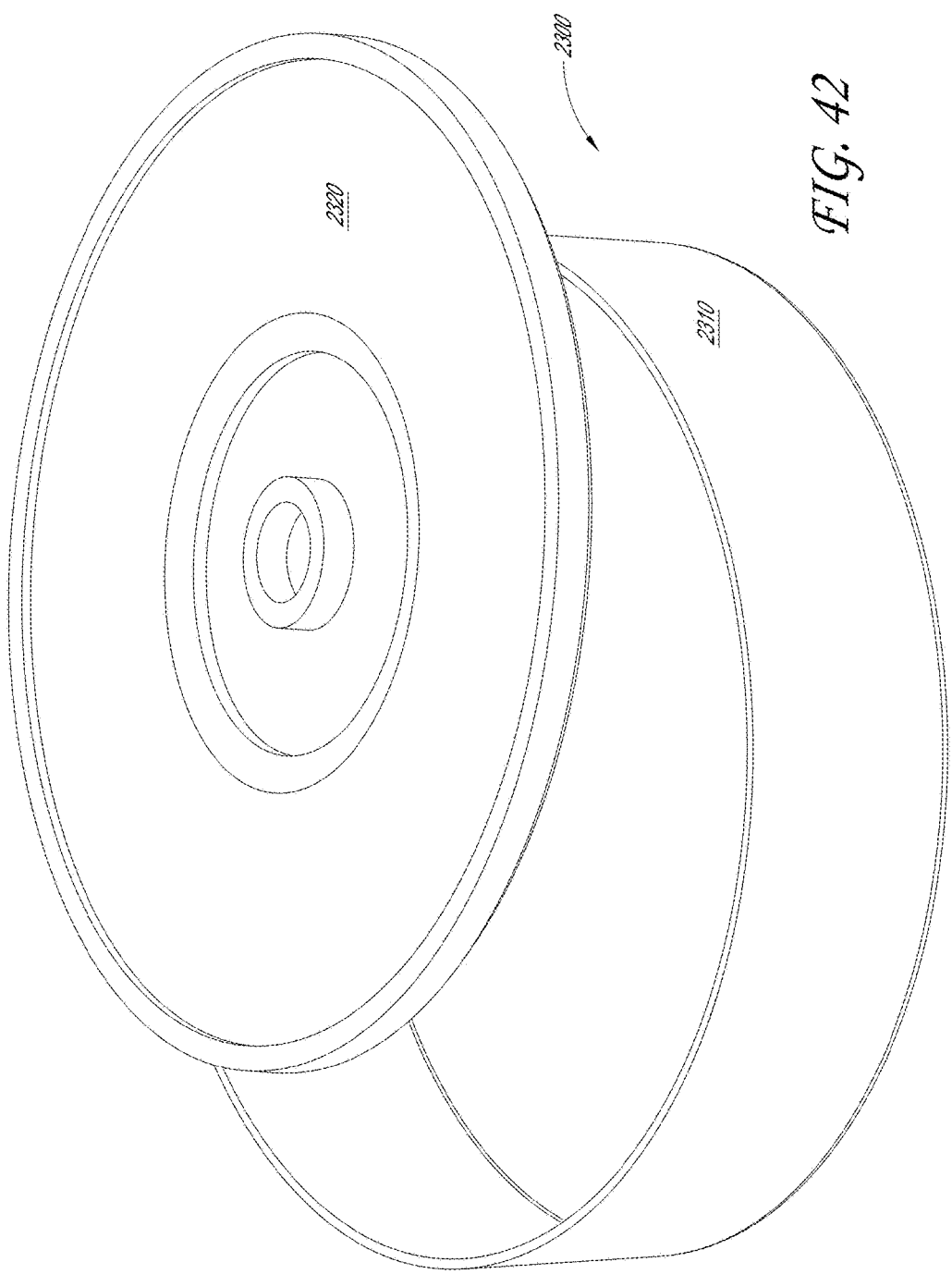
FIG. 42 is a schematic view of an actively heated tortilla warmer.

FIG. 42 shows a tortilla warmer 2300 that can have a container 2310 and a cover 2320 and can include many of the features discussed above with respect to the plate 100, bowl, serving dishes, mugs 400, travel mugs 600, 1700A, 2000, 2100. In particular, the tortilla warmer 2300 can include a heating system (not shown), which can include one or more heating elements, an electronic module (including a wireless power receiver, control circuitry and/or charging circuitry), and one or more sensors to sense operating parameters of the heating system and the temperature of the tortilla warmer. In one embodiment, the tortilla warmer can have a heating system (e.g. one or more heating elements), one or more power storage elements (e.g. battery or capacitor) and a thermostat circuit (or can exclude a thermostat circuit). In this embodiment, the one or more power storage elements within the tortilla warmer can be charged via inductive coupling, or other wireless power configurations, or via electrical contacts on the tortilla warmer, or via a connection cable, or the one or more power storage elements can be removable and charged on a charging station. In another embodiment, the power storage elements can be excluded. In this embodiment, the tortilla warmer can receive power via wireless power or via electrical contacts or a connection cable and can use said power to activate one or more heating elements within the tortilla warmer. This embodiment can be used to pre-heat the tortilla warmer, or the electrical connection can be maintained and the tortilla warmer can stay actively heated while the tortillas are being served. A thermostat circuit can also be used, optionally, within this embodiment. The operation of the heating system in the tortilla warmer 2300 can be similar to that disclosed herein for other embodiments (e.g., the plate 100; bowl; serving dish; mugs 400; travel mugs 600, 1700A, 2000, 2100; beer mug 1600, etc.).

Electric Hand Warmer

Figure 43:
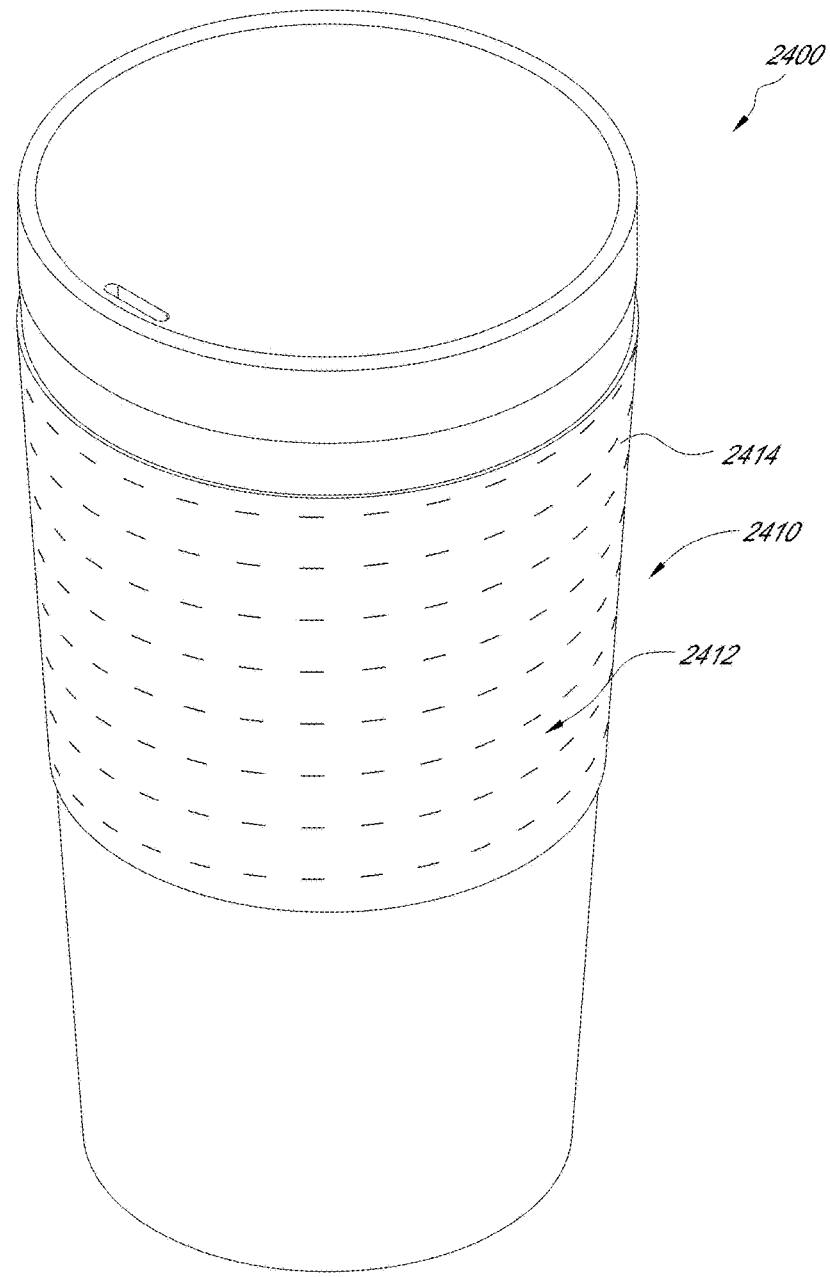
FIG. 43 is a schematic view of a mug (e.g., travel mug) with an electric hand warmer.

FIG. 43 shows one embodiment of a mug 2400 with an electric hand warmer 2410. The mug 2400 can have some or all of the same features as discussed above for the mug 400, or travel mug 600, 1700A, 2100, 2200, including a heating or cooling system with one or more heating or cooling elements, an electronic module (with a wireless power receiver, control circuitry, and optionally charging circuitry), and optionally one or more power storage devices (e.g., batteries, capacitors). In the illustrated embodiment, the hand warmer 2410 can have one or more heating elements 2412 on an outer surface 2414 of the mug 2400 or a handle (not shown) of the mug 2400, where the one or more heating elements 2412 (e.g., heater wire, thermoelectric elements, resistive heaters, etc.) can be activated (e.g., selectively activated or automatically activated) to warm an outer surface 2414 of the mug 2400, so that the user's hands can be warmed as the user holds the mug 2400. The one or more heating elements 2412 can in one embodiment be distributed around a portion of the outside circumference of the mug 2400 and attached to, coupled to, embedded in or otherwise incorporated in an outer surface 2414 of the mug 2400 (e.g., disposed beneath an outer layer of the mug 2400). In another embodiment, the one or more heating elements can be elsewhere within the mug or travel mug and can be in thermal communication with an outer surface 2410 of the mug or travel mug (e.g. the heat energy can be conducted to the outer surface from a heat source located anywhere within the mug or travel mug).

In one embodiment, the heat generated from the heating or cooling system within the mug (i.e. the heating or cooling system that actively heats or cools the liquid within the mug or travel mug) can be used to conduct heat to a hand warmer feature (e.g. the heat energy from the heating or cooling system can be conducted to an outer surface 2410 of the mug or travel mug and act as a hand warmer feature). The hand warmer 2410 can in one embodiment be automatically activated (e.g., via the control circuitry of the mug 2400) when the mug 2400 is used, such as when a liquid is poured into the mug 2400 (e.g., when the presence of liquid is sensed, as discussed in embodiments herein). In another embodiment, the hand warmer 2410 can be selectively actuated (e.g., turned on, off, or to selected temperature set points such as high, medium, low, or a specific temperature) by the user via a user interface (such as the user interface 695, 1710A) on the mug 2400, which communicates the user's instructions to the control circuitry of the mug 2400. In still another embodiment, the hand warmer 2410 can be selectively actuated (e.g., turned on, off, or to selected temperature set points such as high, medium, low, or a specific temperature) by the user via a user interface on an electronic device (e.g., mobile electronic device such as the mobile phone 1750A) that communicates with the mug 2400 (e.g., communicates with the control circuitry of the mug 2400) via the cloud or a BLUETOOTH® connection. In yet another embodiment, a temperature sensor on the mug 2400 (e.g., on an outer surface of the mug 2400) can sense the ambient temperature and actuate (e.g., automatically actuate via the control circuitry) the hand warmer 2410 if the sensed ambient temperature is below a predetermined set point or range. In one embodiment, operation of the hand warmer 2410 can be powered by one or more power storage devices (e.g., batteries, capacitors, etc.). In one embodiment, a mug or travel mug can have an electric hand warmer feature, one or more power storage elements (to power the hand warmer) and control circuitry (to turn on or off the hand warmer, or to control certain preset temperature set points, etc.). In this embodiment, a user interface can optionally be included, which can allow the user to select certain hand warmer operation modes, or temperature modes, or other settings that effect the operation of the hand warmer feature.

Though the electric hand warmer disclosed above may be described in connection with a mug 2400, one of skill in the art will recognize that it can also apply to any liquid container, drinkware, dishware or serverware (e.g., bowl, serving dish, hot plate), including the plate 100', 800, 800', 900, 1100, 1300, 1400, mug 400, travel mug 600, 1700A, 2000, 2100, 2400, beer mug 1600, baby bottle 1500, bread basket 2200, tortilla warmer 2300, and the scope of disclosure and the invention is understood to cover such liquid containers, drinkware, dishware and serverware.

Chilled Dishware

In one embodiment, a cup, mug, travel mug, beer mug, beverage container or other liquid container (such as the mug 400, travel mug 600, 1700A, 2000, 2100, 2400, beer mug 1600) can have one or more thermoelectric elements configured to cool the liquid within the cup, mug, travel mug, beer mug, beverage container or other liquid container, one or more heat sinks thermally coupled to said one or more thermoelectric elements, and an active cooling device (such as a fan, diaphragm, etc.) which can move air across said one or more heat sinks. This airflow can advantageously increase the productivity of the one or more thermoelectric elements and can create a colder beverage temperature within the cup, mug, travel mug, beer mug, beverage container or other liquid container. In one embodiment, the cooling fan can be a water resistant or water proof cooling fan and air flow can be ducted to the location of the heat sink. The use of a waterproof or water resistant cooling fan can enable the creation of a dishwasher safe or water safe cup, mug, travel mug, beer mug, beverage container or other liquid container. In another embodiment, a water resistant or water proof diaphragm can be used to create said airflow. The cup, mug, travel mug, beer mug, beverage container or other liquid container described in this paragraph can include any of the features described above or below of the plate 100; bowl; serving dish; mug 400; travel mug 600, 1700A, 2000, 2100; beer mug 1600, etc. (e.g. power storage elements, wireless communications, wireless power, user-interface, electronics module, etc.).

Wand

Figure 19:
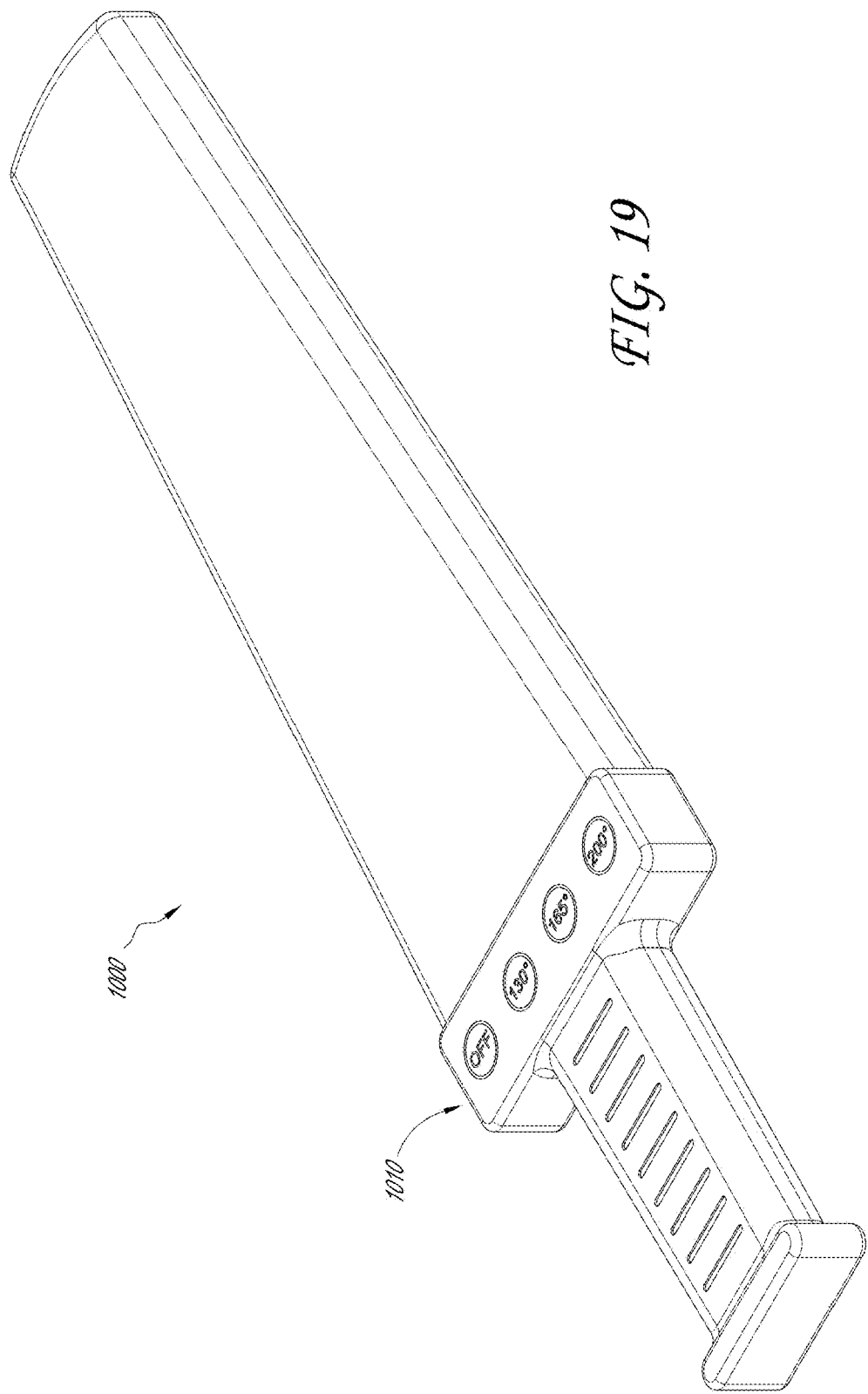
FIG. 19 is a schematic perspective view of one embodiment of a wand for use with a heated or cooled plate, bowl, serving dish, mug, cup, travel mug, water bottle or liquid container.

In one embodiment, the one or more plates 100, bowls, serving dishes, mugs 400, travel mugs 600, cups, water bottles or liquid containers can be actuated with a wand 1000 (see FIG. 19) that can be waived over one or more of the plates 100, bowls, serving dishes, mugs 400, travel mugs 600, cups, water bottles or liquid containers to turn the heating or cooling element 60, 460, 660 on or off, or to set a desired temperature or turn on or off other features For example, when a plurality of plates 100 (or bowls, serving dishes, mugs 400, travel mugs 600, cups, water bottles or liquid containers) are laid out and arranged on a counter (e.g., kitchen counter) or a table, the wand 1000 can be passed over the plates 100 (or bowls, serving dishes, mugs 400, travel mugs 600, cups, water bottles or liquid containers) to turn the heating or cooling element 60, 460, 660 on or off, or to set an operating parameter of the one or more plates 100 (or bowls, serving dishes, mugs 400, travel mugs 600, cups, water bottles or liquid containers), as described below. The one or more plates 100, bowls, serving dishes, mugs 400, travel mugs 600, cups, water bottles or liquid containers can have a receiver (e.g., an RF receiver) that can receive a signal (e.g., RF signal) from the wand 1000 as the wand 1000 passes over them. In another embodiment, the wand 1000 can transmit at a certain frequency, or using a magnet or magnetic field that changes a state in the electronics of the one or more plates 100, bowls, serving dishes, mugs 400, travel mugs 600, cups, water bottles or liquid containers that can, for example, communicate instructions to the one or more plates 100, bowls, serving dishes, mugs 400, travel mugs 600, cups, water bottles or liquid containers (e.g., via the electric module 90, 490, 690) to turn on. In one embodiment, the wand 1000 and one or more plates 100, bowls, serving dishes, mugs 400, travel mugs 600, cups, water bottles or liquid containers can form an inductive loop that when the wand gets close to the plates 100, bowls, serving dishes, mugs 400, travel mugs 600, cups, water bottles or liquid containers (e.g., within 3-6 inches, or less than 3 inches, or more than 6 inches), the inductive loop being charged (e.g., RFID passive loop sensing). The RFID loop in the one or more plates 100, bowls, serving dishes, mugs 400, travel mugs 600, cups, water bottles or liquid containers can be energized when the wand 1000 passes over it, changing the state of the electronics from a first state to a second state to turn the one or more plates 100, bowls, serving dishes, mugs 400, travel mugs 600, cups, water bottles or liquid containers on, or to turn on a wireless receiver which can then receive a signal from the wand 1000 with a given command (e.g. temperature mode setting, etc.).

In another embodiment, the wand 1000 can be used to communicate operational information or instructions to the one or more plates 100, bowls, serving dishes, mugs 400, travel mugs 600, cups, water bottles or liquid containers. For example, the wand 1000 can be used to communicate one or more predetermined temperature set points or power settings. For example, the wand 1000 can have a user interface 1010 allowing the user to select a predetermined temperature set point or power setting and to communicate the information to the one or more plates 100, bowls, serving dishes, mugs 400, travel mugs 600, cups, water bottles or liquid containers as the wand 1000 is waved over them. Additionally, the wand 1000 can be used to turn on or off limited function modes (as described further below) on one or more of the plates 100, bowls, serving dishes, mugs 400, travel mugs 600, cups, water bottles or liquid containers. More generally, the wand 1000 can perform a data upload to, and/or data download from, the one or more plates 100, bowls, serving dishes, mugs 400, travel mugs 600, cups, water bottles or liquid containers.

In one embodiment, the wand 1000 can transmit an RF signal at a certain frequency to transmit instructions to the one or more plates 100, bowls, serving dishes, mugs 400, travel mugs 600, cups, water bottles or liquid containers. In other embodiments, the wand 1000 can transmit in other frequencies to the one or more plates 100, bowls, serving dishes, mugs 400, travel mugs 600, cups, water bottles or liquid containers.

In another embodiment, the wand 1000 can communicate with the one or more plates 100, bowls, serving dishes, mugs 400, travel mugs 600, cups, water bottles or liquid containers via IR or other types of optical transmission.

Though the wand 1000 disclosed above may be described in connection with a plate 100, mug 400 or travel mug 600, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, travel mug 1700A, 2000, 2100, 2400, beer mug 1600, baby bottle 1500, bread basket 2200, tortilla warmer 2300, etc. and the scope of disclosure and the invention is understood to cover such liquid containers, drinkware, dishware and serverware.

User Interface

Figure 20:
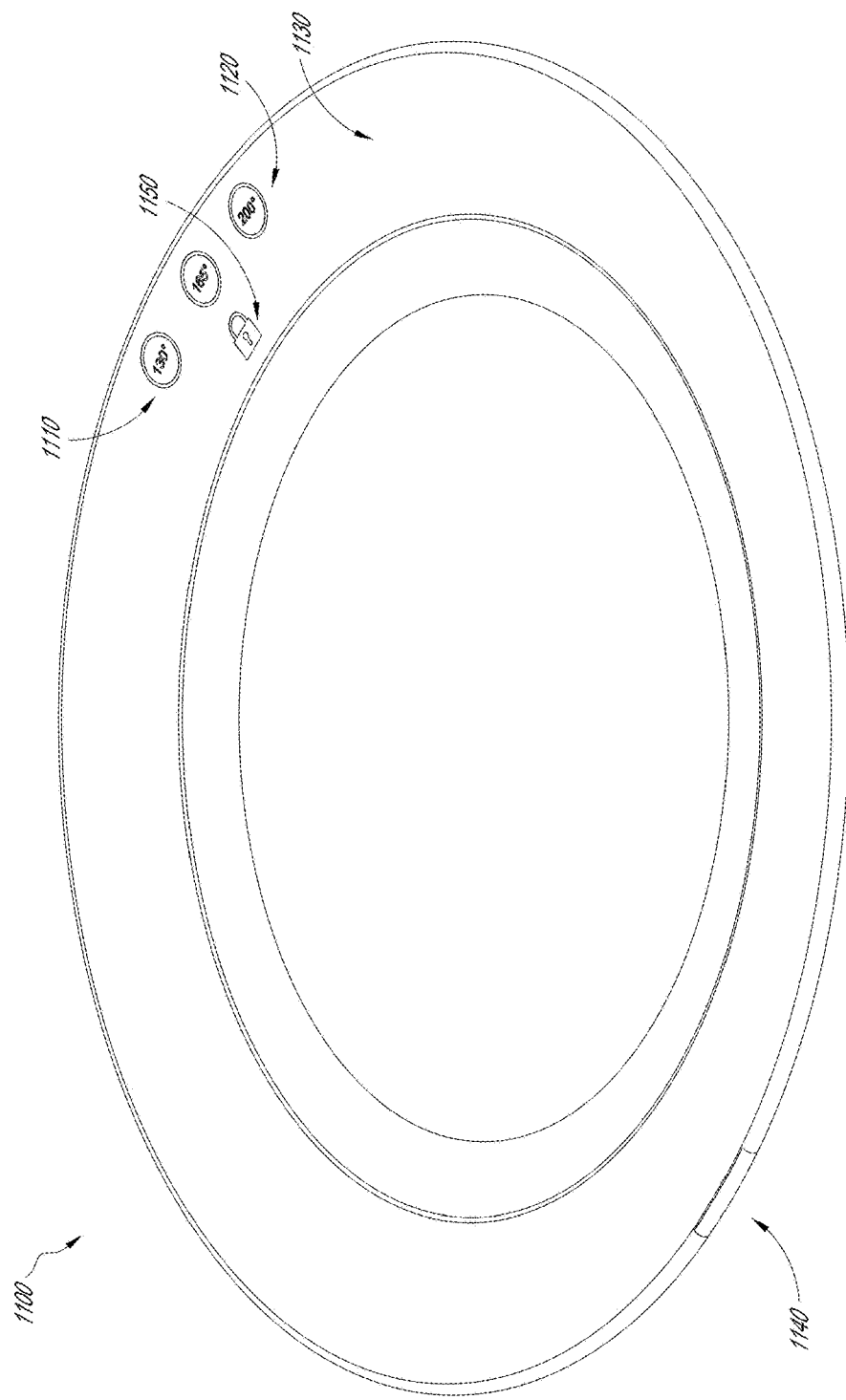
FIG. 20 is a schematic perspective view of another embodiment of a heated or cooled plate, bowl or serving dish.
Figure 21:
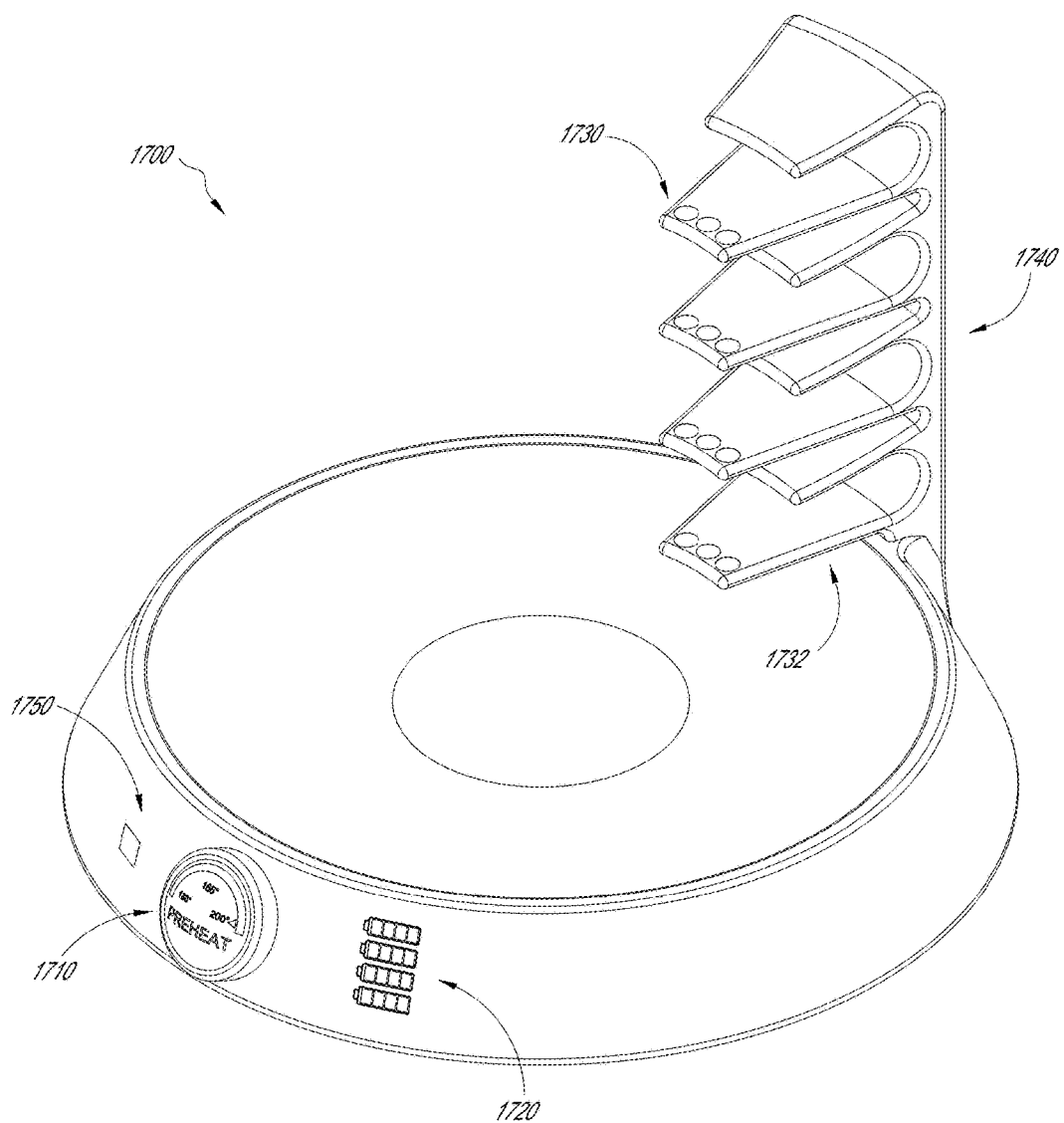
FIG. 21 is a schematic perspective view of one embodiment of a charging station for use with one or more plates, bowls or serving dishes.
Figure 22:
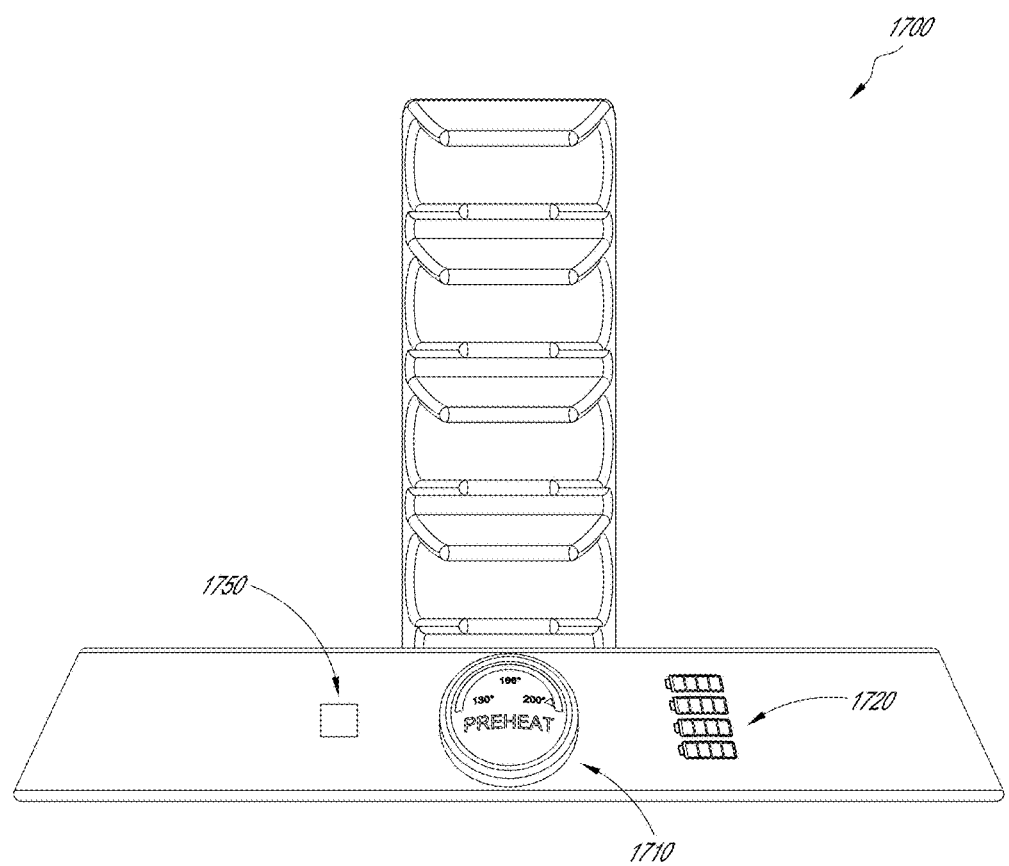
FIG. 22 is a schematic front view of the charging station in FIG. 21.

FIG. 20 shows another embodiment of a plate 1100, bowl or serving dish. The plate 1100 is similar to the plate 100, 100', 800, 800' described above and includes the same components (with the same numerical identifiers) and features disclosed for the plate 100, 100', 800, 800', except as noted below.

In one embodiment, the plate 1100, bowl or serving dish (or mug 400, travel mug 600, cup, water bottle or liquid container) can have a user interface 1110 that can include one or more soft touch or touch switch buttons 1120 electrically connected to the electronic module 90, 490, 690 to operate the heating or cooling system 55, 455, 655. For example, the one or more soft touch or touch switch buttons 1120 can be actuated by a user (e.g., can sense the electricity or resistance in the user's body when touched, such as capacitive touch sensing) to turn on or off the one or more heating elements 60, 460, 600 of the plate 1100, bowl, or serving dish (or mug 400, travel mug 600, cup, water bottle or liquid container). In another embodiment, the one or more soft touch or touch switch buttons 1120 can be actuated to provide a predetermined temperature set point (e.g., low, medium, high, or specific temperature settings) to the one or more heating elements 60, 460, 600 in the one or more plates 1100, bowls, or serving dishes, mugs 400, travel mugs 600, cups, water bottles or liquid containers. For example, the one or more soft touch or touch switch buttons 1120 can operate like a toggle switch, where the user can touch the button 1120 one time to turn the heating or cooling system 55, 455, 655 on, touch it a second time to set the operation of the heating or cooling element 60, 60, 660 to a first level (e.g., low), touch a third time to set the operation of the heating or cooling element 60, 60, 660 to a second level (e.g., medium), touch a fourth time to set the operation of the heating or cooling element 60, 60, 660 to a third level (e.g., high), and touch a fifth time to turn the heating or cooling element 60, 460, 660 off. In another embodiment, the first touch of the soft touch or touch switch button 1120 can both turn the heating or cooling system 55, 455, 655 on and set the operation of the heating or cooling element 60, 60, 660 to the first level (e.g., low). The user-interface controls on the plate 1100, bowl, serving dish, mug 400, travel mug 600, cup, water bottle or liquid container can also be other suitable user-interface mechanisms such as a push-button switch, slide switch, rocker switch, dial or wheel, etc.

With respect to the one or more plates 1100, bowls or serving dishes, the one or more soft touch or touch switch buttons 1120 can be located on a rim 1130 of the plate 1100, bowl or serving dish. In one embodiment, the one or more soft touch or touch switch buttons 1120 on the plate 1100, bowl or serving dish can be a set of three soft touch buttons on the rim 1130 of the plate 1100, bowl or serving dish and can each be backlit (e.g., with white light). The three soft touch buttons 1120 can correspond to different operating levels (e.g., low, medium, high) or temperatures (e.g., 130° F., 165° F., 200° F.) at which the heating or cooling element 60, 60' of the plate 1100, bowl or serving dish is to operate when the button 1120 is actuated. In one embodiment, multiple soft touch or touch switch buttons 830 can be located along the periphery of the plate 800' or serving dish, each button 830 associated with one of a plurality of heating or cooling elements 860A-860D (e.g., where different sections, such as quadrants, of the plate 800', bowl or serving dish have separate heating or cooling elements 860A-860D associated with them), as shown in FIG. 17. In one embodiment, the user interface 1110 on the one or more plates 1100, bowls, serving dishes, mugs 400, travel mugs 600, cups, water bottles or liquid containers can include one or more visual indicators 1140 (e.g., located on a rim 1130 of the plate 1100, bowl or serving dish or located on the side or top of a cup, mug 400, travel mug 600, water bottle or liquid container) that can indicate an operating condition or parameter of the one or more plates 1100, bowls, serving dishes, mugs 400, travel mugs 600, cups, water bottles or liquid containers. For example, the one or more visual indicators 1140 can display operating information, such as charge level, power level, selected temperature, etc. The visual indicator 1140 can be one or more of an LED, glowing light, or digital screen; however, other suitable visual indicators can be used. In one embodiment, the user interface can be behind a tinted semi-transparent layer of plastic so that when the screen goes dark, the user interface screen is unnoticeable as it is behind the layer of plastic. When the screen is activated by the electronic module 90, 490, 690, it illuminates through the translucent plastic layer (e.g., tinted plastic or frosted plastic or colored plastic). The screen can be automatically activated when liquid is sensed in the mug 400, travel mug 600, cup, water bottle or liquid container or when food is sensed on the plate, bowl or serving dish and can display one or more parameters (e.g. liquid temperature or food temperature or user-selected temperature mode). The user interface on the plate 1100, bowl, serving dish, mug 400, travel mug 600, cup, water bottle or liquid container can have one or more buttons (e.g., soft touch buttons) that the user can toggle to change the operation of the heating or cooling system 55, 455, 655. For example, the user can toggle the one or more buttons to change the power level or temperature setting for the heating or cooling element 60, 460, 660, or to change between different operating functions of the plate 1100, bowl, serving dish, mug 400, travel mug 600, cup, water bottle or liquid container. In another embodiment, the user can press and hold the button to increase the temperature setting for the plate 1100, bowl, serving dish, mug 400, travel mug 600, cup, water bottle or liquid container, which can increase in predetermined temperature increments (e.g., 5° F. increments) until a maximum temperature setting is reached, after which continued pressing of the button can cause the temperature setting to begin incrementing again from the minimum temperature setting. Once the user stops pressing the button, the operating temperature will be set for the heating or cooling element 60, 460, 660 in the plate 1100, bowl, serving dish, mug 400, travel mug 600, cup, water bottle or liquid container.

As discussed above, the one or more buttons (e.g., buttons 1120) can be pressed to toggle between different functions, one of which can be the temperature setting for the plate 1100, bowl, serving dish, mug 400, travel mug 600, cup, water bottle or liquid container. Toggling the button again can have the electronic module 90, 490, 690 display on the user interface the charge level of the one or more batteries 80, 480, 680 in the plate 1100, bowl, serving dish, mug 400, travel mug 600, cup, water bottle or liquid container. Toggling again the button can have the electronic module 90, 490, 690 display the BLUETOOTH® pairing mode, or allow the user to pair the plate 1100, bowl, serving dish, mug 400, travel mug 600, cup, water bottle or liquid container to a desired mobile electronic device (e.g., by pressing and holding the button). Once paired, the mobile electronic device can then receive information (e.g., temperature, battery charge level, liquid level) from the plate 1100, bowl, serving dish, mug 400, travel mug 600, cup, water bottle or liquid container, as well as transmit instruction (e.g., temperature setting, power setting, on or off, etc.) to the plate 1100, bowl, serving dish, mug 400, travel mug 600, cup, water bottle or liquid container.

In one embodiment, the one or more soft touch or touch switch buttons (such as buttons 1120 in FIG. 20) can glow or be lit once actuated by a user to signify that the associated heating or cooling element 60, 460, 660 is operating. For example, the soft touch or touch switch buttons can be backlit (e.g., with one or more LEDs or electroluminescence or OLEDs). Similarly, the soft touch or touch switch buttons can be unlit or not glow when the associated heating or cooling element 60, 460, 660 is not in operation. In another embodiment, the electronic module 90, 490, 690 can additionally (or alternatively) cause an audible sound (e.g., from a piezo speaker incorporated into the one or more plates 1100, bowls, serving dishes, mugs 400, travel mugs 600, cups, water bottles or liquid containers) to be generated when the user presses the one or more soft touch or touch switch buttons (or any other type of button, dial or switch).

Though the user interface disclosed above may be described in connection with a plate 1100, mug 400 or travel mug 600, one of skill in the art will recognize that it can also apply to any liquid container, drinkware, dishware or serverware (e.g., bowl, serving dish, hot plate, cup and/or liquid container), including the plate 100, 100', 800, 800', 900, 1300, 1400, travel mug 1700A, 2000, 2100, 2400, beer mug 1600, baby bottle 1500, bread basket 2200, tortilla warmer 2300, etc. and the scope of disclosure and the invention is understood to cover such liquid containers, drinkware, dishware and serverware.

Actuation

In one embodiment, the electronic module 90 can control the heating or cooling system 55 of the one or more plates 100, bowls, serving dishes, mugs 400, travel mugs 600, cups, water bottles or liquid containers to actuate or turn on when they are removed from their associated charging station, such as the charging station 1700 described below. For example, in one embodiment, the one or more plates 100, bowls, serving dishes, mugs 400, travel mugs 600, cups, water bottles or liquid containers can have a sensor (e.g., proximity sensor, magnet, electrical current removal detector, etc.) in communication with the electronic module 90, 490, 690, where the proximity sensor sends a signal to the electronic module 90, 490, 690 when the plate 100, bowl, serving dish, mug 400, travel mug 600, cup, water bottle or liquid container is removed from the charging stand, and the electronic module 90, 490, 690 turns on power to the heating or cooling element 60, 60', 460, 660 based at least in part on said signal. In another embodiment, the electronic module 90, 490, 690 can place the one or more plates 100, bowls, serving dishes, mugs 400, travel mugs 600, cups, water bottles or liquid containers in standby mode when removed from the charging stand, but does not turn on the one or more heating or cooling elements 60, 60', 460, 660, which can thereafter be turned on, for example, via user actuation of the one or more soft touch buttons (such as the buttons 830, 1120), use of a wireless remote control or mobile electronic device, or wand 1000, or liquid or food sensing as described in the embodiments above.

Though the actuation functionality disclosed above may be described in connection with a plate 100, mug 400 or travel mug 600, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, travel mug 1700A, 2000, 2100, 2400, beer mug 1600, baby bottle 1500, bread basket 2200, tortilla warmer 2300, etc. and the scope of disclosure and the invention is understood to cover such liquid containers, drinkware, dishware and serverware.

Charging Station

FIGS. 21-24A show one embodiment of a charging station 1700 or charging stand. In one embodiment, the charging station 1700 can have a user interface 1710 that communicates with the electronic module 90, 490, 690 in the one or more plates 100, 1100, bowls, serving dishes, mugs 400, travel mugs 600, cups, water bottles or liquid containers. For example, the user interface 1710 on the charging station 1700 can be actuated by the user to set one or more operating parameters of the one or more plates 100, 1100, bowls, serving dishes, mugs 400, travel mugs 600, cups, water bottles or liquid containers, such as user selected predetermined temperature set points or power setting modes.

With respect to the one or more plates 100, 1100, bowls or serving dishes, the user can actuate one or more buttons on the charging station 1700 that holds a plurality of plates 100, 1100 (e.g., be a charging stand that holds the plates 100, 1100, bowls or serving dishes in stacked form, as shown in FIG. 23, such as suspended from a base surface of the charging station). The user can set the desired operating temperature or power level for each of the plurality of plates 100, 1100, bowls or serving dishes (e.g., set either individually for each plate 100, bowl or serving dish, or set for all plates 100, bowls or serving dishes at once with one command), said instructions communicated from the user interface 1710 on the charging stand 1700 to the electronic module 90 in the one or more plates 100, 1100, bowls or serving dishes (e.g., via wireless communication such as RF, or via electrical contacts on the charging station 1700 that interface with corresponding electrical contacts on the plates, bowls or serving dishes, such as contacts 46''' in FIG. 3A). Subsequently, when the one or more plates 100, 1100, bowls or serving dishes are removed from the charging station 1700 (as shown in FIG. 24), the electronic module 90 can automatically turn the heating or cooling element 60, 60' in the one or more plates 100, 1100, bowls or serving dishes on to the pre-selected temperature or power setting (e.g., low, medium, high) previously selected by the user via the interface 1710 (e.g., stored in a memory, such as Flash memory on the electronic module 90, 490, 690) while the one or more plates 100, 1100, bowls or serving dishes were on the charging station 1700.

In another embodiment, the user can actuate one or more buttons on the charging station 1700 while the one or more plates 100, 1100, bowls or serving dishes are positioned on the charging station 1700 to instruct at least one of the one or more plates 100, 1100, bowls or serving dishes to not turn on when the one or more plates 100, 1100, bowls or serving dishes is removed from the charging station 1700, allowing the heating or cooling system 55 in the one or more plates 100, 1100, bowls or serving dishes to remain off, or in a standby mode when removed from the charging station 1700. The user can then separately turn on the heating or cooling element 60, 60' in the one or more plates 100, 1100, bowls or serving dishes (e.g., via actuation of the one or more soft touch buttons on the plates 100, 1100, bowls or serving dishes, use of the wireless remote control or mobile electronic device, or via the wand, as described above). In another embodiment, the user-interface buttons 1710 on the charging station 1700 can be used to put the one or more plates 100, 1100, bowls or serving dishes into a given mode (e.g. temperature mode or power level mode) or to activate other features within the one or more plates 100, 1100, bowls or serving dishes. In another embodiment, the user-interface 1710 on the charging station 1700 can be used to communicate certain information to the one or more plates 100, 1100, bowls or serving dishes (e.g. the username of a user, favorite setting, icon selection, the ambient temperature, etc.) In another embodiment, the user can actuate one or more buttons 1710 on the charging station 1700 while the one or more plates 100, 1100, bowls or serving dishes are not on the charging station 1700 (e.g. the plate or plates 100, 1100, bowls or serving dishes are on the counter or on the dinner table and the user can turn one or more of the plates 100, 1100, bowls or serving dishes on from the charging station 1700 via an RF transmitter in the charging station 1700). In this embodiment, the charging station 1700 operates as a wireless remote to control the one or more plates 100, 1100, bowls or serving dishes. Said buttons or interface 1710 on the charging station 1700 can be a soft touch button, touch switch, push button switch, slider switch, dial or any other means of user-interface control. The charging base 1700 and charging base functions described in this paragraph can also be for other embodiments of the invention such as one or more bowls, serving dishes, mugs 400, travel mugs 600, cups, water bottles or liquid containers.

The user interface 1710 on the charging station 1700 can have one or more visual indicators 1720 showing a charging status or level (e.g., percentage of battery power) of the one or more plates 100, 1100, bowls or serving dishes positioned on the charging station 1700 (e.g., one visual charging indicator for each plate 100, 1100, bowl or serving dish). For example, the charging station 1700 can have a plurality of visual indicators 1720, each associated with one plate 100, 1100, bowl or serving dish positioned on the charging station 1700, and showing the charging status or level for the battery 80 of the associated plate 100, 1100, bowl or serving dish. The one or more visual indicators 1720 can also show the user selected temperature set point or power level for the one or more plates 100, 1100, bowls or serving dishes on the charging station 1700. A charging station for the mug 400 or travel mug 600 can have a similar user interface and one or more visual indicators.

In one embodiment, the charging station 1700 or stand that can hold a plurality of plates 100, 1100, bowls or serving dishes (e.g., can hold four plates, or more, or less) can charge the plates 100, 1100, bowls or serving dishes via one or more direct electrical connections between the charging station 1700 and the plates 100. In another embodiment, the charging station 1700 or stand can charge the plates 100, 1100, bowls or serving dishes via inductive coupling, as discussed above. In one embodiment, the charging station can have an inductive coupling column 1740 (e.g., a vertically oriented inductive coupling system), with one or more inductive coupling transmitters 1730 that inductively couple with a plurality of plates 100, 1100, bowls or serving dishes positioned on the charging station 1700 or stand. In one embodiment, the plurality of inductive coupling transmitters 1730 can be in a linear array, as to interface with a plurality of plates 100, 1100, bowls or serving dishes.

The charging station 1700 can have a plurality of inductive coupling transmitters 1730, e.g., in the shape of a slanted ledge 1732, where each transmitter 1730 can couple to at least a portion of an underside (e.g., an underside of the rim) of a corresponding plate 100, 1100, bowl or serving dish (as shown in FIGS. 23-24) on the charging station 1700 to inductively couple to the plate 100, 1100, bowl or serving dish. However in other embodiments, the inductive coupling transmitters 1730 can have other shapes and can inductively couple to other areas of a corresponding plate 100, 1100, bowl or serving dish (e.g., an edge of the plate 100, 1100, bowl or serving dish, a bottom of the plate 100, 1100, bowl or serving dish, a cylindrical female/male port within the plate 100, 1100, bowl or serving dish, or other section of the plate 100, 1100, bowl or serving dish). In another embodiment, the inductive coupling charging station or stand can be in a horizontal orientation, so that the plurality of plates 100, 1100, bowls or serving dishes can be vertically oriented similar to the way a plate sits in the dishwasher. In another embodiment, the inductive coupling charging station can be integrated into a dishwasher so that the plates 100, 1100, bowls or serving dishes can be charged while they are in the dishwasher. The charging station and charging station functions described in this paragraph can also be for other embodiments of the invention such as one or more bowls, serving dishes, mugs 400, travel mugs 600, cups, water bottles or liquid containers.

FIG. 24B shows another embodiment of a charging station 1700', which can be similar to the charging station 200, 300, 500, 700, 1700, except as described below. The charging station 1700' can include a resonant coupling wireless power transmitter 1770 (e.g., resonant coupling wireless power transmitter) that can transmit power to one or more (e.g., a plurality of) plates 100 800, 900, 1100, bowls, serving dishes, mugs 400, travel mugs 600, cups, water bottles or liquid containers without the use of repeater circuits in the plates 100 800, 900, 1100, bowls, serving dishes, mugs 400, travel mugs 600, cups, water bottles or liquid containers so that the power transmission 1772 radiates through the units stacked on the charging station 1700'. The resonant coupling wireless power transmitter 1770 can optionally be located in a base portion of the charging station 1700'.

FIG. 24C shows another embodiment of a charging station 1700", which can be similar to the charging station 200, 300, 500, 700, 1700, 1700' except as described below. The charging station 1700" can include a wireless power transmitter 1770' that can transmit power to one or more (e.g., a plurality of) plates 100 800, 900, 1100, bowls, serving dishes, mugs 400, travel mugs 600, cups, water bottles or liquid containers. Each of the plates 100 800, 900, 1100, bowls, serving dishes, mugs 400, travel mugs 600, cups, water bottles or liquid containers can have a repeater circuit so that power transmission 1772' is provided by each of the units to an adjacent unit to provide wireless power thereto. The wireless power transmitter 1770" (e.g., resonant coupling wireless power transmitter or inductive coupling wireless power transmitter) can optionally be located in a base portion of the charging station 1700".

In another embodiment, the charging station (e.g. 300, 500, 700, 1700) can be sized to accommodate one plate 100, bowl, serving dish, mug 400, travel mug 600, cup, water bottle or liquid container, respectively. The charging station can have one or more visual indicators, which can indicate an operating condition of the charging station and/or plate 100, bowl, serving dish, mug 400, travel mug 600, cup, water bottle or liquid container. For example, the one or more visual indicators can be an indicator light that illuminates when the plate 100, bowl, serving dish, mug 400, travel mug 600, cup, water bottle or liquid container is charging, or has completed its charging, or an indicator to illustrate the current percentage of charge level.

Though the charging station and charging station functions disclosed above may be described in connection with a plate 100, 1100, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, mug 400, travel mug 600, 1700A, 2000, 2100, 2400, beer mug 1600, baby bottle 1500, bread basket 2200, tortilla warmer 2300, etc. and the scope of disclosure and the invention is understood to cover such liquid containers, drinkware, dishware and serverware. Additionally, though the charging station functions disclosed above are described in connection with the charging station 1700 one of skill in the art will recognize that these functions can also apply to the charging base 200, 300, 500, and 700.

Preheat Mode

In one embodiment, the charging station 1700 can have one or more buttons 1710 (e.g., three buttons) on its user interface 1710 for different temperature set points (e.g., 130° F., 165° F., 200° F.) or operating levels (e.g., low, medium, high), which can be actuated by the user to initiate a preheat mode for the one or more plates 100, 1100, bowls, serving dishes, mugs 400, travel mugs 600, cups, water bottles or liquid containers positioned on the charging station 1700 or stand. In one embodiment, the one or more buttons 1710 can control a preheat feature for all of the plates 100, 1100, bowls, serving dishes, mugs 400, travel mugs 600, cups, water bottles or liquid containers positioned on the charging stand 1700 (e.g., control all simultaneously). In another embodiment, separate sets of buttons can be provided on the charging station 1700, each set of buttons associated with one charging location that receives one plate 100, 1100, bowl, serving dish, mug 400, travel mug 600, cup, water bottle or liquid container thereon for charging on the charging station.

Once a user presses the one or more preheat buttons 1710 on the charging station 1700, the charging station 1700 will communicate instructions to the electronic module 90 of the one or more plates 100, 1100, bowls, serving dishes, mugs 400, travel mugs 600, cups, water bottles or liquid containers to turn on the heating or cooling element 60, 460, 660 to the user selected temperature or power level mode. In said preheat mode, power to the heating or cooling element 60, 460, 660 in the plates 100, 1100, bowls, serving dishes, mugs 400, travel mugs 600, cups, water bottles or liquid containers can be provided by the charging station 1700 (e.g., via inductive coupling or electrical contacts), rather than from the one or more batteries 80, 480, 680 within the plates 100, 1100, bowls, serving dishes, mugs 400, travel mugs 600, cups, water bottles or liquid containers, thereby conserving battery power. Once the desired preheat temperature has been obtained, a visual indicator light 1720 on the charging station 1700 can change color (e.g., change to a green light) to indicate to the user that the pre-selected preheat temperature has been obtained and that the plates 100, 1100, bowls, serving dishes, mugs 400, travel mugs 600, cups, water bottles or liquid containers can be removed. Other suitable indicators can be used to indicate to the user that the selected preheat temperature has been obtained (e.g. audible sound, flashing light, digital screen with a message or an icon, glowing icon, etc.).

Once the one or more plates 100, 1100, bowls, serving dishes, mugs 400, travel mugs 600, cups, water bottles or liquid containers are removed from the charging station 1700, the electronic module 90, 490, 690 can operate the heating or cooling element 60, 460, 660 with the one or more electrical energy storage elements (e.g., batteries) 80, 480, 680 to maintain a user selected temperature. In another embodiment, the one or more plates 100, 1100, bowls, serving dishes, mugs 400, travel mugs 600, cups, water bottles or liquid containers need not have an energy storage device, and can receive its power from the charging station 1700 (e.g. via inductive coupling or electrical contacts) for the purpose of preheating the one or more plates 100, 1100, bowls, serving dishes, mugs 400, travel mugs 600, cups, water bottles or liquid containers. Once removed from the charging station 1700 (or preheat station) the one or more plates 100, 1100, bowls, serving dishes, mugs 400, travel mugs 600, cups, water bottles or liquid containers would eventually cool down over time, in accordance with the heat dissipation characteristics of the material of the plate 100, 1100, bowl, serving dish, mug 400, travel mug 600, cup, water bottle or liquid container. Thermal materials can be used to prolong the amount of time that the plate 100, 1100, bowl, serving dish, mug 400, travel mug 600, cup, water bottle or liquid container stays hot (e.g. phase change material, etc.). In one embodiment, the said plate 100, 1100, bowl, serving dish, mug 400, travel mug 600, cup, water bottle or liquid container can have an inductive coupling receiver and a heating or cooling element (e.g., heating or cooling element 60). In another embodiment, there can be other circuitry in the said plate 100, 1100, bowl, serving dish, mug 400, travel mug 600, cup, water bottle or liquid container such as a temperature sensor (e.g., the temperature sensors 820A-820D, 920) and an electronics module (e.g., electronic module 90) which can regulate the temperature of the heating or cooling element. In another embodiment, the one or more plates 100, 1100, bowls, serving dishes, mugs 400, travel mugs 600, cups, water bottles or liquid containers would receive different levels of power from the charging station (preheat station) based on a user-selected temperature or power setting.

The one or more plates 100, 1100, bowls, serving dishes, mugs 400, travel mugs 600, cups, water bottles or liquid containers can also have a visual indicator light (e.g., on a side wall or an edge or rim, such as visual indicator light 1140 on plate 1100)) to indicate when the plate 100, 1100, bowl, serving dish, mug 400, travel mug 600, cup, water bottle or liquid container is in preheat mode on the charging station 1700 (e.g., a red light, or a glowing icon or a flashing light), or when the preheat mode has been completed and the desired temperature has been obtained (e.g., a green light or a glowing icon, or flashing light, etc.).

Though the preheat mode disclosed above may be described in connection with a plate 100, 1100 mug 400 or travel mug 600, one of skill in the art will recognize that it can also apply to any liquid container, drinkware, dishware or serverware (e.g., bowl, serving dish, hot plate, cup and/or liquid container), including the plate 100', 800, 800', 900, 1300, 1400, cup, travel mug 1700A, 2000, 2100, 2400, beer mug 1600, baby bottle 1500, bread basket 2200, tortilla warmer 2300 etc. and the scope of disclosure and the invention is understood to cover such liquid containers, drinkware, dishware and serverware. Additionally, though the preheat mode disclosed above is described in connection with the charging station 1700 one of skill in the art will recognize that this feature can also apply to the charging base 200, 300, 500, and 700.

Limited Function Mode

In one embodiment, the charging station 1700 can have one or more limited function switches 1750 that can be actuated by the user to limit the function of the one or more plates 100, 1100, bowls or serving dishes associated with the charging location on the charging station 1700 or stand. In one embodiment, the limited function switch 1750 can disable one or more operating temperatures or modes of the plate 100, 1100 (e.g., via communication of instructions from the charging station 1700 to the electronic module 90 of the one or more plates 100, 1100, bowls or serving dishes). For example, the limited function switch 1750 can disable a high and medium operating temperature or power level in the plates 100, 1100, bowls or serving dishes, thereby allowing the plate 100, 1100, bowl or serving dish to operate in only a low operating temperature or power level. Such a limited function mode can be used, for example, when the plate 100, 1100, bowl or serving dish will hold food for a child (to inhibit the risk of injury). In another embodiment, the limited function switch 1750 can also (or alternatively) be located on the one or more plates 100, 1100, bowls or serving dishes themselves (e.g., can be a soft touch, touch switch button or any other type of switch on a rim of the plate 100, 1100, bowls or serving dishes or underneath the plate, bowl or serving dish). In one embodiment, the one or more plates 100, 1100, bowls or serving dishes can have a visual indicator (e.g., a backlit icon, glowing light, or other indicator on the rim or other location of the plate 100, 1100, bowl or serving dish, such as indicator 1150 on plate 1100) that can indicate whether the limited function mode is turned on.

In one embodiment, at least one of the one or more limited function switches 1750 on the charging station 1700 can be a two position slider switch on a surface (e.g., a back surface) of the charging station 1700 that can be used as a child lock switch. The switch can be actuated between a "Child lock On" and a "Child lock Off" state. The "Child lock On" state can limit the power level or temperature in one or more of the plates 100, 1100, bowls or serving dishes on the charging station 1700 to the low power level or temperature (e.g., via communication with the electronic module 90), and a padlock icon on the plate, such as the padlock icon 1150 of plate 1100, bowl or serving dish in FIG. 20 (e.g., on the front side of the plate) can be illuminated (e.g., green backlight) when the plate 100, 1100, bowl or serving dish is removed from the charging station 1700 to illustrate that the plate 100, 1100, bowl or serving dish is in Child lock mode. If the user then touches the button (e.g., soft touch button, such as the soft touch button 1120 of plate 1100) associated with the low power level or temperature (e.g., 130° F.), the electronic module 90 will turn the heating or cooling element 60 on and operate it at that level. If the user touches another button (e.g., soft touch button, such as the soft touch button 1120 of plate 1100) on the plate 100, 1100, bowl or serving dish to try to change the mode of operation of the plate 100, 1100, bowl or serving dish to a higher temperature setting, the electronic module 90 will cause the glowing child lock icon to flash or strobe to indicate to the user that the child lock is on and that the plate 100, 1100, bowl or serving dish cannot be changed to a higher temperature mode. In one embodiment, a user can disable the child lock mode on the plate 100, 1100, bowl or serving dish as discussed further below by entering, for example, an unlock combination button-push sequence (e.g., pushing the temperature mode buttons in a specific order). Once the plate 100, 1100, bowl or serving dish is again placed on the charging station 1700, and the child lock switch 1750 (or limited function switch) on the charging station 1700 is on, the charging station 1700 will communicate instructions to the electronic module 90 of the plate 100, 1100, bowl or serving dish to again turn on the child lock mode back on, so that the next time the plate 100, 1100, bowl or serving dish is removed from the charging station 1700 it will again be in child lock mode.

In one embodiment, limited function mode (e.g., child lock mode) can be manually disabled or overridden in one or more ways (e.g. by pushing and holding predetermined buttons for a period of time, or pushing a combination of buttons in a predetermined sequence on the charging station or one or more plates 100, 1100, bowls or serving dishes). In another embodiment, the limited function mode can be actuated or disabled using a wireless remote control, mobile electronic device or wand, as discussed above.

Though the user limited function mode and child lock mode features disclosed above may be described in connection with a plate 100, 1100, one of skill in the art will recognize that it can also apply to any liquid container, drinkware, dishware or serverware (e.g., bowl, serving dish, hot plate, cup and/or liquid container), including the plate, 100', 800, 800', 900, 1300, 1400, mug 400 or travel mug 600, 1700A, 2000, 2100, 2400, beer mug 1600, baby bottle 1500, bread basket 2200, tortilla warmer 2300, etc. and the scope of disclosure and the invention is understood to cover such liquid containers, drinkware, dishware and serverware.

Water Tight and Dishwasher Safe

In one embodiment, the one or more plates 100, bowls, serving dishes, mugs 400, travel mugs 600, cups, water bottles or liquid containers can be water tight, thereby inhibiting damage to the electronic and electrical components. In one embodiment the one or more plates 100, bowls, serving dishes, mugs 400, travel mugs 600, cups, water bottles or liquid containers can be submersible up to 1 meter. However, in other embodiments, the one or more plates 100, bowls, serving dishes, mugs 400, travel mugs 600, cups, water bottles or liquid containers can be submersible to depths lower or greater than this.

In one embodiment, the one or more plates 100, bowls, serving dishes, mugs 400, travel mugs 600, cups, water bottles or liquid containers can be constructed so as to withstand temperatures of up to 200° F., thereby being suitable for cleaning in high temperature dishwashers, including commercial dishwashers with a sanitation cycle of about 180° F. In another embodiment, the one or more plates 100, bowls, serving dishes, mugs 400, travel mugs 600, cups, water bottles or liquid containers can be sealed (e.g., via the bottom portion or member 40, 440, 640) so as to inhibit exposure of the electronics and electrical components to liquids (e.g., chemical bath during cleaning in a dishwasher).

In one embodiment, the one or more plates 100, bowls, serving dishes, mugs 400, travel mugs 600, cups, water bottles or liquid containers can include liquid shielding technology to protect the circuitry and electrical components from water damage. For example, DRYWIRED™, LIQUI-PEL™ or HZO WATERBLACK™ can be used to protect the electronics in the one or more plates 100, bowls, serving dishes, mugs 400, travel mugs 600, cups, water bottles or liquid containers. Such liquid sealing technology can be used in addition to, or instead of the one or more water tight sealed compartments or cavities in the plate 100, bowl, serving dish, mug 400, travel mug 600, cup, water bottle or liquid container.

Though the water tight and dishwasher safe features disclosed above may be described in connection with a plate 100, mug 400 or travel mug 600, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, travel mug 1700A, 2000, 2100, 2400, baby bottle 1500, beer mug 1600, bread basket 2200, tortilla warmer 2300, etc. and the scope of disclosure and the invention is understood to cover such liquid containers, drinkware, dishware and serverware.

Bottom Glow

In one embodiment, the one or more plates 100 can have a visual indicator on the bottom of the plates 100, which are illuminated (e.g., controlled by the electronic module 90) when the heating or cooling element 60, 60' is in operation. For example, a multicolor LED (e.g., in a graphic LED grid) can be provided on the base of each of the plates 100 and when the one or more plates 100 are placed on a counter, the LED causes a soft glow to radiate (e.g., at a plurality of different brightness levels) from under each plate 100. The electronic module 90 can control the operation of the multicolor LED to glow in a first color (e.g., red) when the heating or cooling element 60 is on, to glow in a second color when the plate 100, bowl or serving dish is in a standby mode, or to glow in a third color when the plate 100, bowl or serving dish is in a preheat mode (described above) on the charging station. In another embodiment, the lighting on the underside of the plate can be one color only.

Though the preheat mode disclosed above may be described in connection with a plate 100, one of skill in the art will recognize that it can also apply to any liquid container, drinkware, dishware or serverware (e.g., bowl, serving dish, hot plate, cup and/or liquid container), including the plate 100', 800, 800', 900, 1100, 1300, 1400, mug 400 or travel mug 600, 1700A, 2000, 2100, 2400, baby bottle 1500, beer mug 1600, bread basket 2200, tortilla warmer 2300, etc. and the scope of disclosure and the invention is understood to cover such liquid containers, drinkware, dishware and serverware.

Hot Plate or Cooled Plate

Figure 25:
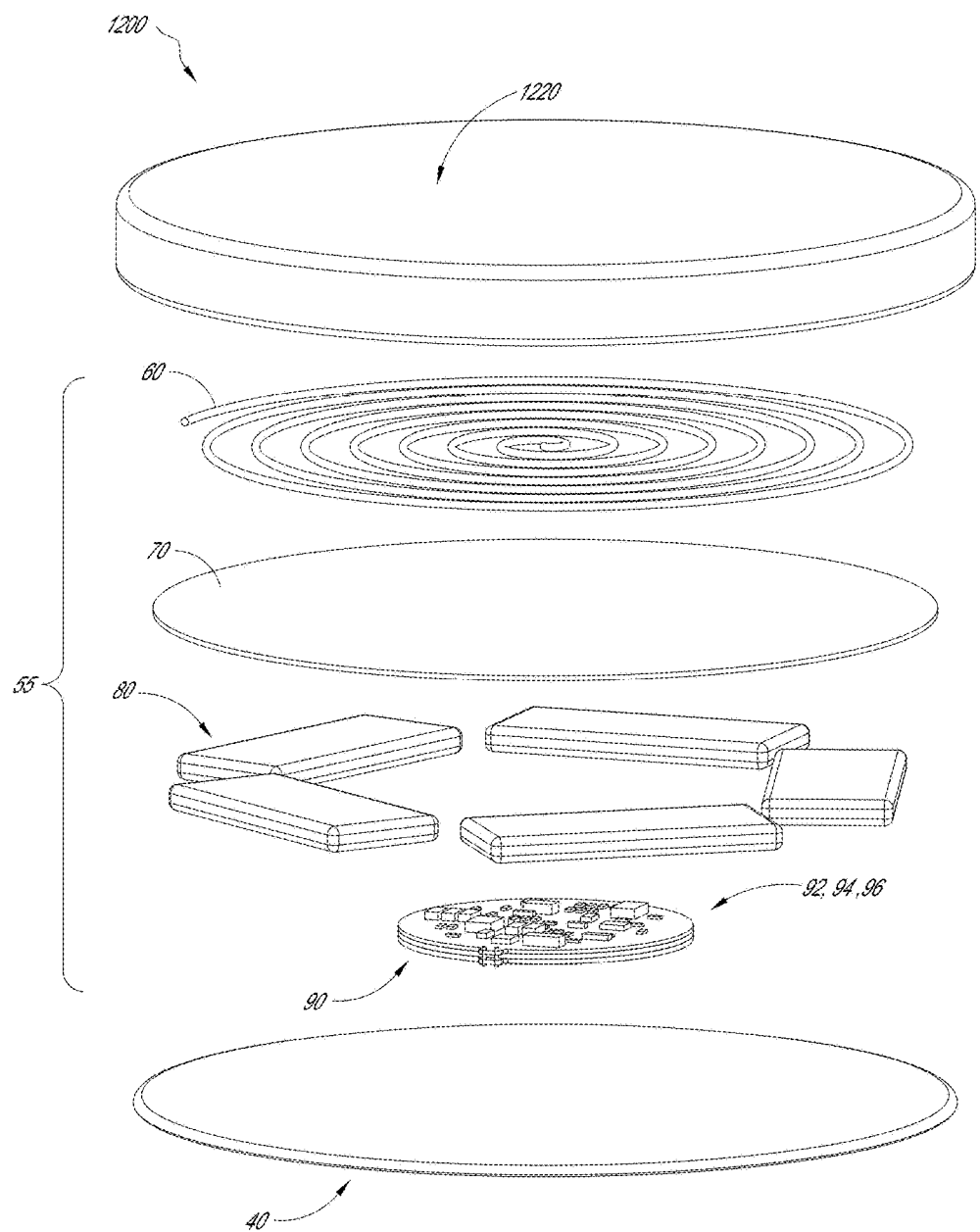
FIG. 25 is a schematic exploded view of one embodiment of a heated or cooled plate.
Figure 26:
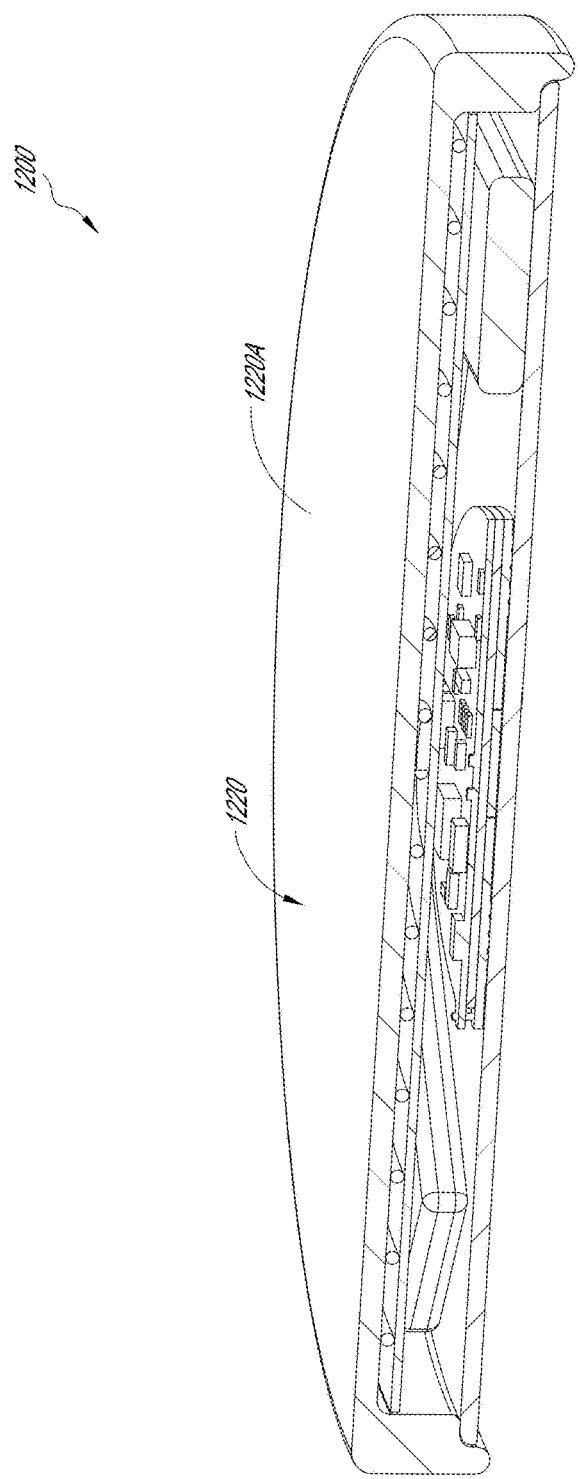
FIG. 26 is a schematic cross-sectional assembled view of the heated or cooled plate of FIG. 25.

FIGS. 25-26 show one embodiment of a hot or cooled plate 1200. The hot or cooled plate 1200 is similar to the plate 100, 100' described above and includes the same components (with the same numerical identifiers) and features disclosed for the plate 100, 100' described above, except as noted below.

The hot or cooled plate 1200 can have a generally flat top surface 1220A and can receive thereon one or more plates, bowls, serving dishes, mugs, travel mugs, cups, water bottles or liquid containers (e.g., conventional dishware or drinkware) to heat the dishware or drinkware (e.g., before or after it has received a hot food item (e.g., steak)), or to chill the dishware or drinkware (e.g., before or after it has received a cold food item (e.g., salad)). The hot or cooled plate 1200 can operate in a similar manner as the plate 100, 100' and can have one or more of the features disclosed in connection with the description of the operation of the plate 100, 100', 800, 800', 900, 1100, 1300, or baby bottle 1500. For example, the hot or cooled plate 1200 can interface with a charging station, in a similar manner as the plate 100, 100', 800, 800', 900, 1100, and be actuated by a wand 1000 or other remote control mechanism or mobile electronic device.

Removable Battery Pack

Figure 27:
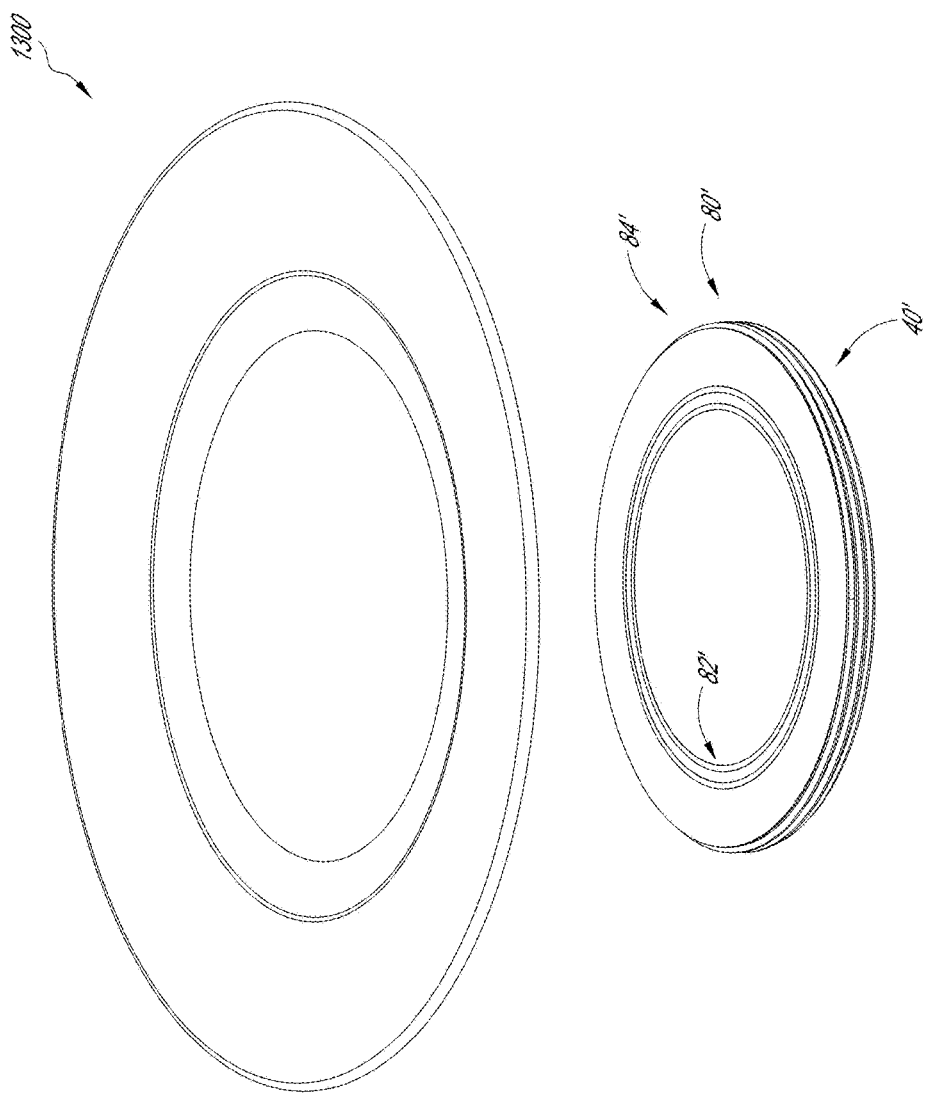
FIG. 27 is a schematic perspective exploded view of another embodiment of a heated or cooled plate, bowl or serving dish.
Figure 28:
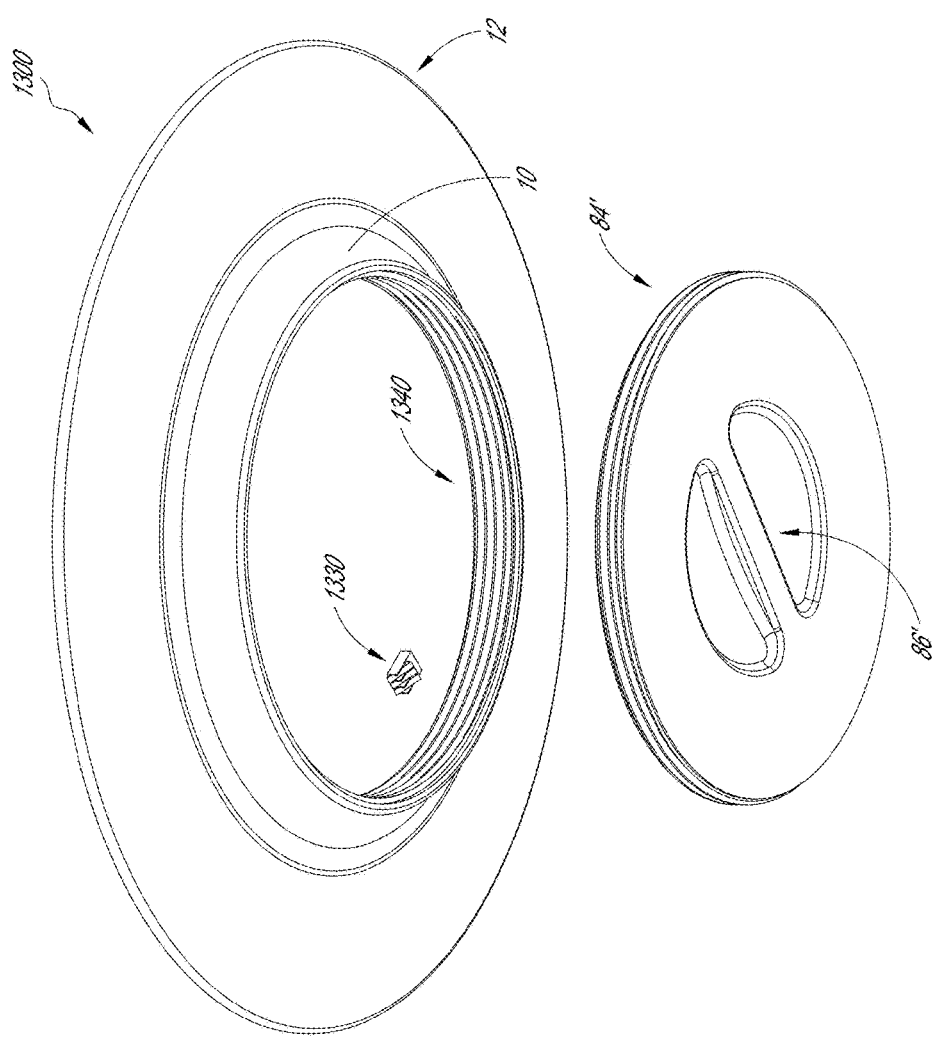
FIG. 28 is a schematic bottom perspective exploded view of the heated or cooled plate, bowl or serving dish of FIG. 27.

FIGS. 27 and 28 show another embodiment of a plate 1300, bowl or serving dish. The plate 1300 is similar to the plate 100, 100', 800, 800', 900 described above and includes the same components (with the same numerical identifiers) and features disclosed for the plate 100, 100', 800, 800', 900, except as noted below.

In the illustrated embodiment, the plate 1300 can have a removable battery pack 80' that removably couples to a bottom of the plate 1300. In one embodiment, the battery pack 80' can have an electrical contact 82' that contacts an electrical contact 1330 on the plate 1300 to electrically connect the battery pack 80' to the plate 1300 (e.g., to provide power to the electronic module 90, including the controller circuit 94 and charging circuit 96, and the heating or cooling element 60). In the illustrated embodiment, the electrical contact 82' is ring shaped; however, the electrical contact 82' can have other shapes. In one embodiment, the electrical contact 82' can be an electrical contact strip (e.g., a gold plated electrical contact strip), though in other embodiments the electrical contact 82' can have other suitable types or made of other suitable materials. Advantageously, the electrical contact 82' is shaped so that the electrical connection between the battery pack 80' and plate 1300 can be provided irrespective of the rotational orientation of the battery pack 80' when coupled to the plate 1300.

The battery pack 80' can have a threaded portion 84' that can mate with a threaded portion 1340 in a bottom of the plate 1300 to mechanically couple the battery pack 80' to the plate 1300. However, other suitable mechanisms can be used to mechanically couple the battery pack 80' to the plate 1300 (e.g., tab and groove structure, press-fit connection). The battery pack 80' can have a user handle or grip member 86' to allow the user to hold and couple the battery pack 80' to the plate 1300.

The threaded connection between the battery pack 80' and the plate 1300 can substantially seal the bottom of the plate 1300 in a water tight manner, as discussed above. In one embodiment, the battery pack 80' can be sized to define substantially the entire base of the plate 1300 when coupled to the plate 1300. In another embodiment, the battery pack 80' can be sized to define only a portion of the base (e.g., less than the entire base) of the plate 1300.

Though the battery pack feature disclosed above may be described in connection with a plate 1300, one of skill in the art will recognize that it can also apply to any liquid container, drinkware, dishware or serverware (e.g., bowl, serving dish, hot plate, cup and/or liquid container), including the plate 100, 100', 800, 800', 900, 1100, mug 400 or travel mug 600, 1700A, 2000, 2100, 2400, baby bottle 1500, beer mug 1600, bread basket 2200, tortilla warmer 2300, etc. and the scope of disclosure and the invention is understood to cover such liquid containers, drinkware, dishware and serverware.

Removable Base

Figure 29:
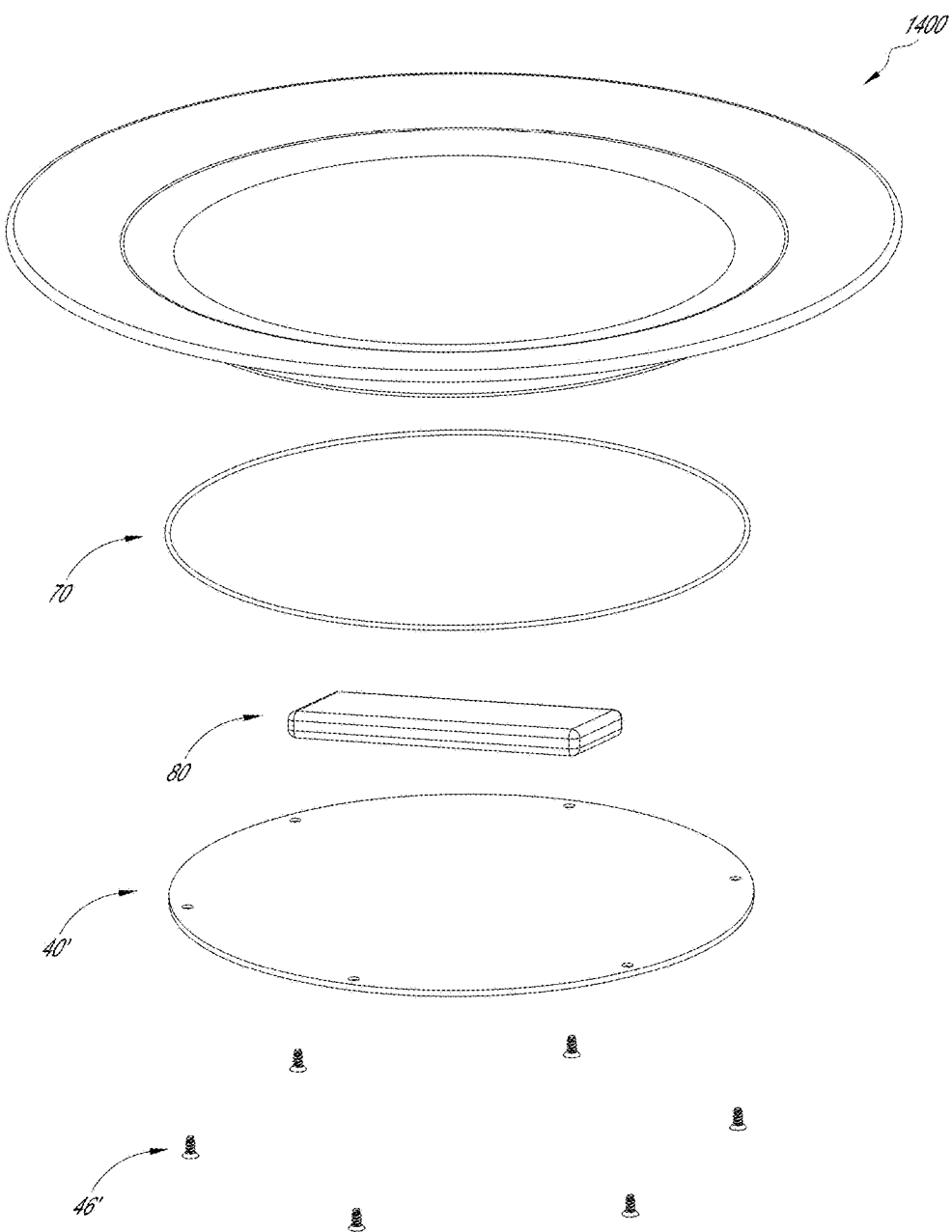
FIG. 29 is a schematic perspective exploded view of another embodiment of a heated or cooled plate, bowl or serving dish.
Figure 30:
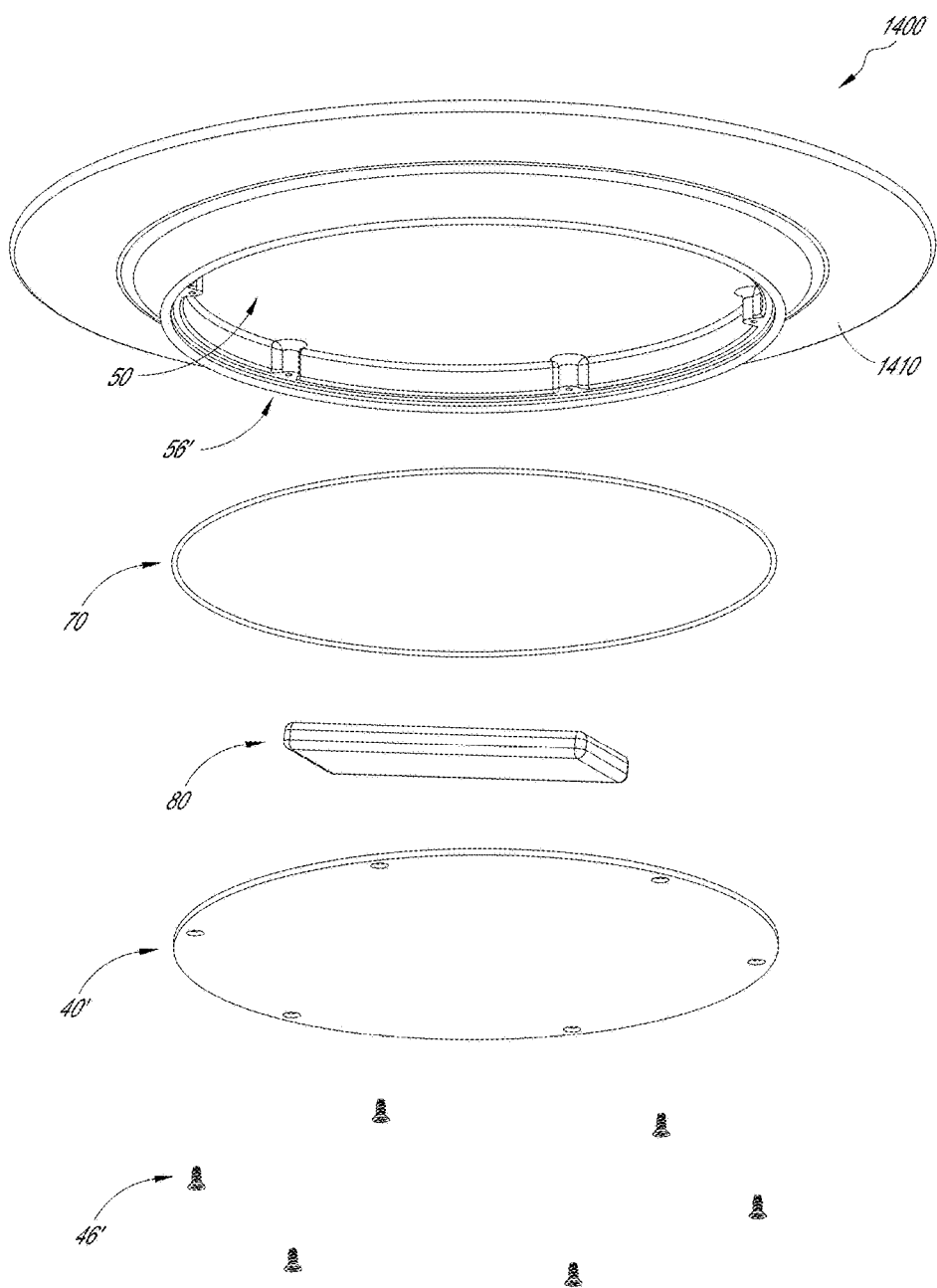
FIG. 30 is a schematic bottom perspective exploded view of the heated or cooled plate, bowl or serving dish of FIG. 29.

FIGS. 29-30 show another embodiment of a plate 1400, bowl or serving dish. The plate 1400 is similar to the plate 100, 100', 800, 800', 900 described above and includes the same components (with the same numerical identifiers) and features disclosed for the plate 100, 100', 800, 800', 900, except as noted below.

In the illustrated embodiment, the plate 1400 can have a bottom portion (or base) 40' that can be removably coupled to a bottom of the plate 1400 to substantially seal a compartment or cavity 50 in the bottom of the plate 1400 that houses the heating or cooling system 55, including the insulative member 70 and one or more electrical energy storage devices 80 (e.g., batteries). In the illustrated embodiment, the bottom portion 40' can be removably coupled to the bottom of the plate 1400 with one or more fasteners 46' (e.g., screws, bolts, pins, or other suitable fasteners). In one embodiment, the one or more fasteners 46' can extend through the bottom portion 40' and couple to a coupling member 56' (e.g., female threaded portion, grommet) in the body 1410 of the plate 1400. The bottom portion 40' can couple to the body 1410 of the plate 1400 so as to substantially seal the bottom of the plate 1300 in a water tight manner, as discussed above.

Though the removable feature disclosed above may be described in connection with a plate 1400, one of skill in the art will recognize that it can also apply to any liquid container, drinkware, dishware or serverware (e.g., bowl, serving dish, hot plate, cup and/or liquid container), including the plate 100, 100', 800, 800', 900, 1100, mug 400 or travel mug 600, 1700A, 2000, 2100, 2400, baby bottle 1500, beer mug 1600, bread basket 2200, tortilla warmer 2300, etc. and the scope of disclosure and the invention is understood to cover such liquid containers, drinkware, dishware and serverware.

Liquid Container (e.g., Baby Bottle)

Figure 31:
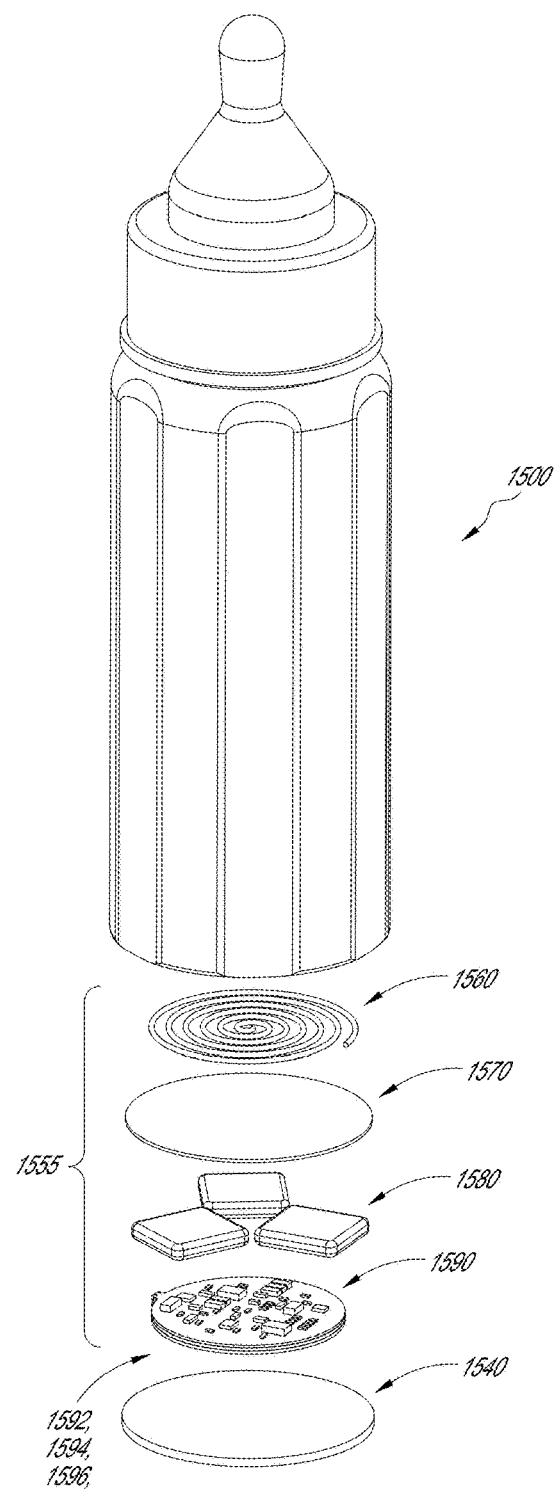
FIG. 31 is a schematic exploded view of one embodiment of a heated or cooled baby bottle liquid container.
Figure 32:
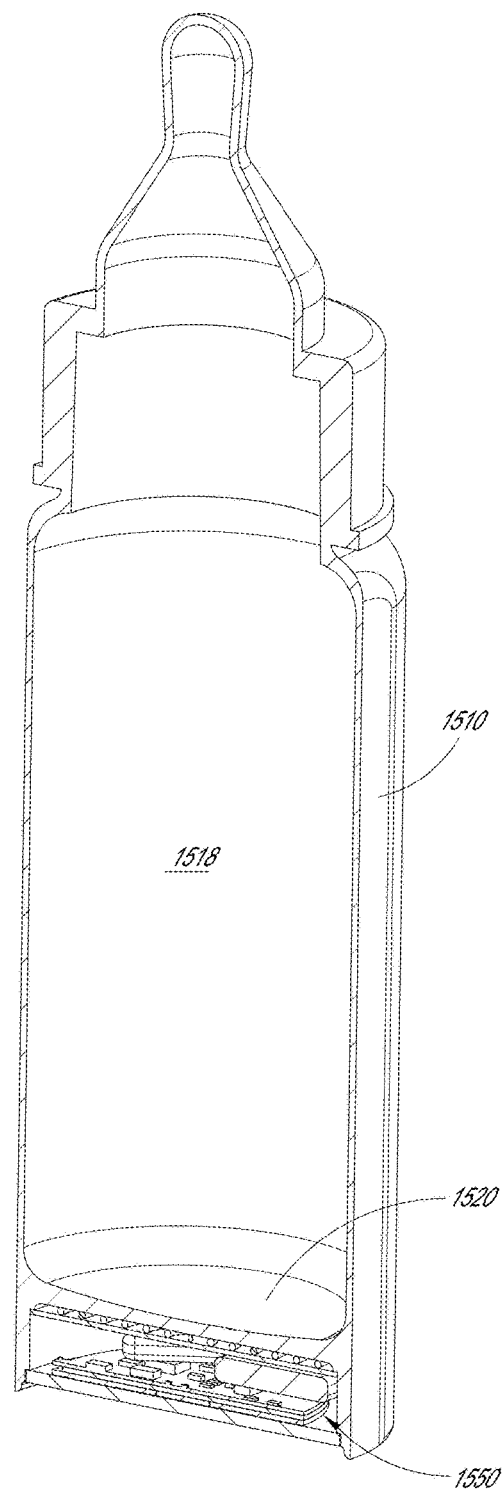
FIG. 32 is a schematic cross-sectional assembled view of the heated or cooled baby bottle of FIG. 31.

FIGS. 31-32 show another embodiment of a liquid container 1500. In the illustrated embodiment, the liquid container 1500 is a baby bottle. The liquid container 1500 is similar to the mug 400 and travel mug 600 described above and includes the same components (with the same numerical identifiers) and features disclosed for the mug 400 and travel mug 600 described above, except as noted below.

The baby bottle 1500 can have a body 1510 that defines a liquid holding chamber 1518 therein and a bottom surface 1520. The baby bottle 1500 can have a heating or cooling system 1555, similar to the heating or cooling system 455, 655 described above, and have a heating or cooling element 1560, an insulative member 1570, one or more electrical energy storage devices 1580 and an electronic module 1590, which can include a wireless power receiver 1592, a control circuitry 1594 and a charging circuit 1596. The heating or cooling system 1555 can function in the same way as described above for the heating or cooling system 55, 155, 655. In another embodiment, the baby bottle 1500 can have one or more electrical contacts (e.g., electrical contacts on a surface of the baby bottle 1500) that can contact electrical contacts on a charging station for providing electrical power to one or more components in the baby bottle 1500 (e.g., to the one or more energy storage devices 1580 to charge them, to the heating or cooling element 1560, etc.).

The heating or cooling system 1555 can be housed in a chamber or cavity 1550 in the body 1510 of the baby bottle 1500, where in one embodiment at least a portion of the heating or cooling system 1555 (e.g., the one or more electrical energy storage devices 1580, such as batteries) can be accessed via a removable bottom portion 1540 (or base) that can removably couple to a bottom of the baby bottle 1500. The bottom portion 1540 can couple to the body 1510 of the baby bottle 1500 so as to substantially seal the bottom of the baby bottle 1500 in a water tight manner, as discussed above. In another embodiment, the bottom portion of the baby bottle 1500 can be excluded or it can be sealed to the body 1510 of the baby bottle 1500 so that the electronics, power storage devices 1580 or heating or cooling system 1555 are sealed within the body 1510 and not accessible.

Figure 32A:
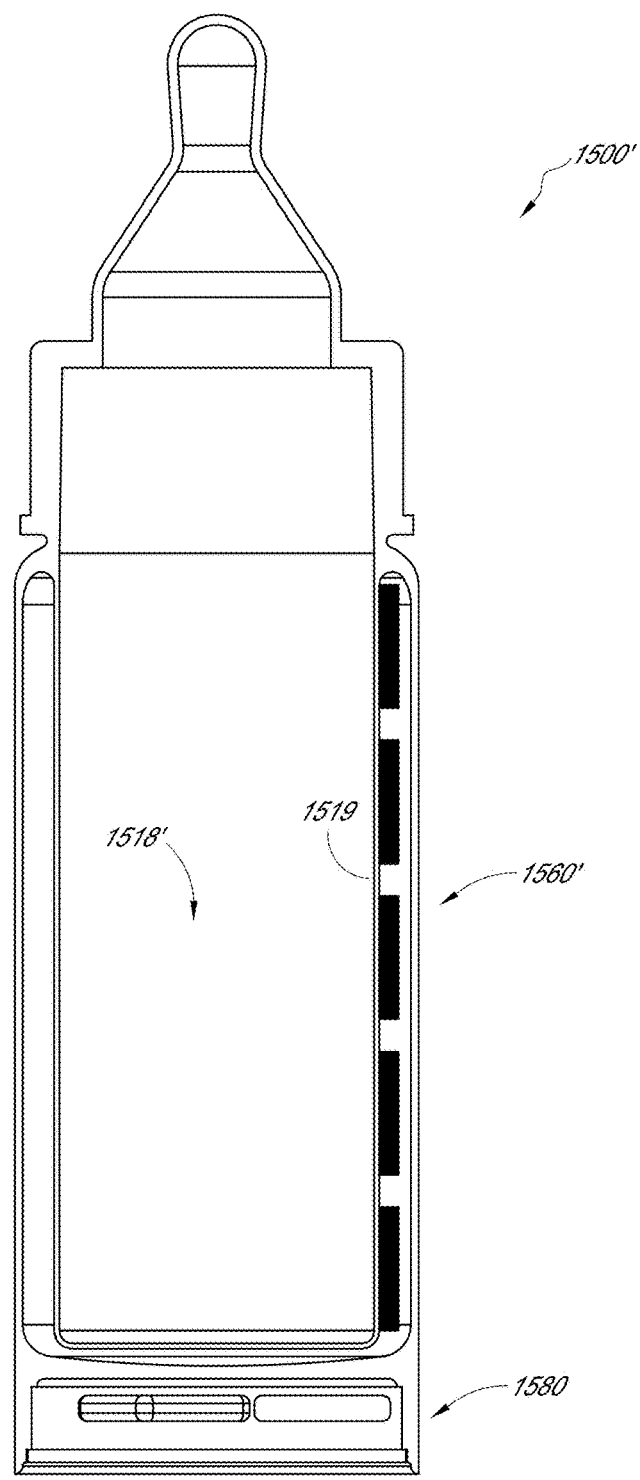
FIG. 32A is a schematic cross-sectional assembled view of another embodiment of a heated or cooled baby bottle.

FIG. 32A shows another embodiment of a baby bottle 1500', which is similar to the baby bottle 1500, except as described below. The baby bottle 1500' can have a liquid holding chamber 1518' defined at least in part by a circumferential wall 1519. The baby bottle 1500' can have one or more heating or cooling elements 1560' (e.g., one or more thermoelectric elements) in thermal communication with the wall 1519 at least along a portion of the length of the wall 1519. The one or more heating or cooling elements 1560' can be operated based at least in part on sensed liquid level, as discussed herein. In another embodiment, only one heating or cooling element can be used along a sidewall of the baby bottle and can be used to induce circulation of the liquid, as described in other embodiments above. In another embodiment, one or more heating or cooling elements can be thermally attached to a thermally conductive wall or walls of the liquid holding chamber similar to the embodiment illustrated in FIG. 34I, advantageously inducing a circulation of the liquid within the liquid holding chamber. The baby bottle 1500' can have one or more power storage devices 1580, as described above, that can provide power to the one or more heating or cooling elements 1560'. Though not shown, the baby bottle 1500' can also have an electronic module, which can include a wireless power receiver, control circuitry and/or a charging circuit.

In one embodiment, the baby bottle 1500, 1500' can have a heating or cooling system 1555 and can be operated (e.g., by an electronic module once the system is actuated by the user) to heat the milk inside the baby bottle 1500 to a lukewarm temperature (e.g., 97 deg. F. to 100 deg. F.). In one embodiment, the baby bottle 1500, 1500' filled with milk or formula can be stored in a separate cooler (e.g., travel cooler, refrigerator) by the user to keep the milk or formula cold.

Once ready for use, the user can turn on the heating system (e.g., manually via an actuation button, wirelessly via their mobile phone or tablet) and the one or more heating or cooling elements 1560, 1560' of the heating or cooling system 1555 can be activated to heat the liquid (e.g., milk, formula) inside the baby bottle 1500, 1500'. The electronic module 1590 can control the heating process (e.g., based on sensed temperature information of the liquid in the baby bottle) to control the amount of heat, and/or the rate of heat, delivered by the one or more heating or cooling elements 1560, 1560' to achieve the desired temperature or temperature range (e.g., lukewarm temperature). In another embodiment, the cooler (e.g., travel cooler) can be excluded. The heating or cooling system 1555 can be activated to operate in cooling mode to keep the liquid (e.g., milk, formula) in the baby bottle 1500, 1500' cool (e.g., at a temperature of between about 35 deg. F. and about 45 deg. F.). Once ready for use, the user can actuate the heating or cooling system 1555 (e.g., manually by pushing a button, wirelessly via a mobile phone or tablet, or by removing the baby bottle from its charging base, etc.) to operate in heating mode so that the one or more heating or cooling elements 1560, 1560' are activated to heat the liquid (e.g., milk, formula) inside the baby bottle 1500, 1500'. Again, the electronic module 1590 or control circuitry can control the heating process (e.g., based on sensed temperature information of the liquid in the baby bottle) to control the amount of heat, and/or the rate of heat, delivered by the one or more heating or cooling elements 1560, 1560' to achieve the desired temperature or temperature range (e.g., lukewarm temperature). Though the features disclosed above may be described in connection with a liquid container or baby bottle 1500, one of skill in the art will recognize that it can also apply to any liquid container, drinkware, dishware or serverware (e.g., bowl, serving dish, hot plate, cup and/or liquid container), including the plate 100, 100', 800, 800', 900, 1100, 1300, 1400, mug 400 or travel mug 600, 1700A, 2000, 2100, 2400, beer mug 1600, bread basket 2200, tortilla warmer 2300, and the scope of disclosure and the invention is understood to cover such liquid containers, drinkware, dishware and serverware. Additionally, one of skill in the art will recognize that the liquid container 1500 or baby bottle can incorporate any of the features or components disclosed in this application (e.g., the features or components disclosed in embodiments above in connection with a plate 100, 100', 800, 800', 900, 1100, 1300, 1400, or mug 400 or travel mug 600, 600', 600'')

Travel Mug

In another embodiment, a travel mug, such as the travel mug 600, 600', 600'', cup, mug, water bottle or liquid container can only have one or more temperature sensors (such as the sensor 820A-820D, 920) for sensing the temperature of the liquid in the travel mug, mug, cup, water bottle or liquid container (e.g., sensing the temperature at the bottom or on a side surface of the inner chamber of the travel mug, mug, cup, liquid container). In this embodiment, the one or more temperature sensors can communicate the sensed temperature information to a visual indicator (e.g., digital display, one or more lights, such as LED lights, glowing icon, including the indicator types disclosed above) on a surface of the travel mug, mug, cup, liquid container viewable by the user to communicate the temperature information to the user. In this embodiment, the travel mug, mug, cup, water bottle or liquid container can exclude the heating or cooling system and can only have the one or more temperature sensors and one or more visual indicators.

Though the features disclosed above may be described in connection with a travel mug, mug, cup, water bottle or liquid container (such as the mug 400, and travel mug 600), one of skill in the art will recognize that this embodiment can also apply to any liquid container, drinkware, dishware or serverware (e.g., bowl, serving dish, hot plate, cup and/or liquid container), including the plate 100, 100', 800, 800', 900, 1100, 1300, 1400, travel mug 1700A, 2000, 2100, beer mug 1600, baby bottle 1500, bread basket 2200, tortilla warmer 2300, etc. and the scope of disclosure and the invention is understood to cover such liquid containers, drinkware, dishware and serverware.

Cooling Mechanism

In another embodiment, the cup, mug 400, travel mug 600, 1700A, 2000, 2100, 2400, baby bottle 1500, beer mug 1600, carafe, water bottle or liquid container can have one or more heating or cooling elements (e.g., heater coil), as discussed in one or more embodiments above, and can have a heat sink 2500 (see FIG. 45) operably thermally coupleable to a side wall SW of the liquid receiving portion to thereby transfer heat from the liquid in the liquid receiving portion to the heat sink 2500. In one embodiment, a portion of the cup, mug 400, travel mug 600, 1700A, 2000, 2100, 2400, baby bottle 1500, beer mug 1600, carafe, water bottle or liquid container that is the heat sink or includes the heat sink 2500 can be moved (e.g., rotated, slid, etc.) into thermal contact with a heat port 2510 (e.g., metal slab, aluminum slab) operably connected to at least a portion of the side wall SW of the liquid receiving portion so that heat from the liquid in the liquid receiving portion is transferred to the heat sink 2500 via the heat port 2510. Said heat is dissipated from the heat sink 2500 (e.g., via radiation, convection). When the heat sink 2500 is moved out of thermal contact with the heat port 2510 (e.g., by rotating or sliding the heat sink portion 2500 relative to the heat port 2510), heat transfer from the liquid in the liquid receiving portion to the heat sink 2500 is inhibited (e.g., prevented). In another embodiment, the heating or cooling element can be excluded from the assembly. In one embodiment, the heat sink portion 2500 can be moved (e.g., rotated, slid) into and out of contact with the heat port 2510 manually by the user. In another embodiment, the heat sink portion 2500 can be moved into and out of thermal contact with the heat port 2510 via an electric motor (e.g., servo motor, linear actuator) or an electromagnet assembly. In one embodiment, the motor or electromagnet is operated via a controller (e.g., electronic module, such as electronic module EM). In another embodiment, the motor can be operated by the user (e.g., via an actuation button actuated by the user to operate the motor). In one embodiment, the heat sink 2500 can be mechanical and include one or more fins 2502 for dissipating heat. In another embodiment, the heat sink 2500 can include a chamber filled with mineral oil, where heat is transferred to the mineral oil when the heat sink 2500 is moved so that the heat port 2510 is in contact with at least a portion of the chamber. In one embodiment, the heat sink 2500 need not be a traditional heat sink with cooling fins 2502, but can be a portion of the outer body of the cup, mug 400, travel mug 600, 1700A, 2000, 2100, 2400, baby bottle 1500, beer mug 1600, carafe, water bottle or liquid container, or a flat or curved surface or any other heat dissipating member (e.g. aluminum, copper, thermal plastic, etc.).

In another embodiment, the cup, mug 400, travel mug 600, 1700A, 2000, 2100, 2400, baby bottle 1500, beer mug 1600, carafe, water bottle or liquid container can have one or more heating or cooling elements (e.g., heater coil), as discussed in one or more embodiments above, and can have a lid (e.g. removable lid) 2520 that can be moved (e.g., rotated, slid, etc.) to uncover one or more openings 2530 so that heat from the liquid in the liquid receiving portion is vented through said one or more openings 2530, thereby cooling the liquid volume (see FIG. 46). Said heat is dissipated from the liquid via convection heat transfer. When the lid 2520 is moved (e.g., rotated, slid, etc.) to cover or close said one or more openings 2530, dissipation of heat from the liquid in the liquid receiving portion through said openings 2530 is inhibited (e.g., prevented).

In one embodiment, the lid 2520 can be moved (e.g., rotated, slid, etc.) manually by the user to allow and disallow said heat dissipation. In another embodiment, the lid 2520 can be moved (e.g., rotated, slide, etc.) to allow and disallow said heat dissipation via an electric motor (e.g., servo motor, linear actuator) or an electromagnet. In one embodiment, the motor or electromagnet is operated via a controller (e.g., electronic module, such as electronic module EM). In another embodiment, the motor or electromagnet can be operated by the user (e.g., via an actuation button actuated by the user to operate the motor).

Though the features disclosed above may be described in connection with a travel mug, mug, cup, water bottle or liquid container (such as the mug 400, and travel mug 600), one of skill in the art will recognize that this embodiment can also apply to any liquid container, drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Molecular Sensor

In one embodiment, the cup, mug 400, travel mug 600, 1700A, 2000, 2100, 2400, baby bottle 1500, beer mug 1600, carafe, water bottle or liquid container can include one or more molecular sensors to analyze the chemical makeup of the liquid therein (e.g., coffee, tea). Said one or more molecular sensors can communicate the sensed information to the controller (e.g., electronic module EM) and/or can communicate the sensed information to a visual display of the cup, mug 400, travel mug 600, 1700A, 2000, 2100, 2400, baby bottle 1500, beer mug 1600, carafe, water bottle or liquid container. The molecular sensor can communicate information about the make-up of the contents in the receiving portion (e.g., nutritional facts, caffeine content, calories, etc.), or can tell the user when a tea bag is done being steeped, or can tell the user the caffeine content or sugar content or calories of a beverage. The controller (e.g., electronic module EM) can have a memory module (e.g., non-volatile memory) that collects the sensed information and can communicate such information to the user (e.g., in desired intervals, such as every week, every month), such as, for example, how much caffeine the user has consumed (e.g., in a week, in a month, etc.).

Though the features disclosed above may be described in connection with a travel mug, mug, cup, water bottle or liquid container (such as the mug 400, and travel mug 600), one of skill in the art will recognize that this embodiment can also apply to any liquid container, drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. for sensing the chemical makeup of food placed thereon and communicating the sensed information with a controller (e.g., electronic module EM) and/or visual display, and the scope of disclosure and the invention is understood to cover such liquid containers, drinkware, dishware and serverware.

Lid Mechanism

As discussed above, in one embodiment, the travel mug 600, 1700A, 2000, 2100, 2400, water bottle or liquid container can have a lid (e.g. removable lid) 2600 (see FIG. 47). In one embodiment, the lid 2600 can have a cover that covers the drinking spout and the cover can open between a closed position (covering the drinking spout) and an open position (exposing the drinking spout). The lid 2600 can have a magnetic coupling mechanism 2610 for releasing the cover from the closed position. In one embodiment, the magnetic coupling mechanism 2610 can be manually actuated by the user (e.g., by pushing a button 2620) to release the cover from the closed position by moving (e.g. sliding, rotating, twisting) a magnet 2612 relative to a magnet 2614 in the cover to reverse the polarity of the magnets 2612, 2614 from an attractive force to a repelling force. In one embodiment, the cover is spring loaded and can move from a closed position to an open position via the spring force. In this embodiment, when the magnetic coupling is deactivated by the user, the cover will automatically move from a closed position to an open position. In another embodiment this can be reversed, so that the spring force activates the cover from an open position to a closed position. In this embodiment, when the magnetic coupling is deactivated by the user, the cover will automatically close. In other embodiments, the cover can slide open or hinge open or twist open or rotate open, and the cover can have a spring force causing the cover to move from a closed position to an open position. In this embodiment, two or more magnets 2612, 2614 can be used to secure the cover in the closed position (e.g., one or more magnets are located in the cover and one or more magnets are located in the lid or in the body of the travel mug 600, 1700A, 2000, 2100, 2400, water bottle or liquid container). In this embodiment, one of the one or more magnets can be moved from a first position to a second position, decoupling the one or more magnets in the cover from the one or more magnets in the lid or the body. The movement of the one or more magnets from a first position to a second position can be accomplished using a user-actuated button 2620, which can be on the cover or on the lid or on the body or can be actuated using a motor or an electromagnet. In the above embodiments, the "body" can refer to the body of the travel mug, water bottle or liquid container or can refer to the body of a removable cap or removable lid of the travel mug, water bottle or liquid container. All of the embodiments described in the above paragraph require at least one or more magnets within the cover and one or more magnets within the lid or the body. Alternatively, the magnetic coupling can be achieved using a magnet in one portion of the assembly and a magnetically attractive metal in another portion of the assembly. Magnets attract to ferrous metals such as iron, nickel, cobalt, certain steels and other alloys. In one embodiment, one or more magnetics can be in the cover and one or more pieces of magnetically attractive material (e.g. iron, nickel, cobalt, certain steels and other alloys) can be in the lid or the body. In another embodiment, this can be reversed and the one or more magnets can be in the lid or the body and one or more pieces of magnetically attractive material (e.g. iron, nickel, cobalt, certain steels and other alloys) can be in the cover.

Though the features disclosed above may be described in connection with a travel mug, water bottle or liquid container (such as the travel mug 600), one of skill in the art will recognize that this embodiment can also apply to any liquid container, drinkware, dishware or serverware (e.g., bowl, serving dish, hot plate, cup, baby bottle and/or liquid container), including the plate 100, 100', 800, 800', 900, 1100, 1300, 1400, carafe, bread basket 2200, tortilla warmer 2300, etc., and the scope of disclosure and the invention is understood to cover such liquid containers, drinkware, dishware and serverware.

Kinetic Electricity Generator

In one embodiment, the cup, mug 400, travel mug 600, 1700A, 2000, 2100, 2400, baby bottle 1500, beer mug 1600, carafe, water bottle or liquid container can have one or more heating or cooling elements (e.g., heater coil), one or more power storage elements (e.g., batteries) that provide power to the one or more heating or cooling elements, as discussed in one or more embodiments above, and can have a kinetic electricity generator 2700 for charging the one or more power storage elements during use of the cup, mug 400, travel mug 600, 1700A, 2000, 2100, 2400, baby bottle 1500, beer mug 1600, carafe, water bottle or liquid container. In one embodiment, the kinetic electricity generator 2700 can be housed in or on the body of the cup, mug 400, travel mug 600, 1700A, 2000, 2100, 2400, baby bottle 1500, beer mug 1600, carafe, water bottle or liquid container. As the user moves the cup, mug 400, travel mug 600, 1700A, 2000, 2100, 2400, baby bottle 1500, beer mug 1600, carafe, water bottle or liquid container (e.g., tilting it to consume a beverage, vibrations transferred from the user to the container while carrying it), the kinetic electricity generator 2700 generates electricity and directs the electricity to the one or more power storage elements to charge them.

In one embodiment, the cup, mug 400, travel mug 600, 1700A, 2000, 2100, 2400, baby bottle 1500, beer mug 1600, carafe, water bottle or liquid container can exclude a heating or cooling system and can have one or more liquid quality sensors, one or more power storage elements, a visual display (e.g. display screen, indicator lights, glowing icons, etc.) and can have a kinetic electricity generator 2700 for charging the one or more power storage elements during use of the cup, mug 400, travel mug 600, 1700A, 2000, 2100, 2400, baby bottle 1500, beer mug 1600, carafe, water bottle or liquid container. The energy from the one or more power storage elements PS can be used to power the liquid quality sensor system. In one embodiment, the cup, mug 400, travel mug 600, 1700A, 2000, 2100, 2400, baby bottle 1500, beer mug 1600, carafe, water bottle or liquid container can exclude a heating or cooling system and can have one or more liquid quality sensors, a visual display (e.g. display screen, indicator lights, glowing icons, etc.) and can have a kinetic electricity generator for powering the liquid quality sensing circuit of the cup, mug 400, travel mug 600, 1700A, 2000, 2100, 2400, baby bottle 1500, beer mug 1600, carafe, water bottle or liquid container. In one embodiment, the kinetic electricity generator can be housed in or on the body of the cup, mug 400, travel mug 600, 1700A, 2000, 2100, 2400, baby bottle 1500, beer mug 1600, carafe, water bottle or liquid container. As the user moves the cup, mug 400, travel mug 600, 1700A, 2000, 2100, 2400, baby bottle 1500, beer mug 1600, carafe, water bottle or liquid container (e.g., tilting it to consume a beverage, vibrations transferred from the user to the container while carrying it), the kinetic electricity generator generates electricity and directs the electricity to the one or more power storage elements to charge them. In one embodiment, the kinetic electricity generator can be a piezoelectric generator and can be activated by vibrations or movements or a user-actuated push button or lever, etc. In another embodiment the kinetic electricity generator can be an electromagnetic induction generator. In one embodiment the kinetic electricity generator can generate electricity via vibrations and movement of the cup, mug 400, travel mug 600, 1700A, 2000, 2100, 2400, baby bottle 1500, beer mug 1600, carafe, water bottle or liquid container (e.g. vibrations caused from transporting the mug in a backpack or in a car (road vibrations), etc.).

Figure 48:
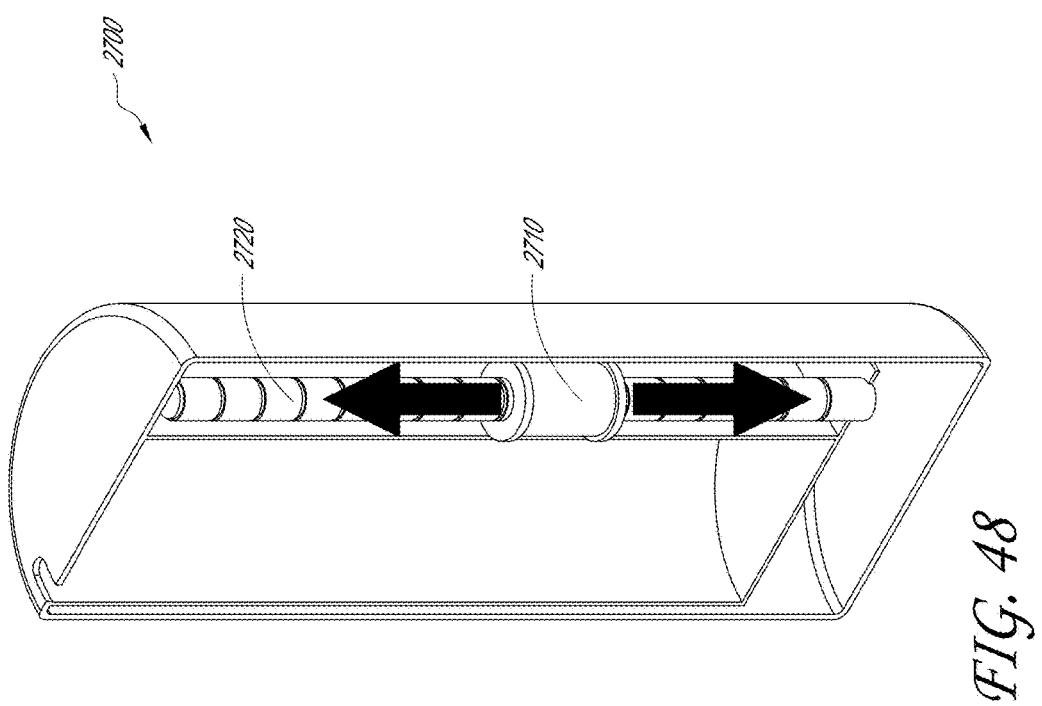
FIG. 48 is a schematic view of one embodiment of a kinetic electricity generator.

As shown in FIG. 48, in one embodiment the kinetic electricity generator can include a magnet 2710 that travels relative to a coiled wire 2720 (e.g., the magnet travels within a space defined by the coiled wire 2720). As the user moves (e.g., tilts) the cup, mug 400, travel mug 600, 1700A, 2000, 2100, 2400, baby bottle 1500, beer mug 1600, carafe, water bottle or liquid container it generates electricity via electromagnetic induction. In one embodiment, the magnet 2710 moves relative to the coiled wire 2720. In another embodiment, the coiled wire 2720 moves relative to the magnet 2710.

In another embodiment, the cup, mug 400, travel mug 600, 1700A, 2000, 2100, 2400, baby bottle 1500, beer mug 1600, carafe, water bottle or liquid container (e.g., water bottle, baby bottle) can have one or more solar cells on at least a portion of its body to collect solar energy that can be used to supply power to the different components of the device.

Though the features disclosed above may be described in connection with a travel mug, mug, cup, water bottle or liquid container (such as the mug 400, and travel mug 600), one of skill in the art will recognize that this embodiment can also apply to any liquid container, drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Liquid Container Insert

In one embodiment, the travel mug 600, 1700A, 2000, 2100, 2400, mug, water bottle or liquid container can include a removable insert for holding the liquid within the body of the travel mug 600, 1700A, 2000, 2100, 2400, mug, water bottle or liquid container. In one embodiment, the insert 2800 can be disposable, as shown in FIG. 49A. In one embodiment, the insert 2800 can be made of paper or plastic (e.g., recyclable plastic). In another embodiment, the insert 2810 can be non-disposable (e.g., made of hard plastic or metal), as shown in FIG. 49B, and can be removably inserted into the receiving portion of the travel mug 600, 1700A, 2000, 2100, 2400, mug, water bottle or liquid container to hold the liquid. In this manner, following use of the travel mug 600, 1700A, 2000, 2100, 2400, mug, water bottle or liquid container, the user can remove the insert 2810 and wash only the insert 2810, without having to also wash the travel mug 600, 1700A, 2000, 2100, 2400, mug, water bottle or liquid container. Preferably, the insert 2810 can be made of a material that allows heat transfer therethrough, thereby allowing heat transfer to or from the one or more heating or cooling elements of the travel mug 600, 1700A, 2000, 2100, 2400, mug, water bottle or liquid container to or from the liquid held in the insert. The insert 2810, once placed in the receiving portion of the travel mug 600, 1700A, 2000, 2100, 2400, mug, water bottle or liquid container can make a thermal connection with an inner surface of the body. In one embodiment, the insert 2810 can have a size and shape generally corresponding to the size and shape of the receiving portion of the travel mug 600, 1700A, 2000, 2100, 2400, mug, water bottle or liquid container. In the embodiments described above, the travel mug 600, 1700A, 2000, 2100, 2400, mug, water bottle or liquid container can have a sensor (e.g. magnetic coupling sensor, proximity sensor, ultrasound sensor, etc.) an can detect if the disposable or non-disposable insert has been inserted or is missing. In this embodiment certain features of the travel mug 600, 1700A, 2000, 2100, 2400, mug, water bottle or liquid container can be disabled or the power can be automatically shut off when the insert is not detected. In another embodiment, certain features can be enabled or the power can be turned on when the insert is detected.

Method of Remote Control Operation

Figure 33:
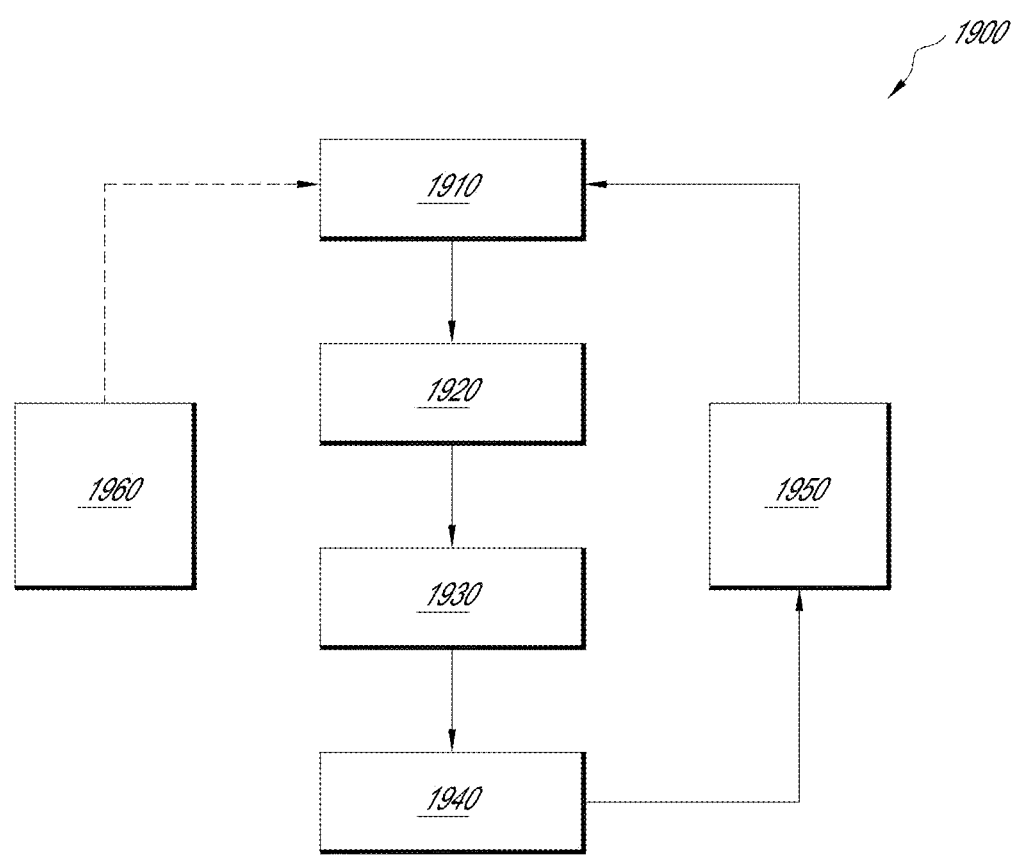
FIG. 33 is a box diagram of one method of operating a heated or cooled plate, bowl, serving dish, mug, cup, travel mug, water bottle or liquid container.

FIG. 33 shows one embodiment of a method 1900 of operating the one or more plates 100, 1100, bowls, serving dishes, mugs 400, travel mugs 600, cups, and liquid containers. In the illustrated embodiment, a remote control or mobile electronic device can be paired 1910 with one or more plates 100, 1100, bowls, serving dishes, mugs 400, travel mugs 600, cups, and liquid containers. The remote control or mobile electronic device can then receive one or more instructions from a user 1920 regarding the operation of the one or more plates 100, 1100, bowls, serving dishes, mugs 400, travel mugs 600, cups, and liquid containers. The remote control or mobile electronic device can then transmit 1930 said one or more instructions to the paired one or more plates 100, 1100, bowls, serving dishes, mugs 400, travel mugs 600, cups, and liquid containers. The one or more instructions can then be performed 1940 by the one or more plates 100, 1100, bowls, serving dishes, mugs 400, travel mugs 600, cups, and liquid containers. Additionally, the remote control or mobile electronic device can receive 1950 information from the one or more plates 100, 1100, bowls, serving dishes, mugs 400, travel mugs 600, cups, and liquid containers (e.g., sensed food temperature, battery charge or level, current temperature setting, etc.). Optionally, an application can be loaded 1960 onto the remote control or mobile electronic device to allow the remote control or mobile electronic device to interface with the one or more plates 100, 1100, bowls, serving dishes, mugs 400, travel mugs 600, cups, and liquid containers.

FIG. 44 shows a block diagram of a communication system for the devices described herein (e.g., the one or more plates 100, 1100, bowls, serving dishes, mugs 400, travel mugs 600, 1700, 2100, 2200, 2400, cups, liquid containers such as beer mugs 1600 and baby bottles 1500, bread basket 2200, tortilla warmer 2300, etc.). In the illustrated embodiment, the electronic module EM (such as the electronic module disclosed herein for the plates, cups, mugs, travel mugs, liquid containers, beer mugs, baby bottles, bread basket, tortilla warmer, etc.) can receive sensed information from one or more sensors S1-Sn (e.g., liquid level sensors, liquid volume sensors, temperature sensors, battery charge sensors, drink quality sensors, tilt sensors or gyroscopes). The electronic module EM can also receive information from and transmit information (e.g., instructions) to one or more heating or cooling elements HC (e.g., to operate each of the heating or cooling elements in a heating mode, in a cooling mode, turn off, turn on, vary power output of, etc.) and optionally to one or more power storage devices PS (e.g., batteries, such as to charge the batteries or manage the power provided by the batteries to the one or more heating or cooling elements). The electronic module EM can also communicate with a wireless power transmitter WPT (e.g., an inductive power transmitter). The electronic module EM can also communicate with (e.g., transmit information to and receive information, such as user instructions from, a user interface UI1 on the unit (e.g., on the body of the plates, cups, mugs, travel mugs, liquid containers, beer mugs, baby bottles, bread basket, tortilla warmer, etc.). The electronic module EM can also communicate with an electronic device ED (e.g., a mobile electronic device such as a mobile phone, PDA, tablet computer, laptop computer, electronic watch; or a desktop computer) via the cloud CL or via a wireless communication system such as BLUETOOTH® BT. The electronic device ED can have a user interface UI2, that can display information associated with the operation of the actively heated/cooled drinkware, dishware, serverware, etc. (as disclosed herein), and that can receive information (e.g., instructions) from a user and communicate said information to the actively heated/cooled drinkware, dishware, serverware, etc. (as disclosed herein).

Drinkware Container

The various embodiments described below refer to a drinkware container. One of skill in the art will understand that the terms "drinkware container" broadly refer to any portable handheld container that can hold a liquid for consumption, and includes containers such as cups, mugs, travel mugs, beer mugs, baby bottles, carafes and other handheld portable liquid containers.

Figure 50:
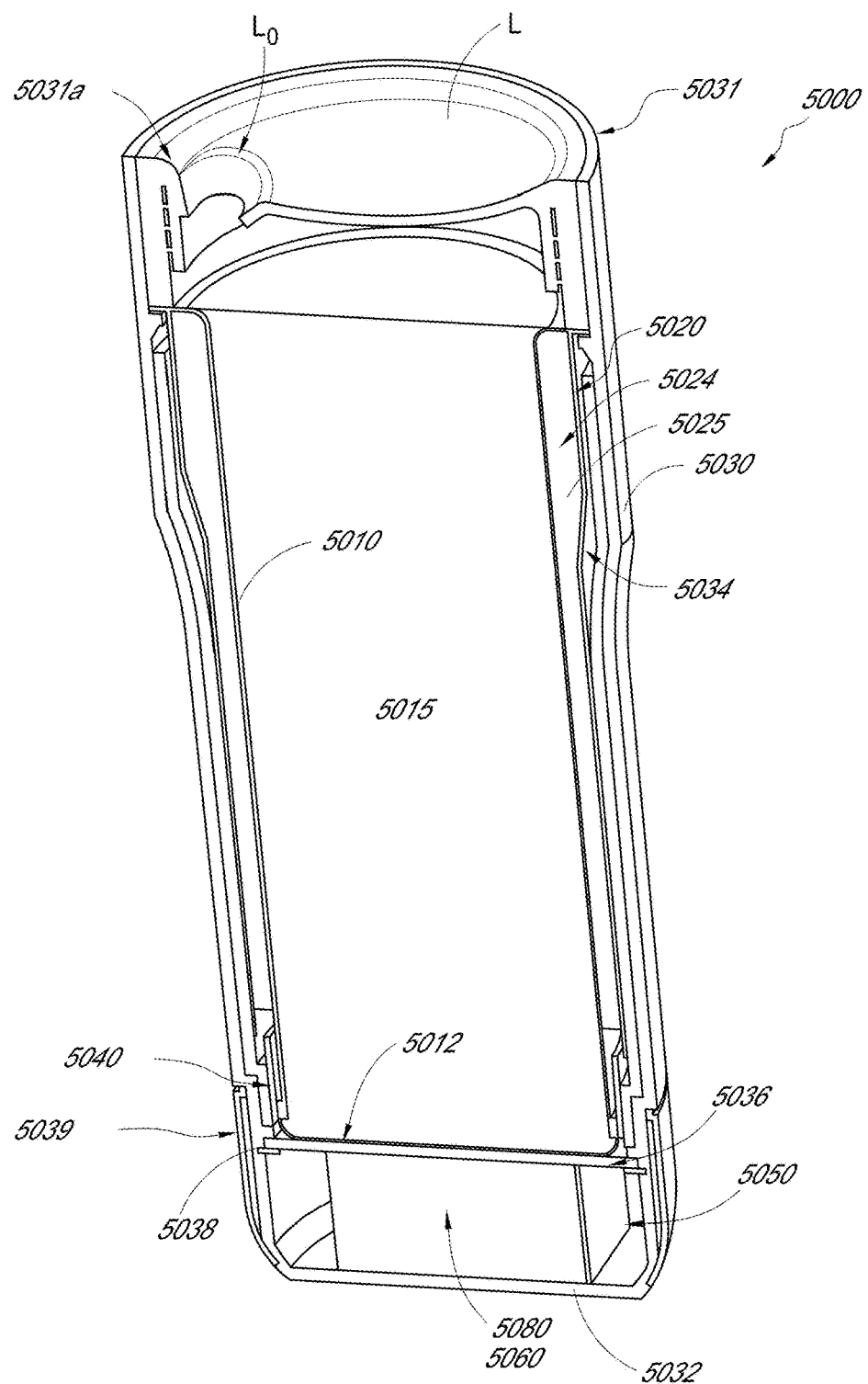
FIG. 50 is a schematic cross-sectional view of an embodiment of a drinkware container.

FIG. 50 shows a lengthwise cross-sectional view of an embodiment of a drinkware container 5000 (hereinafter "container 5000"). As only a cross-section is shown, the other half of the drinkware container 5000 is excluded in FIG. 50 to illustrate the various components of the container 5000. One of skill in the art will understand that the excluded portion of the drinkware container 5000 in FIG. 50 is a mirror image of the portion of the drinkware container 5000 that is shown in FIG. 50. In the illustrated embodiment, the container 5000 is shown as a travel mug. However, as discussed above, the drinkware container 5000 can be other types of containers, such as a cup, mug, beer mug, baby bottle, carafe or other handheld portable liquid containers.

The container 5000 has an inner sidewall 5010 (e.g., a circumferential or cylindrical inner sidewall) and inner bottom wall 5012, which together define a chamber 5015 that receives and holds a liquid therein. The container 5000 also has a second sidewall 5020 (e.g., a circumferential or cylindrical inner sidewall) that is spaced apart from the inner sidewall 5010 so as to define a chamber (e.g., an annular chamber) 5024 between the inner wall 5010 and the second wall 5020. Optionally, the inner sidewall 5010 can be made of metal (e.g., stainless steel). However, in other embodiments, the inner sidewall 5010 can be made of other suitable materials. Optionally, the second sidewall 5020 can be made of the same material as the inner sidewall 5010 (e.g., both the inner sidewall 5010 and the second sidewall 5020 can be made of metal, such as stainless steel). In another embodiment, the second sidewall 5020 can be made of a different material than the inner sidewall 5010; for example, the inner sidewall 5010 can be made of metal, such as stainless steel, and the second sidewall 5020 can be made of a plastic material that insulates the outer portion of the container 5000 from the inner sidewall 5010 and the liquid contents of the chamber 5015. Optionally, the inner sidewall 5010 and the second sidewall 5020 are part of a single piece (e.g., monolithic piece), so that the inner and second sidewall 5010, 5020 are fixed (e.g., not removable) relative to each other.

The chamber 5024 can be filled with a phase change material (PCM) 5025. The PCM 5025 can be a solid-solid phase change material, or a solid-liquid phase change material. The PCM 5025 can be a wax (e.g., Paraffin wax). However, other suitable phase change materials (e.g., a metal) can be used.

The PCM 5025 can be selected to have a predetermined transition (e.g., melting) temperature that generally corresponds to a suitable drinking temperature for a heated liquid. In some embodiments, the predetermined transition temperature can optionally be between 135 degrees F. and 145 degrees F., such as optionally be 140 degrees F. In one embodiment, when the liquid (e.g., hot coffee, hot tea, soup) poured into the chamber 5015 of the container 5000 has a temperature above the predetermined transition temperature, the PCM 5025 can absorb heat from the liquid to cause the PCM 5025 to transition, for example, from a solid to a liquid, thereby decreasing the temperature of the liquid toward the said predetermined temperature. As the temperature of the liquid drops (e.g., via conduction of heat from the liquid through the inner sidewall 5010 to the PCM 5025), the operation of the container 5000 approaches a steady state of operation where the temperature of the liquid approaches the predetermined transition temperature, where it can remain for an extended period of time (e.g., for at least 1 hour, for at least 2 hours, for at least 3 hours, etc.).

The container 5000 can have an outer sidewall 5030 (e.g., a circumferential or cylindrical inner sidewall) that extends from a rim 5031 of the container 5000 to an outer bottom wall 5032. The rim 5031 can optionally partially define a drinking lip 5031a of the container 5000, e.g., along with an opening Lo in a lid L that can removably cover the proximal end of the container 5000. Optionally, the outer sidewall 5030 and outer bottom wall 5032 can be a single piece (e.g., monolithic with no seams). However, in other embodiments, at least a portion of the outer sidewall 5030 can be separate from the bottom wall 5032, as discussed further below. The outer sidewall 5030 can be disposed radially outward from the second sidewall 5020. Optionally, the outer sidewall 5030 can be radially spaced apart from the second sidewall 5020 to define a chamber 5034 (e.g., an annular chamber) therebetween. In one embodiment, the chamber 5034 can provide an air gap between the second sidewall 5020 and outer sidewall 5030, where said air gap can insulate the outer sidewall 5030 from the second sidewall 5020 and the inner sidewall 5010. In other embodiments, the chamber 5034 can be filled with an insulative material (e.g., foam). In still another embodiment, the chamber 5034 can optionally be under vacuum. However, in other embodiments, the outer sidewall 5030 can be adjacent the second sidewall 5020 so that there is no gap therebetween. Optionally, the outer sidewall 5030 can be made of an insulative material (e.g., foam, plastic).

With continued reference to FIG. 50, the container 5000 can optionally have one or more heating elements 5040 disposed about (e.g., circumferentially about) at least a portion of the inner wall 5010 so that it is in direct thermal communication with liquid in the chamber 5015. In the illustrated embodiment, the one or more heating elements 5040 are disposed about at least a portion of the inner wall 5010 at a location below the chamber 5024. The one or more heating elements 5040 are optionally one or more resistive heaters. In one embodiment, the one or more heating elements 5040 can optionally be defined by a trace pattern screen printed onto the surface of the inner wall 5010. A connecting lead line (not shown) can electrically connect the one or more heating elements 5040 to one or more power storage elements 5060 disposed in a bottom chamber 5050 and/or control circuitry 5080 disposed in the bottom chamber 5050. For example, in one embodiment such a lead line can extend from the one or more heating elements 5040 downward along the inner bottom wall 5012 to the one or more power storage elements 5060 and/or control circuitry 5080. In one embodiment, the one or more heating elements 5040 can optionally be a thermoelectric element. Though the discussion in this paragraph refers to one or more heating elements 5040, one of skill in the art will recognize that this can also apply to one or more cooling elements or one or more heating and cooling elements (e.g., thermoelectric elements), and that this disclosure is meant to apply to all these options for the container 5000.

In the illustrated embodiment, the outer sidewall 5030 and outer bottom wall 5032 are optionally a single piece (e.g. monolithic with no seams), such that the one or more power storage elements 5060 (e.g., batteries, capacitors) and control circuitry 5080 are permanently housed in the chamber 5050. In another embodiment, the outer bottom wall 5032 is removable relative to the outer sidewall 5030 to allow access to the chamber 5050 (e.g., to replace the power storage elements 5060, perform maintenance on the electronics, etc.). In another embodiment, at least a portion of the outer sidewall 5030 can be separate from the outer bottom wall 5032 (and/or at least another portion of the outer sidewall 5030) so that the one or more power storage elements 5060 and control circuitry 5080 are housed in a module that can be removably coupled to the rest of the container 5000. For example, said module can be coupled to a bottom plate 5036 via a threaded connection, key-slot connection, magnetic connection, or other suitable connection. In such an embodiment, the lead line from the heating element 5040 can terminate at the bottom plate 5036 and establishes an electrical connection with a separate lead line in said module when the module is coupled to the container 5000. In still another embodiment, the outer bottom wall 5032 can be removably attached to the container 5000 and can be removed to access the control circuitry 5080 and/or one or more power storage elements 5060 for maintenance, testing and/or replacement. In some embodiments, the bottom wall 5032 can have one or more electrical contacts on an outer surface thereof that contacts a corresponding electrical contact on a charging base (See e.g., charging base 7400 in FIG. 73, described below), through which the one or more power storage elements 5060 can be charged when the container 5000 is disposed on the charging base. Said one or more electrical contacts on the bottom wall 5032 can be circular (similar to the electrical contact 7398a shown in FIG. 77a and discussed further below).

The control circuitry 5080 can optionally control the charging of the one or more power storage elements (e.g., the control circuitry 5080 can include a charging circuit) can control delivery of power to the heating element 5040. In one embodiment, the control circuitry 5080 can control delivery of power to the heating element 5040 to maintain the liquid in the chamber 5015 at the predetermined temperature. In another embodiment, the control circuitry 5080 can control delivery of power to the heating element 5040 to input heat to the liquid to increase the temperature of the liquid to a user selected temperature. Said user selected temperature can optionally be provided via a user interface on the body of the container 5000. In another embodiment, the user selected temperature can be provided wirelessly to the control circuitry (which can have a receiver) from a portable electronic device (e.g., smart phone or tablet computer), e.g., so that there are no buttons or other controls on the container 5000 that the user manually actuates. In still another embodiment, the temperature can be preselected or preset (e.g., during manufacture). Optionally, the control circuitry 5080 can control delivery of power to the heating element 5040 based at least in part on information from one or more sensors that sense a parameter of quality of the liquid (e.g., temperature, liquid volume or level, acidity, pH) where said one or more sensors can be on a surface of one or both of the inner sidewall 5010 and inner bottom wall 5012. Said sensors can be any of the sensors disclosed herein and can communicate with the control circuitry 5080 in any manner disclosed herein.

During operation, a user can pour a hot liquid into the chamber 5015. If the temperature of the liquid is above the transition temperature of the PCM 5025, heat can be transferred from the liquid to the PCM 5025 to drop the temperature of the liquid in the chamber 5015 until an equilibrium is achieved. The control circuitry 5080 can then operate (e.g., based on the information provided by the sensors) to supply power to the one or more heating elements 5040 to either maintain the temperature of the liquid in the chamber 5015 relatively steady (or within a desired temperature range) for an extended period of time, or to increase the temperature of the liquid in the chamber 5015.

With continued reference to FIG. 50, the outer sidewall 5030 of the container 5000 can include a lower portion 5038 with a smaller diameter than an upper portion of the outer sidewall 5030 so as to define a stepped portion in a lower portion of the container 5000. The container 5000 can optionally also include a movable sidewall 5031 disposed about the lower portion 5038. In the illustrated embodiment, the movable sidewall 5031 can rotate relative to the lower portion 5038 (e.g., about the axis of the container 5000), e.g. via a bearing. In one embodiment, the movable sidewall 5031 can have substantially the same diameter as the outer sidewall 5030 at a location above the lower portion 5038, so that the movable sidewall 5031 is substantially aligned with the outer sidewall 5030 at said location above the lower portion 5038. In one embodiment, the movable sidewall 5031 can be in operative communication with one or more sensors that can sense the rotation of the movable sidewall 5031 with respect to at least a portion of the outer sidewall 5030 (e.g., with respect to at least a portion of the lower portion 5038). In one embodiment, at least one of said one or more sensors can be an optical sensor. In another embodiment, at least one of said one or more sensors can be a Hall effect sensor. However, other suitable sensors for sensing the movement of the movable sidewall 5031 can be used (e.g., capacitance sensor).

Said one or more sensors can communicate the sensed rotation of the movable sidewall 5031 to the control circuitry 5080, which can control the operation of the one or more heating elements 5040 based at least in part on said sensed rotation. In one embodiment, the control circuitry 5080 can, via an algorithm stored in a memory of the control circuitry 5080, associate an incremental rotation of the movable sidewall 5031 with an incremental change in a user selected temperature (as discussed above), and can operate the one or more heating elements 5040 so that the liquid in the chamber 5015 approaches said user selected temperature. Accordingly, in one embodiment, the movable sidewall 5031 can be used to change a temperature set point for the container 5000 to which the liquid in the chamber 5015 is to be heated.

With continued reference to FIG. 50, in one embodiment the container 5000 can optionally have one or more capacitance touch sensors (not shown) on the outer sidewall 5030, which the user can actuate to control the operation of the container 5000. Said capacitance touch sensors can be similar to the soft touch sensors discussed above. The capacitance touch sensors can communicate with the control circuitry 5080 (e.g., via a lead line that extends between the one or more sensors and the control circuitry 5080). For example, the user can touch the capacitance touch sensor to unlock or wake up the control circuitry 5080, allowing an adjustment in the user selected temperature (as discussed above) by rotating the movable sidewall 5031. After a period of time (which can be a set period of time saved in a memory of the control circuitry 5080), the control circuitry 5080 can lock out the control of the container 5000 such that further rotation of the movable sidewall 5031 will not adjust the user selected temperature. If the user wishes to again adjust the user selected temperature, they can again contact the capacitance touch sensor to again unlock the control of the container 5000, and thereby adjust the user selected temperature via the rotation of the movable sidewall 5031.

In one embodiment, the one or more capacitance touch sensors can be used to turn one and off the electronics of the container 5000. For example, in embodiments where there is only one capacitance touch sensor, the user can press the sensor for an X amount of time (e.g., 2 seconds, 3 seconds, 5 seconds) to turn the electronics (e.g., control circuitry 5080) on if it was previously off, or to turn the electronics off if they were previously on.

In one embodiment, the container 5000 can optionally include a visual indication screen (similar to visual indication screen 7395 in FIG. 75, described below) on the outer sidewall 5030, which can communicate with the control circuitry 5080 and can display information associated with the operation of the container 5000. For example, the visual indication screen can indicate when the control circuitry is in operation (e.g., "ON"). In another example, the visual indication screen can indicate the user selected temperature, e.g., as the user rotates the movable sidewall 5031 to adjust the user selected temperature, as discussed above. In still another embodiment, the visual indication screen can display information (e.g., the user's name) communicated to the control circuitry 5080 from a mobile electronic device (e.g., via BLUETOOTH® or other wireless communication method) of via the internet from a remote computer, or display other operational information (e.g., liquid level in container 5000, such as "HALF FULL", "QUARTER FULL", battery charge level or operating time left before battery needs charging)

Figure 50A:
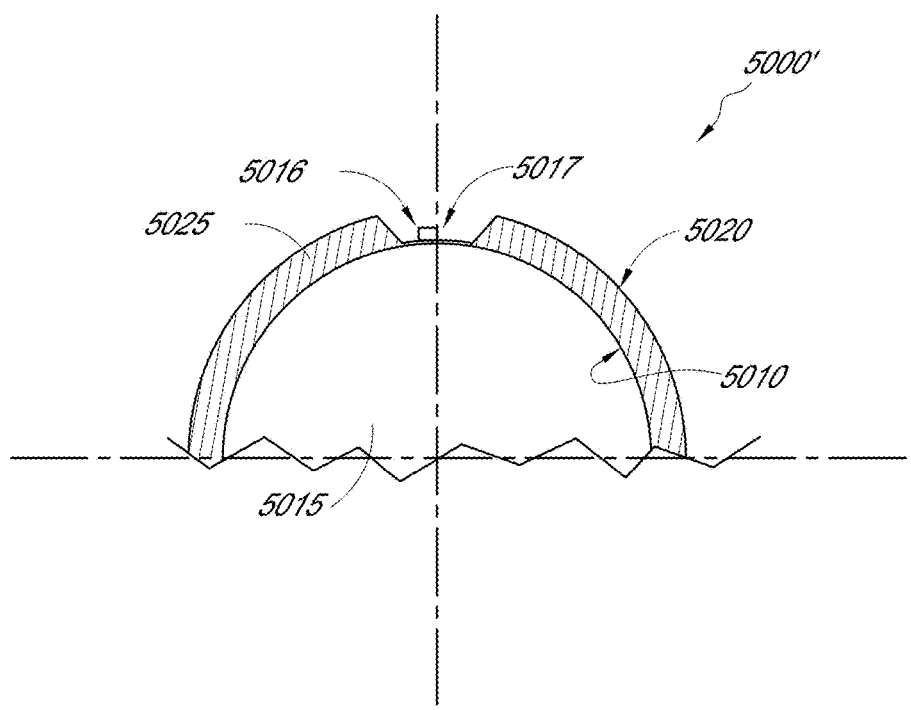
FIG. 50A is a schematic partial transverse cross-sectional view of an embodiment of a drinkware container.

As shown in FIG. 50A, in one embodiment, the container 5000' can include one or more sensors 5016 that can sense information indicative of a liquid level in the chamber 5015. Such sensors can be any of the types of sensors disclosed herein (e.g., capacitance sensors, ultrasound sensors, temperature sensors). In one embodiment, the one or more sensors 5016 can be a plurality of sensors 5016 that are in contact with the inner sidewall 5010 along a length (e.g., the entire length, ¾ of the length, etc.) of the inner sidewall 5010 and communicate the sensed temperature information to the control circuitry 5080 (e.g., via one or more lead lines between the sensors 5016 and the control circuitry 5080). For example, the plurality of sensors 5016 can be mounted to a flex strip attached to (e.g., adhered to, such as with a thermally conductive adhesive) the inner sidewall 5010. In one embodiment, as shown in FIG. 50A, the plurality of sensors 5016 are on the outer surface of the inner sidewall 5010 so as not to be within the chamber 5015. In the illustrated embodiment, the strip of sensors 5016 are positioned against the outer surface of the inner sidewall 5010 at a recessed location 5017 where the second sidewall 5020 and PCM 5025 are not present; as shown in FIG. 50A, the second sidewall 5020 contacts the inner sidewall 5010 on either side of said recess 5017 in which the strip of sensors 5016 is placed. In one embodiment, the plurality of sensors 5016 can be Negative Temperature Coefficient (NTC) thermistors.

In one embodiment, the control circuitry 5080 can determine (e.g., based on one or more algorithms stored in a memory thereof) the liquid level in the chamber 5015 based at least in part on the sensed information (e.g., sensed temperature or information indicative of temperature) communicated from the plurality of sensors 5016. In one embodiment, the control circuitry 5080 can, based on the information sensed by the plurality of sensors 5016, determine the differential in temperature between any two adjacent sensors. Where such differential exceeds a certain amount (e.g., 5 degrees F., 10 degrees F., 15 degrees F.) and/or indicates a temperature higher than ambient by a certain amount, the control circuitry 5080 can determine that the liquid level in the chamber 5015 is between said two sensors of the plurality of sensors 5016 that exhibit this temperature differential, and can indicate the location of liquid level (e.g., based on the arrangement of the plurality of sensors 5016 vertically along the inner sidewall 5010), such as by communicating information associated with the determined liquid level (e.g., to a visual indication screen on the container 5000, to a mobile electronic device associated with the container 5000, etc.). Said information associated with the determined liquid level that is communicated to the user can be in the form of a quantitative value provided to the user (e.g., level at 6/10, 5/10, 1/10) or qualitative level (e.g., "half full", "quarter full", etc.). In another embodiment, said information associated with the determined liquid level can be communicated via a visual graphic to the user (e.g., a chamber shown half full, a quarter full, etc.) without any text or numerical indication of the level.

In one embodiment, the plurality of sensors 5016 are not calibrated and the control circuitry 5080 uses the relative change in sensed temperature (or relative change in sensed information indicative of temperature) from the plurality of sensors 5016 to determine the liquid level in the chamber 5015. In another embodiment, the plurality of sensors 5016 can be calibrated when the chamber 5015 has been filled entirely and the temperature of the liquid in the chamber 5015 has stabilized to increase the accuracy of the sensors 5016. For example, such sensors 5016 with increased accuracy can be used to indicate not only the liquid level in the chamber 5015, but also the level of another substance (e.g., foam) on top of the liquid in the chamber 5015.

As discussed previously, in one embodiment the sensed liquid level, such as the level determined based on information from the plurality of sensors 5016, can be combined with a sensed tilting of the container 5000 (e.g., via a gyroscope). Therefore, when the tilt sensors senses that the container 5000 has been titled by more than a predetermined amount from vertical (e.g., more than 25 degrees from vertical, etc.), the control circuitry 5080 can turn off power to the one or more heating (or cooling) elements 5040, and can cease control based on information provided from the sensors, until the sensed orientation of the container 5000 is less than the predetermined amount (e.g., less than 25 degrees from vertical, etc.).

Though the features disclosed above may be described in connection with the container 5000, one of skill in the art will recognize that any of the features described in this embodiment can also apply to any of the portable liquid containers disclosed herein (e.g., 5100-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 51:
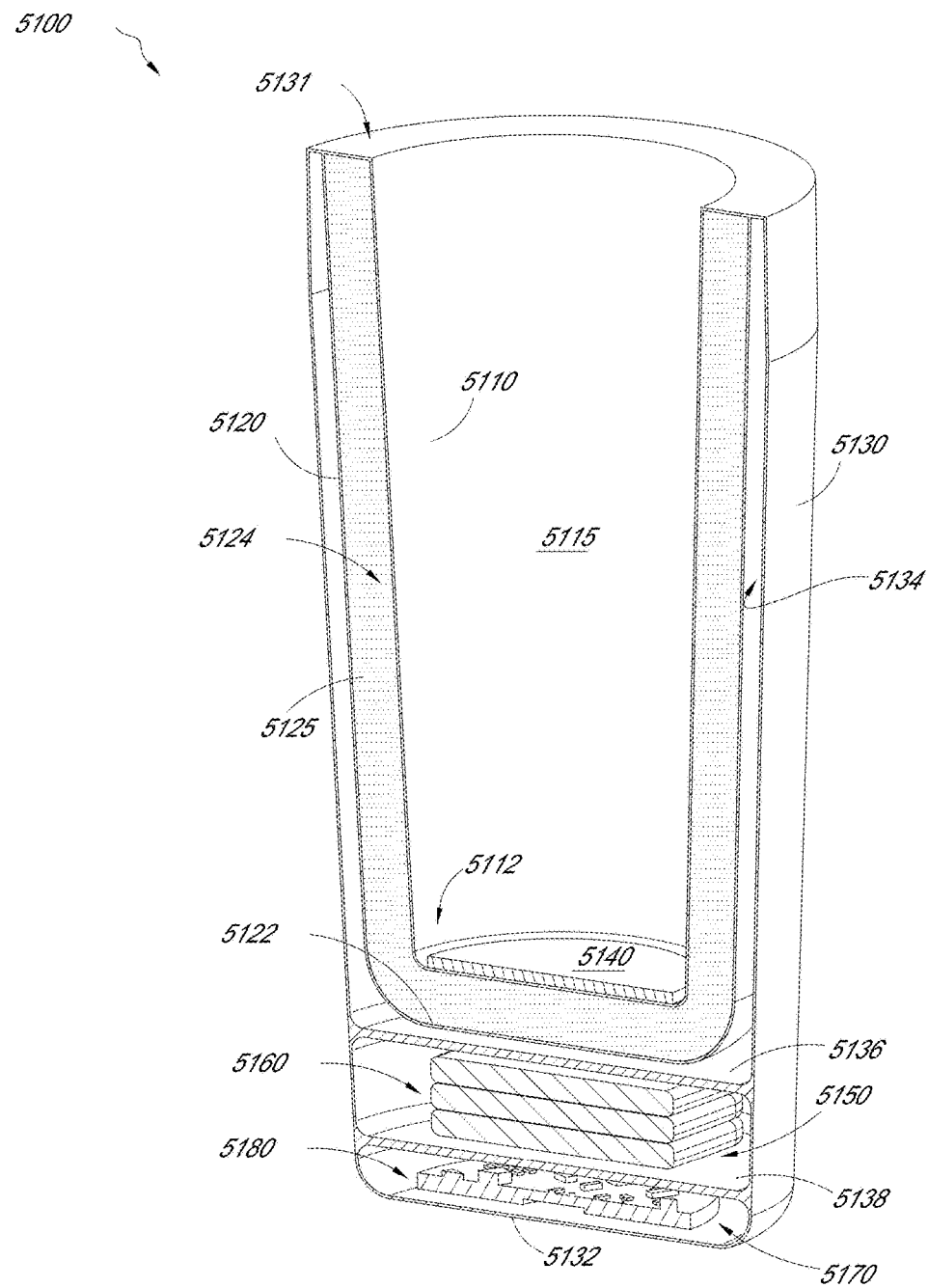
FIG. 51 is a perspective cross-sectional view of an embodiment of a drinkware container.

FIG. 51 shows a lengthwise cross-sectional view of an embodiment of a drinkware container 5100 (hereinafter "container"). As only a cross-section is shown, the other half of the drinkware container 5100 is excluded in FIG. 51 to illustrate the various components of the container 5100. One of skill in the art will understand that the excluded portion of the drinkware container 5100 in FIG. 51 is a mirror image of the portion of the drinkware container 5100 that is shown in FIG. 51. In the illustrated embodiment, the container 5100 is shown as a travel mug. However, as discussed above, the drinkware container 5100 can be other types of containers, such as a cup, mug, beer mug, baby bottle, carafe or other handheld portable liquid containers.

The container 5100 has an inner sidewall 5110 (e.g., a circumferential or cylindrical inner sidewall) and inner bottom wall 5112, which together define a chamber 5115 that receives and holds a liquid therein. The container 5100 also has a second sidewall 5120 (e.g., a circumferential or cylindrical inner sidewall) and second bottom wall 5122 that are spaced apart from the inner sidewall 5110 and inner bottom wall 5112, respectively, so as to define a chamber (e.g., an annular chamber) 5124 between the inner walls 5110, 5112 and the second walls 5120, 5122. Optionally, the inner sidewall 5110 can be made of metal (e.g., stainless steel). However, in other embodiments, the inner sidewall 5110 can be made of other suitable materials. Optionally, the second sidewall 5120 can be made of the same material as the inner sidewall 5110 (e.g., both the inner sidewall 5110 and the second sidewall 5120 can be made of metal, such as stainless steel). In another embodiment, the second sidewall 5120 can be made of a different material than the inner sidewall 5110; for example, the inner sidewall 5110 can be made of metal, such as stainless steel, and the second sidewall 5120 can be made of a plastic material that insulates the outer portion of the container 5100 from the inner sidewall 5110 and the liquid contents of the chamber 5115.

The chamber 5124 can be filled with a phase change material (PCM) 5125. The PCM 5125 can be a solid-solid phase change material, or a solid-liquid phase change material. The PCM 5125 can be a wax (e.g., Paraffin wax). However, other suitable phase change materials (e.g., a metal) can be used). In the illustrated embodiment the PCM 5125 between the sidewalls 5110, 5120 is the same as the PCM 5125 between the bottom walls 5112, 5122. However, in other embodiments, the PCM 5125 between the sidewalls 5110, 5120 can be different than the PCM 5125 between the bottom walls 5112, 5122.

The PCM 5125 can be selected to have a predetermined transition (e.g., melting) temperature that generally corresponds to a suitable drinking temperature for a heated liquid. In some embodiments, the predetermined transition temperature can optionally be between 135 degrees F. and 145 degrees F., such as optionally be 140 degrees F. In one embodiment, when the liquid (e.g., hot coffee, hot tea, soup) poured into the chamber 5115 of the container 5100 has a temperature above the predetermined transition temperature, the PCM 5125 can absorb heat from the liquid to cause the PCM 5125 to transition, for example, from a solid to a liquid, thereby decreasing the temperature of the liquid toward the said predetermined temperature. As the temperature of the liquid drops (e.g., via conduction of heat from the liquid through the inner sidewall 5110 to the PCM 5125), the operation of the container 5100 approaches a steady state of operation where the temperature of the liquid approaches the predetermined transition temperature, where it can remain for an extended period of time (e.g., for at least 1 hour, for at least 2 hours, for at least 3 hours, etc.).

The container 5100 can have an outer sidewall 5130 (e.g., a circumferential or cylindrical inner sidewall) that extends from a rim 5131 of the container 5130 to an outer bottom wall 5132. The rim 5131 can optionally define a drinking lip of the container 5100. Optionally, the outer sidewall 5130 and outer bottom wall 5132 can be a single piece (e.g., monolithic with no seams). However, in other embodiments, at least a portion of the outer sidewall 5130 can be separate from the bottom wall 5132, as discussed further below. The outer sidewall 5130 can be disposed radially outward from the second sidewall 5120. Optionally, the outer sidewall 5130 can be radially spaced apart from the second sidewall 5120 to define a chamber 5134 (e.g., an annular chamber) therebetween. In one embodiment, the chamber 5134 can provide an air gap between the second sidewall 5120 and outer sidewall 5130, where said air gap can insulate the outer sidewall 5130 from the second sidewall 5120 and the inner sidewall 5110. However, in other embodiments, the outer sidewall 5130 can be adjacent the second sidewall 5120 so that there is no gap therebetween. Optionally, the outer sidewall 5130 can be made of an insulative material (e.g., foam, plastic).

With continued reference to FIG. 51, the container 5100 can have a heating element 5140 disposed above (e.g., on) the inner bottom wall 5112 and covers at least a portion of the inner bottom wall 5112 so that it is in direct thermal communication with liquid in the chamber 5115. In the illustrated embodiment, the heating element 5140 covers substantially the entire bottom inner wall 5112. The heating element 5140 is optionally a resistive heater. In one embodiment, the heating element 5140 can be defined by a trace pattern screen printed onto the surface of the inner bottom wall 5112. A connecting lead line (not shown) can electrically connects the heating element 5140 to one or more power storage elements 5160 disposed in a first bottom chamber 5150 and/or control circuitry 5180 disposed in a second bottom chamber 5170. For example, in one embodiment such a lead line can extend from the heating element 5140 upward along the inner sidewall 5110, downward along the second sidewall 5120 and then optionally cross through a dividing wall 5136 that separates the one or more power storage elements 5160 from the second bottom wall 5122. The lead line can optionally extend through a second dividing wall 5138 that separates the one or more power storage elements 5160 from the control circuitry 5180. In another embodiment, said lead line can extend from the heating element 5140, through a conduit (not shown) between the inner bottom wall 5112 and second bottom wall 5122, and optionally pass through the bottom wall 5136 and/or second bottom wall 5138 to electrically connect the heating element with the one or more power storage elements and/or control circuitry 5180. Though the discussion in this paragraph refers to one or more heating elements 5140, one of skill in the art will recognize that this can also apply to one or more cooling elements or one or more heating or cooling elements (e.g., thermoelectric elements), and that this disclosure is meant to apply to all these options for the container 5100.

In the illustrated embodiment, the outer sidewall 5130 and outer bottom wall 5132 are optionally a single piece (e.g. monolithic with no seams), such that the one or more power storage elements 5160 (e.g., batteries, capacitors) and control circuitry 5180 are permanently housed in the chambers 5150, 5170. In another embodiment, at least a portion of the outer sidewall 5130 can be separate from the outer bottom wall 5132 (and/or at least another portion of the outer sidewall 5130) so that the one or more power storage elements 5160 and control circuitry 5180 are housed in a module that can be removably coupled to the rest of the container 5100. For example, said module can be coupled to the bottom plate 5136 via a threaded connection, key-slot connection, or other suitable connection. In such an embodiment, the lead line from the heating element 5140 can terminate at the bottom plate 5136 and establishes an electrical connection with a separate lead line in said module when the module is coupled to the container 5100. In still another embodiment, the outer bottom wall 5132 can be removably attached to the container 5100 and can be removed to access the control circuitry 5180 and/or one or more power storage elements 5160 for maintenance, testing and/or replacement.

The control circuitry 5180 can control the charging of the one or more power storage elements (e.g., the control circuitry 5180 can include a charging circuit) can control delivery of power to the heating element 5140. In one embodiment, the control circuitry 5180 can control delivery of power to the heating element 5140 to maintain the liquid in the chamber 5115 at the predetermined temperature. In another embodiment, the control circuitry 5180 can control delivery of power to the heating element 5140 to input heat to the liquid to increase the temperature of the liquid to a user selected temperature. Said user selected temperature can optionally be provided via a user interface on the body of the container 5100. In another embodiment, the user selected temperature can be provided wirelessly to the control circuitry (which can have a receiver) from a portable electronic device (e.g., smart phone or tablet computer). Optionally, the control circuitry 5180 can control delivery of power to the heating element 5140 based at least in part on information from one or more sensors that sense a parameter of quality of the liquid (e.g., temperature, volume, acidity, pH) where said one or more sensors can be on a surface of one or both of the inner sidewall 5110 and inner bottom wall 5112.

Though the features disclosed above may be described in connection with the container 5100, one of skill in the art will recognize that any of the features described in this embodiment can also apply to any of the portable liquid containers disclosed herein (e.g., 5000, 5200-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 52:
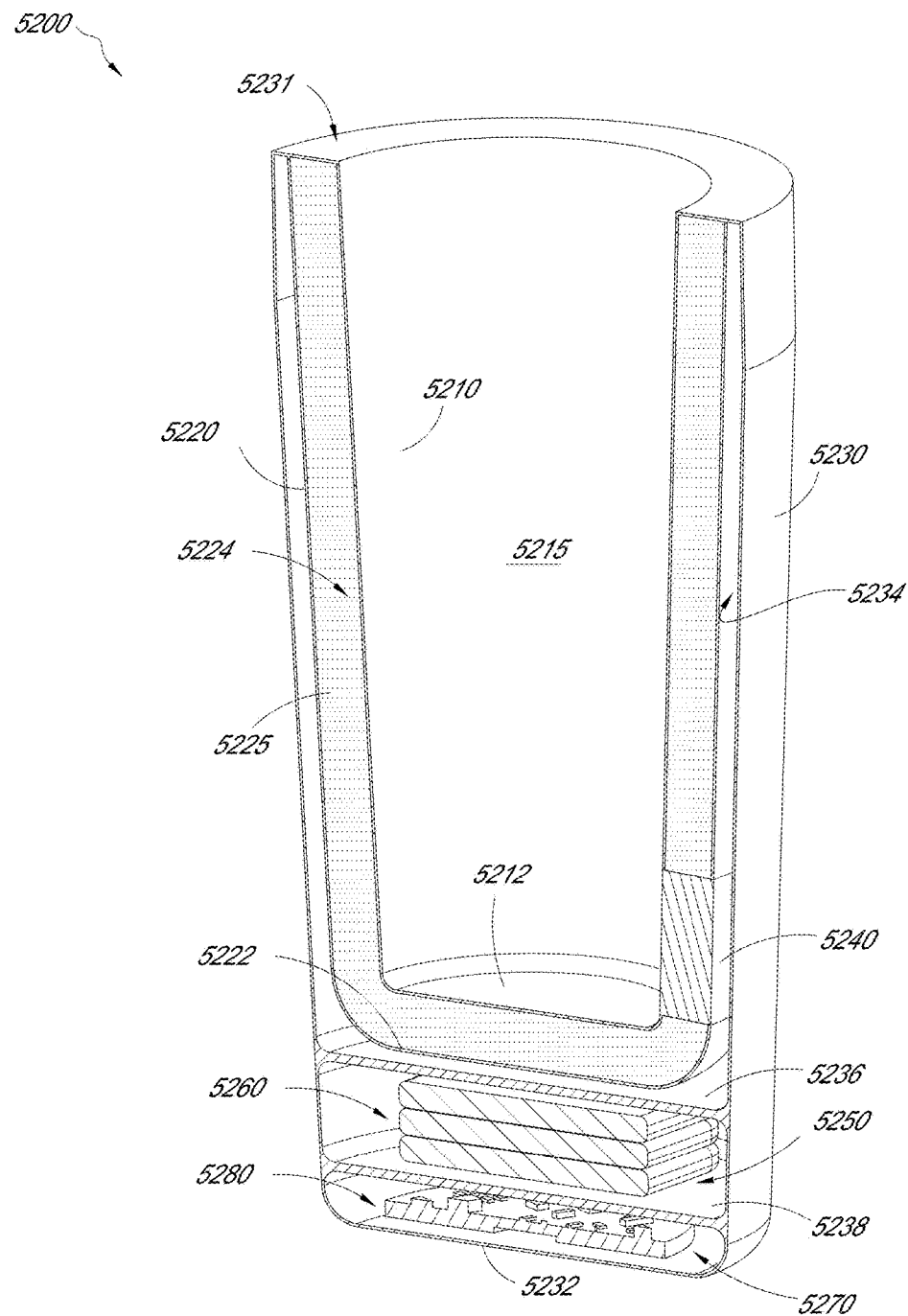
FIG. 52 is a perspective cross-sectional view of an embodiment of a drinkware container.

FIG. 52 illustrates a cross-sectional view of an embodiment of a drinkware container 5200 (hereinafter "container 5200"). The container 5200 is similar to the container 5100 shown in FIG. 51, except as noted below. Thus, the reference numerals used to designate the various components of the container 5200 are identical to those used for identifying the corresponding components of the container 5100 in FIG. 51, except that the reference numerals of the container 5200 begin with "52" instead of "51". Therefore the description for the various components of the container 5100 shown in FIG. 51 are understood to apply to the corresponding components of the container 5200 in FIG. 52, except as described below.

As only a cross-section is shown, the other half of the drinkware container 5200 is excluded in FIG. 52 to illustrate the various components of the container 5200. One of skill in the art will understand that the excluded portion of the drinkware container 5200 in FIG. 52 is a mirror image of the portion of the drinkware container 5200 that is shown in FIG. 52.

As shown in FIG. 52, the heating element 5240 can be in thermal communication with (e.g., in contact with or disposed against) a portion of the inner sidewall 5210 of the container 5200 (e.g., a portion of the circumference of the inner sidewall 5210, such as one defined by an arc length less than the circumference of the inner sidewall 5210), such as in a side portion of the chamber 5224. Though the illustrated embodiment shows the heating element 5240 axially disposed proximate the inner bottom wall 5212, in other embodiments, the heating element 5240 can be disposed at other locations along the inner sidewall 5210 (e.g., midway between the inner bottom wall 5212 and the rim 5231, proximate the rim 5231, etc.). The PCM 5225 can be disposed in the chamber 5224 above and below the heating element 5240. A lead line (not shown) can extend from the heating element 5240 (e.g., from a portion of the second sidewall 5220 in thermal and/or electrical communication with the heating element 5240) to one or both of the one or more power storage elements 5260 and control circuitry 5280, as discussed above in connection with the container 5100 of FIG. 51. The PCM 5225 and heating element 5240 can operate as discussed above for the PCM 5125 and heating element 5140. Though the discussion in this paragraph refers to one or more heating elements 5240, one of skill in the art will recognize that this can also apply to one or more cooling elements or one or more heating or cooling elements (e.g., thermoelectric elements), and that this disclosure is meant to apply to all these options for the container 5200.

Operation of the heating element 5240 can induce a circulation flow (e.g., a convection current) in the chamber 5215 holding liquid to create a convection or "waterfall effect," where liquid circulates upward from the heating element 5240 and along a portion of the inner sidewall 5210 in thermal communication with the heating element 5240, across to an opposite portion of the sidewall 5210, downward along said opposite portion of the sidewall 5210 to the inner bottom wall 5212, and across the inner bottom wall 5212 back to the portion of the inner sidewall 5210 in thermal communication with the heating element 5240. Said convection or circulation advantageously results in the liquid in the bottom portion of the container 5200 and the liquid in the top portion of the container 5200 having substantially the same temperature (e.g., differ in temperature by less than 15 degrees F., differs in temperature by less than 10 degrees F., differ in temperature by less than 5 degrees F., differ in temperature by less than 3 degrees F., differ in temperature by less than 1 deg. F.) such that liquid in the container 5200 has a substantially uniform temperature during use of the container 5200.

Though the features disclosed above may be described in connection with the container 5200, one of skill in the art will recognize that any of the features described in this embodiment can also apply to any of the portable liquid containers disclosed herein (e.g., 5000-5100, 5300-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 53:
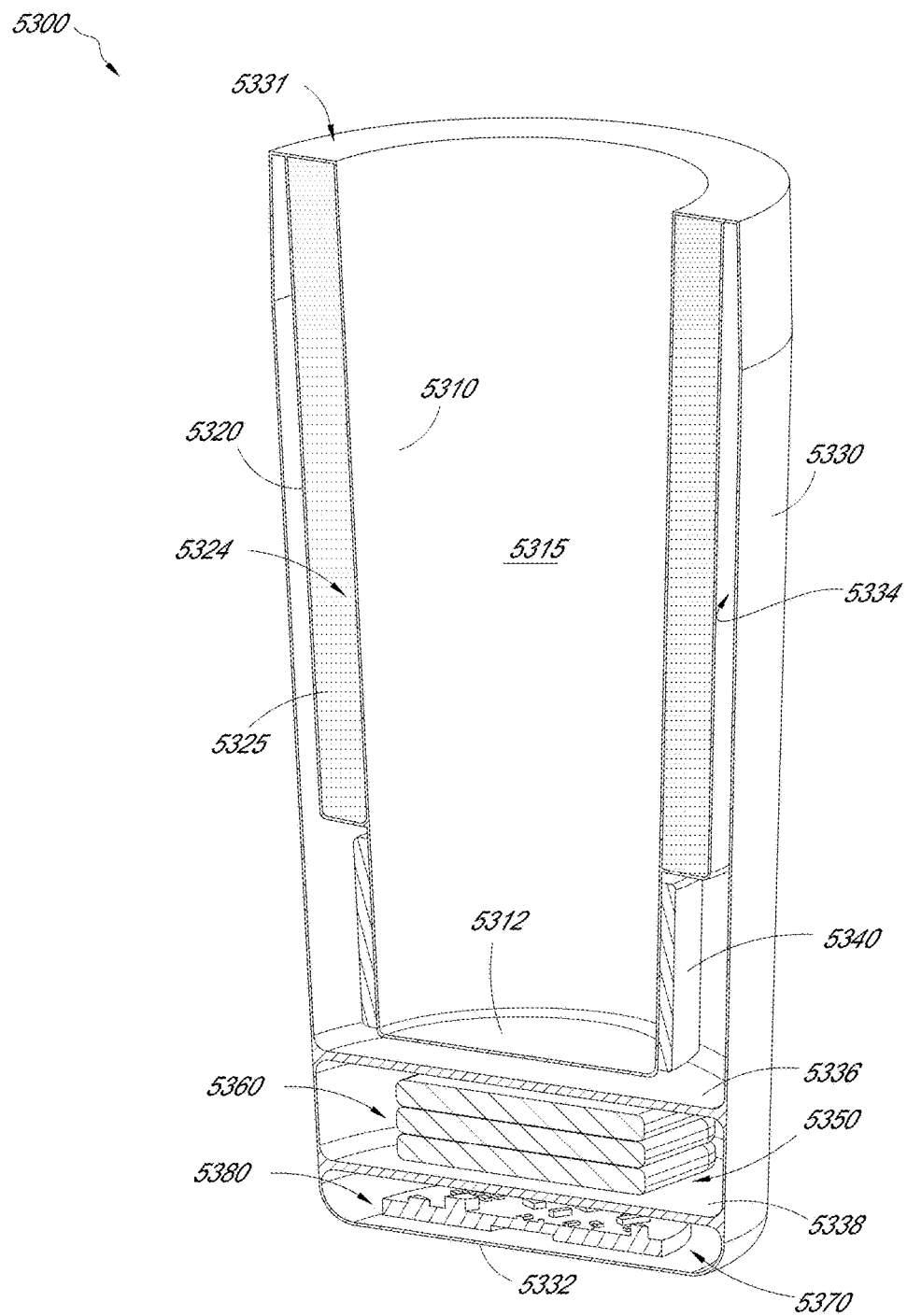
FIG. 53 is a perspective cross-sectional view of an embodiment of a drinkware container.

FIG. 53 illustrates an embodiment of a drinkware container 5300 (hereinafter "container 5300"). The container 5300 is similar to the containers 5100 and 5200 shown in FIGS. 51-52, except as noted below. Thus, the reference numerals used to designate the various components of the container 5300 are identical to those used for identifying the corresponding components of the container 5100 in FIG. 51, except that the reference numerals of the container 5300 begin with "53" instead of "51". Therefore the description for the various components of the container 5100 and container 5200 shown in FIGS. 51-52 are understood to apply to the corresponding components of the container 5300 in FIG. 53, except as described below.

As only a cross-section is shown, the other half of the drinkware container 5300 is excluded in FIG. 53 to illustrate the various components of the container 5300. One of skill in the art will understand that the excluded portion of the drinkware container 5300 in FIG. 53 is a mirror image of the portion of the drinkware container 5300 that is shown in FIG. 53.

As shown in FIG. 53, the heating element 5340 extends along the entire circumference of the inner sidewall 5310 and is in thermal communication with a portion of the sidewall 5310. Though the illustrated embodiment shows the heating element 5340 axially optionally disposed proximate the inner bottom wall 5312, in other embodiments, the heating element 5340 can be disposed at other locations along the inner sidewall 5310 (e.g., midway between the inner bottom wall 5312 and the rim 5331, proximate the rim 5331, etc.). The PCM 5325 can be disposed in a chamber 5324 that extends above the heating element 5340 (e.g., solely above the heating element 5340 so that there is no PCB 5325 disposed below the heating element 5340). A lead line (not shown) can extend from the heating element 5340 to one or both of the one or more power storage elements 5360 and control circuitry 5380, as discussed above in connection with the container 5100 of FIG. 51. Though the discussion in this paragraph refers to one or more heating elements 5340, one of skill in the art will recognize that this can also apply to one or more cooling elements or one or more heating or cooling elements (e.g., thermoelectric elements), and that this disclosure is meant to apply to all these options for the container 5300.

The PCM 5325 and heating element 5340 can operate as discussed above for the PCM 5125, 5225 and heating element 5140, 5240. The heating element 5340 can optionally be a resistive heater (such as a coil heater), or a thermoelectric element (e.g., Peltier element). Operation of the heating element 5340 can induce a circulation flow (e.g., a convection current) in the chamber 5315 to create a convection or "waterfall effect," as discussed above, which can advantageously result in the liquid in the bottom portion of the container 5300 and the liquid in the top portion of the container 5300 having substantially the same temperature (e.g., differ in temperature by less than 15 degrees F., differs in temperature by less than 10 degrees F., differ in temperature by less than 5 degrees F., differ in temperature by less than 3 degrees F., differ in temperature by less than 1 deg.

F.) such that liquid in the container 5300 has a substantially uniform temperature during use of the container 5300.

Though the features disclosed above may be described in connection with the container 5300, one of skill in the art will recognize that any of the features described in this embodiment can also apply to any of the portable liquid containers disclosed herein (e.g., 5000-5200, 5400-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 54:
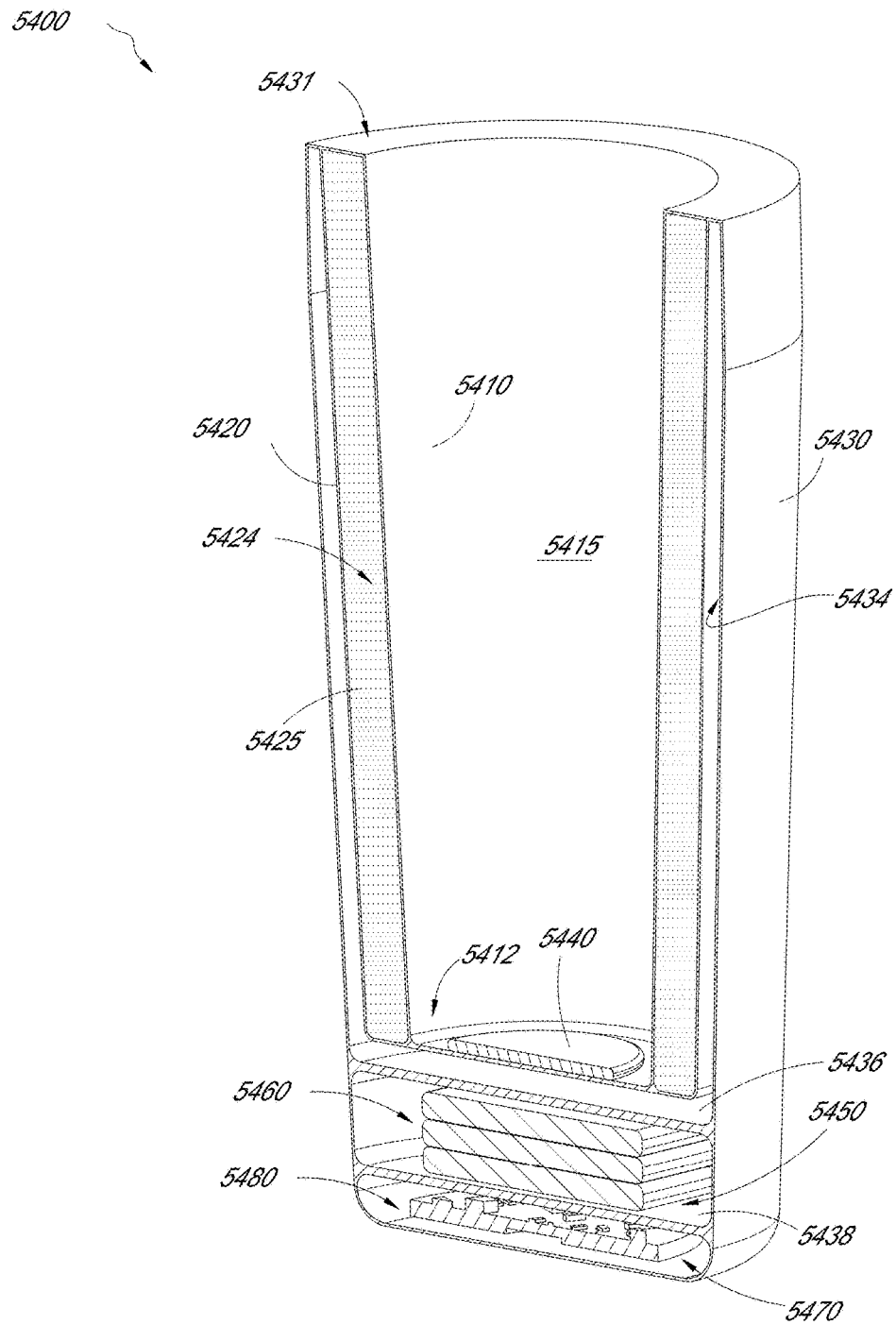
FIG. 54 is a perspective cross-sectional view of an embodiment of a drinkware container.

FIG. 54 illustrates an embodiment of a drinkware container 5400 (hereinafter "container 5400"). The container 5400 is similar to the container 5100 shown in FIG. 51, except as noted below. Thus, the reference numerals used to designate the various components of the container 5400 are identical to those used for identifying the corresponding components of the container 5100 in FIG. 51, except that the reference numerals of the container 5400 begin with "54" instead of "51". Therefore the description for the various components of the container 5100 shown in FIG. 51 are understood to apply to the corresponding components of the container 5400 in FIG. 54, except as described below.

As only a cross-section is shown, the other half of the drinkware container 5400 is excluded in FIG. 54 to illustrate the various components of the container 5400. One of skill in the art will understand that the excluded portion of the drinkware container 5400 in FIG. 54 is a mirror image of the portion of the drinkware container 5400 that is shown in FIG. 54.

As shown in FIG. 54, the chamber 5424 that contains the PCM 5425 extends solely above a plane defined by the inner bottom wall 5412, so that the PCM 5425 is not disposed below the inner bottom wall 5412 (i.e., the chamber 5424 does not extend below the inner bottom wall 5412).

The heating element 5440 is optionally disposed above (e.g., on) the inner bottom wall 5412 and covers at least a portion of the inner bottom wall 5412 so that it is in direct thermal communication with liquid in the chamber 5415. In the illustrated embodiment, the heating element 5440 covers substantially the entire bottom inner wall 5412. The heating element 5440 is optionally a resistive heater. In one embodiment, the heating element 5440 can be defined by a trace pattern screen printed onto the surface of the inner bottom wall 5412. Though the discussion in this paragraph refers to one or more heating elements 5440, one of skill in the art will recognize that this can also apply to one or more cooling elements or one or more heating or cooling elements (e.g., thermoelectric elements), and that this disclosure is meant to apply to all these options for the container 5400.

Though the features disclosed above may be described in connection with the container 5400, one of skill in the art will recognize that any of the features described in this embodiment can also apply to any of the portable liquid containers disclosed herein (e.g., 5000-5300, 5500-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 55:
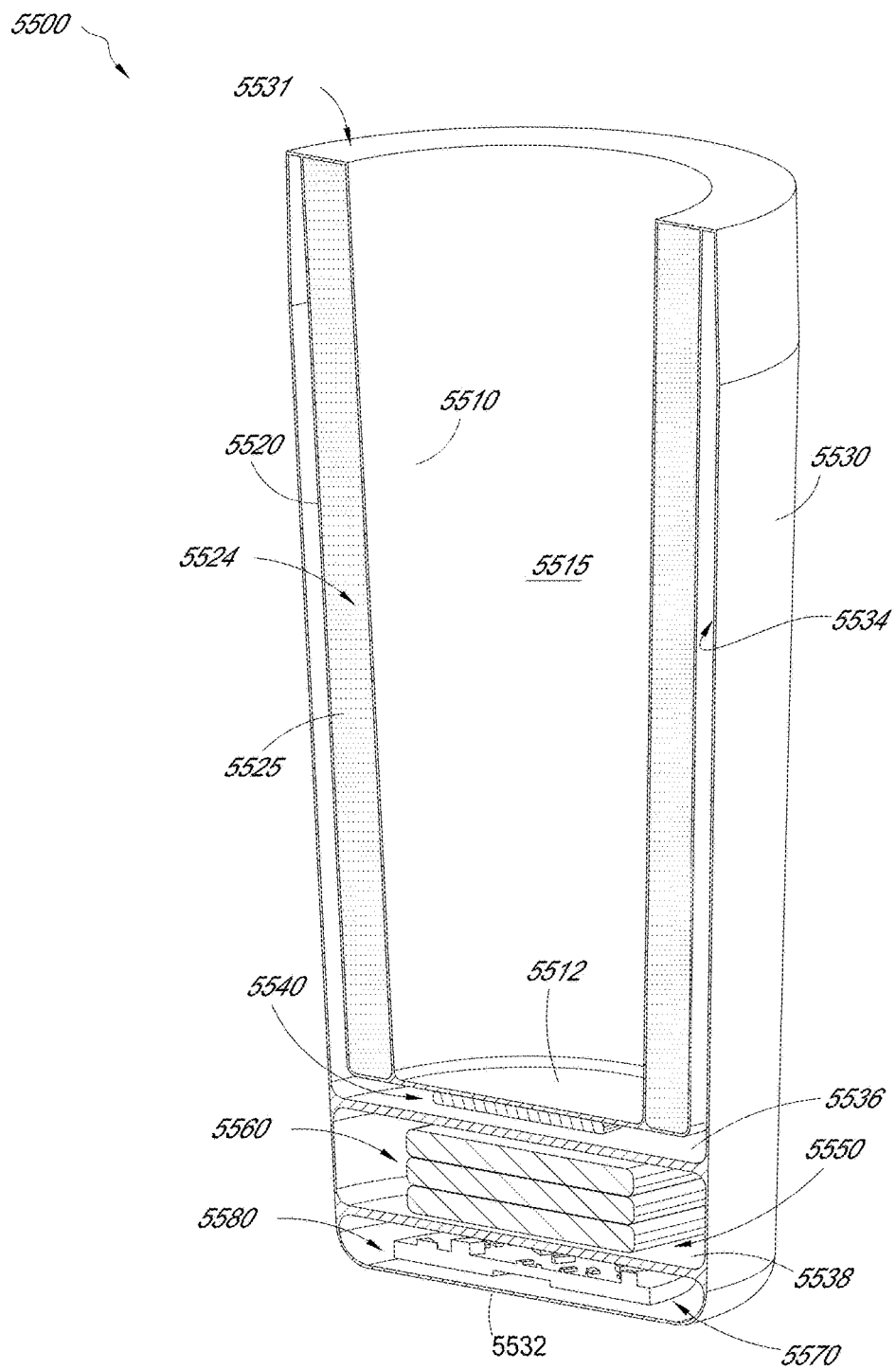
FIG. 55 is a perspective cross-sectional view of an embodiment of a drinkware container.

FIG. 55 illustrates an embodiment of a drinkware container 5500 (hereinafter "container 5500"). The container 5500 is similar to the container 5400 shown in FIG. 54, except as noted below. Thus, the reference numerals used to designate the various components of the container 5500 are identical to those used for identifying the corresponding components of the container 5400 in FIG. 54, except that the reference numerals of the container 5500 begin with "55" instead of "54". Therefore the description for the various components of the containers 5100, 5400 shown in FIGS. 51, 54 are understood to apply to the corresponding components of the container 5500 in FIG. 55, except as described below.

As only a cross-section is shown, the other half of the drinkware container 5500 is excluded in FIG. 55 to illustrate the various components of the container 5500. One of skill in the art will understand that the excluded portion of the drinkware container 5500 in FIG. 55 is a mirror image of the portion of the drinkware container 5500 that is shown in FIG. 55.

As shown in FIG. 55, the container 5500 differs from the container 5400 solely in that the heating element 5540 is optionally disposed below (e.g., in contact with a bottom surface of) the inner bottom wall 5512 and covers at least a portion of the bottom surface of the inner bottom wall 5512 so that the heating element 5540 is in thermal communication (e.g., indirect thermal communication) with liquid in the chamber 5515 via conduction heat transfer through the inner bottom wall 5512. The heating element 5540 is optionally a resistive heater. In one embodiment, the heating element 5540 can be defined by a trace pattern screen printed onto at least a portion of the bottom surface of the inner bottom wall 5512. A lead line (not shown) can extend from the heating element 5540 to one or both of the one or more power storage elements 5560 and control circuitry 5580, as discussed above in connection with the container 5100 of FIG. 51. Though the discussion in this paragraph refers to one or more heating elements 5540, one of skill in the art will recognize that this can also apply to one or more cooling elements or one or more heating or cooling elements (e.g., thermoelectric elements), and that this disclosure is meant to apply to all these options for the container 5500.

Though the features disclosed above may be described in connection with the container 5500, one of skill in the art will recognize that any of the features described in this embodiment can also apply to any of the portable liquid containers disclosed herein (e.g., 5000-5400, 5600-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 56:
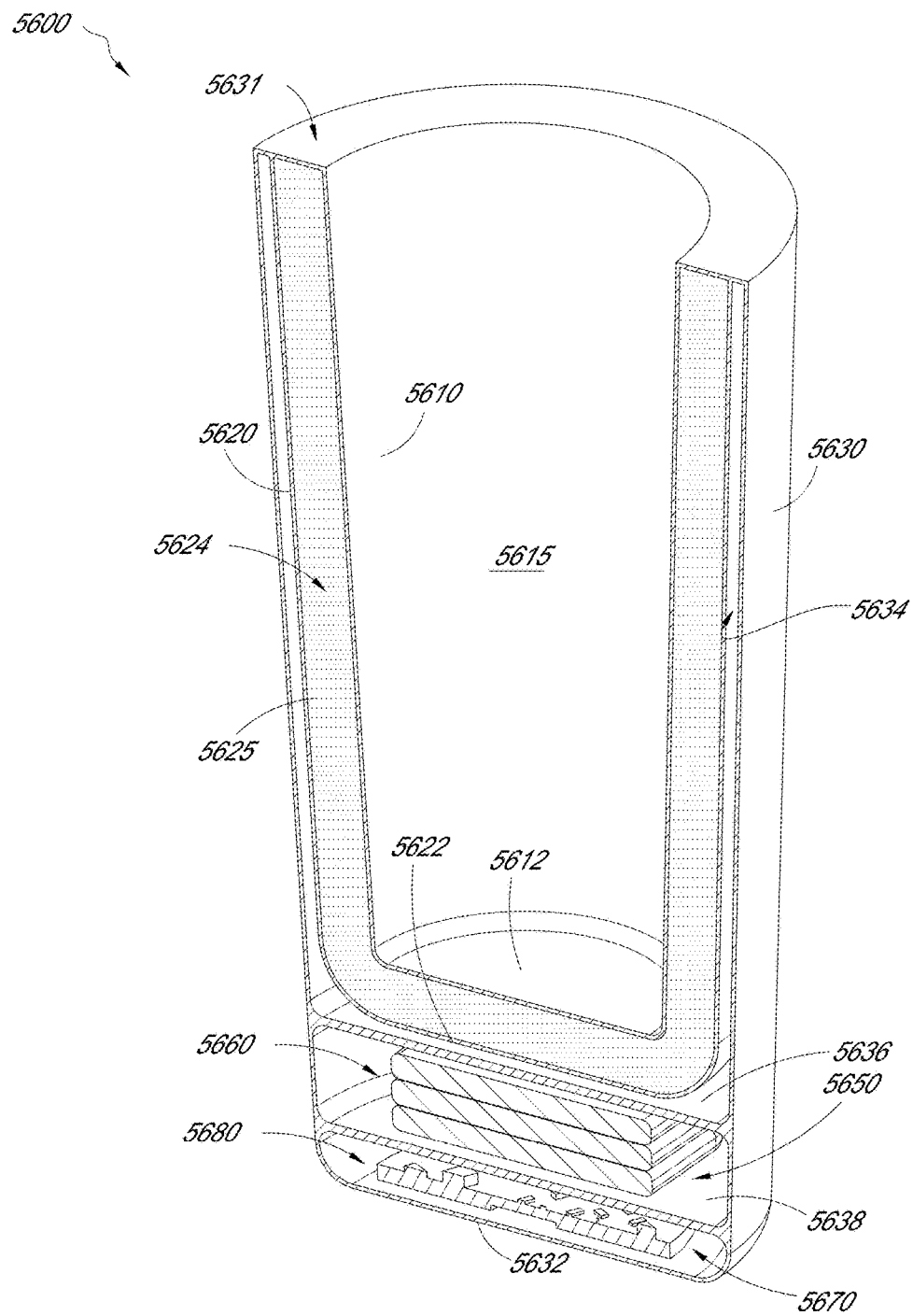
FIG. 56 is a perspective cross-sectional view of an embodiment of a drinkware container.

FIG. 56 illustrates an embodiment of a drinkware container 5600 (hereinafter "container 5600"). The container 5600 is similar to the container 5100 shown in FIG. 51, except as noted below. Thus, the reference numerals used to designate the various components of the container 5600 are identical to those used for identifying the corresponding components of the container 5100 in FIG. 51, except that the reference numerals of the container 5600 begin with "56" instead of "51". Therefore the description for the various components of the container 5100 shown in FIG. 51 are understood to apply to the corresponding components of the container 5600 in FIG. 56, except as described below.

As only a cross-section is shown, the other half of the drinkware container 5600 is excluded in FIG. 56 to illustrate the various components of the container 5600. One of skill in the art will understand that the excluded portion of the drinkware container 5600 in FIG. 56 is a mirror image of the portion of the drinkware container 5600 that is shown in FIG. 56.

In FIG. 56, the heating element is excluded to show the inner bottom wall 5612 of the container 5600 and the chamber 5624 that extends between the second sidewall 5620 and outer side wall 5630 as well as between the inner bottom wall 5612 and the bottom plate 5636. In one embodiment the chamber 5634 can be filled with air, which can provide for thermal insulation of the outer sidewall 5630 relative to the inner and second sidewalls 5610, 5620. Such insulation can facilitate the ability of a user to comfortably hold the container 5600 with a hot liquid therein (e.g., for extended periods of time) without burning their hand or feeling uncomfortable after a while due to the heat transferred from the hot liquid to the outer sidewall 5630. Though the heating element is excluded from FIG. 56, one of skill in the art will recognize that the container 5600 can have a heating element like the heating element 5140, 5240, 5340, 5440 or 5540 previously described. Though the discussion in this paragraph refers to one or more heating elements, one of skill in the art will recognize that this can also apply to one or more cooling elements or one or more heating or cooling elements (e.g., thermoelectric elements), and that this disclosure is meant to apply to all these options for the container 5600.

Though the features disclosed above may be described in connection with the container 5600, one of skill in the art will recognize that any of the features described in this embodiment can also apply to any of the portable liquid containers disclosed herein (e.g., 5000-5500, 5700-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 57:
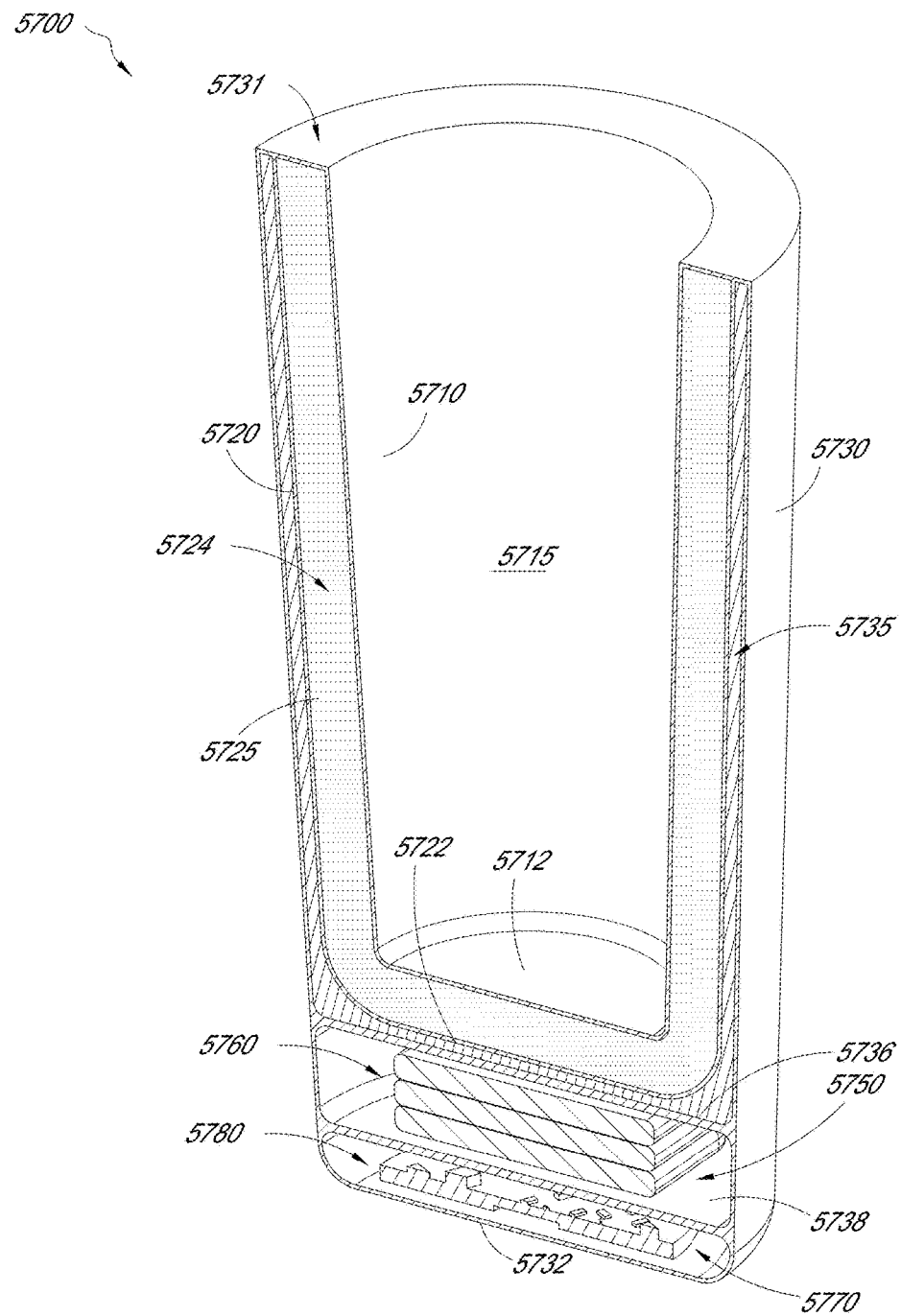
FIG. 57 is a perspective cross-sectional view of an embodiment of a drinkware container.

FIG. 57 illustrates an embodiment of a drinkware container 5700 (hereinafter "container 5700"). The container 5700 is similar to the containers 5100, 5600 shown in FIGS. 51,5 6, except as noted below. Thus, the reference numerals used to designate the various components of the container 5700 are identical to those used for identifying the corresponding components of the container 5100 in FIG. 51, except that the reference numerals of the container 5700 begin with "57" instead of "51". Therefore the description for the various components of the container 5100 shown in FIG. 51 are understood to apply to the corresponding components of the container 5700 in FIG. 57, except as described below.

As only a cross-section is shown, the other half of the drinkware container 5700 is excluded in FIG. 57 to illustrate the various components of the container 5700. One of skill in the art will understand that the excluded portion of the drinkware container 5700 in FIG. 57 is a mirror image of the portion of the drinkware container 5700 that is shown in FIG. 57.

In FIG. 57, the chamber 5734 between the second sidewall 5720 and the outer sidewall 5730 can be filled with a material 5735. The material 5735 can be a thermally insulating material, which can provide for thermal insulation of the outer sidewall 5730 relative to the inner and second sidewalls 5710, 5720. Such insulation can facilitate the ability of a user to comfortably hold the container 5700 with a hot liquid therein (e.g., for extended periods of time) without burning their hand or feeling uncomfortable after a while due to the heat transferred from the hot liquid to the outer sidewall 5730. The material 5735 can be a plastic material, a polymer material or a metal. In some embodiments, the material 5735 is optionally a solid material (e.g., a foam material). In other embodiments, the material is optionally a liquid material. Though the heating element is excluded from FIG. 57, one of skill in the art will recognize that the container 5700 can have a heating element like the heating element 5140, 5240, 5340, 5440 or 5540 previously described. Though the discussion in this paragraph refers to one or more heating elements, one of skill in the art will recognize that this can also apply to one or more cooling elements or one or more heating or cooling elements (e.g., thermoelectric elements), and that this disclosure is meant to apply to all these options for the container 5700.

Though the features disclosed above may be described in connection with the container 5700, one of skill in the art will recognize that any of the features described in this embodiment can also apply to any of the portable liquid containers disclosed herein (e.g., 5000-5600, 5800-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 58:
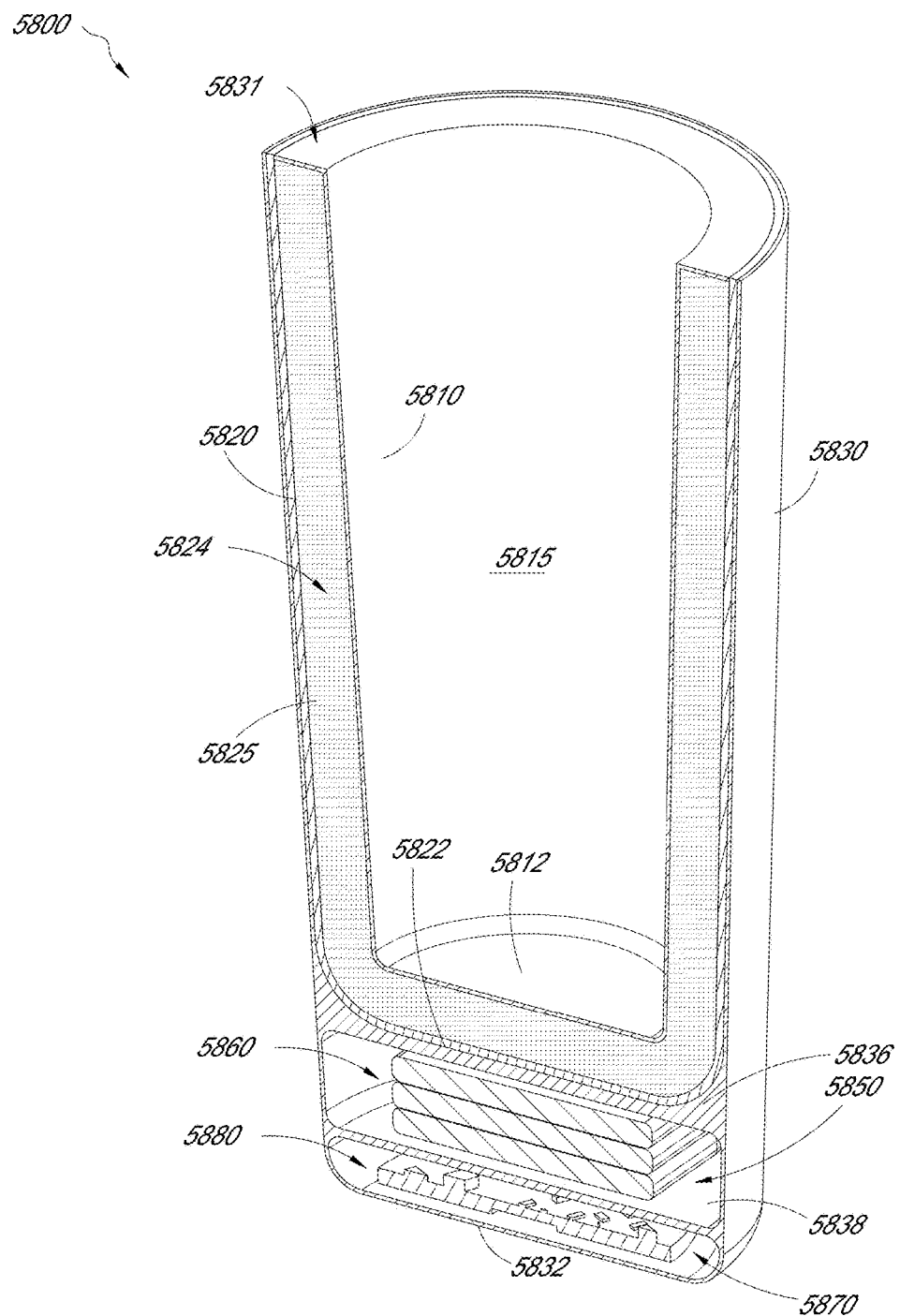
FIG. 58 is a perspective cross-sectional view of an embodiment of a drinkware container.

FIG. 58 illustrates an embodiment of a drinkware container 5800 (hereinafter "container 5800"). The container 5800 is similar to the container 5100 shown in FIG. 51, except as noted below. Thus, the reference numerals used to designate the various components of the container 5800 are identical to those used for identifying the corresponding components of the container 5100 in FIG. 51, except that the reference numerals of the container 5800 begin with "58" instead of "51". Therefore the description for the various components of the container 5100 shown in FIG. 51 are understood to apply to the corresponding components of the container 5800 in FIG. 58, except as described below.

As only a cross-section is shown, the other half of the drinkware container 5800 is excluded in FIG. 58 to illustrate the various components of the container 5800. One of skill in the art will understand that the excluded portion of the drinkware container 5800 in FIG. 58 is a mirror image of the portion of the drinkware container 5800 that is shown in FIG. 58.

In FIG. 58, the heating element is excluded to show the inner bottom wall 5812 of the container 5800. Though the heating element is excluded from FIG. 58, one of skill in the art will recognize that the container 5800 can have a heating element like the heating element 5140, 5240, 5340, 5440 or 5540 previously described. Though the discussion in this paragraph refers to one or more heating elements, one of skill in the art will recognize that this can also apply to one or more cooling elements or one or more heating or cooling elements (e.g., thermoelectric elements), and that this disclosure is meant to apply to all these options for the container 5800.

With continued reference to FIG. 58, the inner sidewall 5810 can be made of a different material than the second sidewall 5820. In one embodiment, the inner sidewall 5810 can be made of metal, such as stainless steel, and the second sidewall 5820 can be made of a different material (e.g., a plastic material) with lower thermal conductivity properties, such that the second sidewall insulates the outer portion of the container 5800 from the liquid in the chamber 5815 and the inner sidewall 5810. Such insulation can facilitate the ability of a user to comfortably hold the container 5800 with a hot liquid therein (e.g., for extended periods of time)

without burning their hand or feeling uncomfortable after a while due to the heat transferred from the hot liquid to the outer surface of the container 5800.

With continued reference to FIG. 58, the outer sidewall 5830 can optionally be adjacent (e.g., in contact with) the second sidewall 5820 so that there is no gap (such as chamber 5134 in FIG. 1) between the second sidewall 5820 and the outer sidewall 5830. As discussed previously, the outer sidewall 5830 can optionally be made of an insulative material (e.g., a foam material, a plastic material, etc.). In another embodiment, the outer sidewall 5830 can be excluded such that the second sidewall 5820 defines the outer wall of the container 5800. In such an embodiment, the chambers 5850, 5870 that house the one or more power storage elements 5860 and control circuitry 5880 would have a sidewall that is generally aligned with the second sidewall 5820.

Though the features disclosed above may be described in connection with the container 5800, one of skill in the art will recognize that any of the features described in this embodiment can also apply to any of the portable liquid containers disclosed herein (e.g., 5000-5700, 5900-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 59:
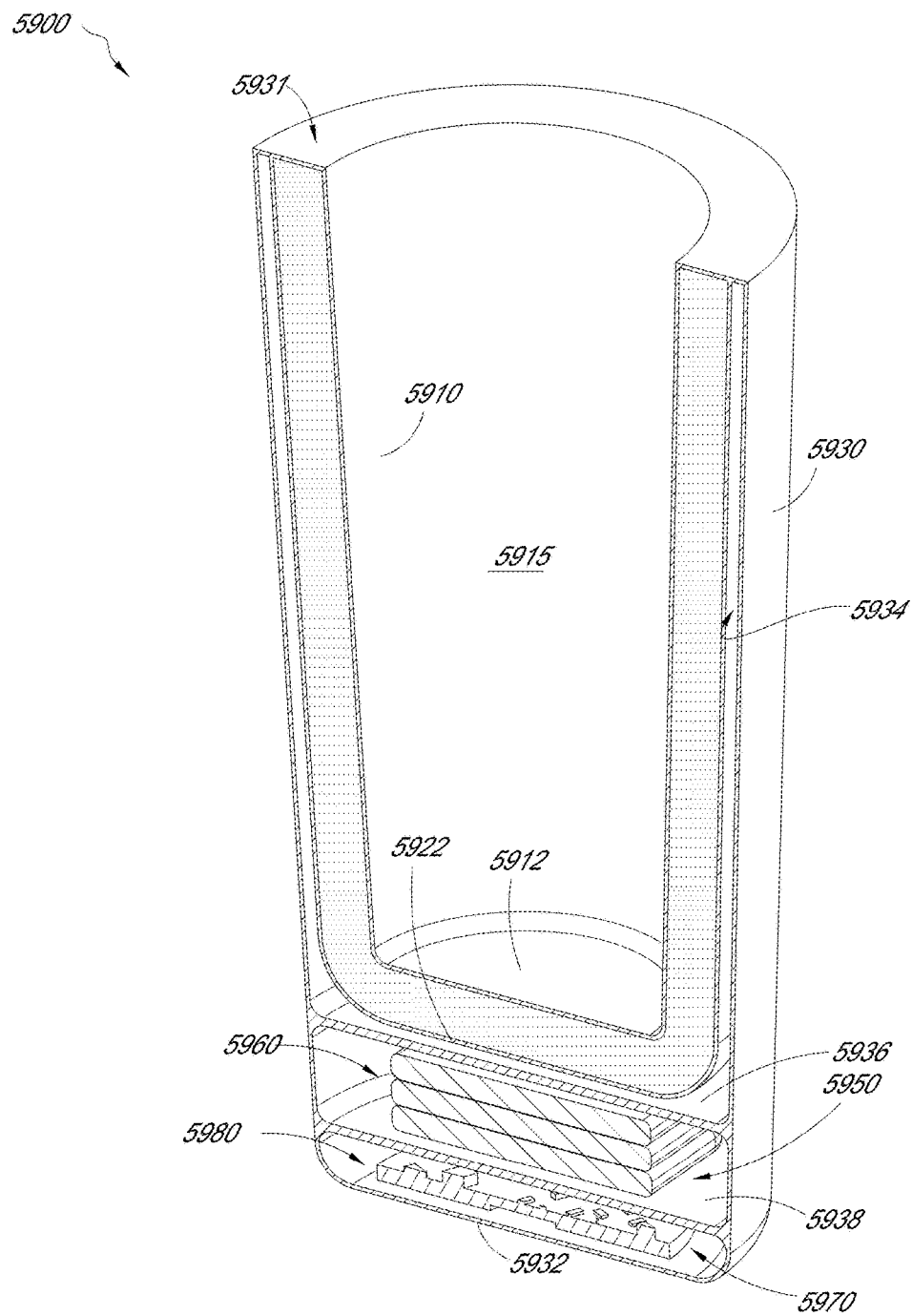
FIG. 59 is a perspective cross-sectional view of an embodiment of a drinkware container.

FIG. 59 illustrates an embodiment of a drinkware container 5900 (hereinafter "container 5900"). The container 5900 is similar to the container 5100 shown in FIG. 51, except as noted below. Thus, the reference numerals used to designate the various components of the container 5900 are identical to those used for identifying the corresponding components of the container 5100 in FIG. 51, except that the reference numerals of the container 5900 begin with "59" instead of "51". Therefore the description for the various components of the container 5100 shown in FIG. 51 are understood to apply to the corresponding components of the container 5900 in FIG. 59, except as described below.

As only a cross-section is shown, the other half of the drinkware container 5900 is excluded in FIG. 59 to illustrate the various components of the container 5900. One of skill in the art will understand that the excluded portion of the drinkware container 5900 in FIG. 59 is a mirror image of the portion of the drinkware container 5900 that is shown in FIG. 59.

In FIG. 59, the heating element is excluded to show the inner bottom wall 5912 of the container 5900. Though the heating element is excluded from FIG. 59, one of skill in the art will recognize that the container 5900 can have a heating element like the heating element 5140, 5240, 5340, 5440 or 5540 previously described. Though the discussion in this paragraph refers to one or more heating elements, one of skill in the art will recognize that this can also apply to one or more cooling elements or one or more heating or cooling elements (e.g., thermoelectric elements), and that this disclosure is meant to apply to all these options for the container 5900.

With continued reference to FIG. 59, the chamber 5934 between the second sidewall 5920 and the outer sidewall 5930 can be under a vacuum so that it defines a vacuum insulated chamber. The chamber 5934 can therefore thermally insulate the outer sidewall 5930 from the inner and second sidewalls 5910, 5920 to facilitate the ability of a user to comfortably hold the container 5900 with a hot liquid therein (e.g., for extended periods of time) without burning their hand or feeling uncomfortable after a while due to the heat transferred from the hot liquid to the outer surface of the container 5900. The chamber 5934 can also thermally insulate the bottom plate 5936 from the second bottom wall 5922.

Though the features disclosed above may be described in connection with the container 5900, one of skill in the art will recognize that any of the features described in this embodiment can also apply to any of the portable liquid containers disclosed herein (e.g., 5000-5800, 6000-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 60:
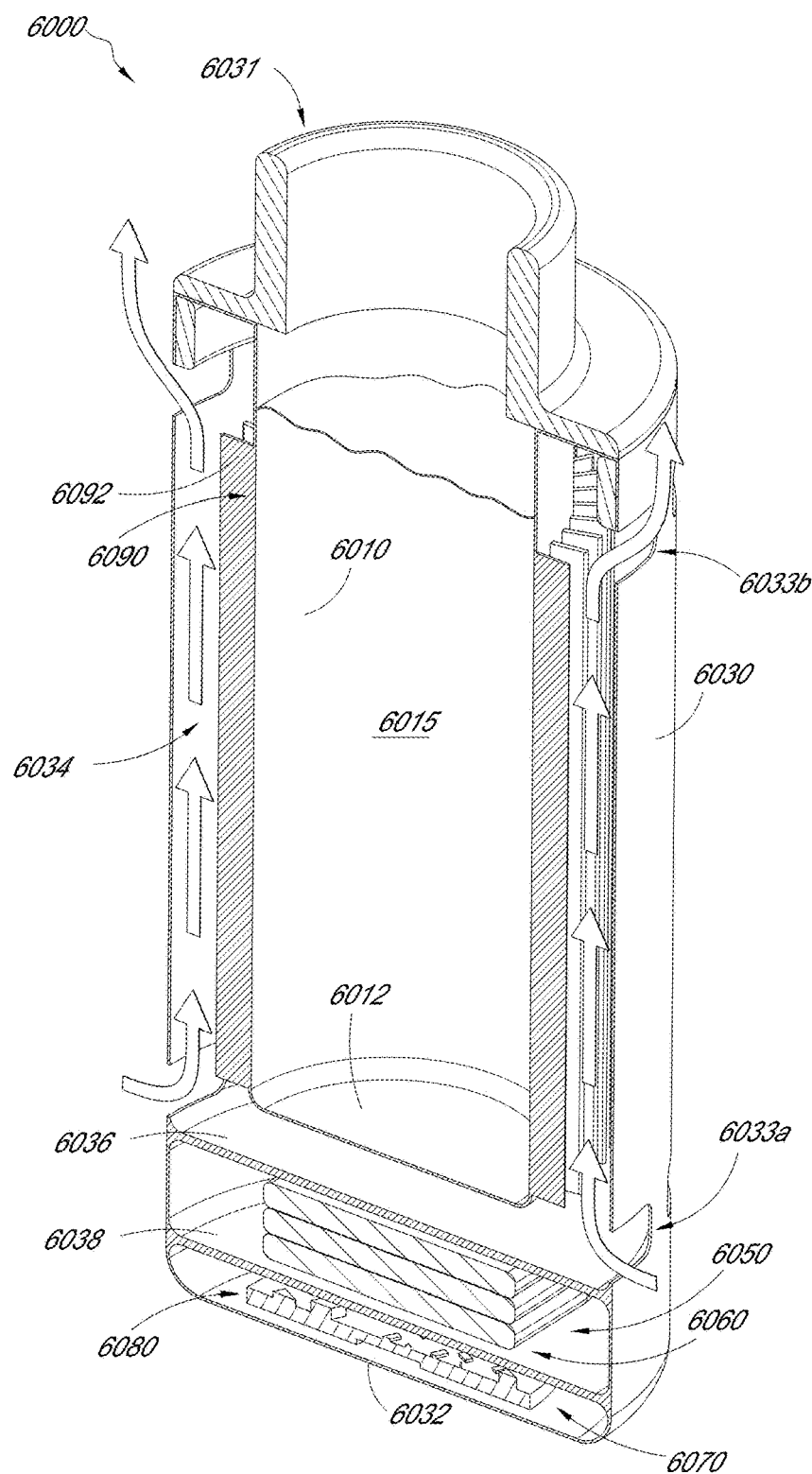
FIG. 60 is a perspective cross-sectional view of an embodiment of a drinkware container.

FIG. 60 illustrates an embodiment of a drinkware container 6000 (hereinafter "container 6000"). The container 6000 is similar to the container 5100 shown in FIG. 51, except as noted below. Thus, the reference numerals used to designate the various components of the container 6000 are identical to those used for identifying the corresponding components of the container 5100 in FIG. 51, except that the reference numerals of the container 6000 begin with "60" instead of "51". Therefore the description for the various components of the container 5100 shown in FIG. 51 are understood to apply to the corresponding components of the container 6000 in FIG. 60, except as described below. The container 100I excludes the use of a phase change material (PCM) and chamber where the PCM is contained.

As only a cross-section is shown, the other half of the drinkware container 6000 is excluded in FIG. 60 to illustrate the various components of the container 6000. One of skill in the art will understand that the excluded portion of the drinkware container 6000 in FIG. 60 is a mirror image of the portion of the drinkware container 6000 that is shown in FIG. 60.

As shown in FIG. 60, the container 6000 has an inner sidewall 6010 (e.g., circumferential or cylindrical inner sidewall 6010) and an inner bottom wall 6012 that together at least partially define the chamber 6015 in the container that holds liquid (e.g., hot coffee, hot tea, soup, hot chocolate). The container has an outer sidewall 6030 radially spaced apart from the inner sidewall 6010 to define a chamber 6034 (e.g., annular chamber or gap) therebetween. Additionally, the outer sidewall 6030 has one or more proximal openings 6033b formed in a proximal portion of the outer sidewall 6030 and one or more distal openings 6033a formed in a distal portion of the outer sidewall 6030. The openings 6033a, 6033b allow air to flow through the one or more distal openings 6033a, along the chamber 6034 and out the one or more proximal openings 6033b, where said airflow provides a passive chimney effect to draw heat away from the inner sidewall 6010 and therefore draw heat from the liquid in the chamber 6015. Said airflow can also facilitate thermal insulation of the outer sidewall 6030 relative to the inner sidewall 6010 to facilitate the ability of a user to comfortably hold the container 6000 with a hot liquid therein (e.g., for extended periods of time) without burning their hand or feeling uncomfortable after a while due to the heat transferred from the hot liquid to the outer surface of the container 6000.

Optionally, the one or more proximal and distal openings 6033b, 6033a can remain open at all times such that said chimney effect through the chamber 6034 is available during use of the container 6000. In other embodiments, one or both of the one or more proximal and distal openings 6033b, 6033a can be selectively closed, as further described below.

Optionally, the container 6000 can have a heat sink 6090 in thermal communication with the inner side wall 6010. In the illustrated embodiment, the heat sink 6090 is adjacent an outer surface of the inner sidewall 6010 with one or more fins 6092 (e.g., a plurality of fins 6092) extending into the chamber 6034 so that the fin(s) 6092 are exposed to the airflow through the chamber 6034. The heat sink 6090 can facilitate the removal of heat from the inner sidewall 6010 and therefore from the chamber 6015 that holds the liquid.

The outer sidewall 6030 can optionally be a single wall, and can optionally be made of a thermally insulative material (e.g., a plastic material, a foam material, etc.). In other embodiments, the outer sidewall 6030 can optionally define a chamber therein (e.g., be defined by two walls) that can contain air, or can be a vacuum chamber, to provide thermal insulation to the outer sidewall 6030 relative to the inner sidewall 6010 and liquid in the chamber 6015.

In FIG. 60, the heating element is excluded to show the inner bottom wall 6012 of the container 6000. Though the heating element is excluded from FIG. 60, one of skill in the art will recognize that the container 6000 can have a heating element like the heating element 5140, 5240, 5340, 5440 or 5540 previously described (e.g., a heating element disposed above the inner bottom wall 6012 or disposed below the inner bottom wall 6012, or disposed in thermal communication with at least a portion of the inner sidewall 6010; a resistive heater or Peltier element; a screen printed heating element printed on the inner bottom wall 6012, etc.). Though the discussion in this paragraph refers to one or more heating elements, one of skill in the art will recognize that this can also apply to one or more cooling elements or one or more heating or cooling elements (e.g., thermoelectric elements), and that this disclosure is meant to apply to all these options for the container 6000.

Though the features disclosed above may be described in connection with the container 6000, one of skill in the art will recognize that any of the features described in this embodiment can also apply to any of the portable liquid containers disclosed herein (e.g., 5000-5900, 6100-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 61:
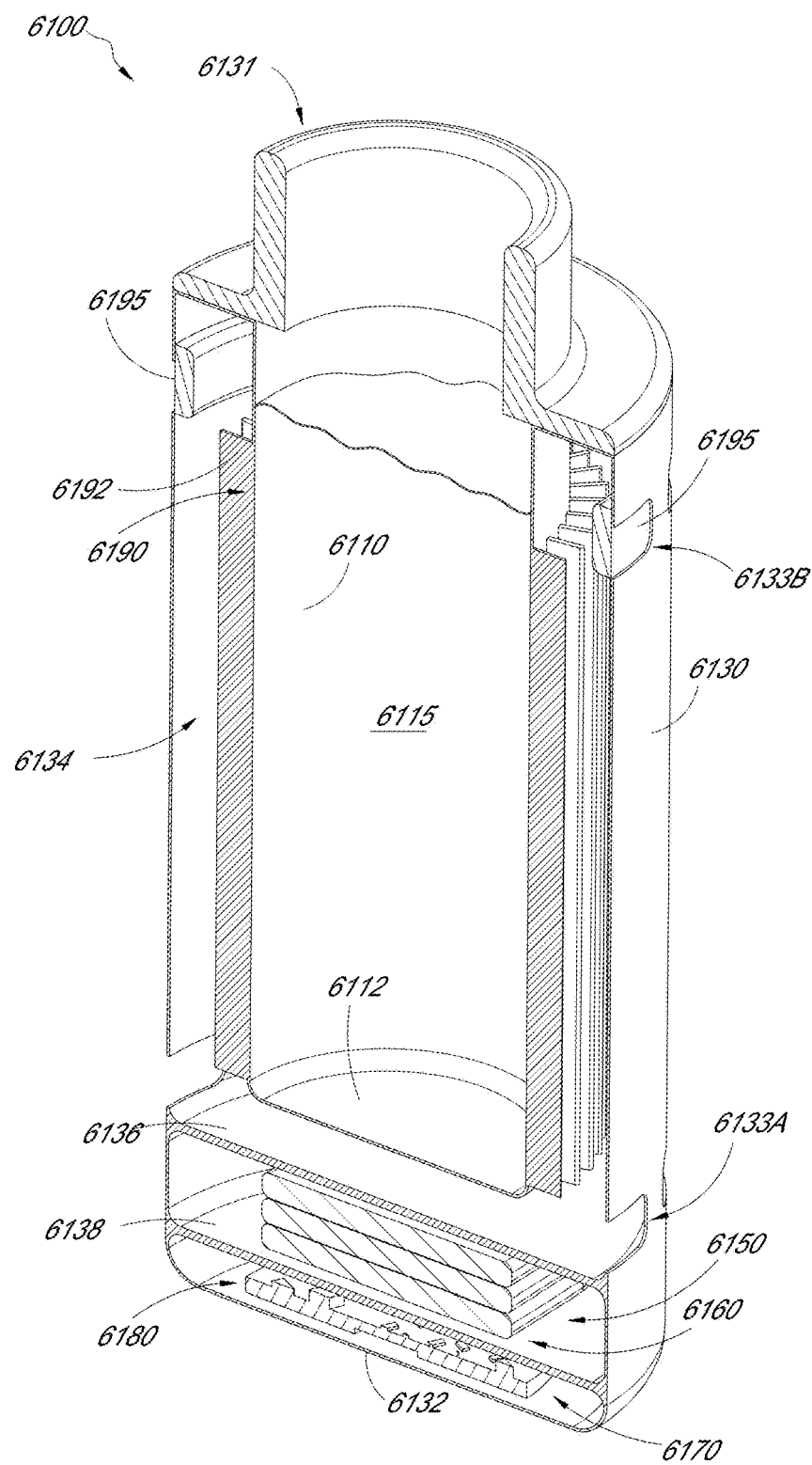
FIG. 61 is a perspective cross-sectional view of an embodiment of a drinkware container.

FIG. 61 illustrates an embodiment of a drinkware container 6100 (hereinafter "container 6100"). The container 6100 is similar to the container 5100, 6000 shown in FIGS. 51 and 60, except as noted below. Thus, the reference numerals used to designate the various components of the container 6100 are identical to those used for identifying the corresponding components of the container 5100 in FIG. 51 and the container 6000 in FIG. 60, except that the reference numerals of the container 6100 begin with "61" instead of "51" or "60". Therefore the description for the various components of the container 5100 shown in FIG. 51, and of the container 6000 shown in FIG. 60, are understood to apply to the corresponding components of the container 6100 in FIG. 61, except as described below. The container 6100 excludes the use of a phase change material (PCM) and chamber where the PCM is contained.

The container 6100 differs from the container 6000 in that one or more of the one or more proximal or distal openings 6133a, 6133b are selectively closed to inhibit or cease the chimney effect of airflow through the chamber 6134, as described above in connection with the container 6000. In the illustrated embodiment, the one or more proximal openings 6133b are selectively closed with one or more gates 6195 to prevent airflow through the openings 6133b, thereby ceasing the chimney airflow effect through the chamber 6134. Though only the one or more gates 6195 are shown that selectively close the one or more proximal openings 6133b, one of skill in the art will understand that alternatively, or additionally, gates can be actuated to selectively close the one or more distal openings 6133b in the outer sidewall 6130.

The one or more gates 6195 can be actuated mechanically or electrically. In one embodiment, the one or more gates 6195 can be manually slid to cover or close the one or more proximal openings 6133b. For example, a user can push a slide button or lever on a surface of the container 6100 that is mechanically coupled to the one or more gates 6195, where actuation of the push button or lever by the user slides the one or more gates 6195 to cover or uncover the one or more proximal openings 6133b.

In another embodiment, the one or more gates 6195 can be driven by an electrical actuator (e.g., electric motor, solenoid, electromagnet, etc.), which can be powered by the one or more power storage elements 6160 and/or controlled by the control circuitry 6180, and which can be actuated by a user pushing on a user interface (e.g., button) on a surface of the container 6100.

In another embodiment, the one or more gates 6195 can be automatically driven by the electrical actuator. For example, the control circuitry 6180 can have a receiver that receives commands from a remote mobile phone or tablet computer, and can actuate the one or more gates 6195 to selectively close or open the one or more proximal openings 6133b. In still another embodiment, the control circuitry 6180 can optionally actuate the one or more gates 6195 to selectively open or close the one or more proximal openings 6133b based at least in part on a sensed parameter during use of the container 6100. For example, the control circuitry 6180 can actuate the one or more gates 6195 to close the one or more proximal openings 6133b based on sensed temperature information for the liquid in the chamber 6115 to inhibit further cooling of the liquid in the chamber 6115. In another embodiment, the control circuitry 6180 can actuate the one or more gates 6195 to close the one or more proximal openings 6133b based on a sensed energy level of the one or more power storage elements 6160 to conserve energy as closing the one or more proximal openings 6133b will result in a decreased loss of heat from the liquid in the chamber 6115, which will therefore require less energy input from a heating element of the container 6100 to maintain the liquid in the chamber 6115 at a predetermined or user selected temperature, thereby reducing the power demand and increasing the operating life of the one or more power storage elements 6160.

Though the features disclosed above may be described in connection with the container 6100, one of skill in the art will recognize that any of the features described in this embodiment can also apply to any of the portable liquid containers disclosed herein (e.g., 5000-6000, 6200-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 62:
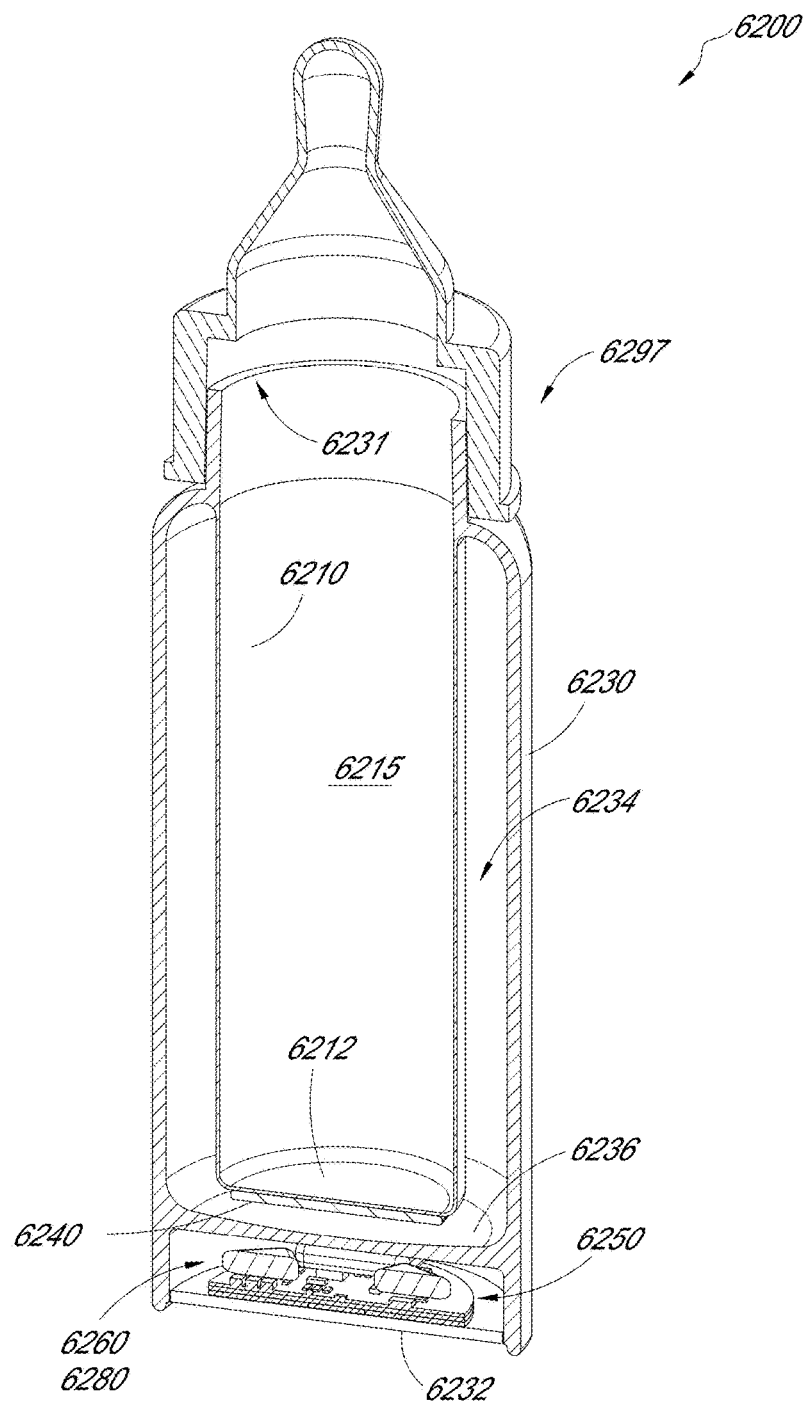
FIG. 62 is a perspective cross-sectional view of another embodiment of a drinkware container.

FIG. 62 illustrates an embodiment of a drinkware container 6200 (hereinafter "container 6200"). In the illustrated embodiment, the drinkware container 6200 is in the form of a baby or infant bottle. Some of the features of the container 6200 are similar to features in the container 5100 in FIG. 51. Thus, references numerals used to designate the various components of the container 6200 are identical to those used for identifying the corresponding components of the container 5100 in FIG. 51, except that the reference numerals of the container 6200 begin with "62" instead of "51". Therefore, the description for the various components of the container 5100 in FIG. 51 is understood to apply to the corresponding components of the container 6200 in FIG. 62, except as described below.

As only a cross-section is shown, the other half of the drinkware container 6200 is excluded in FIG. 62 to illustrate the various components of the container 6200. One of skill in the art will understand that the excluded portion of the drinkware container 6200 in FIG. 62 is a mirror image of the portion of the drinkware container 6200 that is shown in FIG. 62.

As shown in FIG. 62, a connector 6297 attaches to a proximal end of the container 6200 so that it covers the lip 6231. In the illustrated embodiment, the connector 6297 can optionally include a nipple. The nipple can be of a flexible material (e.g., rubber) such as those used in baby bottles, or can be or a relatively rigid material (e.g., plastic) such as those used in sippy cups.

The container 6200 has an inner sidewall 6210 and inner bottom wall 6212 that together define a chamber 6215 that receives and holds a liquid (e.g., milk) therein. The container 6200 also has an outer sidewall 6230 that circumferentially surrounds and is radially spaced apart from the inner sidewall 6210 so as to define an annular chamber 6234 therebetween. The annular chamber 6234 can optionally extend below the inner bottom wall 6212 so that there is a gap between the inner bottom wall 6212 and a bottom plate 6236. The annular chamber 6234 can optionally be filled with air, which can facilitate thermal insulation of the outer sidewall 6230 of the container 6200 relative to the inner sidewall 6210 and liquid in the chamber 6215. In another embodiment, the annular chamber 6234 can optionally be under vacuum to provide a vacuum chamber that facilitates thermal insulation of the outer sidewall 6230 of the container 6200 relative to the inner sidewall 6210 and liquid in the chamber 6215. In still another embodiment, the annular chamber 6234 can be filled with a material (e.g., insulative material, such as foam, that can facilitate thermal insulation of the outer sidewall 6230 of the container 6200 relative to the inner sidewall 6210 and liquid in the chamber 6215. In one embodiment, the outer sidewall 6230 can optionally be of a different material than the material of the inner sidewall 6210. In another embodiment, the inner sidewall 6210 and outer sidewall 6230 can be made of the same material (e.g., glass, a plastic material, a metal).

A chamber 6250 can be defined between the bottom plate 6236 and a second bottom plate 6232, where the chamber 6250 can optionally removably house one or both of one or more power storage elements 6260 and control circuitry 6280 therein.

The container 6200 can have a heating element 6240 optionally disposed below (e.g., in contact with a bottom surface of) the inner bottom wall 6212 that covers at least a portion of the bottom surface of the inner bottom wall 6212 so that the heating element 6240 is in thermal communication (e.g., indirect thermal communication) with liquid in the chamber 6215 via conduction heat transfer through the inner bottom wall 6212. The heating element 6240 is optionally a resistive heater. In other embodiments, the heating element 6240 can optionally be a thermoelectric element (e.g., Peltier element). In some embodiments, as discussed above, the heating element 6240 can be defined by a trace pattern screen printed onto at least a portion of the bottom surface of the inner bottom wall 6212. A lead line (not shown) can extend from the heating element 6240 to one or both of the one or more power storage elements 6260 and control circuitry 6280, as discussed above in connection with the container 5100 of FIG. 51. Though the embodiment in FIG. 62 shows the heating element 6240 disposed below the inner bottom wall 6212, in other embodiments the heating element 6240 can be disposed above the inner bottom wall 6212, similar to the heating element 5140 shown in FIG. 51, so that it is in thermal communication (e.g., direct thermal communication) with liquid in the chamber 6215. Though the discussion in this paragraph refers to one or more heating elements 6240, one of skill in the art will recognize that this can also apply to one or more cooling elements or one or more heating or cooling elements (e.g., thermoelectric elements), and that this disclosure is meant to apply to all these options for the container 6200.

The control circuitry 6280 can control the operation of the heating element 6240 to control the amount of energy supplied to the liquid in the chamber 6215 to maintain or increase the temperature of the liquid. Optionally, the control circuitry 6280 can control delivery of power to the heating element 6240 based at least in part on information from one or more sensors that sense a parameter of quality of the liquid (e.g., temperature, volume, acidity, pH) where said one or more sensors can be on a surface of one or both of the inner sidewall 6210 and inner bottom wall 6212.

The control circuitry can include a memory that stores or receives one or more algorithms that can be executed by the control circuitry 6280 to control the operation of the heating element 6240 and/or to determine a parameter of the liquid based on sensed information. In one embodiment, such algorithms can be used to determine one or more parameters of the liquid in the container 6200 based on sensed information for another parameter of the liquid. In one embodiment, the container 6200 can include a sensor in communication with the chamber 6215 (e.g., in contact with the inner sidewall 6210 or inner bottom wall 6212, whose sensed information can provide an indication of a temperature of the liquid in the container 6200, and an algorithm can calculate a volume of the liquid in the chamber 6215 based on the sensed information of the same sensor. For example, by sensing how long it takes for the liquid to change temperature upon actuation of the heating element 6240, the algorithm can calculate the approximate volume of liquid in the chamber 6215 (e.g., if the container 6200 is full of liquid, it may take X seconds for the sensed temperature to change, but if the container 6200 is half-full of liquid, it may take Y seconds for the sensed temperature to change). Though such algorithms are described in connection with the container 6200, one of skill in the art will recognize that such algorithms can be implemented or use by the control circuitry 5180-6180, 6380, 6580, 6680-6880 of the other containers 5100-6100, 6300, 6400, 6500, 6600-6800 disclosed herein.

Though the features disclosed above may be described in connection with the container 6200, one of skill in the art will recognize that any of the features described in this embodiment can also apply to any of the portable liquid containers disclosed herein (e.g., 5000-6100, 6300-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 63:
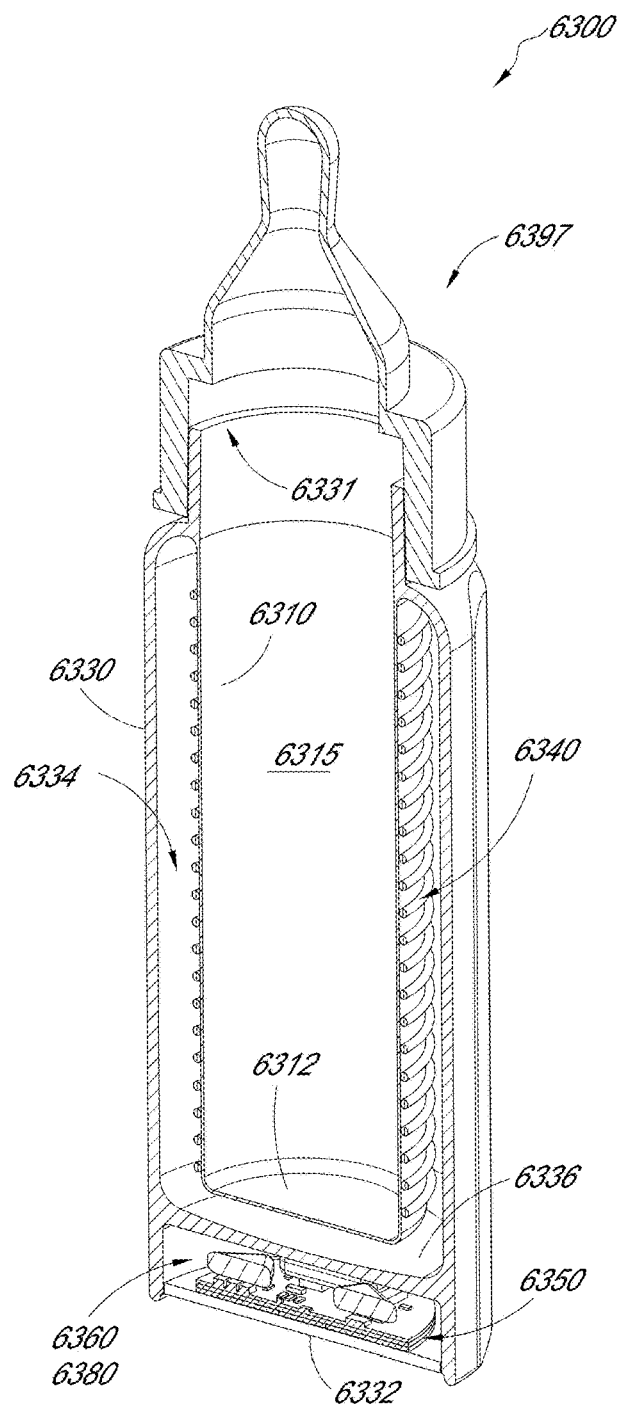
FIG. 63 is a perspective cross-sectional view of another embodiment of a drinkware container.

FIG. 63 illustrates an embodiment of a drinkware container 6300 (hereinafter "container 6300"). The container 6300 is similar to the container 6200 shown in FIG. 62, except as noted below. Thus, the reference numerals used to designate the various components of the container 6300 are identical to those used for identifying the corresponding components of the container 6200 in FIG. 62, except that the reference numerals of the container 6300 begin with "63" instead of "62". Therefore the description for the various components of the container 6200 shown in FIG. 62 are understood to apply to the corresponding components of the container 6300 in FIG. 63, except as described below.

As only a cross-section is shown, the other half of the drinkware container 6300 is excluded in FIG. 63 to illustrate the various components of the container 6300. One of skill in the art will understand that the excluded portion of the drinkware container 6300 in FIG. 63 is a mirror image of the portion of the drinkware container 6300 that is shown in FIG. 63.

As shown in FIG. 63, the heating element 6340 optionally surrounds at least a portion of the inner sidewall 6310 (e.g., surrounds the inner sidewall 6310 along substantially its entire length). The heating element 6340 can optionally be a resistive heater, such as a coil heater. In another embodiment, the heating element 6340 can be a thermoelectric element (e.g., Peltier element). Though the discussion in this paragraph refers to one or more heating elements 6340, one of skill in the art will recognize that this can also apply to one or more cooling elements or one or more heating or cooling elements (e.g., thermoelectric elements), and that this disclosure is meant to apply to all these options for the container 6300.

Though the features disclosed above may be described in connection with the container 6300, one of skill in the art will recognize that any of the features described in this embodiment can also apply to any of the portable liquid containers disclosed herein (e.g., 5000-6200, 6400-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 64:
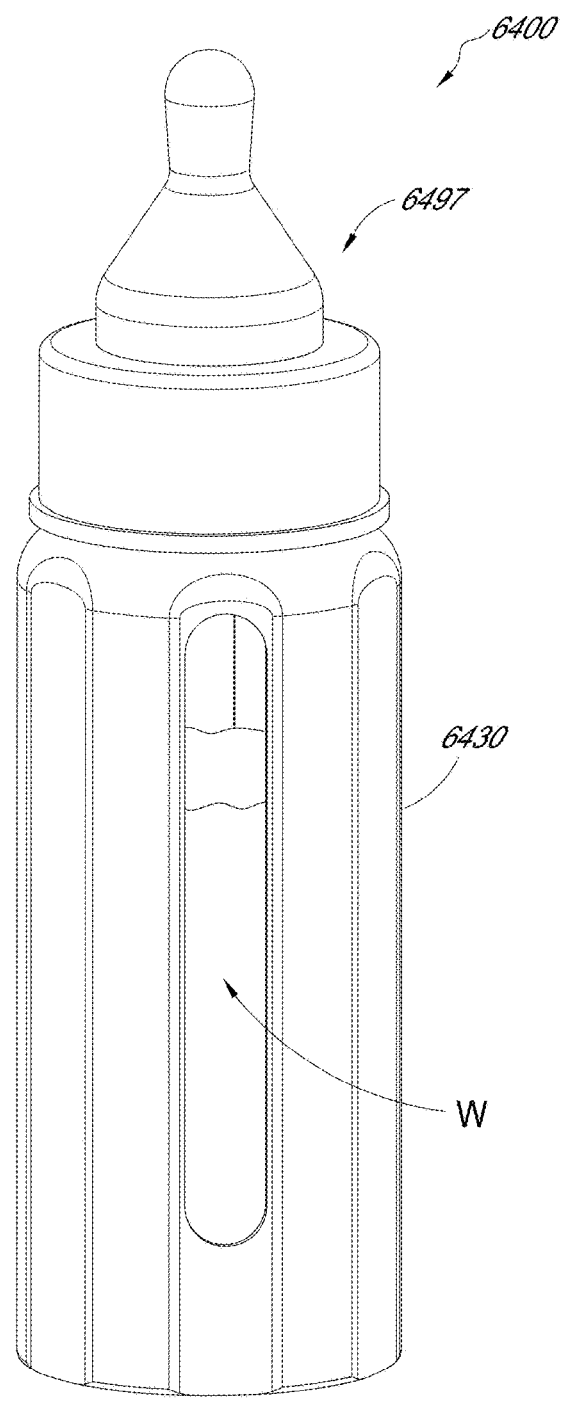
FIG. 64 is a perspective partial view of another embodiment of a drinkware container.

FIG. 64 illustrates an embodiment of a drinkware container 6400 (hereinafter "container 6400"). The container 6400 can be similar to the container 6200, 6300 shown in FIGS. 62-63, except as noted below. Thus, the reference numerals used to designate the various components of the container 6400 are identical to those used for identifying the corresponding components of the container 6200, 6300 in FIGS. 62-63, except that the reference numerals of the container 6400 begin with "64" instead of "62" or "63". Therefore the description for the various components of the container 6200, 6300 shown in FIGS. 62-63 are understood to apply to the corresponding components of the container 6400 in FIG. 64, except as described below.

As shown in FIG. 64, the container 6400 optionally has one or more viewing windows W on the outer sidewall 6430 that allow viewing of the liquid in the container 6400 (e.g., to see the level of the liquid in the container 6400). Though such one or more viewing windows W are shown in connection with container 6400, one of skill in the art will recognize that such one or more viewing windows W can be incorporated into the other containers 5100-5300, 6500, 6600-6800 disclosed herein.

Though the features disclosed above may be described in connection with the container 6400, one of skill in the art will recognize that any of the features described in this embodiment can also apply to any of the portable liquid containers disclosed herein (e.g., 5000-6300, 6500-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 65:
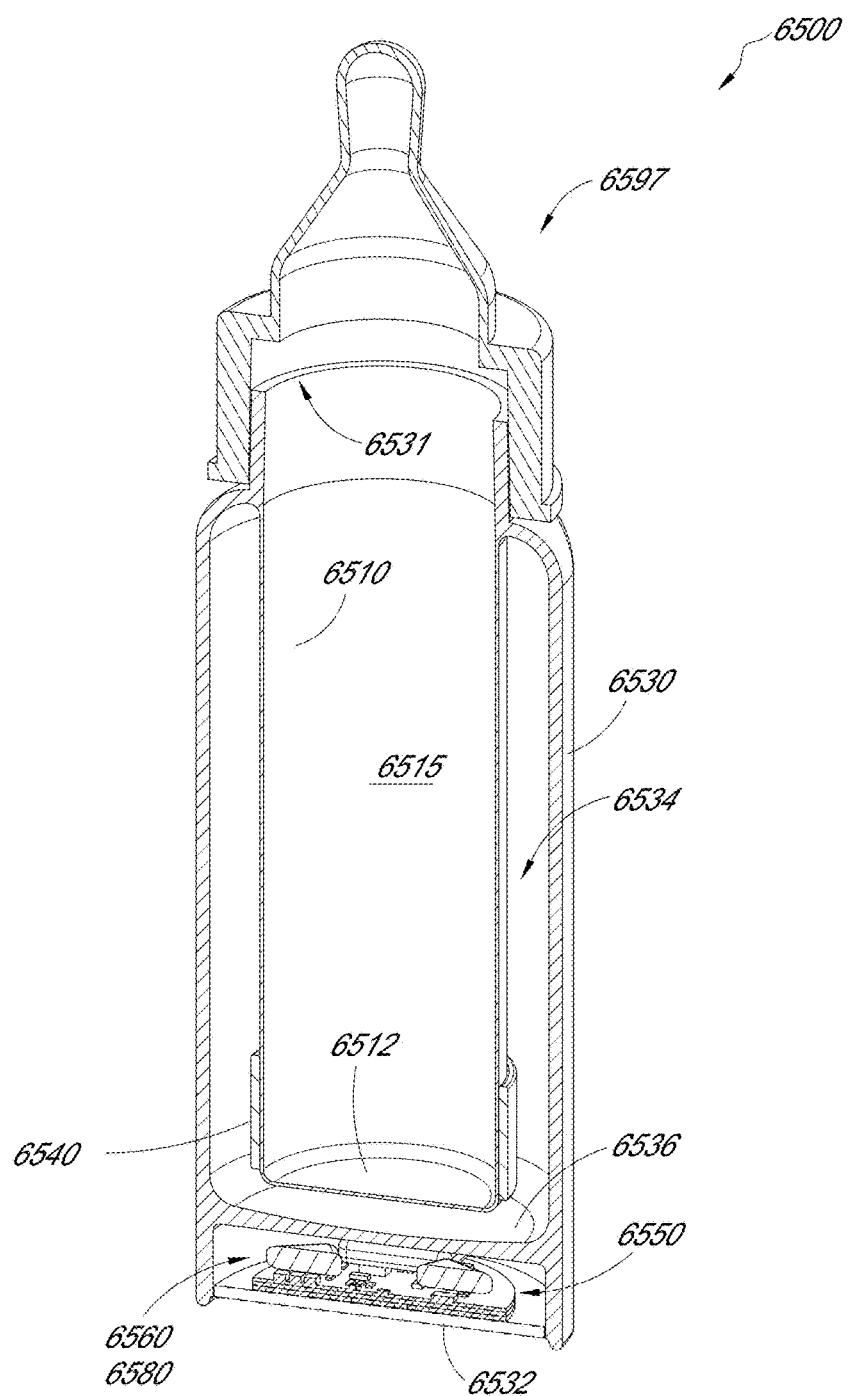
FIG. 65 is a perspective cross-sectional view of another embodiment of a drinkware container.

FIG. 65 illustrates an embodiment of a drinkware container 6500 (hereinafter "container 6500"). The container 6500 is similar to the container 6200 shown in FIG. 62, except as noted below. Thus, the reference numerals used to designate the various components of the container 6500 are identical to those used for identifying the corresponding components of the container 6200 in FIG. 62, except that reference numerals of the container 6500 begin with "65" instead of "62". Therefore the description for the various components of the container 6200 shown in FIG. 62 are understood to apply to the corresponding components of the container 6500 in FIG. 65, except as described below.

As only a cross-section is shown, the other half of the drinkware container 6500 is excluded in FIG. 65 to illustrate the various components of the container 6500. One of skill in the art will understand that the excluded portion of the drinkware container 6500 in FIG. 65 is a mirror image of the portion of the drinkware container 6500 that is shown in FIG. 65.

As shown in FIG. 65, the heating element 6540 optionally surrounds at least a portion of the inner sidewall 6510 (e.g., surrounds the inner sidewall 6510 along less than half its length). The heating element 6540 can optionally be a resistive heater, such as a coil heater. In another embodiment, the heating element 6540 can be a thermoelectric element (e.g., Peltier element). In the illustrated embodiment, the heating element 6540 surrounds a bottom portion of the inner sidewall 6510 (proximate the bottom inner wall 6512). However, in other embodiments, the heating element 6540 can optionally surround the top portion of the inner sidewall 6510, or can optionally surround an intermediate portion of the inner sidewall 6510 that is between the bottom and top ends of the inner sidewall 6510. Though the discussion in this paragraph refers to one or more heating elements 6540, one of skill in the art will recognize that this can also apply to one or more cooling elements or one or more heating or cooling elements (e.g., thermoelectric elements), and that this disclosure is meant to apply to all these options for the container 6500.

Though the features disclosed above may be described in connection with the container 6500, one of skill in the art will recognize that any of the features described in this embodiment can also apply to any of the portable liquid containers disclosed herein (e.g., 5000-6400, 6600-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 66:
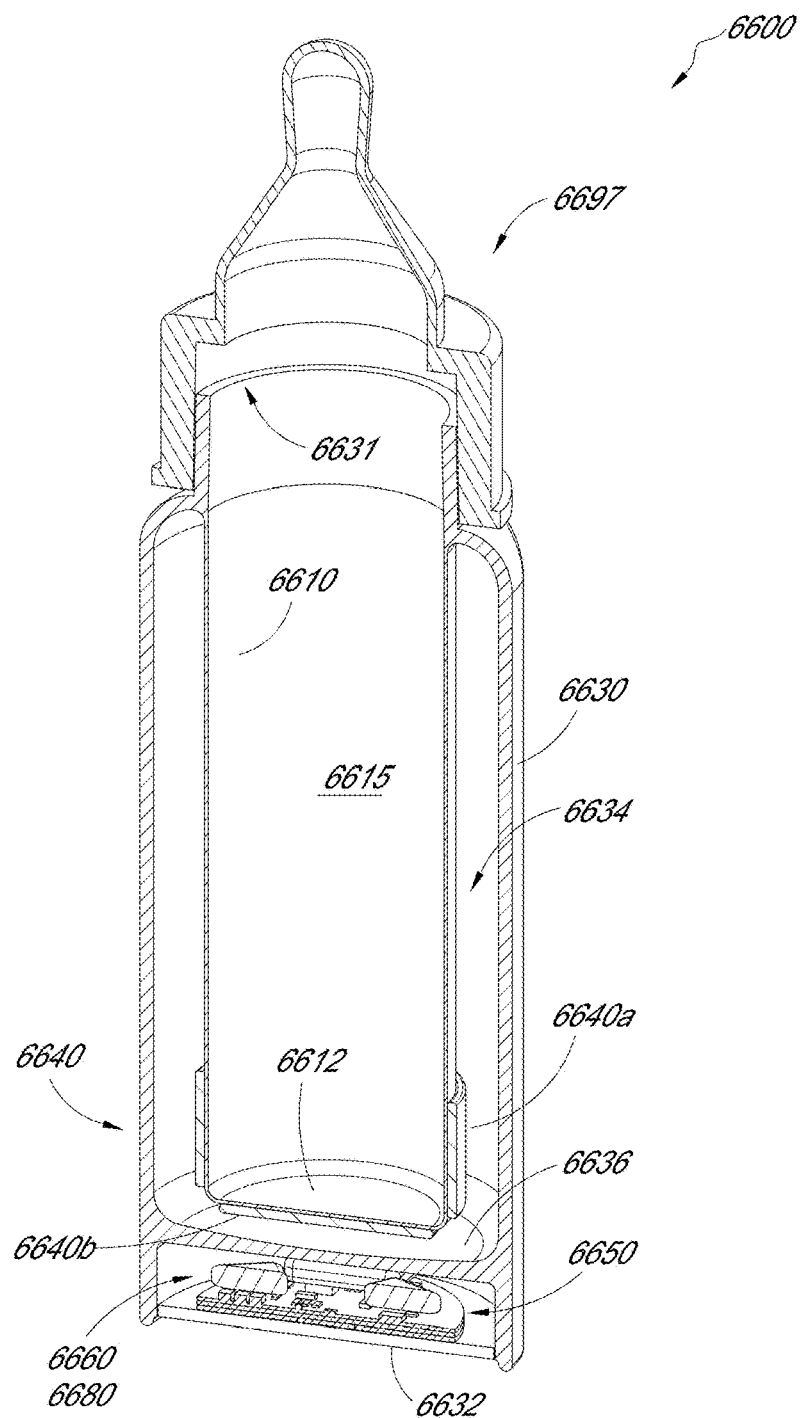
FIG. 66 is a perspective cross-sectional view of another embodiment of a drinkware container.

FIG. 66 illustrates an embodiment of a drinkware container 6600 (hereinafter "container 6600"). The container 6600 is similar to the container 6200 shown in FIG. 62, except as noted below. Thus, the reference numerals used to designate the various components of the container 6600 are identical to those used for identifying the corresponding components of the container 6200 in FIG. 62, except that the reference numerals of the container 6600 begin with "66" instead of "62". Therefore the description for the various components of the container 6200 shown in FIG. 62 are understood to apply to the corresponding components of the container 6600 in FIG. 66, except as described below.

As only a cross-section is shown, the other half of the drinkware container 6600 is excluded in FIG. 66 to illustrate the various components of the container 6600. One of skill in the art will understand that the excluded portion of the drinkware container 6600 in FIG. 66 is a mirror image of the portion of the drinkware container 6600 that is shown in FIG. 66.

As shown in FIG. 66, the heating element 6640 includes a bottom heating element 6640*a*1 optionally disposed below (e.g., in contact with a bottom surface of) the inner bottom wall 6612 that covers at least a portion of the bottom surface of the inner bottom wall 6612 so that the heating element 6640*a* is in thermal communication (e.g., indirect thermal communication) with liquid in the chamber 6615 via conduction heat transfer through the inner bottom wall 6612. The heating element 6640 also includes a side heating element 6640*b* that optionally surrounds at least a portion of the inner sidewall 6610 (e.g., surrounds the inner sidewall 6610 along less than half its length). One or both of the bottom and side heating elements 6640*a*, 6640*b* can optionally be a resistive heater, such as a coil heater. In another embodiment, one or both of the bottom and side heating elements 6640*a*, 6640*b* can be a thermoelectric element (e.g., Peltier element). In the illustrated embodiment, the side heating element 6640*b* surrounds a bottom portion of the inner sidewall 6610 (proximate the bottom inner wall 6612). However, in other embodiments, the heating element 6640*b* can optionally surround the top portion of the inner sidewall 6610, or can optionally surround an intermediate portion of the inner sidewall 6610 that is between the bottom and top ends of the inner sidewall 6610. Though the discussion in this paragraph refers to one or more heating elements 6640, one of skill in the art will recognize that this can also apply to one or more cooling elements or one or more heating or cooling elements (e.g., thermoelectric elements), and that this disclosure is meant to apply to all these options for the container 6600.

Though the features disclosed above may be described in connection with the container 6600, one of skill in the art will recognize that any of the features described in this embodiment can also apply to any of the portable liquid containers disclosed herein (e.g., 5000-6500, 6700-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 67:
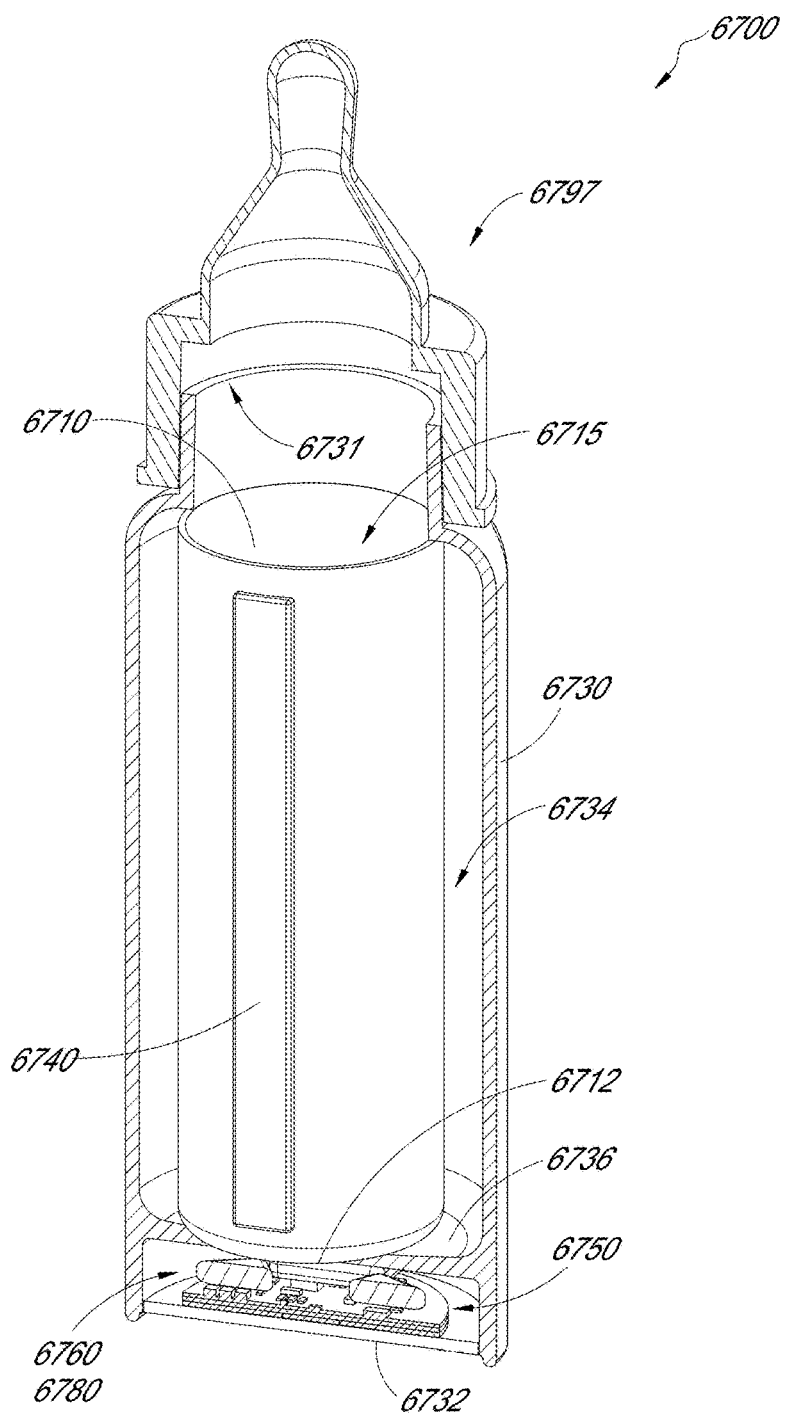
FIG. 67 is a perspective cross-sectional view of another embodiment of a drinkware container.

FIG. 67 illustrates an embodiment of a drinkware container 6700 (hereinafter "container 6700"). The container 6700 is similar to the container 6200 shown in FIG. 62, except as noted below. Thus, the reference numerals used to designate the various components of the container 6700 are identical to those used for identifying the corresponding components of the container 6200 in FIG. 62, except that the reference numerals of the container 6700 begin with "67" instead of "62". Therefore the description for the various components of the container 6200 shown in FIG. 62 are understood to apply to the corresponding components of the container 6700 in FIG. 67, except as described below.

FIG. 67 shows a cross-section of the outer sidewall 6730 and connector 6797, as well as a cross-section of the chamber 6750, wall 6732 and one or more power storage elements 6760 and control circuitry 6780. The other half of these components is excluded in FIG. 67 to illustrate the various components of the container 6700. One of skill in the art will understand that the excluded portion of the drinkware container 6700 in FIG. 67 is a mirror image of the portion of the drinkware container 6700 that is shown in FIG. 67.

As shown in FIG. 67, the heating element 6740 can optionally be a band that extends along at least a portion of the length of the sidewall 6710 (e.g., along substantially the entire length of the inner sidewall 6710). The heating element 6740 can have a width that is less than a circumference of the sidewall 6710, such that the heating element 6740 only extends over a portion of the circumference of the inner sidewall 6710. The heating element 6740 can optionally be a resistive heater. In another embodiment, the heating element 6740 can be a thermoelectric element (e.g., Peltier element). In the illustrated embodiment, the heating element 6740 optionally extends along substantially the entire length of the inner sidewall 6710. In another embodiment, the heating element 6740 can optionally extend over only a portion (e.g., less than half, less than ⅓) of the length of the inner sidewall 6710. Though the discussion in this paragraph refers to one or more heating elements 6740, one of skill in the art will recognize that this can also apply to one or more cooling elements or one or more heating or cooling elements (e.g., thermoelectric elements), and that this disclosure is meant to apply to all these options for the container 6700.

Though the features disclosed above may be described in connection with the container 6700, one of skill in the art will recognize that any of the features described in this embodiment can also apply to any of the portable liquid containers disclosed herein (e.g., 5000-6600, 6800-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 68:
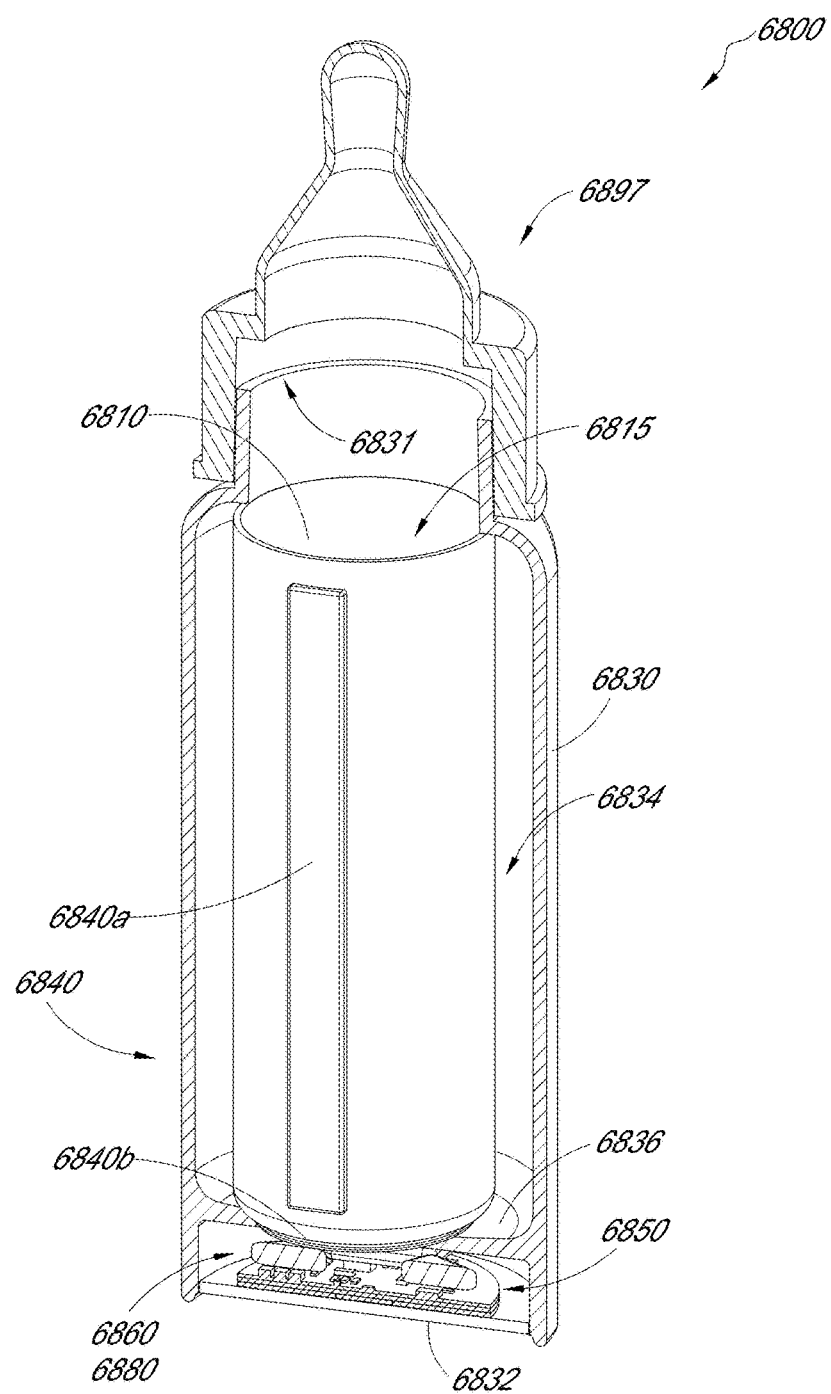
FIG. 68 is a perspective cross-sectional view of another embodiment of a drinkware container.

FIG. 68 illustrates an embodiment of a drinkware container 6800 (hereinafter "container 6800"). The container 6800 is similar to the container 6200 shown in FIG. 62, except as noted below. Thus, the reference numerals used to designate the various components of the container 6800 are identical to those used for identifying the corresponding components of the container 6200 in FIG. 62, except that the reference numerals of the container 6800 begin with "68" instead of "62". Therefore the description for the various components of the container 6200 shown in FIG. 62 are understood to apply to the corresponding components of the container 6800 in FIG. 68, except as described below.

FIG. 68 shows a cross-section of the outer sidewall 6830 and connector 6897, as well as a cross-section of the chamber 6850, wall 6832 and one or more power storage elements 6860 and control circuitry 6880. The other half of these components is excluded in FIG. 68 to illustrate the various components of the container 6800. One of skill in the art will understand that the excluded portion of the drinkware container 6800 in FIG. 68 is a mirror image of the portion of the drinkware container 6800 that is shown in FIG. 68.

As shown in FIG. 68, the heating element 6840 includes a bottom heating element 6840*b* optionally disposed below (e.g., in contact with a bottom surface of) the inner bottom wall 6812 that covers at least a portion of the bottom surface of the inner bottom wall 6812 so that the heating element 6840*b* is in thermal communication (e.g., indirect thermal communication) with liquid in the chamber 6815 via conduction heat transfer through the inner bottom wall 6812. The heating element 6840 also includes a side heating element 6840*a* that can optionally be a band that extends along at least a portion of the length of the sidewall 6810 (e.g., along substantially the entire length of the inner sidewall 6810). The heating element 6840*a* can have a width that is less than a circumference of the sidewall 6810, such that the heating element 6840*a* only extends over a portion of the circumference of the inner sidewall 6810. One or both of the bottom and side heating elements 6840*b*, 6840*a* can optionally be a resistive heater, such as a coil heater. In another embodiment, one or both of the bottom and side heating elements 6840*b*, 6840*a* can be a thermoelectric element (e.g., Peltier element). In the illustrated embodiment, the side heating element 6840*a* optionally extends along substantially the entire length of the inner sidewall 6810. In another embodiment, the side heating element 6840*a* can optionally extend over only a portion (e.g., less than half, less than ⅓) of the length of the inner sidewall 6810. Though the discussion in this paragraph refers to one or more heating elements 6840, one of skill in the art will recognize that this can also apply to one or more cooling elements or one or more heating or cooling elements (e.g., thermoelectric elements), and that this disclosure is meant to apply to all these options for the container 6800.

Though the features disclosed above may be described in connection with the container 6800, one of skill in the art will recognize that any of the features described in this embodiment can also apply to any of the portable liquid containers disclosed herein (e.g., 5000-6700, 6900-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

FIGS. 69A-69B illustrate an embodiment of a drinkware container 6900 (hereinafter "container 6900"). In the illustrated embodiment, the drinkware container 6900 is in the form of a baby or infant bottle. Some of the features of the container 6900 are similar to features in the container 6200 in FIG. 62. Thus, references numerals used to designate the various components of the container 6900 are identical to those used for identifying the corresponding components of the container 6200 in FIG. 62, except that the reference numerals of the container 6900 begin with "69" instead of "62". Therefore, the structure and description for the various components of the container 6200 in FIG. 62 is understood to apply to the corresponding components of the container 6900 in FIGS. 69A-69B, except as described below.

As shown in FIGS. 69A-69B, a connector 6997 attaches to a proximal end of the container 6900 so that it covers a lip (not shown, but similar to 6231 in FIG. 62). In the illustrated embodiment, the connector 6997 can optionally include a nipple. The nipple can be of a flexible material (e.g., rubber) such as those used in baby bottles, or can be or a relatively rigid material (e.g., plastic) such as those used in sippy cups.

The container 6900 an outer sidewall 6930 and a chamber 6950 at a bottom of the container 6900 and defined at least in part by a bottom surface 6936 of the container 6900.

With continued reference to FIGS. 69A-69B, a module 6990 (e.g., a heating module) can optionally include one or more of heating elements 6940 (similar to heating element 6240), one or more power storage element (not shown, but similar to power storage element 6260) and/or control circuitry (not shown, but similar to control circuitry 6280). The module 6990 can removably couple to the bottom portion of the container 6900 so that the one or more heating elements 6940 is in contact with the bottom surface 6936. In another embodiment, the one or more heating elements can be incorporated into the container 6900 (as disclosed in other embodiments herein), and power to the one or more heating elements can be communicated from the module 6990 via one or more electrical contacts between the container 6900 and the module 6990. Though the discussion in this paragraph refers to one or more heating elements 6940, one of skill in the art will recognize that this can also apply to one or more cooling elements or one or more heating or cooling elements (e.g., thermoelectric elements), and that this disclosure is meant to apply to all these options for the container 6900.

The module 6990 can have one or more magnets 6992 configured to magnetically couple to one or more magnets 6994 on the bottom surface 6936 to couple the module 6990 to the container 6900. Once the user is done using the module 6990 (e.g., to heat a liquid in the container 6900), the user can decouple the module 6990 from the container 6900 (e.g., to allow the container 6900 to be washed).

Advantageously, because the module 6900 is removable, it can be used with a plurality of separate containers 6900. Thus, a user can use one module 6990 to heat a plurality of separate containers 6900 and need not purchase a plurality of containers that each includes its separate electronics and heating unit.

Though the features disclosed above may be described in connection with the container 6900, one of skill in the art will recognize that any of the features described in this embodiment can also apply to any of the portable liquid containers disclosed herein (e.g., 5000-6800, 7000-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

FIGS. 70A-70B illustrate an embodiment of a drinkware container 7000 (hereinafter "container 7000"). In the illustrated embodiment, the drinkware container 7000 is in the form of a baby or infant bottle. Some of the features of the container 7000 are similar to features in the container 6200 in FIG. 62. Thus, references numerals used to designate the various components of the container 7000 are identical to those used for identifying the corresponding components of the container 6200 in FIG. 62, except that the reference numerals of the container 7000 begin with "70" instead of "62". Therefore, the structure and description for the various components of the container 6200 in FIG. 62 is understood to apply to the corresponding components of the container 7000 in FIGS. 70A-70B, except as described below.

As shown in FIGS. 70A-70B, a connector 7097 attaches to a proximal end of the container 7000 so that it covers a lip (not shown, but similar to 6231 in FIG. 62). In the illustrated embodiment, the connector 7097 can optionally include a nipple. The nipple can be of a flexible material (e.g., rubber) such as those used in baby bottles, or can be or a relatively rigid material (e.g., plastic) such as those used in sippy cups.

The container 7000 an outer sidewall 7030 and a chamber 7050 at a bottom of the container 7000 and defined at least in part by a bottom surface 7036 of the container 7000.

With continued reference to FIGS. 70A-70B, a module 7090 can optionally include one or more of heating elements 7040 (similar to heating element 6240), one or more power storage element (not shown, but similar to power storage element 6260) and/or control circuitry (not shown, but similar to control circuitry 6280). The module 7090 can removably couple to the bottom portion of the container 7000 so that the one or more heating elements 7040 is in contact with the bottom surface 7036. In another embodiment, the one or more heating elements can be incorporated into the container 7000 (as disclosed in other embodiments herein), and power to the one or more heating elements can be communicated from the module 7090 via one or more electrical contacts between the container 7000 and the module 7090. Though the discussion in this paragraph refers to one or more heating elements 7040, one of skill in the art will recognize that this can also apply to one or more cooling elements or one or more heating or cooling elements (e.g., thermoelectric elements), and that this disclosure is meant to apply to all these options for the container 7000.

The module 7090 can have a threaded portion 7092 configured to threadably couple to a threaded portion 7094 on a bottom of the container 7000 to couple the module 7090 to the container 7000. Once the user is done using the module 7090 (e.g., to heat a liquid in the container 7000), the user can decouple the module 7090 from the container 7000 (e.g., to allow the container 7000 to be washed).

Advantageously, because the module 7090 is removable, it can be used with a plurality of separate containers 7000. Thus, a user can use one module 7090 to heat a plurality of separate containers 7000 and need not purchase a plurality of containers that each includes its separate electronics and heating unit.

Though the features disclosed above may be described in connection with the container 7000, one of skill in the art will recognize that any of the features described in this embodiment can also apply to any of the portable liquid containers disclosed herein (e.g., 5000-6900, 7100-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

FIGS. 71A-71B illustrate an embodiment of a drinkware container 7100 (hereinafter "container 7100"). In the illustrated embodiment, the drinkware container 7100 is in the form of a baby or infant bottle. Some of the features of the container 7100 are similar to features in the container 6200 in FIG. 62. Thus, references numerals used to designate the various components of the container 7100 are identical to those used for identifying the corresponding components of the container 6200 in FIG. 62, except that the reference numerals of the container 7100 begin with "71" instead of "62". Therefore, the structure and description for the various components of the container 6200 in FIG. 62 is understood to apply to the corresponding components of the container 7100 in FIGS. 71A-71B, except as described below.

As shown in FIGS. 71A-71B, a connector 7197 attaches to a proximal end of the container 7100 so that it covers a lip (not shown, but similar to 6231 in FIG. 62). In the illustrated embodiment, the connector 7197 can optionally include a nipple. The nipple can be of a flexible material (e.g., rubber) such as those used in baby bottles, or can be or a relatively rigid material (e.g., plastic) such as those used in sippy cups.

The container 7100 an outer sidewall 7130 and a chamber 7150 at a bottom of the container 7100 and defined at least in part by a bottom surface 7136 of the container 7100.

With continued reference to FIGS. 71A-71B, a module 7190 can optionally include one or more of heating elements (similar to heating element 6240), one or more power storage element (not shown, but similar to power storage element 6260) and/or control circuitry (not shown, but similar to control circuitry 6280). The module 7190 can removably couple to the bottom portion of the container 7100 in a press-fit manner so that the one or more heating elements of the module 7190 contact the bottom surface 7136. In another embodiment, the one or more heating elements can be incorporated into the container 7100 (as disclosed in other embodiments herein), and power to the one or more heating elements can be communicated from the module 7190 via one or more electrical contacts 7192 that contact electrical contacts 7194 of the container 7100. Additionally, power can be provided to one or more sensors (e.g., temperature sensors, capacitance sensors, tilt sensors) in the container 7100 via an electrical contact 7196 in the module 7190 that contacts an electrical contact 7198 in the container 7100 when the module 7190 is coupled to the container 7100. Though the discussion in this paragraph refers to one or more heating elements, one of skill in the art will recognize that this can also apply to one or more cooling elements or one or more heating or cooling elements (e.g., thermoelectric elements), and that this disclosure is meant to apply to all these options for the container 7100.

Once the user is done using the module 7190 (e.g., to heat a liquid in the container 7100), the user can decouple the module 7190 from the container 7100 (e.g., to allow the container 7100 to be washed).

Advantageously, because the module 7190 is removable, it can be used with a plurality of separate containers 7100. Thus, a user can use one module 7190 to heat a plurality of separate containers 7100 and need not purchase a plurality of containers that each includes its separate electronics and heating unit.

Though the features disclosed above may be described in connection with the container 7100, one of skill in the art will recognize that any of the features described in this embodiment can also apply to any of the portable liquid containers disclosed herein (e.g., 5000-7000, 7200-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figures 72A, 72B:
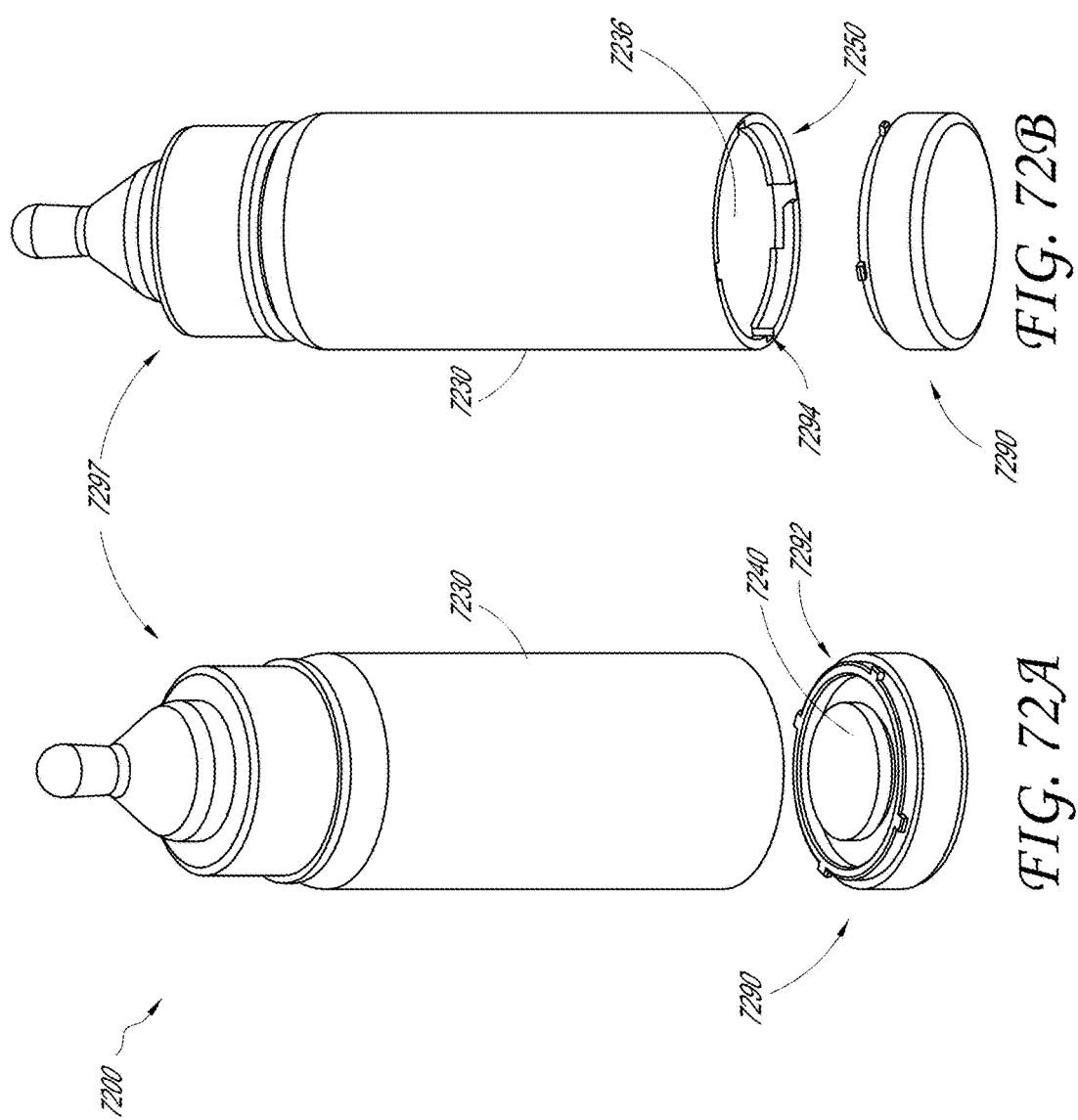
FIGS. 72A-72B show a perspective view of another embodiment of a drinkware container.

FIGS. 72A-72B illustrate an embodiment of a drinkware container 7200 (hereinafter "container 7200"). In the illustrated embodiment, the drinkware container 7200 is in the form of a baby or infant bottle. Some of the features of the container 7200 are similar to features in the container 6200 in FIG. 62. Thus, references numerals used to designate the various components of the container 7200 are identical to those used for identifying the corresponding components of the container 6200 in FIG. 62, except that the reference numerals of the container 7200 begin with "72" instead of "62". Therefore, the structure and description for the various components of the container 6200 in FIG. 62 is understood to apply to the corresponding components of the container 7200 in FIGS. 72A-72B, except as described below.

As shown in FIGS. 72A-72B, a connector 7297 attaches to a proximal end of the container 7200 so that it covers a lip (not shown, but similar to 6231 in FIG. 62). In the illustrated embodiment, the connector 7297 can optionally include a nipple. The nipple can be of a flexible material (e.g., rubber) such as those used in baby bottles, or can be or a relatively rigid material (e.g., plastic) such as those used in sippy cups.

The container 7200 an outer sidewall 7230 and a chamber 7250 at a bottom of the container 7200 and defined at least in part by a bottom surface 7236 of the container 7200.

With continued reference to FIGS. 72A-72B, a module 7290 can include one or more of heating elements 7240 (similar to heating element 6240), one or more power storage element (not shown, but similar to power storage element 6260) and/or control circuitry (not shown, but similar to control circuitry 6280). The module 7290 can removably couple to the bottom portion of the container 7200 so that the one or more heating elements 7240 is in contact with the bottom surface 7236. In another embodiment, the one or more heating elements can be incorporated into the container 7200 (as disclosed in other embodiments herein), and power to the one or more heating elements can be communicated from the module 7290 via one or more electrical contacts between the container 7200 and the module 7290. Though the discussion in this paragraph refers to one or more heating elements 7240, one of skill in the art will recognize that this can also apply to one or more cooling elements or one or more heating or cooling elements (e.g., thermoelectric elements), and that this disclosure is meant to apply to all these options for the container 7200.

The module 7290 can have a pin portion 7292 configured to couple to a notched or recessed portion 7294 on a bottom of the container 7200 to couple the module 7290 to the container 7200 in a twist-lock manner (e.g., by inserting the module 7290 into the chamber 7250 and rotating the module 7290, for example a quarter turn, to lock the module 7290 to the container 7200). Once the user is done using the module 7290 (e.g., to heat a liquid in the container 7200), the user can decouple the module 7290 from the container 7200 (e.g., to allow the container 7200 to be washed).

Advantageously, because the module 7290 is removable, it can be used with a plurality of separate containers 7200. Thus, a user can use one module 7290 to heat a plurality of separate containers 7200 and need not purchase a plurality of containers that each includes its separate electronics and heating unit.

Though the features disclosed above may be described in connection with the container 7200, one of skill in the art will recognize that any of the features described in this embodiment can also apply to any of the portable liquid containers disclosed herein (e.g., 5000-7100, 7300-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 73:
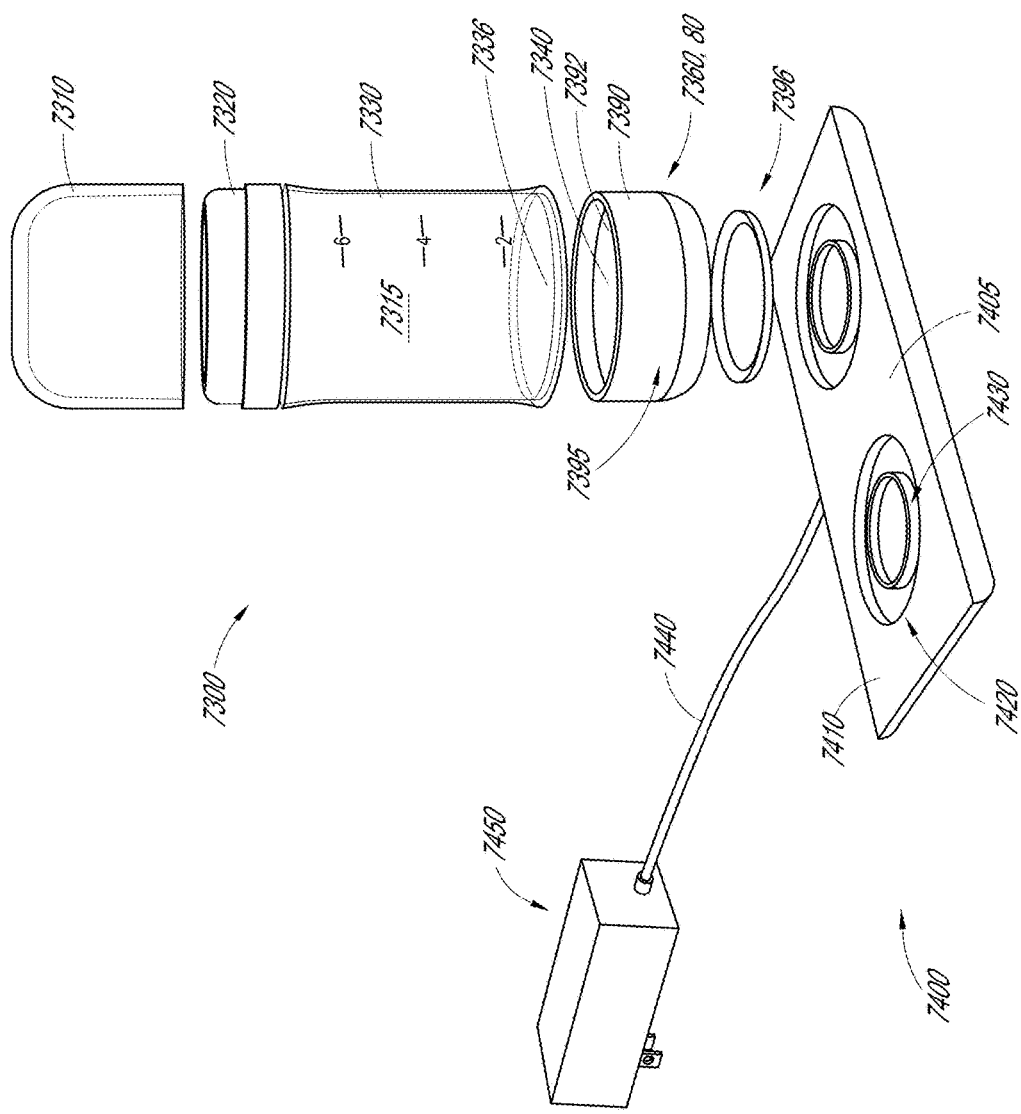
FIG. 73 shows a schematic view of an embodiment of a drinkware container and charging base system.

FIG. 73 illustrates an embodiment of a drinkware container 7300 (hereinafter "container 7300"). In the illustrated embodiment, the drinkware container 7300 is in the form of a baby or infant bottle. Some of the features of the container 7300 are similar to features in the container 6900 in FIGS. 69A-69B. Thus, references numerals used to designate the various components of the container 7300 are identical to those used for identifying the corresponding components of the container 6900 in FIGS. 69A-69B, except that the reference numerals of the container 7300 begin with "73" instead of "69". Therefore, the structure and description for the various components of the container 6900 in FIGS. 69A-69B is understood to apply to the corresponding components of the container 7300 in FIG. 73, except as described below.

As shown in FIG. 73, the container 7300 can include a cover 7310 and a cap 7320. In one embodiment, the cover 7310 can be a clear polycarbonate cover. In one embodiment, the cap 7320 can be made of plastic. The container 7300 can also include connector 7397 (see FIGS. 74A-74B) that attaches to a cap 7320 and extends into the cover 7310 when the cover 7310 is disposed over the cap 7320. In one embodiment, the connector 7397 can optionally include a nipple. The nipple can be of a flexible material (e.g., rubber) such as those used in baby bottles, or can be or a relatively rigid material (e.g., plastic) such as those used in sippy cups. The cap 7320 can attach to an outer sidewall 7330 so that it covers a lip (not shown, but similar to lip 6231 in FIG. 62), and the outer sidewall 7330 together with a bottom surface 7336 of the container 7300 defines a chamber 7315 that can hold a liquid (e.g., milk, water). The outer sidewall 7330 can in one embodiment be made of clear polycarbonate material. The bottom surface or wall 7336 can in one embodiment be made of metal, and be embedded into a bottom of the container 7300, as described further below.

With continued reference to FIG. 73, a module 7390 (e.g., a heating module) can optionally include one or more of heating elements 7340 (similar to heating element 6940 in FIG. 69A), one or more power storage element (not shown, but similar to power storage element 6260 in FIG. 62) and/or control circuitry (not shown, but similar to control circuitry 6280 in FIG. 62). In embodiments where the element 7340 is a thermoelectric module, the element can function in heating or cooling mode to heat or cool the liquid in the container 7300. The module 7390 can removably couple to the bottom portion of the container 7300 so that the one or more heating elements 7340 is in contact with the bottom surface 7336. Accordingly, in this embodiment, the electronics are only housed in the module 7390, not in the vessel defined by the outer sidewall 7330 and bottom surface or wall 7336. In another embodiment, the one or more heating elements can be incorporated into the container 7300 (as disclosed in other embodiments herein), and power to the one or more heating elements can be communicated from the module 7390 via one or more electrical contacts between the container 7300 and the module 7390 (such as disclosed above in connection with container 7100). Though the discussion in this paragraph refers to one or more heating elements 7340, one of skill in the art will recognize that this can also apply to one or more cooling elements or one or more heating or cooling elements (e.g., thermoelectric elements), and that this disclosure is meant to apply to all these options for the container 7300.

The module 7390 can have one or more magnets 7392 (see FIGS. 74A-74B) configured to magnetically couple to the bottom surface 7336 where the surface 7336 is made of metal. In other embodiments, where the bottom surface 7336 is not made of metal (e.g., it's made of polycarbonate material), the bottom surface 7336 can have one or more magnets on an outer surface thereof or embedded therein, to which the one or more magnets 7392 can couple when the module 7390 couples to the bottom of the container 7300. Once the user is done using the module 7390 (e.g., to heat a liquid in the container 7300), the user can decouple the module 7390 from the container 7300 (e.g., to allow the container 7300 to be washed).

Figures 75A, 75B:
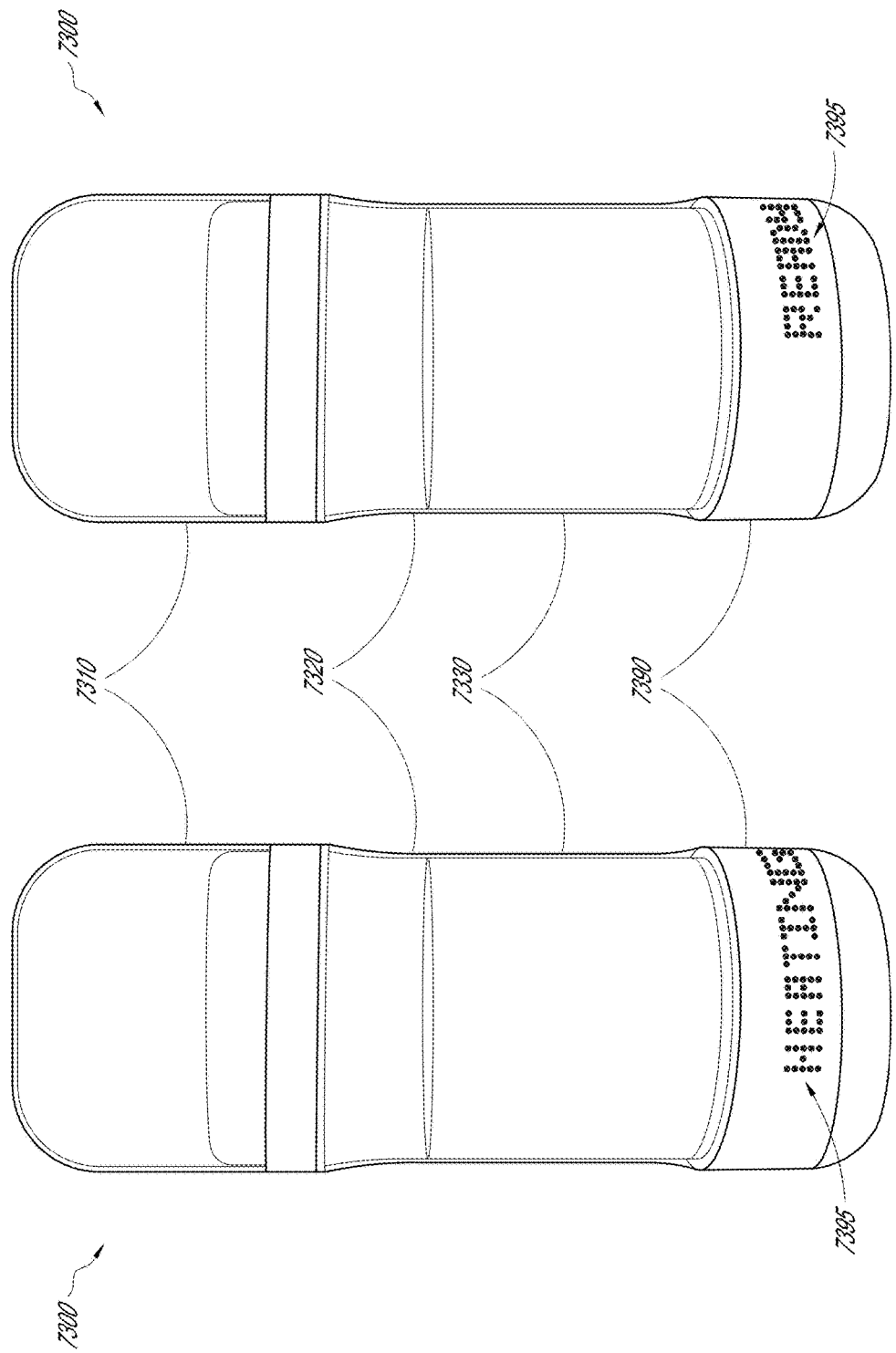
FIGS. 75A-75B show a schematic view of an embodiment of a drinkware container assembly.

Advantageously, the magnetic coupling allows a user to couple the container 7300 to the module 7390 with one hand (e.g., while holding a baby or infant with their other arm), thereby greatly facilitating the heating of the contents of the container 7300. For example, a user can keep one or more containers 7300 filled with a liquid (e.g., milk) in a refrigerator, travel cooler, etc. Once the baby or infant awakens at night or is otherwise ready for a feeding, the user can take one of the containers 7300 out of the refrigerator with one hand (e.g., while holding the baby or infant in their other arm), place it over the module 7390 (which can be docked over a charging base 7400 at the time), whereby the magnets 7392 automatically couple the module 7390 to the container 7300. The user can then lift the container 7300 with the attached module 7390 and give it to the baby or infant once ready (e.g., walk back to place the baby or infant in bed and provide them with the container 7300 with the heated liquid). In one embodiment, the module 7390 can provide an indication (e.g., visual, vibration, auditory) that the liquid has been heated to the preselected or predetermined temperature (as discussed further below). For example, as shown in FIGS. 75A-75B, the module 7390 can have a visual indication screen 7395 that can indicate to the user the status of the heating process. FIG. 75A shows a "HEATING" notice, which identifies the user that the liquid in the container 7300 is not yet at the desired drinking temperature. However, other suitable notices, such as NOT READY, etc. can be used, or the screen can blink. FIG. 75B shows a "READY" notice, which identifies to the user that the liquid in the container 7300 has been heated to the desired temperature (or temperature range) and is ready for consumption. However, other suitable notices, such as SAFE or OKAY, etc. can be used, or the screen can remain lit (not blink). The visual indication screen 7395 can be automatically activated when the module 7390 couples to the container 7300. In one embodiment, the visual indication screen 7395 can be a hidden till-lit white LED dot matrix display. The visual indication screen 7395 can also provide other information, such as operating information (e.g., battery life, liquid level, heating or cooling operation).

In one embodiment, the user can decouple the module 7390 from the container 7300 before handing the container 7300 to the baby or infant for consumption. In another embodiment, the module 7390 can remain attached to the container 7300 while the baby or infant consumes the liquid in the container 7300. As noted above, the container 7300 can advantageously be coupled to the module 7390 with one hand by the user (e.g., while their other hand is occupied, such as holding the infant) by placing the container 7300 over the module 7390. In one embodiment, the module 7390 couples to the container 7300 solely via the magnets 7392 as discussed above; the magnetic coupling force can be large enough to inhibit the decoupling of the module 7390 from the container 7300 by the baby or infant (e.g., while consuming the liquid in the container 7300).

In another embodiment, the module 7390 couples to the container 7300 via a combination of mechanisms disclosed herein. For example, the module 7390 can couple to the container 7300 via magnets 7392, as discussed above, and in addition the bottom of the container 7300 and top of the module 7390 can have a pin-notch system (similar to the one described above for container 7200 in FIG. 72) or a ramp and notch mechanism that provides a twist-lock arrangement to the coupling to thereby provide a connection between the container 7300 and module 7390 that is more difficult to remove (e.g., more difficult for the baby or infant to decouple, such as while consuming the liquid in the container 7300). For example, where the container 7300 and module 7390 have a ramp and notch system in addition to magnets 7392, when the user places the container 7300 over the module 7390 (which may be sitting on the charging base 7400), the magnets 7392 on the module 7390 start to draw the module 7390 toward the bottom surface 7336 of the container 7300. As the module 7390 is drawn toward the bottom surface 7336, the ramps (on the module 7390 or the container 7300) can engage the notches or recesses (on the container 7300 or the module 7390) to provide for a locking connection between the module 7390 and the container 7300. In one embodiment, the engagement of the ramps and notches or recesses can cause the module 7390 to rotate relative to the container 7300 as the locking connection is achieved.

In one embodiment, the container 7300 that is used with the removable module 7390 can be a conventional plastic or glass baby bottle. In another embodiment, the container 7300 can be a conventional sippy cup made of plastic. In such embodiments, the container 7300 includes no electronics therein; all the electronics and heating elements are housed in the removable module 7390.

Advantageously, because the module 7300 is removable, it can be used with a plurality of separate containers 7300. Thus, a user can use one module 7390 to heat a plurality of separate containers 7300 and need not purchase a plurality of containers that each includes its separate electronics and heating unit.

In one embodiment, actuation of the one or more heating elements 7340 can begin automatically upon the coupling of the module 7390 to the container 7300. For example, one or more sensors can sense when the module 7390 couples to the container 7300 and communicate a signal to control circuitry 7380 (see FIGS. 74A-74B) in the module 7390 to provide power to the one or more heating elements 7340 to generate heat. Said heat can be communicated from the one or more heating elements 7340 to the bottom surface 7336 of the container 7300 via conduction heat transfer, and the heat transferred through the bottom surface 7336 to the contents of the container 7300. Conversely, actuation of the one or more heating elements 7340 can cease automatically upon decoupling of the module 7390 from the container 7300 (e.g., based on sensed information from one or more sensors that the module 7390 is not coupled to the container 7300. Such one or more sensors can include a pressure sensor, a contact sensor, a capacitance sensor, an optical sensor, or any other suitable type of sensor for sensing the coupling or decoupling of the module 7390 with the container 7300.

The control circuitry 7380 (see FIGS. 74A-74B) can control the operation of the one or more heating elements 7340 to control the amount of energy supplied to the liquid in the chamber of the container 7300 to maintain or increase the temperature of the liquid. Optionally, the control circuitry 7380 can control delivery of power to the one or more heating elements 7340 based at least in part on information from one or more sensors that sense a parameter of quality of the liquid (e.g., temperature, volume, acidity, pH) where said one or more sensors can be on a surface of one or both of the module 7390 and container 7300. For example, such sensors can be on the bottom surface 7336 and/or the top surface of the module 7390.

The control circuitry 7380 can include a memory that stores or receives one or more algorithms (e.g., wirelessly via a tablet or smartphone app, via a wired connection or during manufacturing of the module 7390 at the factory) that can be executed by the control circuitry 7380 to control the operation of the one or more heating elements 7340 and/or to determine a parameter of the liquid based on sensed information. In one embodiment, such algorithms can be used to determine one or more parameters of the liquid in the container 7300 based on sensed information for another parameter of the liquid. In one embodiment, the container 7300 can include one or more sensors in communication with inner liquid holding chamber 7315 (e.g., in contact with the sidewall 7330 or bottom wall 7336, whose sensed information can provide an indication of a temperature of the liquid in the container 7300, and an algorithm can calculate a volume of the liquid in the chamber based on the sensed information of the same sensor. For example, by sensing how long it takes for the liquid to change temperature upon actuation of the one or more heating elements 7340, the algorithm can calculate the approximate volume of liquid in the chamber (e.g., if the container 7300 is full of liquid, it may take X seconds for the sensed temperature to change, but if the container 7300 is half-full of liquid, it may take Y seconds for the sensed temperature to change). Though such algorithms are described in connection with the container 7300, one of skill in the art will recognize that such algorithms can be implemented or use by the control circuitry of the containers 5000-7200, 7400-7700, and other containers disclosed herein.

The sensed temperature can be communicated to the control circuitry 7380, which can then adjust the amount of power supplied to the one or more heating elements 7340 based on the sensed temperature (e.g., the control circuitry can reduce power to the one or more heating elements 7340 as the desired temperature for the liquid is approached). Additionally, the control circuitry 7380 can control the operation of the one or more heating elements 7340 based on preselected temperature (e.g., user selected temperature, such as one provided by the user directly via a user interface (e.g., similar to movable sidewall 5031 in FIG. 50) on the module 7390, or wirelessly via a tablet or smartphone app), or based on a predetermined temperature set point (e.g., temperature set point saved into a memory of the control circuitry 7380, either by a user, such as via a tablet or smartphone app, or at the factory during manufacture). The control circuitry 7380 can advantageously control the amount of power supplied to the one or more heating elements 7340 to prevent the temperature of the liquid from increasing above the predetermined or preselected temperature. For example, in one embodiment, the control circuitry 7380 can include a temperature sensitive switch, which can open if the sensed temperature of the liquid in the container 7300 increases above a temperature set point, thereby cutting off power supply to the one or more heating elements 7340.

With continued reference to FIG. 73, a charging assembly 7400 can be provided for charging the module 7390. The charging assembly 7400 can have a charging plate 7410 with one or more recesses 7420 into which a bottom portion of the module 7390 can be placed so that a corresponding electrical contact on a charging base 7396 of the module 7390 contacts an electrical contact 7430 of the charging plate 7410. In one embodiment, the electrical contact 7430 can be circular, though other shapes are possible. In one embodiment, the electrical contact 7430 is gold plated. The illustrated embodiment shows the charging plate 7410 with two recesses 7420 and two electrical contacts 7430 to charge two separate modules 7390 at the same time. However, in other embodiments, the charging plate 7410 can have a single recess 7420 and single electrical contact 7430. The charging plate 7410 can connect via an electrical cord 7440 to an electrical connector 7450. In the illustrated embodiment, the electrical connector 7450 is a wall connector for connecting to AC power. In other embodiments, the electrical connector 7450 can be a connector for connecting to DC power, such as to a car charger. In still another embodiment, the electrical connector 7450 can be a USB connector that allows the electrical cord to be connected to a computer, portable battery, or to a separate wall connector for connecting to a wall outlet.

Figure 74A:
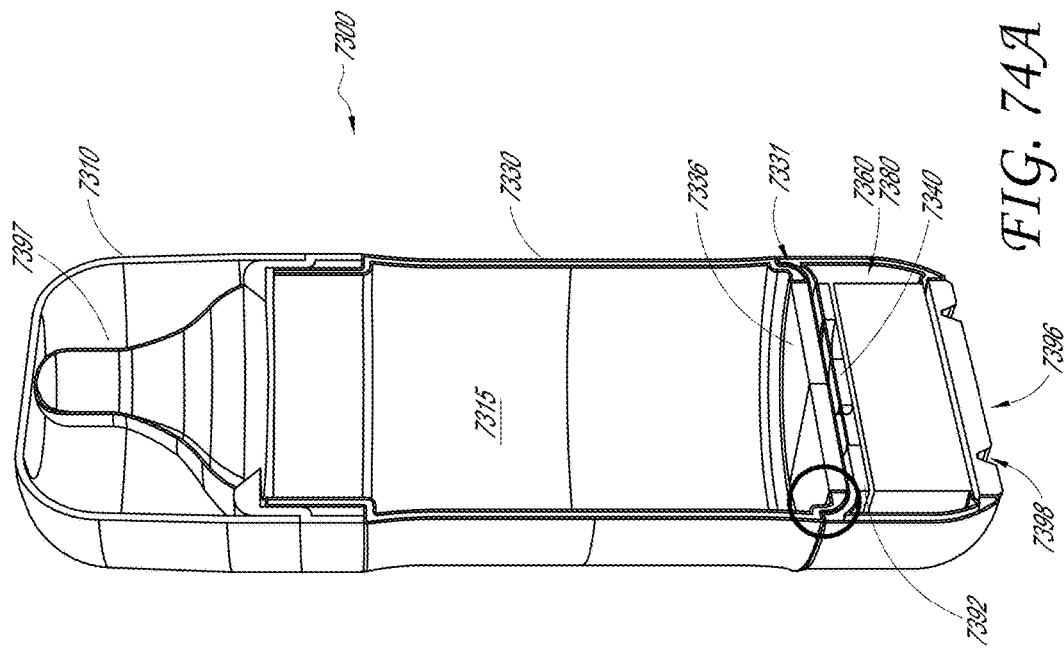
FIGS. 74A-74B show a schematic view of an embodiment of a drinkware container assembly.
Figure 74B:
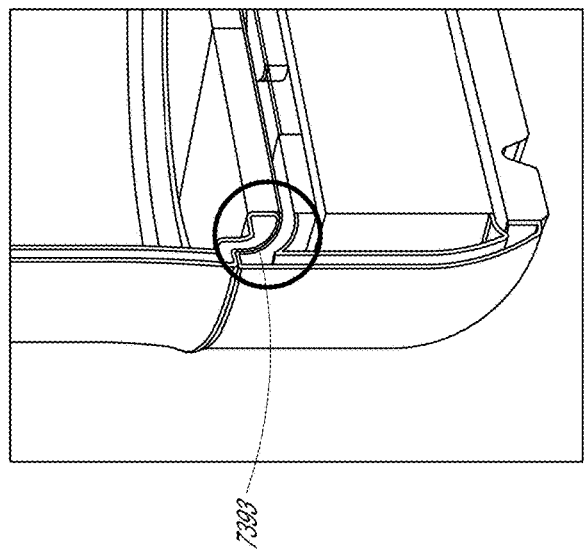

FIGS. 74A-74B show a cross-sectional view and sectional view of portions of the container 7300. As discussed above, the bottom wall 7336 can be coupled or otherwise embedded in a bottom of the container 7300. In the illustrated embodiment, the bottom wall 7336 is made of metal and molded into a bottom surface of the container 7300 so that the bottom wall 7336 is circumscribed by, or held in place by, a bottom rim 7331. As shown in FIGS. 74A-74B, the bottom wall 7336 extends below a bottom edge of the outer sidewall 7330.

With continued reference to FIGS. 74A-74B, the one or more magnets 7392 on the module 7390 can be a donut shaped or annular in shape. In the illustrated embodiment, the one or more heating elements 7340 is disposed at the center of the module 7390 and radially spaced apart from the magnet 7392. One or more temperature sensors 7393 can optionally be located on a perimeter of the module 7390 and spaced radially apart from the one or more heating elements 7340 to facilitate sensing of temperature of the liquid in the container 7300 while inhibiting the sensing of the temperature of the one or more heating elements 7340.

As shown in FIGS. 74A-B, the charging base 7396 of the module 7390 can have an electrical contact 7398 that corresponds in shape with the electrical contact 7430 on the charging plate 7410. In some embodiments, the charging base 7396 can optionally include one or more weight sensors that communicate with the control circuitry 7380 and, using one or more algorithms stored in a memory of the control circuitry 7380, can measure the level or volume of liquid in the container 7300, and keep track of consumption of liquid (e.g., by correlating sensed weight with liquid volume using said algorithms).

Figure 76A:
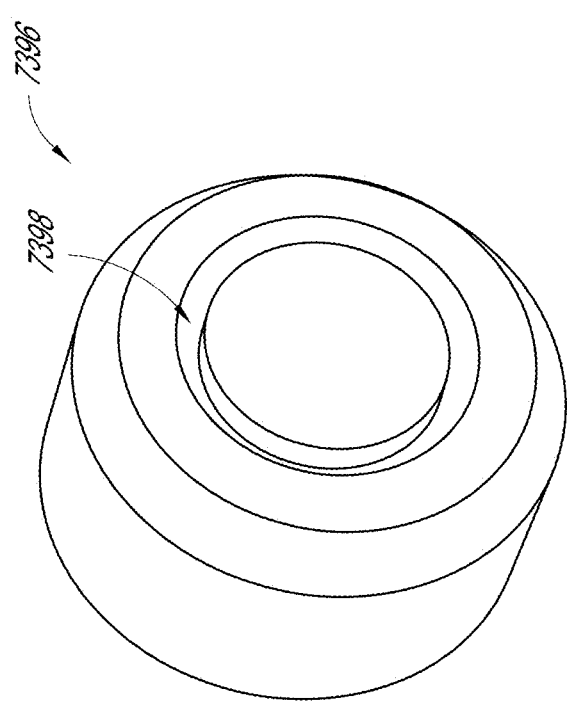

As shown in FIGS. 76A-76C, the charging base 7396 of the module 7390 can have an electrical contact 7398 that is annular or donut shaped and surrounds a base surface 7398*b*. In the illustrated embodiment, the module 7390 can be decoupled from the container 7300 by rotating R the module 7390 relative to the container 7300. Requiring such rotation R for decoupling of the module 7390 from the container 7300 can provide further child proofing of the system to prevent the module 7390 from inadvertently decoupling from the container 75300 during use by the infant or baby.

Though the features disclosed, including the charging assembly 7400, above may be described in connection with the container 7300, one of skill in the art will recognize that any of the features described in this embodiment can also apply to any of the portable liquid containers disclosed herein (e.g., 5000-7200, 7400-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

FIGS. 77A-77C illustrates an embodiment of a drinkware container 7500 (hereinafter "container 7500"). In the illustrated embodiment, the drinkware container 7500 is in the form of a baby or infant bottle. Some of the features of the container 7500 are similar to features in the container 7300 in FIG. 73. Thus, references numerals used to designate the various components of the container 7500 are identical to those used for identifying the corresponding components of the container 7300 in FIG. 73, except that the reference numerals of the container 7500 begin with "75" instead of "73". Therefore, the structure and description for the various components of the container 7300 in FIG. 73 is understood to apply to the corresponding components of the container 7500 in FIGS. 77A-77C, except as described below.

The illustrated embodiment differs from the embodiment illustrated in FIG. 73 only in that the module 7590 includes one or more buttons 7594 that a user can press to release the coupling between the module 7590 and the container 7500. For example, pressing the buttons 7594 can optionally actuate the control circuitry in the module 7590 to change the polarity of the one or more magnets so that they provide a repelling force, instead or an attracting force, relative to the container 7500. In another embodiment, pushing the buttons 7594 mechanically decouples the magnets on the module 7590 from the bottom wall of the container 7500. The use of such buttons 7594 can provide further child proofing of the system to prevent the module 7590 from inadvertently decoupling from the container 7500 during use by the infant or baby.

Though the features disclosed above may be described in connection with the container 7500, one of skill in the art will recognize that any of the features described in this embodiment can also apply to any of the portable liquid containers disclosed herein (e.g., 5000-7400, 7600-7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 78B:
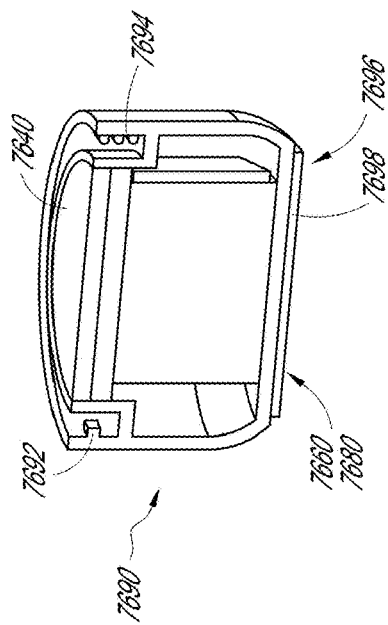
FIGS. 78A-78B show an embodiment of a drinkware container assembly.
Figure 78A:
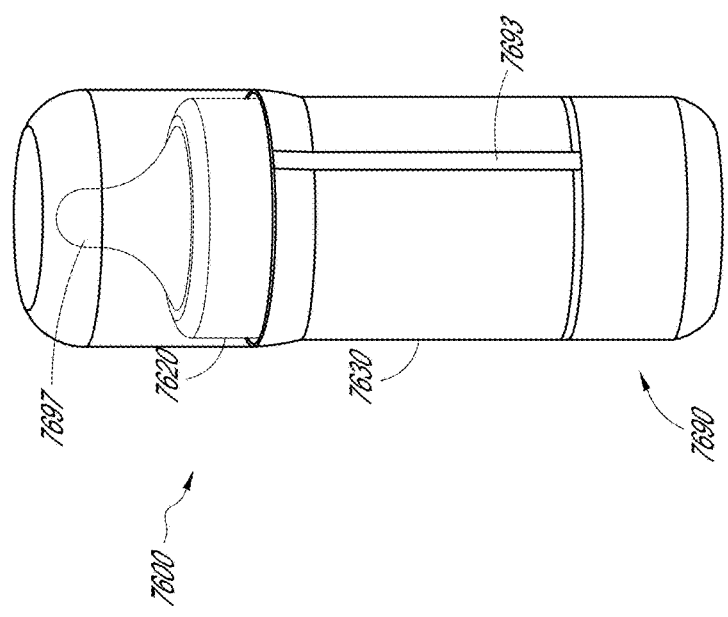

FIGS. 78A-78B illustrate an embodiment of a drinkware container 7600 (hereinafter "container 7600"). In the illustrated embodiment, the drinkware container 7600 is in the form of a baby or infant bottle. Some of the features of the container 7600 are similar to features in the container 7300 in FIG. 73. Thus, references numerals used to designate the various components of the container 7600 are identical to those used for identifying the corresponding components of the container 7300 in FIG. 73, except that the reference numerals of the container 7600 begin with "76" instead of "73". Therefore, the structure and description for the various components of the container 7300 in FIG. 73 is understood to apply to the corresponding components of the container 7600 in FIGS. 76A-76B, except as described below.

The illustrated embodiment differs from the embodiment illustrated in FIG. 73 in that the module 7690 has a twist lock mechanism including protrusions or tabs 7692 that can engage corresponding slots or grooves on the container 7600. Additionally, the module 7690 has electrical contacts 7694, as shown on FIG. 78B, configured to connect to corresponding contacts on the container 7600 to connect with sensor strip 7693 that extends along at least a portion of a height of the container 7600 to sense one or more parameters (e.g., liquid level, temperature, etc.) of the liquid in the container 7600. Said sensed parameter information is communicated to the control circuitry 7680 via the electrical connection 7694. In addition, the module 7690 includes electrical contacts 7698 on a bottom surface of the module 7690 for contacting a corresponding electrical contact on a charging plate, such as the charging plate 7410 discussed above.

Though the features disclosed above may be described in connection with the container 7600, one of skill in the art will recognize that any of the features described in this embodiment can also apply to any of the portable liquid containers disclosed herein (e.g., 5000-7500, 7700), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Figure 79B:
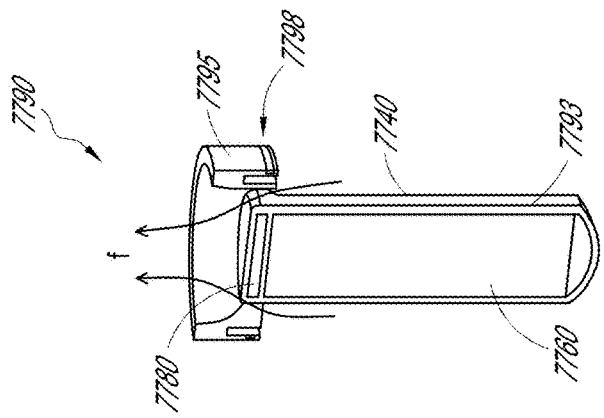
FIGS. 79A-79B show an embodiment of a drinkware container assembly.
Figure 79A:
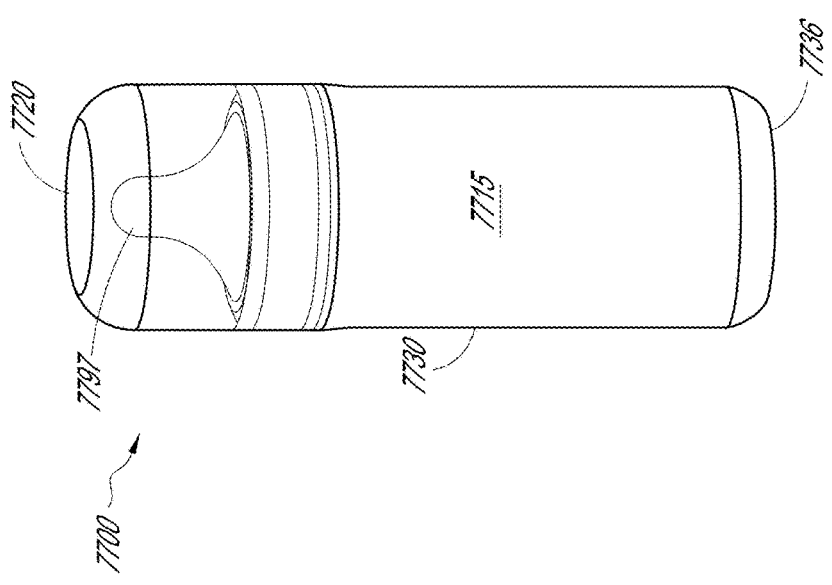

FIGS. 79A-79B illustrate an embodiment of a drinkware container 7700 (hereinafter "container 7700"). In the illustrated embodiment, the drinkware container 7700 is in the form of a baby or infant bottle. However, the container 7700 can have other forms, e.g. a sippy cup.

In the illustrated embodiment, the container 7700 has an outer wall 7730 and bottom wall 7736 made of plastic, glass or other conventional material used for, e.g., baby bottles, and define a chamber 7715 therebetween for holding a liquid (e.g., milk). A cap 7720 can couple to the top of the container 7700, and a connector 7797 can be held in place on top of the container 7700 by the cap 7720. In the illustrated embodiment, the connector 7797 can be a nipple (e.g., made of rubber, silicone, or other common material used in baby bottle nipples). In another embodiment, the connector 7797 can be similar to a drinking spout in a sippy cup.

A module 7790 can be inserted into the container 7700 and held in place by the cap 7720. The module 7790 can have a sensor strip 7793 that extends along at least a portion of the module 7790, and at least one heating element 7740 that can be disposed within the chamber 7715 and can heat the liquid in the chamber 7715. The at least one heating element 7740 can be activated as soon as it's inserted into the chamber 7715 (e.g., by sensing contact with a liquid. Alternatively, the heating element 7740 can be activated based on user input (e.g., via an interface of the module 7790 or wirelessly). Though the discussion in this paragraph refers to one or more heating elements 7740, one of skill in the art will recognize that this can also apply to one or more cooling elements or one or more heating or cooling elements (e.g., thermoelectric elements), and that this disclosure is meant to apply to all these options for the container 7700.

The module 7790 can further have one or more power storage elements 7760 and a control circuitry 7780. A rim of the module 7790 can rest on the rim (not shown) of the container 7700 when in use. The rim can include charging contacts 7798 that can contact corresponding electrical contacts on a charging assembly (not shown) when the power storage elements 7760 are charged. One or more passages between the rim of the module 7790 and the heating element 7740 allow for flow of liquid to pass along flow path F and into the connector 7797 for consumption. Therefore, the module 7790 can be left in place in the container 7700 while the infant or baby consumes the contents of the container 7700. Alternatively, the module 7790 can be removed from within the chamber 7715 and the cap 7720 and connector 7797 reattached to the container 7700 before the liquid is consumed by the infant or baby.

Though the features disclosed above may be described in connection with the container 7700, one of skill in the art will recognize that any of the features described in this embodiment can also apply to any of the portable liquid containers disclosed herein (e.g., 5000-7600), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

FIG. 44 above shows a block diagram of a communication system for any of the drinkware containers described herein. In the illustrated embodiment, the electronic module EM (such as the electronic module disclosed herein for the drinkware containers) can receive sensed information from one or more sensors S1-Sn (e.g., liquid level sensors, liquid volume sensors, temperature sensors, battery charge sensors, capacitance sensors, tilt sensors or gyroscopes). The electronic module EM can also receive information from and transmit information (e.g., instructions) to one or more heating elements HC (e.g., to operate each of the heating elements in a heating mode, turn off, turn on, vary power output of, etc.) and optionally to one or more power storage devices PS (e.g., batteries, such as to charge the batteries or manage the power provided by the batteries to the one or more heating or cooling elements). The electronic module EM can also communicate with a wireless power transmitter WPT (e.g., an inductive power transmitter) on the drinkware container. The electronic module EM can also communicate with (e.g., transmit information to and receive information, such as user instructions from, a user interface UI1 on the unit (e.g., on the body of the drinkware container). The electronic module EM can also communicate with an electronic device ED (e.g., a mobile electronic device such as a mobile phone, PDA, tablet computer, laptop computer, electronic watch; or a desktop computer) via the cloud CL or via a wireless communication system such as BLU-ETOOTH® BT. The electronic device ED can have a user interface UI2, that can display information associated with the operation of the drinkware container (as disclosed herein), and that can receive information (e.g., instructions) from a user and communicate said information to the drinkware container (as disclosed herein).

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the body of the drinkware container, as disclosed herein. That is, the electronic module or electronics can have different form factors.

Food Container

Figure 80:
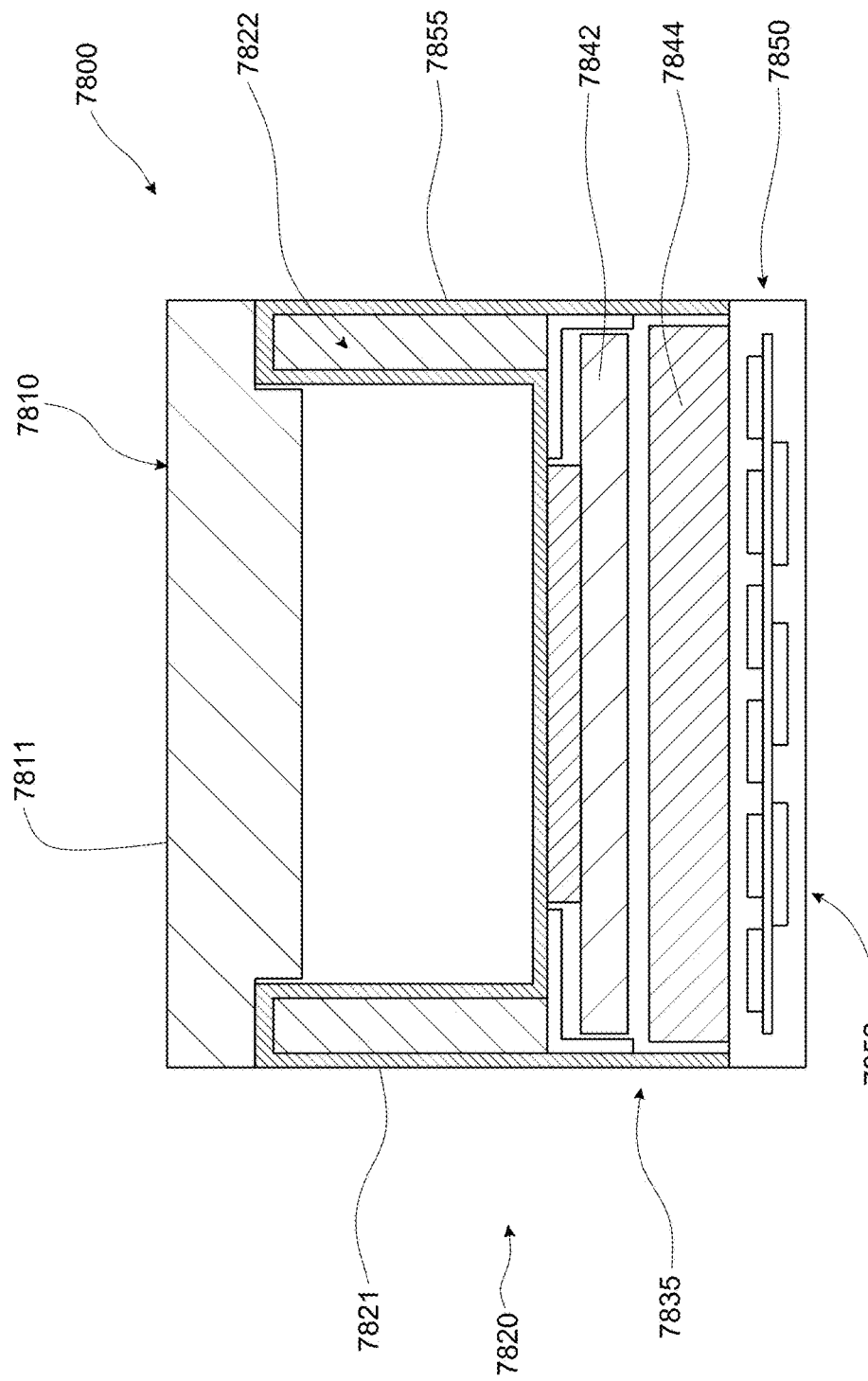
FIGS. 80-81 show an embodiment of a food container.
Figure 81:
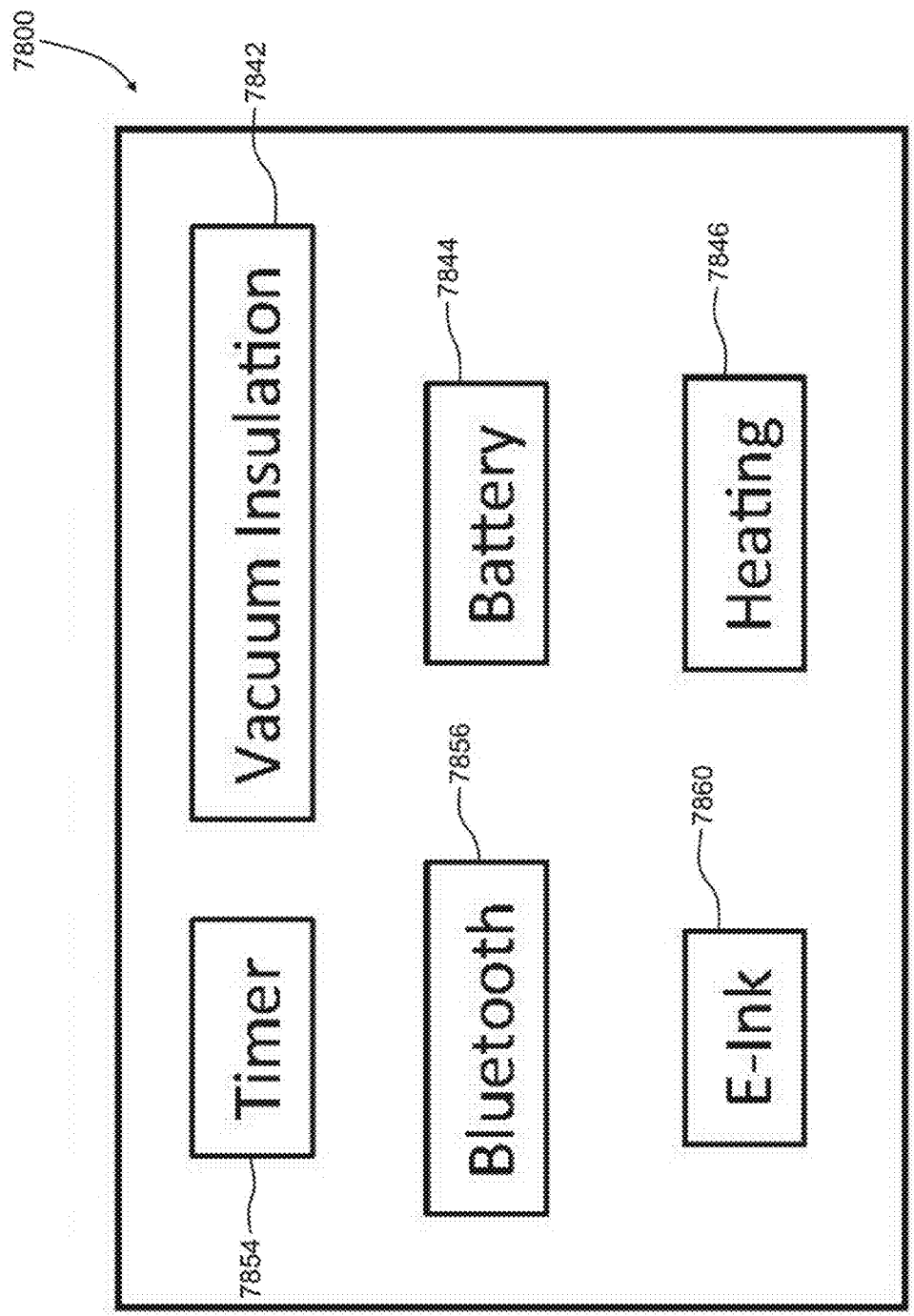

FIGS. 80-81 show one embodiment of a food container 7800 (e.g., a lunch box, a soup container). The container 7800 can have a cover or lid 7810 that can optionally be insulated and can cover a body 7820. The body 7820 can define a chamber or cavity 7830 that can hold one or more foodstuffs (e.g., directly or in separate packages, such as Tupperware®, sandwich bags, etc.). Though the illustrated embodiment shows the container 7800 having one chamber 7830, in other embodiments, the container 7800 can have multiple chambers. The chamber 7830 can be defined between sidewalls 7822 and a base 7824. The sidewalls 7822 can optionally be insulated (e.g., vacuum insulated) to keep the foodstuff warm or cold for a longer period of time. In one embodiment, the container 7800 is generally square or rectangular in shape. In another embodiment, the container 7800 is generally cylindrical in shape. As used herein, the term "food", "foodstuff" or "foodstuffs" includes any substance, whether solid or liquid, that can be eaten or drunk by an individual (e.g., water, juice, milk, soup, sandwiches, meats, vegetables, cheeses, fruits, nuts), for example as part of a meal. As used herein "beverage" in understood to mean any consumable liquid (e.g., water, coffee, tea, soup, hot chocolate, etc.). Also, the drinkware or beverage containers disclosed herein are understood to also receive solid or semi-solid, or blended food.

The body 7820 can have a bottom chamber or cavity 7835 defined below the base 7824. The bottom chamber 7835 can house an temperature control system 7840 that can include one or more heating or cooling elements 7846 (e.g., one or more of a heating elements such as resistive heaters, a cooling elements such as a phase change material or heat sink, heating/cooling elements such as thermoelectric heaters or Peltier elements, or any combination thereof) in thermal communication with one or both of the base 7824 and sidewalls 7822. The body 7820 can optionally have one or more power storage elements 7844 electrically connected to the one or more heating or cooling elements 7846, and optionally have control circuitry 7850. In one embodiment, the bottom chamber 7835 can also include an insulative layer 7842 between the one or more heating or cooling elements 7846 and the rest of the electronics (e.g. power storage elements 7844 and control circuitry 7850) to thermally isolate the one or more heating or cooling elements 7846 from the electronics.

The temperature control system 7840 in one embodiment is an active temperature control system that can advantageously operate during at least a period of time (e.g., a portion of the period of time) during which the food container 7800 is used. Accordingly, the term "active", as used herein, is not limited to continuous operation of the temperature control system 7840. As used herein, heat transfer encompasses a heating, as well as a cooling, process. Therefore, a "heat transfer element" as used herein is an element that can effect a heating or a cooling process.

The control circuitry 7850 can optionally include one or more printed circuit boards (PCBs) 7852, a timer 7854, and a wireless communication module 7856 (e.g., BLU-ETOOTH®). In one embodiment, the one or more power storage elements 7844 can be rechargeable. In one embodiment, the body 7820 can have a removable bottom cover (not shown) that can be removed to access the electronics in the bottom chamber 7835, such as to replace the one or more power storage elements 7844. In another embodiment, the bottom chamber 7835 can be sealed and the one or more power storage elements 7844 can be charged, for example, via induction, using a charging base on which the food container 7800 can be placed.

The control circuitry 7850 can advantageously communicate (e.g., using BLUETOOTH®) with a remote electronic device (e.g., smart phone, smart watch, tablet computer, laptop computer) via which the user can control the operation of the food container 7800. For example, the user can control the start time and stop time of the heating process (or cooling process) for the foodstuff in the container 7800 via the remote electronic device. In another embodiment, the timer 7854 can be preset (e.g., via a user interface on the container 7800 or via the remote electronic device) to begin the heating process (or cooling process) at a certain time. For example, parents can preset the timer 7854 to coincide with their children's school lunch period. In one embodiment, the control circuitry 7850 can have multiple timers, for example used to control operation of the temperature control system

7840 during multiple meal breaks (e.g., a snack break at 10 AM, and a lunch break at 12 PM).

The control circuitry 7850 can include a temperature limiting switch that can limit the temperature to which the foodstuff is heated or cooled, for example, to prevent the overheating of the one or more heating or cooling elements 7846 or the overheating of the foodstuff. The container 7800 can have one or more temperature sensors that can sense a temperature in the chamber 7830 an communicate the sensed temperature to the control circuitry 7850, which can adjust power to the one or more heating or cooling elements 7846 based at least in part on the sensed temperature information. In one embodiment, the user can input one or more preselected temperatures or temperature ranges (e.g., warm, hot) via the user interface on the container 7800 or via the remote electronic device, and the control circuitry can operate the one or more heating or cooling elements 7846 based on the preselected temperature and the sensed temperature information from the temperature sensor(s) to heat (or cool) the foodstuff to approximately the preselected temperature. For example, one preselected temperature can be for a first meal break (e.g., a snack period) and the second preselected temperature can be for a second meal break (e.g., a lunch period).

In one embodiment, the remote electronic device (e.g., smart phone, tablet computer, laptop computer) can utilize and app through which the remote electronic device can control the operation of the temperature control system 7840, such as via the control circuitry 7850. For example, a parent can enter a time of day when the user (e.g., child) has a meal break (e.g., at school). The control circuitry 7850 can operate the temperature control system 7840 to heat (or cool) the foodstuff in the container 7800 to the preselected temperature by the time of the meal break. In one embodiment, the control circuitry 7850 can control the temperature control system 7850 to begin heating (or cooling) the foodstuff a predetermined period (e.g., 20 minutes, 30 minutes, 40 minutes) before the time of the meal break (e.g., using a timer) so that the foodstuff is at the desired temperature once the meal break arrives. In another embodiment, the container 7800 can include one or more sensors that sense a level in the chamber 7830 (e.g., where the foodstuff is soup), and the control circuitry 7850 calculates a heating period based at least in part on a sensed temperature of the foodstuff and a sensed level in the chamber 7830 (or calculated volume in the chamber 7830 based on the sensed level) to determine how long it will take to heat (or cool) the foodstuff to the desired temperature from the sensed temperature (e.g., predetermined period), and controls the operation of the temperature control system 7840 (e.g., controls the start time for operation of the one or more heating or cooling elements 7846) based on the predetermined period, so that the foodstuff is at the preselected temperature by the time the meal break arrives. Accordingly, the calculated predetermined period would be longer if the initial state of the foodstuff was at a refrigerated temperature, versus if the initial state of the foodstuff was at room temperature.

In one embodiment, the chamber 7830 can have a plurality of separate compartments, some of which can house foodstuff meant to be cooled and other compartments that can house foodstuff meant to be heated. The one or more heating or cooling elements 7846 can include a plurality of heating or cooling elements 7846 where the heating or cooling elements 7846 under the cooling compartments can advantageously be operated (by the control circuitry 7850) to cool the compartment and the heating or cooling elements 7846 under the heating compartments can advantageously be operated (by the control circuitry) to heat the compartments to thereby cool and heat the foodstuff in those compartments, respectively. In this manner, the user and enjoy their food at the desired temperature or temperature range (e.g., cold, cool, warm, hot).

In one embodiment, an outer surface 7821 of the body 7820 and/or an outer surface 7811 of the cover 7810 can have an electronic ink outer shell to display custom logos or skins to personalize the food container 7800. In one embodiment, the electronic ink shells can be electrically connected to one or more of the control circuitry 7850 and one or more power storage elements 7844 and wireless communication module 7856. The user can change the skin or logo on the electronic ink shells via the remote electronic device (which can be wirelessly paired with the food container 7800 via the wireless communication module 7856). In one embodiment, the user can purchase skins via an app through their remote electronic device, and select the desired skin for display on the electronic ink shell of the food container 7800.

In another embodiment, the container 7800 can exclude the control circuitry 7850 and power storage elements 7840, and the temperature control system 7840 can include a passive heating or cooling element 7846 (e.g., a phase change material) that can heat or cool the foodstuff.

Though the features disclosed above may be described in connection with the container 7800, one of skill in the art will recognize that any of the features described in this embodiment can also apply to any of the containers disclosed herein (e.g., 400, 600, 1500, 1600, 1700A, 2000, 2100, 2800, 5000-7600), drinkware, dishware or serverware (e.g., bowl, serving dish, hot plate, cup and/or liquid container), including the plate 100, 100', 800, 800', 900, 1100, 1300, 1400, carafe, bread basket 2200, tortilla warmer 2300, etc. and the scope of disclosure and the invention is understood to cover such liquid containers, drinkware, dishware and serverware.

Sensors

With respect to any of the containers disclosed above, one or more sensors S1-Sn can be provided. In some embodiments, at least one sensor S2 of the one or more sensors S1-Sn can sense a liquid level (or information indicative of a liquid level) in a chamber (e.g., such as chamber 15 in FIG. 1, etc.) of the container.

In one embodiment, the sensor S2 can be a load cell that can sense a weight of the container (e.g., container 5000-7800). The electronic module EM of the container can receive the sensed weight information and compare it against a reference weight data (e.g., previously sensed when the container was empty and/or that is stored in a memory of the electronic module EM), and calculate a volume or level of the liquid in the container (e.g., using an algorithm to convert the sensed weight information to liquid volume or level measurement).

In another embodiment, the sensor S2 can be a pressure sensor on a bottom of the chamber (e.g., chamber 5015, 5115, etc.) of the container (e.g., container 5000-7800) and can sense a hydrostatic pressure of the liquid in the chamber. The electronic module EM can calculate a liquid volume or level based at least in part on the sensed pressure information from the sensor S2.

In another embodiment, the sensor S2 can be a capacitance sensor (e.g., capacitance sensing strip) that extends along at least a portion of the length of an inner sidewall (e.g., inner sidewall 5010, 5110, etc.) that defines the chamber (e.g., chamber 5015, 5115, etc.) of the container (e.g., container 5000-7800). The sensor S2 can sense a capacitance of a liquid in the container relative to a capacitance of air above the liquid level and communicate the sensed information to the electronic module EM, which can provide a measurement of liquid volume or liquid level in the container based on the sensed information. In another embodiment, the sensor S2 can sense a conductivity of the liquid or air proximate the sensor and the electronic module EM can provide a measurement of liquid level or volume based at least in part on the sensed information.

In another embodiment, the sensor S2 can be an ultrasonic sensor on an inner sidewall (e.g., inner sidewall 5010, 5110, etc.) that defines the chamber (e.g., chamber 5015, 5115, etc.) of the container (e.g., container 5000-7800). The sensor S2 can use a pulse-echo or wall resonance (e.g. resonance of inner sidewall 5010, 5110, etc.) to sense information indicative of a liquid level in the container. For example, the sensor S2 can sense a time it takes for pulse emitted by the sensor S2 into the chamber of the container to return to the sensor (e.g., once it bounces from the liquid level location). The sensor S2 can transmit the sensed information to the electronic module EM, which can provide a measurement of liquid volume or liquid level in the container based on the sensed information.

In another embodiment, the sensor S2 can be an accelerometer or tilt sensor. The sensor S2 can sense an orientation (or change in orientation) of the container (e.g., container 5000-7800) and communicate the sensed orientation information to the electronic module EM. The electronic module EM can estimate a liquid level in the container based on the sensed orientation information (e.g., using an algorithm that correlates a tilt angle to a liquid level). For example, if the sensor S2 senses an orientation of less than a first threshold (e.g., less than 30 degrees from an upright position) when a user has the container against their lips (e.g., sensed via a sensor on the container lip or lid, such as a contact sensor, temperature sensor, etc.) then the electronic module estimates the liquid level to be about full, and if the sensor S2 senses an orientation greater than a second threshold (e.g., greater than 90 degrees from an upright position) when a user has the container against their lips (e.g., sensed via a sensor on the container lip or lid, such as a contact sensor, temperature sensor, etc.) then the electronic module estimates the liquid level to be about empty, and the electronic module EM can use an algorithm to interpolate between the two thresholds to infer intermediate liquid levels of the container (e.g., half full, quarter full, etc.).

In another embodiment, the sensor S2 can be a light sensor that measures light attenuation through the liquid and provides the sensed information to the electronic module EM, which can provide a measurement of liquid volume or liquid level in the container based on the sensed information (e.g., using an algorithm to correlate light attenuation with liquid volume or level).

In another embodiment, the sensor S2 can be a float that floats on the liquid level in the chamber (e.g., chamber 5015, 5115, etc.) of the container (e.g., container 5000-7800) and communicates the sensed position information to the electronic module EM, which can provide a measurement of liquid volume or liquid level in the container based on the sensed information.

In another embodiment, liquid level in the container (e.g., container 5000-7800) is measured based on sensed temperature (or information indicative of temperature) from one or more (e.g., a plurality of) temperature sensors S3 (e.g., as discussed above in connection with the operation of the container 5000). In one embodiment, the one or more sensors S3 can sense how long it takes the temperature to increase a reference number of degrees (e.g., 1 degree F. or 1 degree C.) when the chamber of the container is full of liquid to provide a first reference time, and the first reference time can be stored in a memory (e.g., a memory of the electronic module EM). Optionally, additional reference times can be provided by the one or more sensors S3 when the chamber of the container has other volumes of liquid therein (e.g., half full, ¾ full) and the reference times stored in said memory. During operation of the container, the one or more temperature sensors S3 can measure how long it takes for the temperature in the chamber to change by said reference number of degrees and communicate the sensed time information to the electronic module EM, which can provide a measurement of liquid volume or liquid level in the container based on the sensed time information, for example, based on an algorithm correlating time versus liquid volume or level. In one embodiment, the sensed time information is compared against one or more of the reference times and the liquid level or volume interpolated between the level or volume values corresponding to the reference times. Optionally, the algorithm can calculate the liquid volume or level based at least in part on sensed ambient temperature (e.g., from a sensor S4), to account for variations in how long it takes the temperature to increases by the reference number of degrees depending on ambient temperature (e.g., at high altitude, low altitude, in winter, in summer, etc.). Use of the one or more temperature sensor S3 therefore advantageously allows measurement of temperature and liquid level in the container with one sensor instead of requiring a separate sensor to measure liquid level, which provides for a simpler and less costly system.

While certain embodiments of the inventions have been described, these embodiments have been presented by way of example only, and are not intended to limit the scope of the disclosure. Indeed, the novel methods and systems described herein may be embodied in a variety of other forms. For example, though the features disclosed herein are in describe for drinkware containers, the features are applicable to containers that are not drinkware containers (e.g., bowls, serverware, food storage containers) and the invention is understood to extend to such other containers. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Though the features and ideas disclosed above may be related to actively heating or cooling food or beverage, the embodiments above may also be used to heat or cool air spaces, such as refrigeration devices, cold boxes, coolers, portable coolers, or portable refrigerators, or hot boxes, or warmer drawers, or heat chambers, or any other device that would benefit from the heating or cooling of the air within a defined cavity or chamber.

Though the features disclosed above may be described in connection with the plate 100, 1100, mug 400, and travel mug 600, one of skill in the art will recognize that this embodiment can also apply to any liquid container, drinkware, dishware or serverware (e.g., bowl, serving dish, hot plate, cup and/or liquid container), including the plate 100', 800, 800', 900, 1100, 1300, 1400, travel mug 1700A, 2000, 2100, 2400, beer mug 1600, baby bottle 1500, bread basket 2200, tortilla warmer 2300, etc. and the scope of disclosure and the invention is understood to cover such liquid containers, drinkware, dishware and serverware.

Though the embodiments above are described in connection with dishware and drinkware, such as mugs, plates and travel mugs, one of ordinary skill in the art will recognize that the above described features and functions can also be incorporated into dinnerware, serverware (e.g., serving platters, bowls, tureens, Chafing Dishes, coffee carafes, bread baskets, bread warmers, tortilla warmers, trays, hot plates) and bakeware (e.g., casserole dishes) or bottles (e.g. baby bottles or portable drinking bottles) or other liquid or food containers. Additionally, the drinkware, dishware, serverware, etc. can be made of a ceramic material or other suitable materials (e.g., plastic or glass).

Various embodiments reference an electronic module, such as the electronic module 90, 490, 690. The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the body of the plate, serving dish, hot/cool plate, mug, travel mug, cup, liquid container or baby bottle, as disclosed herein. That is, the electronic module or electronics can have different form factors.

Of course, the foregoing description is that of certain features, aspects and advantages of the present invention, to which various changes and modifications can be made without departing from the spirit and scope of the present invention. Moreover, the heated or cooled dishware and drinkware need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. For example, one of skill in the art will recognize that the passive or active cooling elements described above for FIG. 9A can be incorporated into any of the other embodiments disclosed for the drinkware or dishware (e.g., plate 100, mug 400, travel mug 600). Additionally, one of skill in the art will recognize that a vacuum chamber can also be incorporated into all embodiments described above, such as the mug 400, the plate 100', bowl or serving dish and the travel mug 600', in a manner similar to that described above in connection with the plate 100", bowl or serving dish or travel mug 600", cup, water bottle or liquid container. It is contemplated that various combinations or subcombinations of these specific features and aspects of embodiments may be made and still fall within the scope of the invention. In addition, though the embodiments disclosed herein may be described in connection with a heated or cooled plate, mug, or travel mug, one of skill in the art will recognize that the features also apply to any liquid container, drinkware, dishware or serverware (e.g., platter), including the plate 100', 800, 800', 900, 1100, 1300, 1400, mug 400, travel mug 600, hot/cooled plate 1200, water bottle and baby bottle 1500 and the scope of disclosure and the invention is understood to cover such liquid containers, drinkware, dishware and serverware. Accordingly, it should be understood that various features and aspects of the disclosed embodiments can be combined with or substituted for one another in order to form varying modes of the discussed heated or cooled dishware, drinkware and/or serverware.

What is claimed is:

1. An actively heated or cooled portable food container for heating or cooling a meal, comprising:
   a removable lid;
   an insulated container body having an inner wall and a base attached to the inner wall, the inner wall and base defining a chamber that extends between an opening at a top end of the chamber configured to be removably sealed by the lid and a closed end at the base, the chamber configured to receive and hold a foodstuff, the foodstuff accessible solely through the opening at the top end of the chamber, the container body further comprising a cavity between the base and a bottom wall of the container body; and
   a temperature control system housed in the cavity, the temperature control system comprising
      one or more heating or cooling elements in thermal communication with the chamber and configured to heat or cool at least a portion of the chamber,
      circuitry configured to control the operation of the one or more heating or cooling elements,
      one or more sensors configured to sense one or more parameters of the foodstuff in the chamber and to communicate with the circuitry, the one or more sensors including at least one temperature sensor in thermal communication with the chamber, and
      one or more batteries configured to provide power to one or more of the circuitry, one or more sensors and one or more heating or cooling elements, wherein the circuitry is configured to:
      receive a meal time setting from a user corresponding to a start of a meal period,
      receive a temperature set point to which to heat or cool the foodstuff,
      receive a sensed temperature signal from the at least one temperature sensor corresponding to a sensed temperature of the foodstuff in the chamber,
      automatically calculate a period of time needed to heat or cool the foodstuff from the sensed temperature to the temperature set point,
      automatically calculate a start time for initiating operation of the one or more heating or cooling elements by subtracting the calculated period of time from the meal time setting, and
      automatically actuate operation of the one or more heating or cooling elements at the calculated start time prior to the meal time setting so that the foodstuff is at approximately the temperature set point at the start of the meal period.

2. The food container of claim 1, wherein at least one of the one or more heating or cooling elements is a phase change material.

3. The food container of claim 1, wherein the temperature control system further comprises a transceiver configured to communicate with a mobile electronic device and to one or both of transmit information to the mobile electronic device and to receive information from the mobile electronic device.

4. The container of claim 3, where the temperature control system further comprises a timer in communication with the control circuitry to initiate a heating or cooling operation of the active temperature control system at the calculated start time.

5. The container of claim 3, wherein the circuitry is configured to receive said meal time setting from the user via a user interface on one or both of the container and the mobile electronic device.

6. The container of claim 3, wherein the circuitry is configured to receive said temperature setpoint from the user via a user interface on one or both of the container and the mobile electronic device, the control circuitry configured to operate the one or more heating or cooling elements based at least in part on said temperature setpoint.

7. The container of claim 1, wherein the one or more sensors include one or more sensors configured to sense a level of foodstuff in the chamber and to communicate a signal indicative of said level to the circuitry, and wherein the circuitry automatically calculates the period of time needed to heat or cool the foodstuff from the sensed temperature to the temperature set point based at least in part on the signal indicative of the level of foodstuff in the chamber, the control circuitry configured to operate the one or more heating or cooling elements based at least in part on said sensed level.

8. The container of claim 7, wherein the control circuitry calculates a volume of foodstuff in the chamber based at least in part on the sensed level of foodstuff in the chamber, and wherein the circuitry automatically calculates the period of time needed to heat or cool the foodstuff from the sensed temperature to the temperature set point based at least in part on the calculated volume of foodstuff in the chamber, the control circuitry configured to operate the one or more heating or cooling elements based at least in part on the calculated volume.

9. The container of claim 1, wherein the container comprises an outer wall spaced from the inner wall to define a gap therebetween, the inner wall being insulated relative to the outer wall.

10. An actively heated or cooled portable food container for heating or cooling a meal, comprising:
 a removable lid;
 an insulated container body having a wall and a base, the wall and base defining a chamber configured to receive and hold a foodstuff therein, the foodstuff accessible solely via an opening at a top end of the chamber configured to be sealed by the lid when in the closed position; and
 an active temperature control system housed in the container body, comprising
  one or more heating or cooling elements in thermal communication with one or both of the wall and the base and configured to heat or cool one or both of the wall and the base to thereby heat or cool the foodstuff in the chamber;
  one or more batteries configured to provide power to the one or more heating or cooling elements;
  control circuitry configured to control the operation of the one or more heating or cooling elements;
  one or more temperature sensors in thermal communication with the chamber and configured to communicate one or more signals to the control circuitry indicative of a sensed temperature of the foodstuff in the chamber; and
  a transceiver configured to wirelessly communicate with a remote electronic device to one or both of transmit information to the remote electronic device and receive information from the remote electronic device,
 the control circuitry operable to:
  wirelessly receive from the remote electronic device a meal start time setting corresponding to a start of a meal period,
  wirelessly receive from the remote electronic device a temperature set point to which to heat or cool the foodstuff,
  receive the sensed temperature from the one or more temperature sensors corresponding to the sensed temperature of the foodstuff in the chamber,
  automatically calculate a period of time needed to heat or cool the foodstuff from the sensed temperature to the temperature set point,
  automatically calculate a start time for initiating operation of the one or more heating or cooling elements by subtracting the calculated period of time from the meal start time setting, and
  automatically actuate operation of the one or more heating or cooling elements at the calculated start time prior to the meal start time setting so that the foodstuff is at approximately the temperature set point at the start of the meal period.

11. The container of claim 10, further comprising an insulative layer between the one or more heating or cooling elements and the one or more batteries and control circuitry to thermally isolate the one or more heating or cooling elements.

12. The container of claim 10, where the temperature control system further comprises a timer in communication with the control circuitry to initiate a heating or cooling operation of the active temperature control system at the calculated start time.

13. The container of claim 10, further comprising one or more sensors configured to sense a level of foodstuff in the chamber and to communicate a signal indicative of said level to the circuitry, and wherein the circuitry automatically calculates the period of time needed to heat or cool the foodstuff from the sensed temperature to the temperature set point based at least in part on the signal indicative of the level of foodstuff in the chamber, the control circuitry configured to operate the one or more heating or cooling elements based at least in part on said sensed level.

14. The container of claim 10, wherein the container comprises an outer wall spaced from the wall to define a gap therebetween, the wall being thermally insulated relative to the outer wall.

15. The container of claim 14, where the gap is under a vacuum, the wall being thermally insulated relative to the outer wall by the vacuum.

* * * * *